(12) United States Patent
Ershov et al.

(10) Patent No.: US 8,908,735 B2
(45) Date of Patent: Dec. 9, 2014

(54) LASER SYSTEM

(75) Inventors: Alexander I. Ershov, San Diego, CA (US); William N. Partlo, Poway, CA (US); Daniel J. W. Brown, San Diego, CA (US); Igor V. Fomenkov, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 0 days.

(21) Appl. No.: 13/231,882

(22) Filed: Sep. 13, 2011

(65) Prior Publication Data

US 2012/0002687 A1 Jan. 5, 2012

Related U.S. Application Data

(63) Continuation of application No. 12/987,039, filed on Jan. 7, 2011, now Pat. No. 8,170,078, which is a (Continued)

(51) Int. Cl.
*H01S 3/22* (2006.01)

(Continued)

(52) U.S. Cl.
CPC ............. *H01S 3/225* (2013.01); *H01S 3/08004* (2013.01); *H01S 3/005* (2013.01);

(Continued)

(58) Field of Classification Search
CPC ........... G03F 7/70583; G03F 7/70025; G03F 7/70041; G03F 7/7055; G03F 7/70341; G03F 7/70558; G03F 7/70575; G03F 7/70616; G03F 7/70625; G02F 1/3534; G02F 1/37; H01S 3/225; H01S 3/10092; H01S 3/005; H01S 3/2333; H01S 3/0057; H01S 3/2251; H01S 3/2383; H01S 3/08059; H01S 3/08004; H01S 2301/02; H01S 3/08036; H01S 3/2258; H01S 3/08009; H01S 3/083

USPC ............................ 372/58, 57, 61, 55, 64, 108
See application file for complete search history.

(56) References Cited

U.S. PATENT DOCUMENTS 3,530,388 A 9/1970 Guerra et al.
3,566,128 A 2/1971 Arnuad (Continued)

FOREIGN PATENT DOCUMENTS

JP 2000-223408 2/1999
JP 11-330592 B 11/1999

(Continued)

OTHER PUBLICATIONS

Buczek, "C02 Regenerative Ring Power Amplifiers" Journal of Applied Physics, vol. 42, No. 8, pp. 33133-33137 (Jul. 1971).

(Continued)

*Primary Examiner* — Tuan Nguyen
(74) *Attorney, Agent, or Firm* — DiBerardino McGovern IP Group LLC

(57) ABSTRACT

A method and apparatus may comprise a line narrowed pulsed excimer or molecular fluorine gas discharge laser system which may comprise a seed laser oscillator producing an output comprising a laser output light beam of pulses which may comprise a first gas discharge excimer or molecular fluorine laser chamber; a line narrowing module within a first oscillator cavity; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses, which may comprise a ring power amplification stage.

17 Claims, 50 Drawing Sheets

Related U.S. Application Data continuation of application No. 11/787,180, filed on Apr. 13, 2007, now Pat. No. 7,885,309, which is a continuation-in-part of application No. 11/584,792, filed on Oct. 20, 2006, now abandoned, which is a continuation-in-part of application No. 11/521,904, filed on Sep. 14, 2006, now abandoned, and a continuation-in-part of application No. 11/522,052, filed on Sep. 14, 2006, now abandoned, and a continuation-in-part of application No. 11/521,833, filed on Sep. 14, 2006, now abandoned, and a continuation-in-part of application No. 11/521,860, filed on Sep. 14, 2006, now abandoned, and a continuation-in-part of application No. 11/521,834, filed on Sep. 14, 2006, now abandoned, and a continuation-in-part of application No. 11/521,906, filed on Sep. 14, 2006, now abandoned, and a continuation-in-part of application No. 11/521,858, filed on Sep. 14, 2006, now abandoned, and a continuation-in-part of application No. 11/521,835, filed on Sep. 14, 2006, now abandoned, and a continuation-in-part of application No. 11/521,905, filed on Sep. 14, 2006, now abandoned.

(60) Provisional application No. 60/732,688, filed on Nov. 1, 2005, provisional application No. 60/814,293, filed on Jun. 16, 2006, provisional application No. 60/814,424, filed on Jun. 16, 2006.

(51) Int. Cl.
 *H01S 3/225* (2006.01)
 *H01S 3/08* (2006.01)
 *H01S 3/00* (2006.01)
 *H01S 3/23* (2006.01)
 *H01S 3/083* (2006.01)
 *H01S 3/10* (2006.01)

(52) U.S. Cl.
 CPC .............. *H01S 3/2333* (2013.01); *H01S 3/083* (2013.01); *H01S 2301/02* (2013.01); *H01S 3/08009* (2013.01); *H01S 3/2258* (2013.01); *H01S 3/2251* (2013.01); *H01S 3/0057* (2013.01); *H01S 3/10092* (2013.01); *H01S 3/2383* (2013.01)
 USPC .......................................................... 372/57

(56) References Cited

U.S. PATENT DOCUMENTS

| | | | |
|---|---|---|---|
| 3,646,468 A | 2/1972 | Buczek et al. | |
| 3,646,469 A | 2/1972 | Buczek et al. | |
| 3,969,685 A | 7/1976 | Chenausky et al. | |
| 4,019,157 A | 4/1977 | Hutchinson et al. | |
| 4,107,628 A | 8/1978 | Hill et al. | |
| 4,135,787 A | 1/1979 | McLafferty | |
| 4,227,159 A | 10/1980 | Barrett et al. | |
| 4,229,106 A | 10/1980 | Dorschner et al. | |
| 4,239,341 A | 12/1980 | Cason, III et al. | |
| 4,247,831 A | 1/1981 | Lindop | |
| 4,264,870 A | 4/1981 | Avicola et al. | |
| 4,268,800 A | 5/1981 | Johnston, Jr. et al. | |
| 4,490,823 A | 12/1984 | Komine et al. | |
| 4,499,582 A | 2/1985 | Karning et al. | |
| 4,606,034 A | 8/1986 | Eden et al. | |
| 4,689,794 A | 8/1987 | Brosnan | |
| 4,982,406 A | 1/1991 | Facklam | |
| 5,097,478 A | 3/1992 | Verdiell et al. | |
| 5,233,460 A | 8/1993 | Partlo et al. | |
| 5,790,303 A | 8/1998 | Weston | |
| 5,852,627 A * | 12/1998 | Ershov | 372/108 |
| 5,940,418 A | 8/1999 | Shields | |
| 6,031,854 A | 2/2000 | Ming | |
| 6,191,887 B1 | 2/2001 | Michaloski et al. | |
| 6,320,886 B1 | 11/2001 | Dawber et al. | |
| 6,373,869 B1 | 4/2002 | Jacob | |
| 6,477,188 B1 | 11/2002 | Takaoka et al. | |
| 6,549,551 B2 * | 4/2003 | Ness et al. | 372/38.07 |
| 6,560,263 B1 | 5/2003 | Morton et al. | |
| 6,567,450 B2 | 5/2003 | Myers et al. | |
| 6,577,663 B2 | 6/2003 | Vogler | |
| 6,590,698 B1 | 7/2003 | Ohtsuki et al. | |
| 6,590,922 B2 | 7/2003 | Onkels et al. | |
| 6,625,191 B2 | 9/2003 | Knowles et al. | |
| 6,654,163 B1 | 11/2003 | Du et al. | |
| 6,690,704 B2 | 2/2004 | Fallon et al. | |
| 6,693,939 B2 | 2/2004 | Klene et al. | |
| 6,721,344 B2 | 4/2004 | Nakao et al. | |
| 6,741,627 B2 | 5/2004 | Kitatochi et al. | |
| 6,816,520 B1 | 11/2004 | Tulloch et al. | |
| 6,839,373 B1 | 1/2005 | Takehisa et al. | |
| 6,865,210 B2 | 3/2005 | Ershov et al. | |
| 6,879,617 B2 | 4/2005 | Ariga | |
| 6,901,084 B2 | 5/2005 | Pask et al. | |
| 6,904,073 B2 | 6/2005 | Yager et al. | |
| 6,928,093 B2 | 8/2005 | Webb et al. | |
| 6,940,880 B2 | 9/2005 | Butterworth et al. | |
| 7,006,547 B2 * | 2/2006 | Steiger et al. | 372/55 |
| 7,016,388 B2 | 3/2006 | Klene et al. | |
| 7,061,959 B2 | 6/2006 | Partlo et al. | |
| 7,072,375 B2 | 7/2006 | Ariga et al. | |
| 7,167,499 B2 | 1/2007 | Das et al. | |
| 7,184,204 B2 | 2/2007 | Govorkov et al. | |
| 7,212,275 B2 | 5/2007 | Ohtsuki | |
| 7,227,881 B2 | 6/2007 | Govorkov et al. | |
| 7,369,597 B2 | 5/2008 | Smith et al. | |
| 7,630,424 B2 | 12/2009 | Ershov | |
| 7,903,700 B2 * | 3/2011 | Nagai et al. | 372/20 |
| 8,116,347 B2 * | 2/2012 | Wakabayashi et al. | 372/57 |
| 2004/0156414 A1 | 8/2004 | Govorkov | |
| 2004/0202220 A1 | 10/2004 | Hua et al. | |
| 2005/0205811 A1 | 9/2005 | Partlo et al. | |
| 2005/0269300 A1 | 12/2005 | Partlo et al. | |
| 2005/0286599 A1 | 12/2005 | Rafac et al. | |
| 2006/0007978 A1 | 1/2006 | Govorkov et al. | |
| 2006/0114958 A1 | 6/2006 | Trintchouk et al. | |
| 2006/0126697 A1 | 6/2006 | Knowles et al. | |
| 2006/0146900 A1 | 7/2006 | Jacques et al. | |
| 2006/0209916 A1 | 9/2006 | Holtaway et al. | |
| 2006/0222034 A1 | 10/2006 | Ujazdowski et al. | |
| 2006/0227839 A1 | 10/2006 | Besaucele et al. | |
| 2006/0291517 A1 | 12/2006 | Gillespie et al. | |
| 2007/0001127 A1 | 1/2007 | Reiley et al. | |
| 2007/0091968 A1 | 4/2007 | Wakabayashi et al. | |
| 2007/0237192 A1 | 10/2007 | Das et al. | |
| 2007/0279747 A1 | 12/2007 | Hofmann | |

FOREIGN PATENT DOCUMENTS

| | | |
|---|---|---|
| JP | 2001077453 A | 3/2001 |
| JP | 2003008119 A | 1/2003 |
| JP | 2003332661 A | 7/2003 |
| JP | 2005502209 A | 1/2005 |
| JP | 2005512333 A | 4/2005 |
| JP | 2006024855 A | 1/2006 |
| JP | 2006505960 A | 2/2006 |
| WO | WO97/08792 | 3/1997 |
| WO | 03021728 A2 | 3/2003 |
| WO | 2004012308 A2 | 2/2004 |
| WO | 2004095661 A1 | 11/2004 |
| WO | WO2004/956661 * | 11/2004 |

OTHER PUBLICATIONS

Cobb, "EUV Photoresist Performance Results from the VNL and the EUV LLC" Emerging Lithographic Technologies VI, Editor Proceedings of SPIE, vol. 4688 (2002).

Fork, "Amplification of Femtosecond Optical Pulses Using a Double Confocal Resonator" Optics Letters vol. 14, No. 19 (Oct. 1989).

(56) References Cited

OTHER PUBLICATIONS

Goodman, "Speckle in Certain Imaging Applications" Speckle Phenomena In Optics—Chapt.6 Theory & Applications, pp. 187-233, (2009).

Lee, "Effect of Line Edge Roughness & Line Width Roughness on sub-100 nm Device Performance Advances in Resist Technology & Processing XXI". Proceedings of SPIE vol. 5376 (Bellingham, WA 2004).

Leunissen, "Full Spectral Analysis of Line Width Roughness, Metrology, Inspection & Process Control For Microlithography XIX" Proc. Of SPIE vol. 5752 (Bellingham, WA 2005).

Ming-Lai, "Transversely Pumped 11-Pass Amplifier for Femtosecond Optical Pulses", Applied Optics vol. 30, No. 30, pp. 4365-4367 (Oct. 20, 1991).

Monga, "Collimination of the Output Beam from an Asymmetric Unstable Ring Resonator", Applied Optics, vol. 24, No. 6, pp. 914-916 (Mar. 15, 1985).

Muckenheim, "50-W Average Power, 200-Hz Repetition Rate, 480-fs KrF Excimer Laser With Gated Gain Amplification", CLEO, p. 96 (2001).

Nabors "Injection Locking of a 13-W cw ND:YAG Ring Laser" Optics Letters, vol. 14, No. 21, (Nov. 1989).

Nabekawa, "50-W Average Power, 200-Hz Repetition Rate, 480-fs KrF Excimer Laser With Gated Gain Amplification", CLEO, p. 96 (2001).

Nadeau, "Relevance of Mask-Roughness-Induced Printed Line-Edge Roughness in Recent and Future Extreme Ultravioiet Lithography Tests", Applied Optics, vol. 43, Issue 20, pp. 4025-4032 (2004).

Naulleau "The Role of Temporal Coherence in Imaging with Extreme Ultraviolet Lithography Optics", Optics Communications, 219 pp. 57-63 (2003).

Nilsson, "High-Power Wavelength-Tunable Cladding-Pumped Rare-Earth-Doped Silica Fiber Lasers", Opt. Fiber Tech., 10, pp. 5-20 (2004).

Olson, "Multipass Diode-Pumped Nd:YAG Optical Amplifiers at 1.06 um & 1.32 um". IEEE Photonics Technology Letters, vol. 6, No. 5, pp. 605-608 (May 5, 1994).

Pacala, "A Wavelength Scannable XeCl Oscillator-Ring Amplifier Laser System", App. Phys. Letters, vol. 40, No. 1 (Jan. 1982).

Partlo, "Diffuser Speckle Model: Application to Multiple Moving Diffusers", Applied Optics, vol. 32, No. 16, pp. 3009-3014 (Jun. 1993).

Paschotta, "Regenerative Amplifiers" found at http://www.rp-photonics.com/regenerative_amplifiers.html.

Patsis, "Integrated Simulation of Line-Edge Roughness Effects on Sub-65 nm Transistor Operation: from Lithography Simulation, to LER Metrology, to Device Operation", Emerging Lithographic Technologies X, Proc. Of SPIE, vol. 6151, 61513J (2006).

Pawloski, "Characterization of Line Edge Roughness in Photoresist Using an Image Fading Technique", Advances in Resist Technology & Processing XXI, Proc. Of SPIE, vol. 5376. pp. 414-425 (SPIE, Bellingham, WA 2004).

Plaessmann, "Multipass Diode-Pumped Solid-State Optical Amplifier", Optics Letters, vol. 18, No. 17, pp. 1420-1422 (Sep. 1, 1993).

Rydberg, "Dynamic Laser Speckle as a Detrimental Phenomenon in Optical Projection Lithography" Microlith., Microfab., Microsyst., vol. 53, No. 1-1-1-8 (Jul.-Sep. 2006).

Sandstrom, "Dynamic Laser Speckle in Optical Projection Lithography: Causes, Effects on CDU & LER, and Possible Remedies", Optical Microlithography XVIII, Proc., of SPIE, vol. 5754, pp. 274-284 (SPIE. Bellingham, WA 2005).

Uppal, "Performance of a General Asymmetric Unstable Nd: Glass Ring Laser", Applied Optics, vol. 25, No. 1, pp. 97-101 (Jan. 1986).

Yamaguchi, "Impact of Long-Period Line-Edge Roughness on accuracy in CD Measurement" Proc. Of SPIE, vol. 5752 (SPIE, Bellingham, WA 2005).

"Ti-Sapphire Laser" found at http://en.wikipedia.org/wiki/Ti-sapphire_laser.

"Second Harmonic Generation" found at http:P//en.wikipedia.org/wiki/Second_harmonic_generation.

"Acousto-Optics Introduce Phase shift" found at http://laserfocusworldcom/articles.

Masakatsu Sugii et al., "High locking efficiency XeCl ring amplifier injection locked by backward stimulated Brillouin scattering," J. Appl. Phys. 62 (8), Oct. 15, 1987, pp. 3480-3482.

Japanese Patent Office, Official Action in Japanese Patent Application No. 2011-106816, May 7, 2013 (3 pages) with English translation (3 pages).

Japanese Patent Office, Official Action in Japanese Patent Application No. 2011-106816, Jan. 6, 2014 (2 pages) with English translation (3 pages).

* cited by examiner

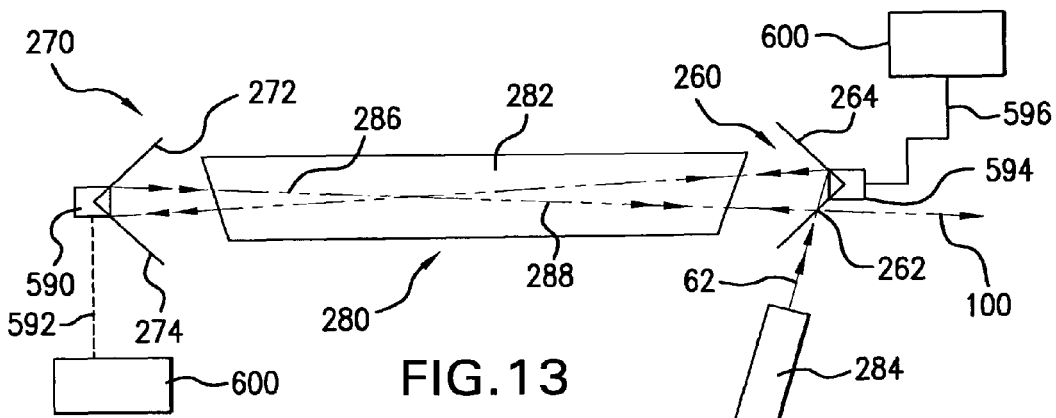
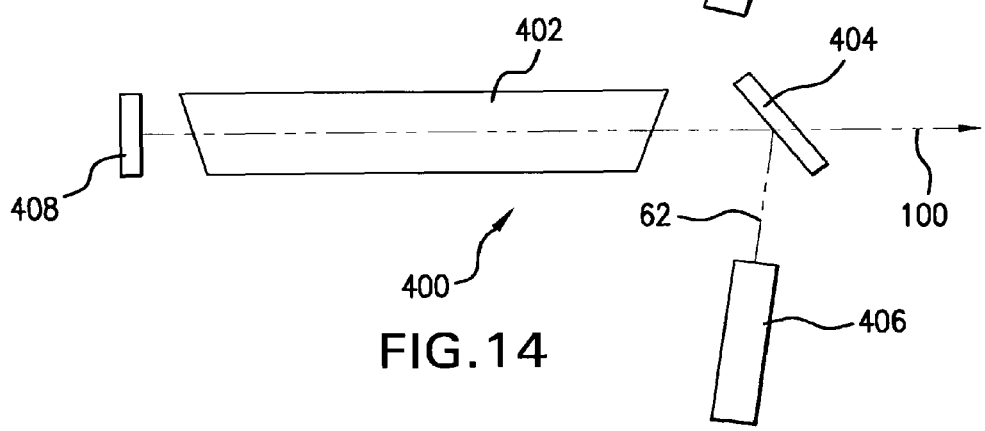
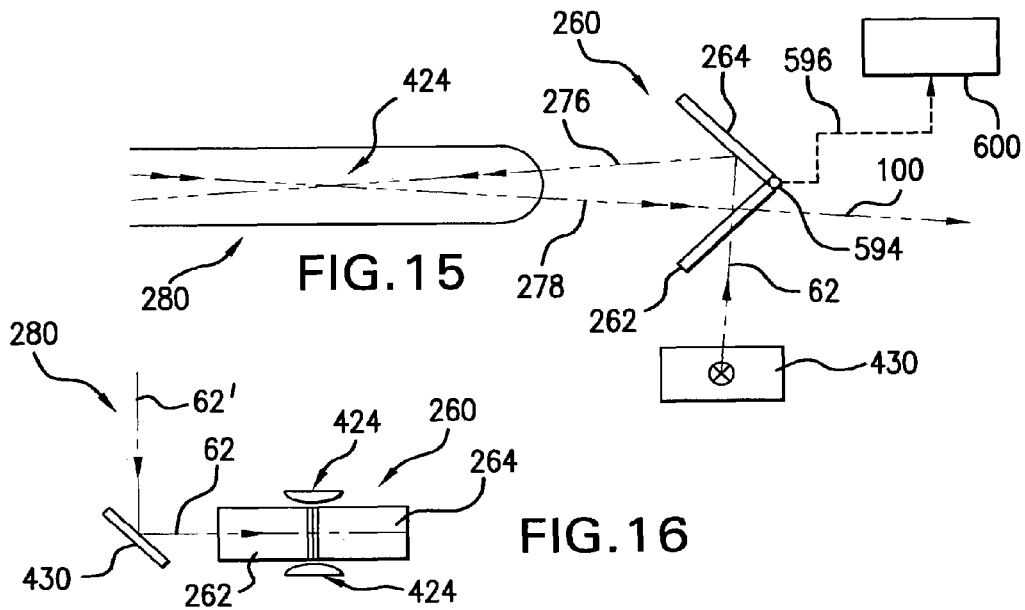

● 598: CORRELATION
▨ 594: NORMALIZED STANDARD DEVIATION
▥ 596: EQUIVALENT INDEPENDENT PULSES

● BLACK: CROSS-CORRELATION

LASER SYSTEM

CROSS-REFERENCE TO RELATED APPLICATIONS

The present application is a continuation of U.S. application Ser. No. 12/987,039, filed Jan. 7, 2011 and entitled LASER SYSTEM, which is a continuation of U.S. application Ser. No. 11/787,180, filed on Apr. 13, 2007 and entitled LASER SYSTEM, which is a continuation-in-part of U.S. application Ser. No. 11/584,792, filed on Oct. 20, 2006, entitled LASER SYSTEM, now abandoned, which is a continuation-in-part of U.S. application Ser. No. 11/521,904, filed Sep. 14, 2006, entitled LASER SYSTEM, now abandoned; U.S. application Ser. No. 11/522,052, filed Sep. 14, 2006, entitled LASER SYSTEM, now abandoned; U.S. application Ser. No. 11/521,833, filed Sep. 14, 2006, entitled LASER SYSTEM, now abandoned; U.S. application Ser. No. 11/521,860, filed Sep. 14, 2006, entitled LASER SYSTEM, now abandoned; U.S. application Ser. No. 11/521,834, filed Sep. 14, 2006, entitled LASER SYSTEM, now abandoned; U.S. application Ser. No. 11/521,906, filed Sep. 14, 2006, entitled LASER SYSTEM, now abandoned; U.S. application Ser. No. 11/521,858, filed Sep. 14, 2006, entitled LASER SYSTEM, now abandoned; U.S. application Ser. No. 11/521,835, filed Sep. 14, 2006, entitled LASER SYSTEM, now abandoned; and U.S. application Ser. No. 11/521,905, filed Sep. 14, 2006, entitled LASER System, now abandoned; which applications and the present application claim priority to U.S. Application No. 60/732,688, filed on Nov. 1, 2005, entitled 200 W GAS DISCHARGE EXCIMER OR MOLECULAR FLUORINE MULTICHAMBER LASER, and to U.S. Application No. 60/814,293 filed on Jun. 16, 2006, entitled 200 WATT DUV GAS DISCHARGE LASER SYSTEM, and to U.S. Application No. 60/814,424, filed on Jun. 16, 2006, entitled LONG LIVED MO IN MOPO CONFIGURED LASER SYSTEM, the disclosures of each of which are hereby incorporated by reference. The present application is also related to the applications referenced in the above noted co-pending and co-filed patent applications, the disclosures of which referenced applications are also hereby incorporated by reference.

FIELD OF THE SUBJECT MATTER DISCLOSED

The subject matter disclosed is related to high power gas discharge laser systems for DUV light sources, e.g., used in integrated circuit photolithography or other laser treatment applications such as laser annealing for low temperature polysilicon processing ("LTPS"), such as thin beam sequential lateral solidification ("tbSLS").

BACKGROUND

Deep ultraviolet light sources, such as those used for integrated circuit photolithography manufacturing processes have been almost exclusively the province of excimer gas discharge lasers, particularly KrF excimer lasers at around 248 nm and followed by ArF lasers at 198 nm having been brought into production since the early 90's, with molecular fluorine $F_2$ lasers also having also been proposed at around 157 nm, but as yet not brought into production.

To achieve resolution reduction at a fixed wavelength and fixed NA (i.e., an 193 nm XLA 165 on a XT:1400 with an NA of 0.93), one must optimize k1, where k1 represents process-dependent factors affecting resolution.

Based on Rayleigh's equation, for dry ArF tools today smaller resolution of state-of-the-art high-numerical-aperture ArF lithography can only be achieved with Resolution-Enhancement Techniques (RET's). RETs are a cost-effective way to maintain the aggressive evolution to smaller dimensions in IC manufacturing and are becoming integral to manufacturing lithography solutions.

These Process-related resolution enhancement efforts (lowering k1) have focused on reticle design, using methodologies such as phase shifting or pattern splitting on dual masks. While these techniques improve imaging, they also have significant drawbacks, including throughput loss. So when k1 is optimized for an application the only way to improve resolution further is to go back to the wavelength or NA.

Immersion lithography does just this for the 45 nm, the wavelength is constant at 193 nm so introducing water allows for NA's up to 1.35 and this relaxes the k1 requirement until processing at the 32 nm is required.

Since first introduction of excimer laser light sources in the DUV wavelength manufacturers of these light sources have been under constant pressure not only to reduce the wavelength, but also to increase the average power delivered to the wafer in the manufacturing process carried out by the steppers and scanners of the principle customers for such light sources, the stepper/scanner manufacturers, now including Canon and Nicon in Japan and ASML in the Netherlands.

This requirement for smaller and smaller wavelength has come from the need of the integrated circuit manufacturer customers for the stepper/scanner makers to be able to print smaller and smaller critical dimensions on the integrated circuit wafers. The need for higher power has generally been driven by either the need for more throughput or higher dose for exposing certain photo resists on the wafer, or both.

This steady progression down the road formed by the so-called Moore's law about the progression of integrated circuit capabilities, and thus, the number of transistors per unit area and thus also basically smaller and smaller critical dimensions, has created various and serious problems for the light source manufacturers to address. Particularly the move to the 193 nm wavelength node of light sources has resulted in several challenges.

The lower wavelength photons from an 193 nm laser system has having higher energies than the prior KrF 248 nm light sources has caused problems both for the light source manufacturers and the present day scanner manufacturers. Regions in both the light source and scanner receiving these higher energy photons, particularly at high energy density levels per unit area have been required to be made of what is currently the single window/lens material that can stand up to these optically damaging photons for any reasonably economical period of time, i.e., $CaF_2$. Such single material lenses in the scanners have required the scanner manufacturers to, e.g., demand virtually monochromatic light out of the laser light source systems, e.g., to avoid chromatic aberrations in the lenses.

The demand for smaller and smaller bandwidths (more and more monochromatic light) has required more and more precisely sensitive line narrowing units, e.g., containing etalon or grating line narrowing optical elements. Older style single chamber laser light sources suffered from short life of such line narrowing units because, among other things, much of the light entering the line narrowing unit is lost in the line narrowing process, the narrower the output bandwidth being required the larger the loss. Thus, the requirement was to send higher and higher pulse energy into the line narrowing unit in order to get a given pulse energy out of the laser system. Thus, e.g., formerly utilized single chamber ArF laser systems were capable of laser output pulses of around 5 mJ with reasonably cost effective lifetimes for the line narrowing units.

A first approach of the light source manufacturers, among other things, to address these issues with ArF light sources to get progressively narrower bandwidths and higher output average power was to increase pulse repetition rate, with essentially the same pulse energy per pulse. Thus through about 2002 pulse repetition, rates increased from hundreds of pulses per second to 4 kHz. This kept the optical damage per pulse down, but increased the overall exposure of the laser optics in the line narrowing units and elsewhere as the pulse repetition rate increased. In addition, higher pulse repetition rates created other problems for the light source manufacturers, principal of which were, e.g., increased electrode deterioration rates and requirements for faster gas circulation rates within the lasing chamber, i.e., requiring more fan motor power and adding more heat to the chamber and the fan motor and bearing assembly, resulting in reductions in mean time between replacement for the lasing chambers.

Higher pulse repetition rates also caused problems that the light source manufacturers had to address, e.g., in the magnetic switched pulse power supplies with timing and component lifetimes negatively impacted by the higher thermal loads, e.g., on the magnetic switching elements in the pulsed power system at the higher pulse repetition rates.

To add to the difficulties to be addressed by the light source manufacturers the integrated circuit have also continued to demand improvements in other laser pulse parameters, e.g., beam profile and beam divergence and pulse-to-pulse stability requirements, e.g., for bandwidth and energy and timing from the trigger signal from the scanner, etc. The ability to provide the various controls of the laser output and operating parameters of this nature can be negatively impacted by either or both of increased pulse energy demands and higher pulse repetition rate, along with variations in such things as the duty cycle (percentage of time the laser is firing) during operation), pulse energy selected by the scanner, rates of depletion of $F_2$ in the lasing chamber, etc.

For example the applicant's assignee's product the ELS-6010, The world's first variable 248 nm KrF excimer single chamber laser system, introduced in the late nineties, provided what was then advanced optical performance applicable to 130 nm node of semiconductor manufacturing. It provided what was then also a highly line-narrowed bandwidth of about 0.5 pm at full-width half-maximum (FWHM) and about 1.4 pm (95% energy integral), thus enabling lithography steppers and scanners to achieve full imaging performance using lenses with numerical apertures of >0.75. The ELS-6010 supported higher throughput rates for its day, e.g., operating at up to 2.5 kHz, 8 mJ pulse energy, for 20 W average power, the ELS-6010 also delivered what was then improved dose stability at the wafer for better CD control and higher yield. The ELS 6010 also provided for precise energy control to reduce the need for attenuation, optimize pulse usage, and extended the useful lifetime of laser consumables. Improvements to signal processing components in the wavelength stabilization module provided faster data acquisition and more reliable wavelength stability.

The ELS 6XXX models were followed by a later model, called by applicant's assignee the ELS 7000, addressing even more aggressive requirements of the semiconductor industry for the sub-130 design node. This also KrF 248 nm wavelength excimer single chamber laser system delivered even more tightly constricted bandwidth at higher power in order to reduce CD geometry in semiconductor photolithography, further improving throughput, and reducing operating costs.

The 7000 was also made available in an ArF 193 nm wavelength version. More average power was delivered by increasing pulse repetition rate from 2.5 kHz to 4 kHz. The 7010 added improved line narrowing performance (selecting bandwidth) and wavelength stabilization, e.g., to insure better focus control, maximize exposure latitude, and improve semiconductor circuit critical dimension ("CD") control. Improvements were also made in the gas injection algorithm, e.g., for injecting small, precise amounts of gas into the laser chamber during exposure sequences to provide superior energy stability. The ELS-7000 was aimed to meet the requirements of high volume product of sub-0.13 micron devices on 248 nm exposure tools. Offering 4 kHz, 7.5 mJ, 30 W optical output, plus the same ultra-low bandwidth performance as the 6010, and high-speed wavelength control, the ELS-7000 also reduced laser consumables costs.

The ELS 7000 was followed in about 2001 by applicants' assignee's ELS 7010 model that further aggressively addressed the performance and cost requirements of the semiconductor industry for the sub-100 nm design nodes. The ELS-7010, also a 4-kHz krypton fluoride (KrF, 248 nm), excimer light source addressed the demands of the photolithography by the semiconductor industry for sub-100 nm design nodes. The ELS-7010 offered further increased power and bandwidth performance parameters for KrF light sources and still further decreased the cost of consumables (CoC). The ELS-7010 provided a 50 to 100 percent improvement on the expected life of each of the major consumable modules, while at the same time increasing power and further reducing bandwidth. The ELS 7010 was a 4 kHz, 10 mJ, 40 W, (FWHM) 0.35 pm and (E95%) 1.2 pm, single chamber laser system Another follow on, and probably the further extent of single chamber excimer laser technology was applicants' assignee's Nanolith 7000 ArF (193 nm) single chamber laser system introduced in about 2002. The Nanolith 7000 was an ArF laser system with about the same bandwidth specifications at 193 nm as the ELS 7000, i.e., ≤0.5 pm FWHM and ≤1.3 pm (E 95% intensity integral) at 5 mJ and 4 kHz (20 Watt) operation to power next-generation lithography tools with superior spectral power and highly focused line-narrowed bandwidth, while again reducing laser consumable costs, a more difficult task at 193 nm, due mostly to increased optical damage resulting from the reduced wavelength light. The 193 nm Nanolith ArF light source for volume photolithography semiconductor manufacturing, with its highly line-narrowed, high power and high accuracy tuned wavelength control enabled the most advanced imaging of that time, e.g., with NA>0.75 below the 100 nm node, still meeting the then current such other requirements as image contrast and wafer throughput, enabling chip design to shrink even further, accommodating, e.g., faster processor speed, larger memory capacity per chip, and at the same time better yield per wafer.

Featuring, e.g., a new chamber design, the NanoLith 7000 incorporated new technological advances in power design, laser discharge chamber, and wavelength control to enable tight control of exposure dose energy (<±0.3%) and laser wavelength stability (<±0.03 pm). On-Board laser metrology provided pulse-to-pulse data acquisition and feedback control to minimize transient wavelength instabilities, thereby enhancing exposure process latitude and CD control.

However, as even further demands for shrinking bandwidth and increased power moved even beyond the technological advances of applicant's assignees world-class single chamber laser systems, it became clear that something would have to replace the single chamber system. Further optimizing such beam parameters as bandwidth, including keeping it within some specific range, e.g., for OPC reasons, rather than just a not to exceed specification, was becoming impossible at the necessary average power levels. At the time, it was also deemed that increasing repetition rate was not the effective path to take for a number of reasons.

Applicant's assignee's chosen solution was a two chambered laser system comprising a seed laser pulse beam producing laser chamber, e.g., a master oscillator ("MO"), also of the gas discharge excimer variety, seeding another laser chamber with an amplifying lasing medium, also of the same excimer gas discharge variety, acting to amplify the seed beam, a power amplifier ("PA"). Other so-called master oscillator-power amplifier ("MOPA") laser systems had been known, mostly in the solid state laser art, essentially for boosting power output. applicants' assignee came up with the concept of the utilization of seed laser chamber in which a seed laser was produced, with the view of optimizing that chamber operation for selecting/controlling desirable beam parameters, e.g., bandwidth, beam profile, beam spatial intensity distribution, pulse temporal shape, etc. and then essentially amplifying the pulse with the desirable parameters in an amplifier medium, e.g., the PA. This breakthrough by applicants' assignee was able to meet the then current demands attendant to the continually shrinking node sizes for semiconductor photolithography DUV light sources.

The first of these two chamber laser systems was the XLA-100, providing leading edge optical and power performance in an ultra line narrowed, high power argon fluoride (ArF) production light source. The dual chamber Master Oscillator Power Amplifier (MOPA) architecture developed by applicants' assignee, was capable of 40 W of average output power, double the output power of Cymer's earlier, single chamber-based Nanolith 7000 ArF models, while also meeting even increasingly stringent performance and cost requirements necessary for semiconductor chip production at the <100-nm node. Providing an ultra line-narrowed spectral bandwidth of about 0.25 pm FWHM, and about 0.65 pm E95% integral, the tightest spectral bandwidth performance of any deep-ultraviolet (DUV) production light source up to that time, i.e., about 2003, the XLA 100 provided the light that enabled high contrast imaging for lithography tools with an numerical aperture (NA) up to 0.9.

This was mostly because less energy was wasted in the MO chamber in producing the beam with selected optical parameters, e.g., bandwidth, and the amplifier medium provided plenty of amplification to get an output of the MO at about, e.g., 1 mJ up to a PA output of 10 mJ, 40 watts average output power at 4 kHz operating pulse repetition rate. This allowed, e.g., fewer pulses per exposure window, e.g., enabling the use of less pulses per exposure. The same tight exposure controls were available, i.e., exposure dose (about ±0.3 percent) and wavelength stability (about ±0.025 pm) by providing pulse-to-pulse data acquisition and feedback control to its in-situ metrology system, involving sampling at the outputs of both the MO and PA.

In about the end of 2005 applicants' assignee introduced the XLA-200, a second generation two chamber XLA laser system which became the world's first immersion photolithography enabling gas discharge laser light source even further reduced the ultra line narrowed output at 50% more average output power than the original XLA-100 series. In a quest for smaller feature sizes, new and innovative technologies were needed to meet the mandate of Moore's law and the concomitant ever smaller CD sizes, especially with extreme ultraviolet sources (EUV") delivery dates being moved out to the end of the first decade of the new millennium or further.

The introduction of a fluid of different refraction index than air, e.g., water, to the exposure process, known as Immersion Lithography, was becoming a cost-effective and production-viable technique for extending 193 nm wavelength lithography technologies to meet sub-65 nm process nodes, i.e., ultra-high numerical aperture (NA), immersion-scanner systems.

The XLA 200 met stringent performance and cost requirements necessary for the most sophisticated semiconductor chip production techniques-providing ultra-pure spectral performance of about 0.12 pm FWHM and 0.25 pm E95% integral-to support the ultra-high NA scanner systems required for sub-65 nm exposure, while simultaneously providing high power, (up to 60 W), to support the industry's high productivity needs. Leading edge spectral metrology, used in the XLA series, also enabled monitoring and maintaining the very high spectral purity, including on-board high-accuracy E95% intensity integral bandwidth metrology, e.g., for providing the process control needed for immersion lithography technologies. The XLA 200 was a 193 nm, 4 kHz, 15 mJ, 60 W two-chamber laser system.

Subsequently applicants' assignee introduced in about early 2006 the XLA 300, a 6 kHz 90 W version of the XLA 200. For 193 nm immersion lithography has emerged as the leading for the critical layer processing down to the 32 nm node XLA 300 meet the requirements. Even at the 45 nm node, requirements for critical dimensions, profiles, line edge roughness and overlay requirements of different layers impact design margin and limit yield. High throughput hyper NA (>1.2) exposure tools along with polarized illumination effects and optimized Resolution Enhancement Techniques (RET) will be required for process control, which can be met only by the introduction of applicants assignee's XLA 300 series laser systems. With the k1 physical limit at 0.25 (for memory applications <0.30 is aggressive, logic is usually higher), for 45 nm processing high NA exposure tools and high spectral power (high laser power & high spectral purity) lasers are required. This is what the applicants; assignee's XLA 300 series of lasers currently delivers.

Unfortunately, Moore's law is not done and EUV is still a development project. Therefore addressing even higher power requirements for 193 nm laser light sources is required. Two major obstacles to the typical pulse repetition rate increases evidenced in the advancement of power output in the above noted single chamber laser systems and later two chamber laser systems is the difficulty of getting excimer gas discharge laser system chambers to operate at above 6 kHz and the increased optical damage to certain optical components exposed to the most severe doses of 193 nm light during operation as the pulse repetition rate goes even higher, even with the MOPA architecture. In addition, for various reasons, including the higher pressure operation of the MO's needed, e.g., to extract as much pulse energy as possible out of the line narrowed MO chamber, e.g., around 380 kPa total gas pressure, with, e.g., around a maximum of about 38 kPa of fluorine partial pressure caused conditions advantageous to longer chamber lifetimes to not be attainable, which along with LNM lifetime issues was contributing to the increase in CoC of XLA laser systems.

This latest generation MOPA-based Argon Fluoride light source can provide an ultra-line narrowed bandwidth as low as 0.12 pm FWHM and 0.30 pm 95% energy integral laser light source supporting very high numerical aperture dioptric and catadioptric lens immersion lithography scanners. The XLA 300 introduces an extendable 6 kHz platform to deliver 45 to 90 W of power. Increased repetition rate, along with pulse stretching, minimizes damage to the scanner system optics. State-of-the-art on-board E95% bandwidth metrology and improved bandwidth stability to provide enhanced Critical Dimension control. Longer chamber lifetimes and proven power optics technology extends the lifetime of key laser modules to improve (reduce) CoC (Cost of Consumables), through, e.g., longer chamber lifetimes and proven power optics technology that extends the lifetime of key laser modules.

In the area of simply generating high average power, e.g., around 100 w and above and up to even 200 w and above, with laser systems operating at not much greater than 6 kHz, the MOPA system, eliminating the line narrowing from the required architecture for the MO still requires new technology.

One possible solution is to use an amplifying medium that comprises a power oscillator. The PA of applicants' assignee is optimized both for amplification and for preservation of the desirable output beam pulse parameters produced in the MO with optimized, e.g., line narrowing. An amplifier medium that is also an oscillator, a power oscillator ("PO"), has been proposed and used by applicants' assignee's competitor GigaPhoton, as evidenced in U.S. Pat. No. 6,721,344, entitled INJECTION LOCKING TYPE OR MOPA TYPE OF LASER DEVICE, issued on Apr. 13, 2004 to Nakao et al; U.S. Pat. No. 6,741,627, entitled PHOTOLITHOGRAPHIC MOLECULAR FLUORINE LASER SYSTEM, issued on May 25, 2004 to Kitatochi et al, and U.S. Pat. No. 6,839,373, entitled ULTRA-NARROWBAND FLUORINE LASER APPARATUS, issued on Jan. 4, 2005 to Takehisha et al.

Unfortunately the use of an oscillator such as with front and rear reflecting mirrors (include a partially reflecting output coupler, and input coupling, e.g., through an aperture in one of the or through, e.g., a 95% reflective rear reflector) has a number of drawbacks. The input coupling from the MO to the amplifier medium is very energy loss-prone. In the amplifier medium with such an oscillator cavity optimized beam parameters selected, e.g., in the MO chamber, may be denigrated in such an oscillator used as an amplifying medium. An unacceptable level of ASE may be produced.

Applicant's propose an architecture that can preserve the optimized beam parameters developed in an MO chamber almost to the same degree as applicants' assignee's present XLA XXX systems, while producing much more efficient amplification from the amplification medium, e.g., to give current levels of output average power with strikingly reduced output pulse energy from the MO (seed laser) resulting in, e.g., a much lower CoC for the MO. Further, applicants believe that according to aspects of embodiments of the subject matter disclosed, e.g., pulse-to-pulse stability or a number of laser output parameters can also be greatly improved.

Increased Wafer Throughput & Productivity maintaining the advancing requirements for Deep Ultra Violet lithography in mass production, and increasing importance on the economics of the laser use is satisfied in part by increasing the laser's repetition rate to 6 kHz and output power to 90 W. Resolution and critical dimension (CD) control in advanced lithography, at the 193 nm, requires a narrow spectral bandwidth, e.g., because all lens materials have some degree of chromatic aberration, necessitating a narrow bandwidth laser to reduce the wavelength variation in the light source, thereby diminishing the impact of chromatic aberration. Very narrow bandwidth can improve the ultimate resolution of the system, or, alternatively can give lens designers more focal latitude. Expensive calcium fluoride optics suffer less chromatic aberration at 193 nm than fused silica does. Narrow bandwidth lasers reduce the need for calcium fluoride optics in 193 nm exposure systems. Spectral engineering, e.g., for critical dimension (CD) control, e.g., driven by more aggressive use of optical proximity correction and higher NA lenses increased the sensitivity to BW and BW changes, including not just bandwidth specification of not to exceed, but bandwidth specification of within a relatively narrow range between a high (the formerly not to exceed type of limit) and a low. Stable BW is even more important for ArF than it has been for KrF. Even a very low BW can yield poor CD if exhibiting significant variations underneath the upper limit. Thus, both BW metrology and BW stabilization are critical technologies for good CD control.

A 6 kHz Repetition Rate results also in improved dose performance to minimize CD variation at the 45 nm node, which can reduced dose quantization errors, e.g., that occur when the exposure slit does not capture all pulses in the dose. In addition, dose errors due to laser beam dynamics can cause imperfections of the exposure slit profile. A newly designed LNM for the XLA 300, e.g., uses a higher resolution dispersive element and an improved wavelength control actuation mechanism, which improved LNM in combination with applicant's assignee's Reduced Acoustic Power (RAP) chamber provides excellent stability of bandwidth.

Other problems exist in such arrangements, e.g., ASE production can be significant enough, e.g., in the power amplification stage to cause downstream problems in the line narrowed versions, because the ASE is out of band. The ASE may also cause problems in the, e.g., broadband, e.g., LTPS versions, since the beam treatment optics, e.g., to produce an elongated and very thin, e.g., 10μ or so wide, beam may be sensitive to light well out of the broadband normally produced by excimer lasing in the amplification stage. In addition, ASE can rob gain medium and thus lower the available in-band or otherwise useable output of the amplification stage.

Buczek, et al, $CO_2$ Regenerative Ring Power Amplifiers, J. App. Phys., Vol. 42, No. 8 (July 1971) relates to a unidirectional regenerative ring $CO_2$ laser with above stable (conditionally stable) operation and discusses the role of gain saturation on $CO_2$ laser performance. Nabors, et al, Injection locking of a 13-W Nd:YAG ring laser, Optics Ltrs., vol. 14, No 21 (November 1989) relates to a lamp-pumped solid-state CW ring laser injection locked by a diode-pumped solid state Nd:YAG master oscillator. The seed is input coupled into the ring laser by a half-wave plate, a Faraday rotator and a thin film polarizer forming an optical diode between the seed laser and the amplifier. Pacala, et al., A wavelength scannable XeCl oscillator-ring amplifier laser system, App. Phys. Ltrs., Vol. 40, No. 1 (January 1982); relates to a single pass excimer (XeCl) laser system seeded by a line narrowed XeCl oscillator. U.S. Pat. No. 3,530,388, issued to Buerra, et al. on Sep. 22, 1970, entitled LIGHT AMPLIFIER SYSTEM, relates to an oscillator laser seeding two single pass ring lasers in series with beam splitter input coupling to each. U.S. Pat. No. 3,566,128, issued to Amaud on Feb. 23, 1971, entitled OPTICAL COMMUNICATION ARRANGEMENT UTILIZING A MULTIMODE OPTICAL REGENERATIVE AMPLIFIER FOR PILOT FREQUENCY AMPLIFICATION, relates to an optical communication system: with a ring amplifier. U.S. Pat. No. 3,646,468, issued to Buczek, et al. on Feb. 29, 1972 relates to a laser system with a low power oscillator, a high power oscillator and a resonance adjustment means. U.S. Pat. No. 3,646,469, issued to Buczek, et al. on Feb. 29, 1097, entitled TRAVELLING WAVE REGENERATIVE LASER AMPLIFIER, relates to a laser system like that of the '468 Buczek patent with a means for locking the resonant frequency of the amplifier to frequency of the output of the oscillator. U.S. Pat. No. 3,969,685, issued to Chenausky on Jul. 13, 1976, entitled ENHANCED RADIATION COU- PLING FROM UNSTABLE LASER RESONATORS relates to coupling energy from a gain medium in an unstable resonator to provide a large fraction of the energy in the central lobe of the far field. U.S. Pat. No. 4,107,628, issued tot Hill, et al., on Aug. 15, 1978, entitled CW BRILLOUIN RING LASER, relates to a Brillouin scattering ring laser, with an acousto-optical element modulating the scattering frequency. U.S. Pat. No. 4,135,787, issued to McLafferty on Jan. 23, 1979, entitled UNSTABLE RING RESONATOR WITH CYLINDRICAL MIRRORS, relates to an unstable ring resonator with intermediate spatial filters. U.S. Pat. No. 4,229,106, issued to Domschner on Oct. 21, 1980, entitled ELECTROMAGNETIC WAVE RING GENERATOR, relates to a ring laser resonator with a means to spatially rotate the electronic field distribution of laser waves resonant therein, e.g., to enable the waves to resonate with opposite polarization. U.S. Pat. No. 4,239,341 issued to Carson on Dec. 16, 1980, entitled UNSTABLE OPTICAL RESONATORS WITH TILTED SPHERICAL MIRRORS, relates to the use of tilted spherical mirrors in an unstable resonator to achieve asymmetric magnification to get "simultaneous confocality" and obviate the need for non-spherical mirrors. U.S. Pat. No. 4,247,831 issued to Lindop on Jan. 27, 1981, entitled RING LASERS, relates to a resonant cavity with at least 1 parallel sided isotropic refracting devices, e.g., prisms, with parallel sides at an oblique angle to part of light path that intersects said sides, along with a means to apply oscillating translational motion to said refracting devices. U.S. Pat. No. 4,268,800, issued to Johnston et al. on May 19, 1981, entitled, VERTEX-MOUNTED TIPPING BREWSTER PLATE FOR A RING LASER, relates to a tipping Brewster plate to fine tune a ring laser located close to a flat rear mirror A acting as one of the reflecting optics of the ring laser cavity. U.S. Pat. No. 4,499,582, entitled RING LASER, issued to Karning et al. on Feb. 5, 1980, relates to a ring laser system with a folded path pat two separate pairs of electrodes with a partially reflective input coupler at a given wavelength. U.S. Pat. No. 5,097,478, issued to Verdiel, et al. on Mar. 17, 1992, entitled RING CAVITY LASER DEVICE, relates to a ring cavity which uses a beam from a master laser to control or lock the operation of a slave laser located in the ring cavity. It uses a non-linear medium in the cavity to avoid the need of insulators, e.g., for stabilizing to suppress oscillations, e.g., as discussed in Col 4 lines 9-18. Nabekawa et al., 50-W average power, 200-Hz repetition rate, 480-fs KrF excimer laser with gated gain amplification, CLEO (2001), p. 96, e.g., as discussed with respect to FIG. 1, relates to a multipass amplifier laser having a solid state seed that is frequency multiplied to get to about 248 nm for KrF excimer amplification. U.S. Pat. No. 6,373,869, issued to Jacob on Apr. 16, 2002, entitled SYSTEM AND METHOD FOR GENERATING COHERENT RADIATION AT ULTRAVIOLET WAVELENGTHS, relates to using an Nd:YAG source plus an optical parametric oscillator and a frequency doubler and mixer to provide the seed to a multipass KrF amplifier. U.S. Pat. No. 6,901,084, issued to Pask on May 31, 2005, entitled STABLE SOLID STATE RAMAN LASER AND A METHOD OF OPERATING SAME, relates to a solid-state laser system with a Raman scattering mechanism in the laser system oscillator cavity to frequency shift the output wavelength. U.S. Pat. No. 6,940,880, issued to Butterworth, et al. on Sep. 6, 2005, entitled OPTICALLY PUMPED SEMICONDUCTOR LASER, relates to a optically pumped semiconductor laser resonance cavities forming part of a ring resonator, e.g., with a non linear crystal located in the ring, including, as discussed, e.g., with respect to FIGS. 1, 2, 3, 5 & 6, having a bow-tie configuration. U.S. Published Patent Application No. 2004/0202220, published on Oct. 14, 2004, with inventors Hua et al, entitled MASTER OSCILLATOR-POWER AMPLIFIER EXCIMER LASER SYSTEM, relates to an excimer laser system, e.g., with in a MOPA configuration, with a set of reflective optics to redirect at least a portion of the oscillator beam transmitted through the PA back thru PA ion the opposite direction. U.S. Published Patent Application No. 2005/0002425, published on Jan. 1, 2003, with inventors Govorkov et al, entitled MASTER-OSCILLATOR POWER-AMPLIFIER (MOPA) EXCIMER OR MOLECULAR FLUORINE LASER SYSTEM WITH LONG OPTICS LIFETIME, relates to, e.g., a MOPA with a pulse extender and using a beamsplitting prism in the pulse extender, a housing enclosing the (MO+PA) and reflective optics, with the pulse extender mounted thereon, and reflective optics forming a delay line around the PA. U.S. Published application No. 2006/0007978, published on Jan. 12, 2006, with inventors Govokov, et al., entitled BANDWIDTH-LIMITED AND LONG PULSE MASTER OSCILLATOR POWER OSCILLATOR LASER SYSTEM, relates to a ring oscillator with a prism to restrict bandwidth within the oscillator.

U.S. Pat. No. 6,590,922 issued to Onkels et al. on Jul. 8, 2003, entitled INJECTION SEEDED F2 LASER WITH LINE SELECTION AND DISCRIMINATION discloses reverse injection of and $F_2$ laser undesired radiation centered around one wavelength through a single pass power amplifier to selectively amplify a desired portion of the $F_2$ spectrum for line selection of the desired portion of the $F_2$ spectrum in a molecular fluorine gas discharge laser. in F2 laser.

U.S. Pat. No. 6,904,073 issued to Yager, et al. on Jun. 7, 2005, entitled HIGH POWER DEEP ULTRAVIOLET LASER WITH LONG LIFE OPTICS, discloses intracavity fluorine containing crystal optics exposed to lasing gas mixtures containing fluorine for protection of the optic.

Published International application WO 97/08792, published on Mar. 6, 1997 discloses an amplifier with an intracavity optical system that has an optical path that passes each pass of a sixteen pass through the same intersection point at which is directed a pumping source to amplify the light passing through the intersection point.

R. Paschotta, Regenerative amplifiers, found at http://www.rp-photonics.com/regenerative_amplifiers.html (2006) discusses the fact that a regenerative amplifier, may be considered to be an optical amplifier with a laser cavity in which pulses do a certain number of round trips, e.g., in order to achieve strong amplification of short optical pulses. Multiple passes through the gain medium, e.g., a solid state or gaseous lasing medium may be achieved, e.g., by placing the gain medium in an optical cavity, together with an optical switch, e.g., an electro-optic modulator and/or a polarizer. The gain medium may be pumped for some time, so that it accumulates some energy after which, an initial pulse may be injected into the cavity through a port which is opened for a short time (shorter than the round-trip time), e.g., with the electro-optic (or sometimes acousto-optic) switch. Thereafter the pulse can undergo many (possibly hundreds) of cavity round trips, being amplified to a high energy level, often referred to as oscillation. The electro-optic switch can then be used again to release the pulse from the cavity. Alternatively, the number of oscillations may be determined by using a partially reflective output coupler that reflects some portion, e.g., around 10%-20% of the light generated in the cavity back into the cavity until the amount of light generated by stimulated emission in the lasing medium is such that a useful pulse of energy passes through the output coupler during each respective initiation and maintenance of an excited medium, e.g., in an electrically pumped gas discharge pulsed laser system, the gas discharge between the electrodes caused by placing a voltage across the electrodes at the desired pulse repetition rate. Uppal et al, Performance of a general asymmetric Nd:glass ring laser, Applied Optics, Vol. 25, No. 1 (January 1986) discusses an Nd:glass ring laser. Fork, et al. Amplification of femtosecond optical pulses using a double confocal resonator, Optical Letters, Vol. 14, No. 19 (October 1989) discloses a seed laser/power amplifier system with multiple passes through a gain medium in a ring configuration, which Fork et al. indicates can be "converted into a closed regenerative multi pass amplifier by small reorientations of two of the four mirrors that compose the resonator [and providing] additional means . . . for introducing and extracting the pulse from the closed regenerator. This reference refers to the open-ended amplifier portion with fixed number of passes through the amplifier portion (fixed by the optics an, e.g., how long it takes for the beam to walk off of the lens and exit the amplifier portion as a "resonator". As used herein the term resonator and other related terms, e.g., cavity, oscillation, output coupler are used to refer, specifically to either a master oscillator or amplifier portion, the power oscillator, as lasing that occurs by oscillation within the cavity until sufficient pulse intensity exists for a useful pulse to emerge from the partially reflective output coupler as a laser output pulse. This depends on the optical properties of the laser cavity, e.g., the size of the cavity and the reflectivity of the output coupler and not simply on the number of reflections that direct the seed laser input through the gain medium a fixed number of times, e.g., a one pass, two pass, etc. power amplifier, or six or so times in the embodiment disclosed in Fork, et al. Mitsubishi published Japanese Patent Application Ser. No. JP11-025890, filed on Feb. 3, 1999, published on Aug. 11, 2000, Publication No. 2000223408, entitled SEMICONDUCTOR MANUFACTURING DEVICE, AND MANUFACTURING OF SEMICONDUCTOR DEVICE, disclosed a solid state seed laser and an injection locked power amplifier with a phase delay homogenizer, e.g., a grism or grism-like optic between the master oscillator and amplifier. U.S. Published application 20060171439, published on Aug. 3, 2006, entitled MASTER OSCILLATOR-POWER AMPLIFIER EXCIMER LASER SYSTEM, a divisional of an earlier published application 20040202220, discloses as master oscillator/power amplifier laser system with an optical delay path intermediate the master oscillator and power amplifier which creates extended pulses from the input pulses with overlapping daughter pulses.

Partlo et al, Diffuser speckle model: application to multiple moving diffusers, discusses aspects of speckle reduction. U.S. Pat. No. 5,233,460, entitled METHOD AND MEANS FOR REDUCING SPECKLE IN COHERENT LASER PULSES, issued to Partlo et al. on Aug. 3, 1993 discusses misaligned optical delay paths for coherence busting on the output of gas discharge laser systems such as excimer laser systems.

The power efficiency of a regenerative amplifier, e.g., using a switching element, can be severely reduced by the effect of intracavity losses (particularly in the electro-optic switch). Also, the reflectivity of a partially reflective output coupler can affect both intracavity losses and the duration of the output pulse, etc. The sensitivity to such losses can be particularly high in cases with low gain, because this increases the number of required cavity round trips to achieve a certain overall amplification factor. A possible alternative to a regenerative amplifier is a multipass amplifier, such as those used in applicants' assignee's XLA model laser systems mentioned above, where multiple passes (with, e.g., a slightly different propagation direction on each pass) can be arranged with a set of mirrors. This approach does not require a fast modulator, but becomes complicated (and hard to align) if the number of passes through the gain medium is high.

An output coupler is generally understood in the art to mean a partially reflective optic that provides feedback into the oscillation cavity of the laser and also passes energy out of the resonance cavity of the laser.

In regard to the need for improvement of Cost Of Consumables, e.g., for ArF excimer lasers, e.g., for photolithography light source use, KrF CoC has long been dominated by chamber lifetime, e.g., due to the robustness of the optics at the higher 248 nm wavelength for KrF. Recent advances in Cymer ArF optical components and designs have led to significant increases in ArF optical lifetimes, e.g., ArF grating life improvements developed for the Cymer NL-7000A, Low intensity on LNMs, e.g., in two stage XLA systems. ArF etalon material improvements have contributed to longer life for ArF wavemeters, stabilization modules, LAMs, SAMs, and BAMs. In addition KrF chamber lifetime has been significantly increased with Cymer ELS-7000 and ELS-7010 products, e.g., through the use of proprietary electrode technology. However, longer life electrode technology requires specific operating parameters, such as are met in ELS-7000 and ELS-7010 KrF chambers, XLA-200 and XLA-300 PA chambers. These parameters, however, are not able to be utilized, e.g., in any of Cymer's ArF XLA MO chambers because of the overall output power requirements of the system. Applicants propose ways to alleviate this detriment to cost of consumables in, e.g., the ArF dual chamber master oscillator/amplifier products, used, e.g., for integrated circuit manufacturing photolithography.

As used herein the term resonator and other related terms, e.g., cavity, oscillation, output coupler are used to refer, specifically to either a master oscillator or amplifier portion, a power oscillator, as lasing that occurs by oscillation within the cavity until sufficient pulse intensity exists for a useful pulse to emerge from the partially reflective output coupler as a laser output pulse. This depends on the optical properties of the laser cavity, e.g., the size of the cavity and the reflectivity of the output coupler and not simply on the number of reflections that direct the seed laser input through the gain medium a fixed number of times, e.g., a one pass, two pass, etc. power amplifier.

SUMMARY OF THE SUBJECT MATTER DISCLOSED

It will be understood by those skilled in the art that an apparatus and method is disclosed that may comprise a line narrowed pulsed excimer or molecular fluorine gas discharge laser system which may comprise a seed laser oscillator producing an output comprising a laser output light beam of pulses which may comprise a first gas discharge excimer or molecular fluorine laser chamber; a line narrowing module within a first oscillator cavity; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses, which may comprise a ring power amplification stage. The ring power amplification stage may comprise an injection mechanism comprising a partially reflecting optical element through which the seed laser oscillator output light beam is injected into the ring power amplification stage. The ring power amplification stage may comprise a bow-tie loop or a race track loop. The pulse energy of the output of the seed laser oscillator may be less than or equal to 0.1 mJ, or 0.2 mJ, or 0.5 mJ, or 0.75 mJ. The ring power amplification stage may amplify the output of the seed laser oscillator cavity to a pulse energy of ≥1 mJ or ≥2 mJ or ≥5 mJ or ≥10 mJ or ≥15 mJ. The laser system may operate at an output pulse repetition rate of up to 12 kHz, or ≥2 and ≤8 kHz or ≥4 and ≤6 kHz. The apparatus and method may comprise a broad band pulsed excimer or molecular fluorine gas discharge laser system which may comprise a seed laser oscillator producing an output comprising a laser output light beam of pulses which may comprise a first gas discharge excimer or molecular fluorine laser chamber; a laser amplification stage which may contain an amplifying gain medium in a second gas discharge excimer or molecular fluorine laser chamber receiving the output of the seed laser oscillator and amplifying the output of the seed laser oscillator to form a laser system output comprising a laser output light beam of pulses, which may comprise a ring power amplification stage. According to aspects of an embodiment of the disclosed subject matter a coherence busting mechanism may be located intermediate the seed laser oscillator and the amplifier gain medium. The coherence busting mechanism may comprise an optical delay path having a delay length longer than the coherence length of a pulse in the seed laser oscillator laser output light beam of pulses. The optical delay path may not substantially increase the length of the pulse in the seed laser oscillator laser output light beam of pulses. The coherence busting mechanism may comprise a first optical delay path of a first length and a second optical delay path of a second length, with the optical delay in each of the first and second delay paths exceeding the coherence length of a pulse in the seed laser oscillator laser output light beam of pulses, but not substantially increasing the length of the pulse, and the difference in the length of the first delay path and the second delay path exceeding the coherence length of the pulse. The apparatus and method according to aspects of an embodiment may comprise a line narrowed pulsed excimer or molecular fluorine gas discharge laser system which may comprise a seed laser oscillator producing an output comprising a laser output light beam of pulses which may comprise a first gas discharge excimer or molecular fluorine laser chamber; a line narrowing module within a first oscillator cavity; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses, which may comprise a ring power amplification stage; a coherence busting mechanism intermediate the seed laser oscillator and the ring power amplification stage. According to aspects of an embodiment the apparatus and method may comprise a broad band pulsed excimer or molecular fluorine gas discharge laser system which may comprise a seed laser oscillator producing an output comprising a laser output light beam of pulses which may comprise a first gas discharge excimer or molecular fluorine laser chamber; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses, which may comprise a ring power amplification stage; a coherence busting mechanism intermediate the seed laser oscillator and the ring power amplification stage. The apparatus and method according to aspects of an embodiment may comprise a pulsed excimer or molecular fluorine gas discharge laser system which may comprise a seed laser oscillator producing an output comprising a laser output light beam of pulses which may comprise a first gas discharge excimer or molecular fluorine laser chamber; a line narrowing module within a first oscillator cavity; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses; a coherence busting mechanism intermediate the seed laser oscillator and the laser amplification stage comprising an optical delay path exceeding the coherence length of the seed laser output light beam pulses. The amplification stage may comprise a laser oscillation cavity or an optical path defining a fixed number of passes through the amplifying gain medium. The coherence busting mechanism may comprise comprising a coherence busting optical delay structure generating multiple sub-pulses delayed sequentially from a single input pulse, wherein each sub-pulse is delayed from the following sub-pulse by more than the coherence length of the pulse light.

It will also be understood by those skilled in the art that an apparatus and method is disclosed that may comprise a processing machine which may comprise an irradiation mechanism irradiating a workpiece with pulsed UV light; a UV light input opening; a workpiece holding platform; a coherence busting mechanism comprising an optical delay path exceeding the coherence length of the UV light pulses. The optical delay path may not substantially increase the length of the UV light pulse. The coherence busting mechanism may comprise a first optical delay path of a first length and a second optical delay path of a second length, with the optical delay in each of the first and second delay paths exceeding the coherence length of the UV light pulse, but not substantially increasing the length of the pulse, and the difference in the length of the first delay path and the second delay path exceeding the coherence length of the pulse. At least one of the first and second optical delay paths may comprise a beam flipping or beam translating mechanism.

It will also be understood by those skilled in the art that an apparatus and method is disclosed which may comprise according to aspects of an embodiment a laser light source system which may comprise a solid state laser seed beam source providing a seed laser output; a frequency conversion stage converting the seed laser output to a wavelength suitable for seeding an excimer or molecular fluorine gas discharge laser; an excimer or molecular fluorine gas discharge laser gain medium amplifying the converted seed laser output to produce a gas discharge laser output beam of pulses at approximately the converted wavelength; a coherence busting mechanism comprising an optical delay element having a delay path longer than the coherence length of the output pulse. The excimer or molecular fluorine laser may be selected from a group comprising XeCl, XeF, KrF, ArF and $F_2$ laser systems. The laser gain medium may comprise a power amplifier, which may comprise a single pass amplifier stage or a multiple-pass amplifier stage. The gain medium may comprise a ring power amplification stage, which may comprise a bow-tie configuration or race track configuration and may also comprise an input/output coupler seed inject mechanism. The coherence busting mechanism may be intermediate the laser seed beam source and the gas discharge laser gain medium. The solid state seed laser beam source may comprise an Nd-based solid state laser and may comprise a frequency doubled pump pumping the Nd-based solid state laser. The Nd-based solid state laser may comprise a fiber amplifier laser and may comprise an Nd-based solid state laser selected from a group which may comprise Nd:YAG, Nd:YLF and Nd:YVO$_4$ solid state lasers. The solid state seed laser beam source may comprise an Er-based solid state laser, which may comprise a fiber laser. The Er-based solid state laser may comprise an Er:YAG laser. The frequency conversion stage may comprise a linear frequency converter, which may comprise a Ti:Sapphire crystal or a crystal comprising Alexandrite. The frequency conversion stage may comprise a non-linear frequency converter, e.g., a second harmonic generator or a sum-frequency mixer. The apparatus and method according to aspects of an embodiment may comprise a laser light source system which may comprise a solid state laser seed beam source providing a seed laser output; frequency conversion stage converting the seed laser output to a wavelength suitable for seeding an excimer or molecular fluorine gas discharge laser; an excimer or molecular fluorine gas discharge laser gain medium amplifying the converted seed laser output to produce a gas discharge laser output at approximately the converted wavelength, which may comprise a ring power amplification stage. The method may comprise utilizing a solid state laser seed beam source to provide a seed laser output; frequency converting in a frequency conversion stage the seed laser output to a wavelength suitable for seeding an excimer or molecular fluorine gas discharge laser; utilizing an excimer or molecular fluorine gas discharge laser gain medium, amplifying the converted seed laser output to produce a gas discharge laser output at approximately the converted wavelength.

BRIEF DESCRIPTION OF THE DRAWINGS

FIG. 13 illustrates schematically input coupling useful according to aspects of an embodiment of the subject matter disclosed;

FIG. 14 illustrates schematically input coupling useful according to aspects of an embodiment of the subject matter disclosed;

FIG. 15 illustrates schematically a top view of aspects of an embodiment of an input coupling mechanism useful according to aspects of an embodiment of the subject matter disclosed;

FIG. 16 illustrates schematically a side view of the input coupling mechanism of FIG. 15 useful according to aspects of an embodiment of the subject matter disclosed;

DETAILED DESCRIPTION

Figure 1:
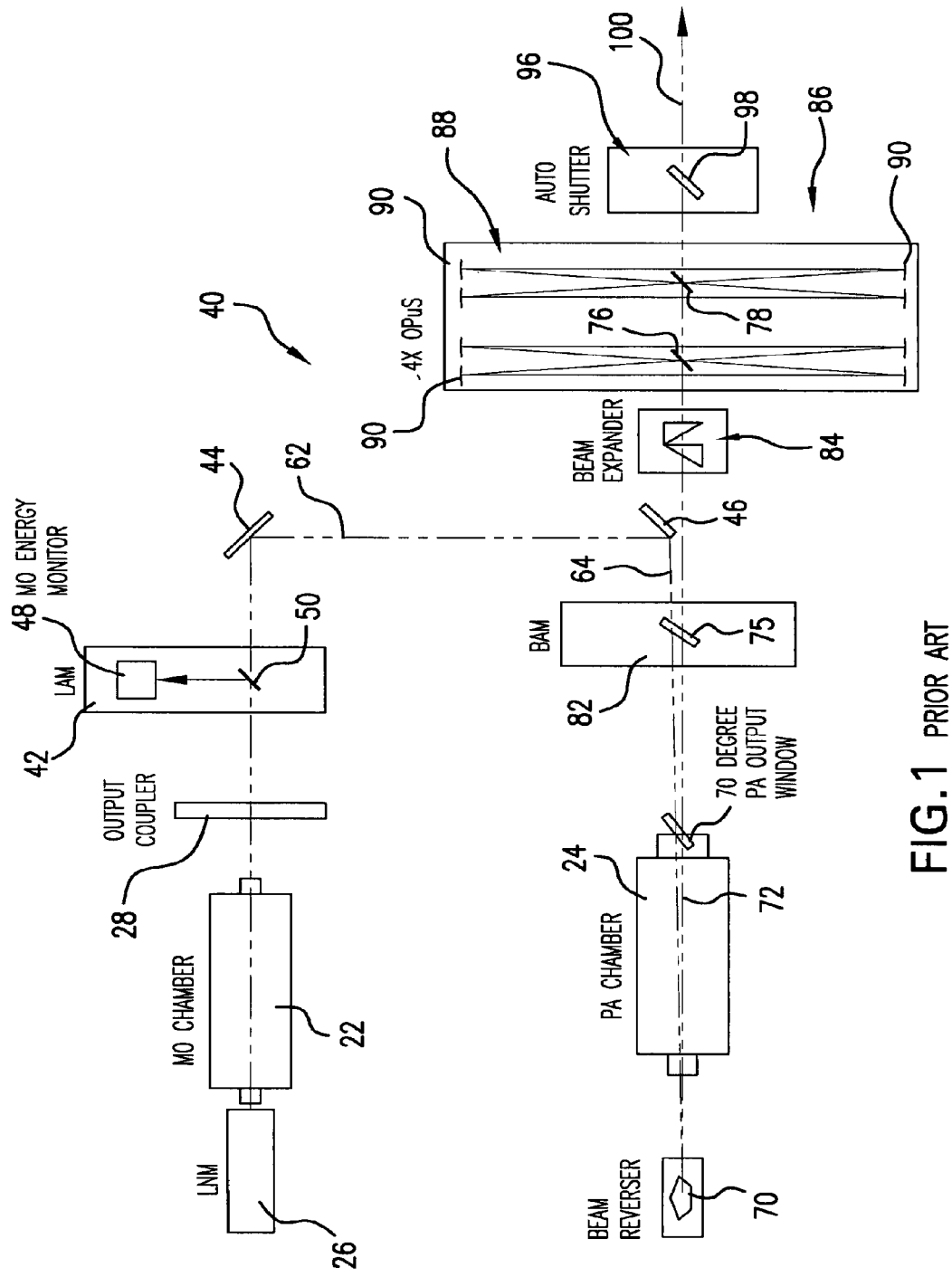
FIG. 1 shows as known MOPA configured multi-chamber laser system.

According to aspects of an embodiment of the subject matter disclosed a gain amplification medium suitable for use with, e.g., an excimer or molecular fluorine gas discharge seed oscillator laser in a multi-chamber (multi-portion) oscillator/amplifier configuration, this could be, e.g., a master oscillator power gain amplification configuration, which may take advantage of improved seed laser coupling arrangements, fundamentally designed to insert seed laser light, e.g., master oscillator seed output laser light pulse beam pulses, into an amplifying gain medium, generally with little loss and with protection against amplifier oscillation and/or ASE returning to the master oscillator while the master oscillator laser medium is excited. Such could interfere with the proper operation of the master oscillator, e.g., in conjunction with the line narrowing module producing the appropriately narrowed seed oscillator output laser light pulse beam pulse bandwidth.

According to aspects of an embodiment of the subject matter disclosed, however, a preferred configuration may comprise, e.g., a ring cavity, e.g., a power oscillator or Power Ring Oscillator ("PRO") or a Power Ring Amplifier ("PRA"). Such a configuration has been determined by applicants to be a very effective solution to going to higher power laser operation in a line narrowed multi-portion (seed laser-amplifier) arrangement, particularly for gas discharge seed laser to identical gas discharge amplifier laser multi-portion laser systems. Such a laser system could be similar in operation to applicants' employers' XLA series lasers, though with a power ring amplification stage. Improvement in CoC may be attained according to a aspects of an embodiment of the subject matter disclosed.

Also, however, a power ring amplification stage may be useful for other applications, including with seed lasers of other than the same type of gas discharge laser, e.g., a solid state seed, e.g., matched to the lasing wavelength of an excimer or molecular fluorine amplifier, e.g., by frequency shifting and/or frequency multiplication. Such systems may be useful for ultimate control of laser system output laser light pulse beam pulse parameters, e.g., bandwidth, bandwidth stability, output pulse energy, output pulse energy stability and the like. In such systems pulse trimming, e.g., at the output of the amplification stage may also be useful for control of laser system output pulse parameters. Thus, according to aspects of an embodiment of the subject matter disclosed a ring cavity PO may be constructed, e.g., with a 24% output coupler, e.g., comprising an existing OPuS beamsplitter, as explained more fully below.

According to aspects of an embodiment of the subject matter disclosed applicants propose to re-arrange, e.g., an existing XLA product, e.g., with an excimer-based MO, from a MOPA to a MOPRO (power ring oscillator), or to a MOPRA, a seed laser with a regenerative amplifier, e.g., in a ring configuration (a power regenerative amplifier), collectively refereed to herein sometimes as a power amplification stage, in accordance with aspects of an embodiment of the subject matter disclosed. Such a system can (1) improve energy stability, e.g., by operating the amplification stage at saturation, or effectively saturation, pulse to pulse, thereby more accurately insuring pulse to pulse energy stability, (2) achieve longer LNM life.

The advantages of the multi-chambered laser system according to aspects of an embodiment of the subject matter disclosed enable meeting the above discussed requirements for, e.g., higher power, better pulse energy stability, better bandwidth control and lower achievable bandwidth, higher repetition rates and lower cost of operation. Further, increases in currently available laser system output light average power may be attained. This may be beneficial both for line narrowed systems and for broad band systems, e.g., XeCl or XeF multi-chamber laser systems used, e.g., for annealing amorphous silicon on substrates, e.g., in LTPS processes, e.g., for the manufacture of crystallized substrates for the production of, e.g., thin film transistors.

According to aspects of an embodiment of the disclosed subject matter there are certain performance requirements desirous of a very high power amplification stage cavity for, e.g., a 120-180 W or higher laser system, e.g., with two amplifier gain medium chambers in parallel. Examples noted herein may be based upon a presumption that the requirement may be 200 W or higher. They should produce linear polarization (>98%). Each amplification stage should produce, and survive, ≥40 W average output energy, e.g., at 193 nm wavelength of ArF, although an expectation of ≥60 w may also be the specification, or less stringently at longer wavelengths, e.g., 248 for KrF and 351 for XeF or 318 for XeCl, though even more stringent for $F_2$ at 157 nm. Each amplification stage in one embodiment may operate at least about 4 kHz or above, with 6 kHz or above also being an expectation in some cases. According to aspects of an embodiment of the disclosed subject matter, the amplification stage(s) can exhibit full seeding (at or near saturation) with relatively small seed laser energy. Applicants believe that the amplification stage may also need to support a moderately large angular distribution for some applications, e.g., to maintain the same angular spread of the seed laser, in order to avoid inadvertently improving coherence by, e.g., removing coherence cells, e.g., with a range of angles of within a few m Rad. Protection of the seed laser from reverse traveling radiation is also an important operational requirement. When properly seeded, ASE levels produced by the amplification stage, according to aspects of an embodiment of the disclosed subject matter, should be less than 0.1% or less of the total output.

According to aspects of an embodiment of the disclosed subject matter applicants expect that (1) the gain cross-section will be similar to existing ArF chambers, e.g., applicants' assignee's XLA ArF laser system power amplifier ("PA") chambers, (2) the gain length will also be similar to existing ArF chambers, (3) the gain duration will also be similar to existing ArF chambers.

According to aspects of an embodiment of the disclosed subject matter, applicants propose, e.g., a single MO/gain amplification medium XLA tic-toc with a solid state seed laser operating at 12 kHz with about a 1 mJ seed laser output light pulse energy and the two amplification stages each operating at around a 17 mJ output pulse energy, i.e., alternately amplifying in respective amplification gain medium chambers tic and toc output pulses from the seed laser divided to alternately enter in serial form the respective two amplification gain mediums (which could also include, as explained herein) more than two amplification gain mediums and pulses divided into more than in alternate pulses, e.g., three gain mediums and three pulses divided out seriatim from the seed pulse output for respective gain mediums, repeated over time, so the gain mediums run at a pulse repetition rate that is a fraction of that of the seed laser, depending upon the number of gain mediums used in parallel on the seed laser output.

In addition, according to aspects of an embodiment of the disclosed subject matter, applicants propose the utilization of a regenerative gain medium in which the oscillating laser generated light photons pass through the gain medium, e.g.; a ring power amplification stage, a ring power oscillator or a ring power amplifier, which can be more efficient at amplification of the seed pulse energy from the seed laser as compared, e.g., to a power amplifier amplification stage in ("PA") in a MOPA configuration, with an optically defined fixed number of passes through the gain medium. For testing purposes applicants have simulated the input from a solid state 193 nm seed laser using a line-narrowed ArF laser.

Figure 75:
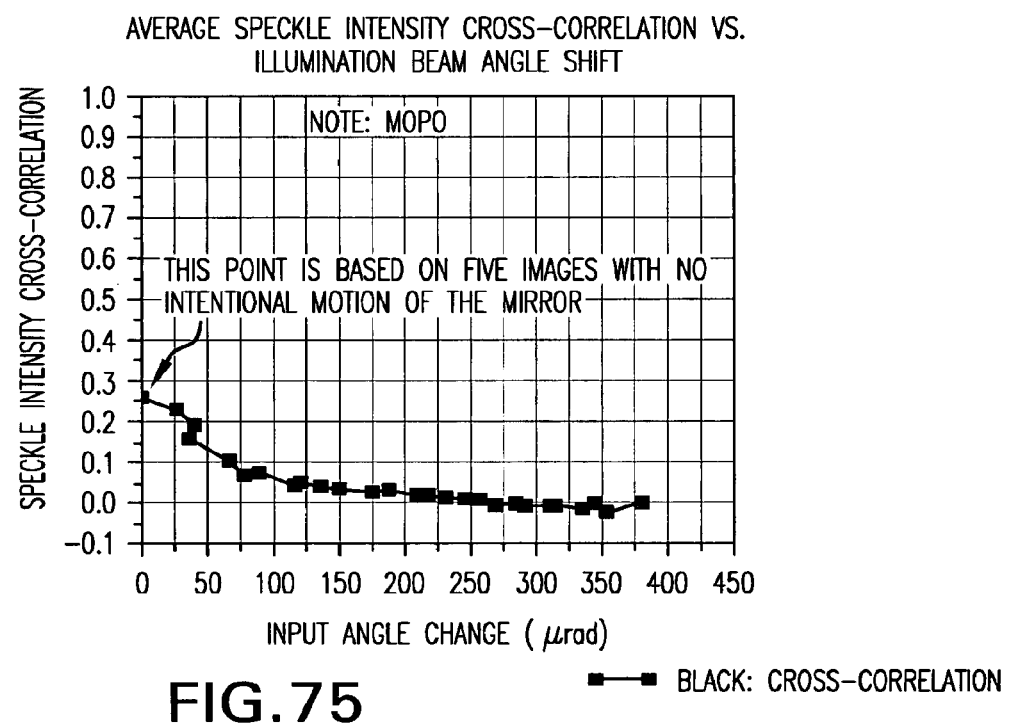
FIG. 75 illustrates exemplary coherency busting test results according to aspects of an embodiment of the disclosed subject matter.

Applicants have studied ASE vs. MO-PO timing difference for the different values of the above noted parameters with results as indicated in FIG. 75. Similarly a study of MOPO energy vs. MO-PO timing as a function of these same parameters also illustrated in FIG. 75.

In order to meet the requirements noted above, including, e.g., the constraints of known lithography laser light source technology, applicants propose, according to aspects of an embodiment of the disclosed subject matter, a number of overall architectures that are believed to provide workable ways to address the requirements and constraints noted above. The first may be to provide two multi-chamber laser systems along the lines of applicants' assignee's XLA XXX laser system series, e.g., with two dual chamber laser oscillator/power amplifier arrangements whereby each is configured to run at around above 4 kHz and preferably around 6 kHz, producing output pulses at about 17 mJ with interleaved firing times to produce, according to an embodiment, a single approximately 12 kHz system producing about 17 m per pulse.

Turning now to FIG. 1 there is shown schematically and partly in block diagram form a more or less typical MOPA laser system 20, such as applicants' assignees XLA multi-chamber MOPA laser systems. The laser system 20 may include, e.g., an oscillator seed laser chamber 22, and an amplifier gain medium laser chamber 24, e.g., a multi-pass power amplifier ("PA"). The MO 22 may have associated with it, e.g., for applications such as semiconductor manufacturing photolithography, a line narrowing module ("LNM") 26, or if desired to be operated in broadband mode, e.g., for application such as LTPS, it may not have line narrowing. An output coupler 28, e.g., a partially reflective mirror, e.g., with a selected reflectivity for the applicable nominal center wavelength, e.g., about 351 for XeF laser oscillators, 248 nm for KrF laser oscillators, 193 nm for ArF laser oscillators and 157 for molecular fluorine laser oscillators, along with the rear end reflection provided by the LNM 26 (or a maximally reflective mirror for the given nominal center wavelength, not shown, substituted for the LNM 26 in the case of broad band operation), may serve to form the laser 20 oscillator cavity.

Relay optics 40, e.g., including a turning mirror 44 and a turning mirror 46, may serve to steer the seed oscillation laser 20 output laser light pulse beam 62 pulses exiting a line center (center wavelength) analysis module ("LAM") 42 along a light path (optical axis) 60 to the input of the amplifier module lasing chamber 24. The LAM, in addition to center wavelength monitoring equipment (not shown) may include an MO energy monitor 48, which may be provided with a small portion of the laser output light pulse beam from the MO chamber 22 for metrology purposes, e.g., for nominal center wavelength and energy detection, by a beam splitter 50 inside the LAM 42. The turning mirror 44 may provide the master oscillator 22 output laser light pulse beam 62 pulses to the turning mirror 46 along an optical path beam path, which may reflect the beam 62 into the amplifier chamber 24 as a beam 64.

In the case of the system 20 of FIG. 1 the gain amplifier 24 is set up as a power amplifier, i.e., the light received from the MO, the MO seed output laser light pulse beam pulses passes through the gain amplification medium a fixed number of times, e.g., determined by the optics, including the turning mirror 46, set up as illustrated schematically in FIG. 1 as an edge coupling optic and a beam returner (reverser) optic 70, e.g., a retro-reflecting mirror, discussed in more detail below, along a beam path 72, exiting the laser gain medium through a window 80, which may be, e.g., set at an angle, e.g., around 70° to the exiting beam path 72 in order to optimize energy density reduction on optical elements and thus the thermal loading for the given nominal center wavelength and the material of the window 80, e.g., $CaF_2$ for shorter wavelengths such as the nominal center wavelength for an ArF laser system, or at around Brewster's angle to optimize the transmissivity of the exiting light. The exit light 100 may also pass through a beam splitter 75 within a bandwidth analysis module ("BAM") 82. The laser system output beam 100 may also pass through a first beam splitter 76 and a second beam splitter 78 within a pulse stretcher 86, e.g., an Optical Pulse Stretcher ("OPuS"), such as are included with many of applicants' assignees' laser systems discussed above as a 4× pulse stretcher, e.g., increasing the $T_{is}$ of the laser system 20 output laser light pulse beam 100 pulses exiting the system as beam 100 from about 17 ns to about 40 ns, by directing the beam 100 into delay path 88, as is more fully described in, e.g., U.S. Pat. No. 6,928,093, entitled LONG DELAY AND HIGH TIS PULSE STRETCHER, issued to Webb et al. on Aug. 9, 2005 referenced above.

Also in the path of the laser system 20 output laser light pulse beam 100 pulses may be, e.g., a beam expander 84, e.g., to decrease the energy density on downstream optics, including the OPuS 86 beam splitters 76, 78 and optical delay ling mirrors 90 and optics, e.g., in the scanner (not shown) utilizing the laser system 20 output laser light pulse beam 100 pulses. The laser system 20 may also include a shutter 96, including, e.g., a shutter beam splitter 98, e.g., taking off a portion of the laser system 20 output laser light pulse beam 100 pulses for energy measurement in an output energy monitor (not shown) in the shutter 96.

OPuS 86

This existing XLA MOPA configuration, shown in FIG. 1 is illustrated schematically further in the sense that the illustration switches between the horizontal and vertical axis in several places in order to make this schematic illustration simpler and easier to understand. None of the concepts described here are impacted by properly drawing the horizontal and vertical axis of the light paths.

Figure 2:
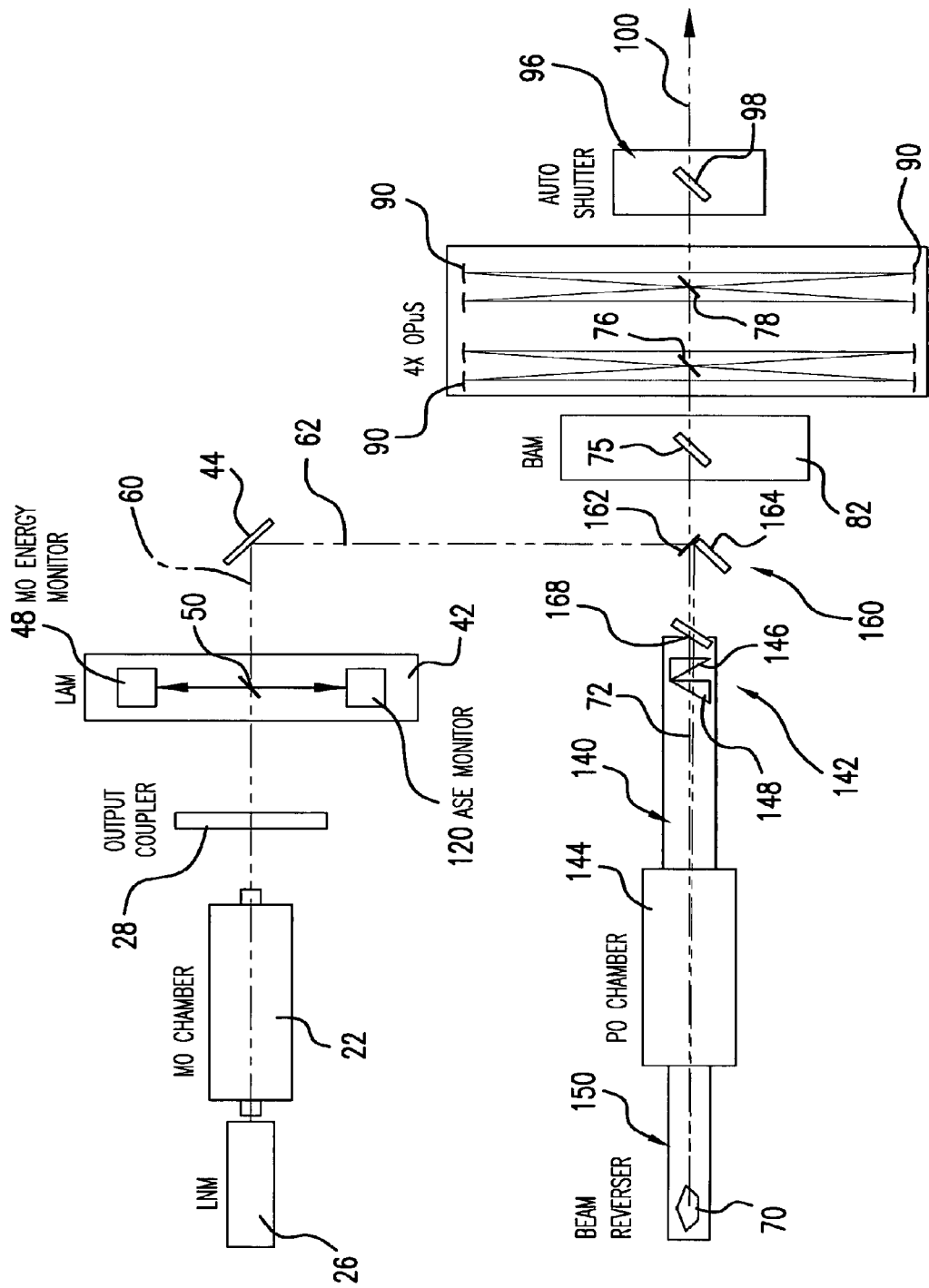
FIG. 2 shows aspects of an embodiment of the claimed subject matter disclosed.

Turning to FIG. 2 there is illustrated a conversion from a MOPA configuration to a master oscillator along with a power oscillation amplification or a regenerative amplification configuration power amplification stage according to aspects of an embodiment of the subject matter disclosed, e.g., including a power ring amplification stage, e.g., with a ring cavity power oscillator (also known as a ring cavity regenerative amplifier) formed between the beam reverser 70 and the lower turning mirror 44, replaced with, e.g., an injection seeding mechanism 160 according to aspects of an embodiment of the subject matter disclosed. The BAM 82 as shown in FIG. 1 may be moved or its functionality included within the shutter 96.

Figure 20:
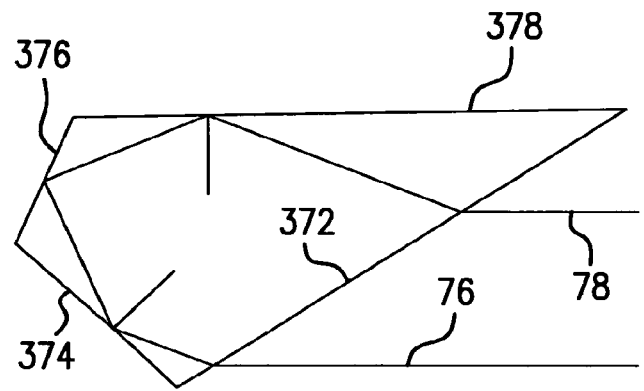
FIG. 20 illustrates schematically illustrates in cross section aspects of an embodiment of a beam returner according to aspects of an embodiment of the subject matter disclosed.
Figure 21:
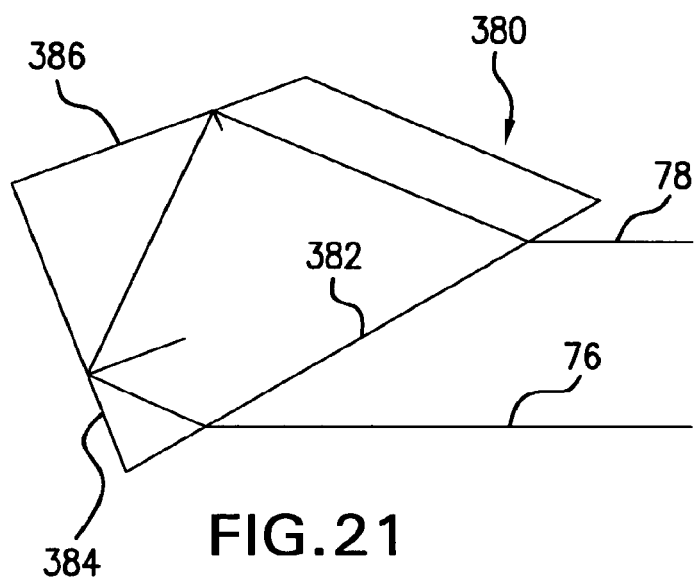
FIG. 21 illustrates schematically illustrates in cross section aspects of an embodiment of a beam returner according to aspects of an embodiment of the subject matter disclosed.
Figure 22:
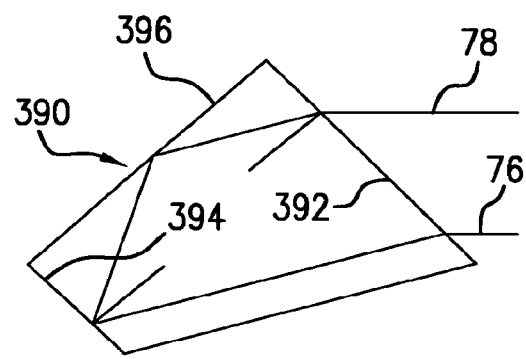
FIG. 22 illustrates schematically illustrates in cross section aspects of an embodiment of a beam returner according to aspects of an embodiment of the subject matter disclosed.

According to aspects of an embodiment of the subject matter disclosed may include, e.g., placing the a beam expander 142 comprising, e.g., first and second beam expanding and dispersing prisms 146, 148 inside of an entrance window and beam expander housing 140 which may be affixed to the gain medium chamber 144 by a suitable means, e.g., welding or bolting with suitable sealing mechanisms. These optics 146, 148 may be placed inside the ring cavity formed between the orthogonal seed injection mechanism 160 input/output coupling partially reflecting mirror 162 and the beam returner 70, e.g., in order to reduce the energy density on the maximum reflector forming the beam returner 70, e.g., as illustrated in FIGS. 20-22, which may be composed of, e.g., CaF$_2$, e.g., a beam splitter of the type currently used in applicants' assignee's OPuSs, and coated with a coating that, e.g., reflects 20% of the incident light, that makes up a portion 162 of the seed injection mechanism 160 of the ring power amplification stage cavity discussed in more detail below. The prisms may be non-dispersive in embodiments where the power amplification stage is configured not to oscillate on its own, thus removing the need to lessen or remove ASE from the system output. The beam reverser 70 may also be moved to inside the cavity gain medium cavity chamber 144 with the attachment of a housing 150 similar to that of housing 140.

The beam expander optics 146, 148 and beam returner/reverser 70, due to their makeup including a fluorine containing crystal and their exposure to fluorine in the lasing medium gas in the chamber 144 and housings 140, 150 may be protected from optical damage. The AMPLIFICATION STAGE chamber window 168 similarly constructed, e.g., of a fluorine containing crystal, e.g., CaF$_2$, need not have a protective coating on its face exposed to the highest energy density, facing the ring power oscillator oscillation cavity, due in part to its beam expansion in the beam expanded 14Z in the cavity and also to using around a 45° angle, e.g., a 47 degree orientation.

According to aspects of an embodiment of the subject matter disclosed a ring power oscillator cavity, e.g., as illustrated by way of example in FIG. 2, e.g., with beam expansion on the output coupler side of the chamber 144 and with the beam expansion prisms 146, 148 oriented to produce a net dispersion (where useful for ASE reduction or elimination), has a number of notable advantages, including, e.g., making very efficient use of seed energy, eliminating the need for protective coatings for high power and very short nominal center wavelength, especially at 193 nm and below, dispersion in the cavity, which can, e.g., help to decrease the ASE ratio, and acceptable energy density on the optics, e.g., forming the output coupler portion 162 of the ) seed injection mechanism and the maximally reflective mirror ("Rmax") portion 164 of the seed injection mechanism, which may or may not be coated as needed, e.g., as is done in applicants' assignee's OPuSs on existing laser systems (beam splitters 76, 78 and mirrors 90). In addition, the arrangement can, e.g., perform the needed beam expansion function prior to the laser system output laser light pulse beam 100 entering the OPuS 86, and the chamber 144 with additions 140 and 150 can easily be created from applicant's assignee's existing chambers, e.g., XLA model chambers, e.g., by adding two "snouts" 140, 150, e.g., in place of existing window mounting assemblies. This is shown, e.g., in more detail partially schematically FIG. in 23.

Further, all optics inside the chamber, e.g., including the snouts 140, 150 can be, e.g., further removed from the source of chamber dust. The configuration can also be made to fit, e.g., within a present XLA optics bay.

Figure 12:
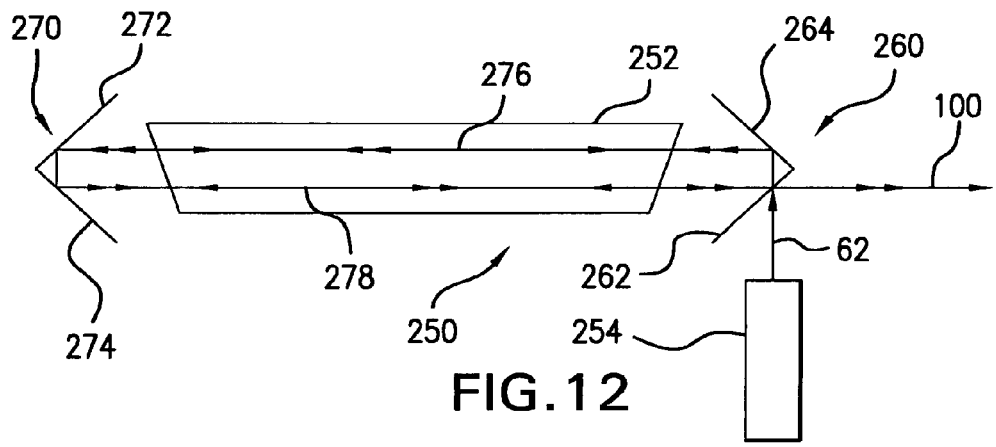
FIG. 12 illustrates schematically input coupling useful according to aspects of an embodiment of the subject matter disclosed.

As explained elsewhere, the ring cavity, e.g., as shown in FIGS. 12 and 13, may also be used with a relatively long round trip time, e.g., about 7 ns to traverse, e.g., from the input/output coupler beam splitter 262 to the beam reverser 270 and back to the beam splitter 262. Also, of course, especially in broad band embodiments, but also in line narrowed embodiments, according to aspects of an embodiment of the subject matter disclosed using the more typical 1-3 mJ MO output greatly increases the average power out of the amplification stage over that of, e.g., current XLA-XXX laser systems.

Low MO chamber pressure has a number of longer chamber life benefits.

Rather than having to contemplate ways to simply survive high raw power, e.g., in the 200 W range, applicants, according to aspects of an embodiment of the subject matter disclosed contemplate being able to instead focus on bettering energy stability, pointing stability, profile stability, and ASE stability of contemplated configuration while, operating at full repetition rate, e.g., between 4 kHz and 6 kHz and even above.

Figure 3:
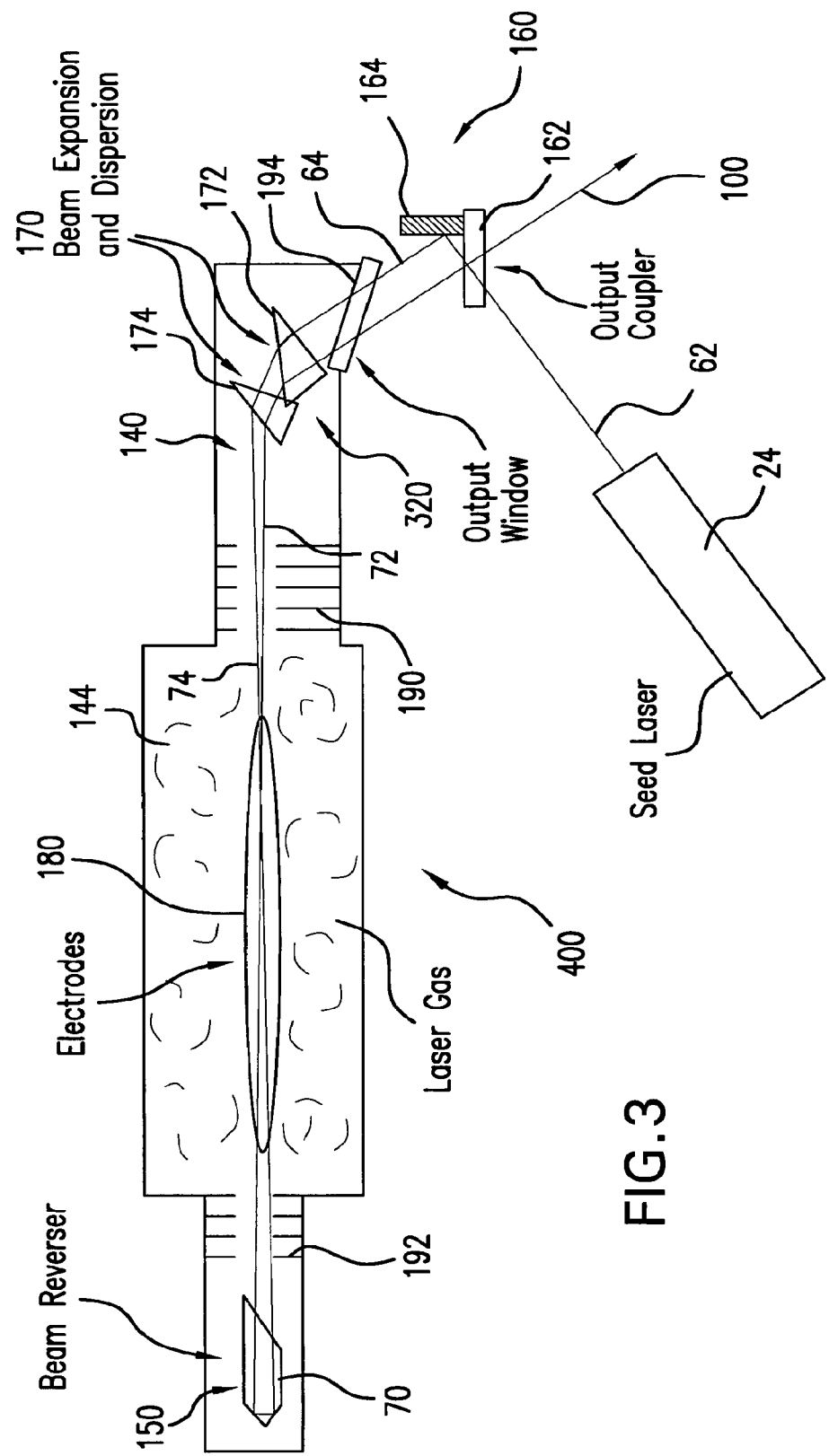
FIG. 3 shows aspects of an embodiment of the claimed subject matter disclosed.

Turning now to FIG. 3 there is shown illustratively and partly schematically and in block diagram form a ring power amplification stage laser system 400, which in addition to the elements shown in FIG. 2 may include, e.g., an injection seeding coupler mechanism 160 that is aligned with a chamber input/output window 94 and with beam expansion and dispersion optic 170, e.g., comprising beam expanding and dispersing prisms 172 and 174, which can e.g., contract and steer and disperse the beam 64 to one path 74 to the beam reverser 70 in chamber extension 150 and back to the input/output coupler partially reflective mirror 162. Baffles 190 and 192, respectively may protect the optics in the rear snout 150 and the front snout 140, form, e.g., dust circulating within the chamber 144.

Figure 4:
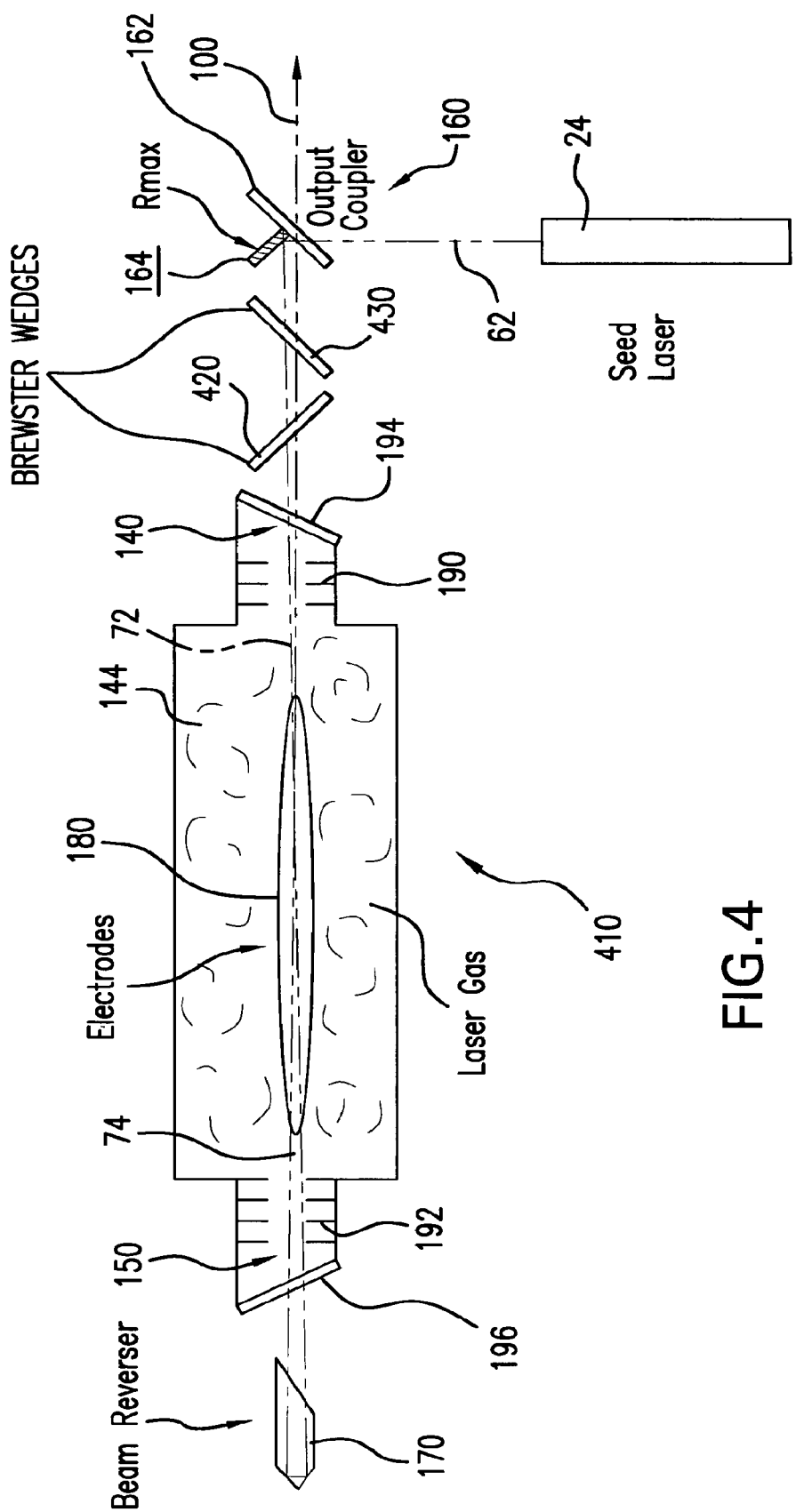
FIG. 4 shows aspects of an embodiment of the claimed subject matter disclosed.

In FIG. 4 a similar system 410, according to aspects of an embodiment of the subject matter disclosed, may include, e.g., the beam returner/reverser 170 outside of the chamber 14A, which may incorporate modified snouts 140, 150, e.g., to protect, respectively, front input/output window 194 and rear window 196 from circulating dust, along with baffles 190, 192. This embodiment may include, e.g., Brewster wedges 420 and 430, for the purpose of, e.g., clearing the desirable polarization by reflecting the undesirable polarization out of the optical cavity.

Figure 5:
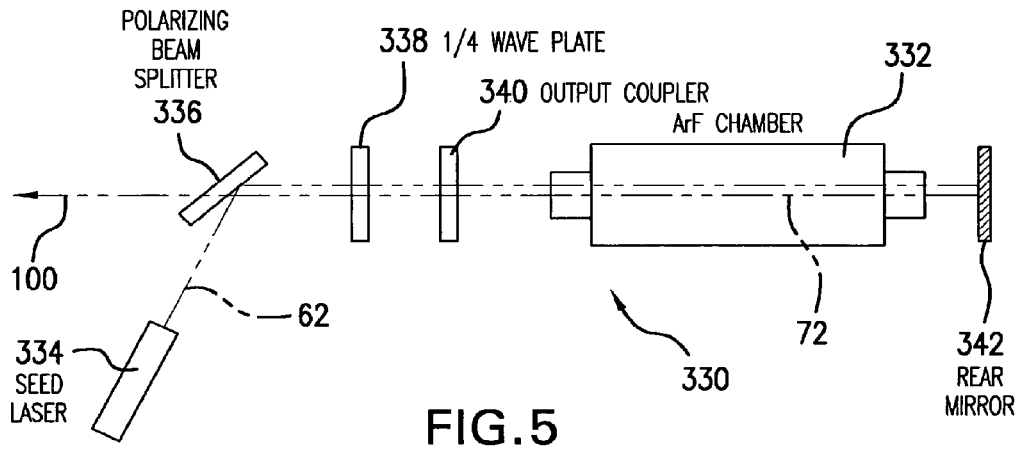
FIG. 5 shows aspects of an embodiment of the claimed subject matter disclosed.

FIG. 5 illustrates schematically and partly in block diagram format a system 330 in which, e.g., a ring power amplification stage is set up by, e.g., the use of a polarizing beam splitter 336, half wave plate 338 and output coupler 340. In operation the seed laser 334 feeds a seed laser output laser light pulse beam 62 to the beam splitter 336 and the ring cavity is set up with a single maximally reflective rear mirror 342, e.g., and a partially reflective output couple 340.

Figure 6:
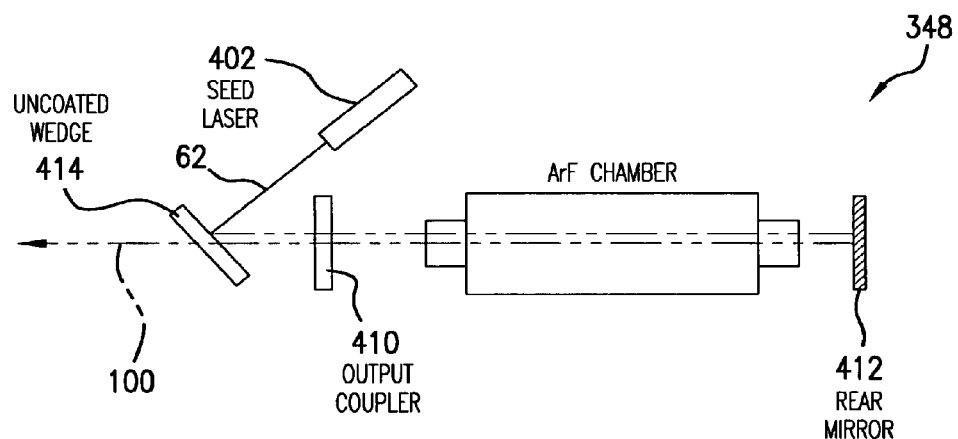
FIG. 6 shows aspects of an embodiment of the claimed subject matter disclosed.

Similarly a ring cavity may be set up according to aspects of an embodiment of the subject matter disclosed as illustrated in FIG. 6 between an output coupler 410 and a rear cavity mirror 412.

Figure 9:
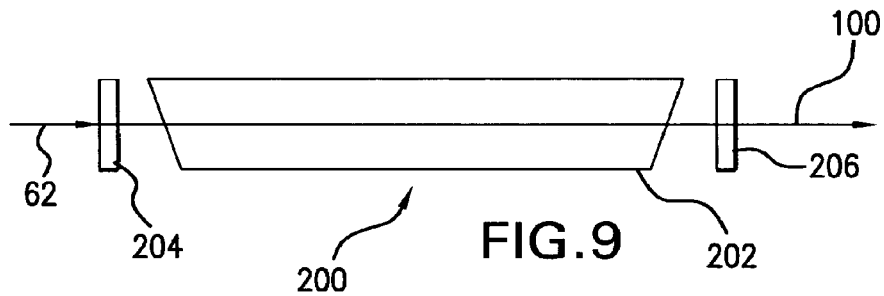
FIG. 9 illustrates schematically input coupling useful according to aspects of an embodiment of the subject matter disclosed.

There are a number of possible ways to couple the output laser light pulse beam pulses from the MO to the power amplification stage, e.g., as illustrated schematically and partly in block diagram format in FIGS. 9-11 and 14. As shown in FIG. 9, e.g., a partial reflection input coupled oscillator amplification stage or power regenerative amplifier 200 may have a chamber 202 and, e.g., a partial reflective optic 204 as an input coupler to the oscillator chamber, with a front partially reflective optic output coupler 206. In operation, the MO output 62 enters the cavity, 200, shown to be a normal oscillator, rather than a ring oscillator, for purposes of, e.g., clarity of description, and oscillates within the cavity formed by the entrance partially reflecting optic 204 and the output coupler partially reflective optic 206, until oscillation results in a significant enough pulse of laser system output light pulse beam 100 leaving the output coupler as is well understood in the art.

Figure 10:
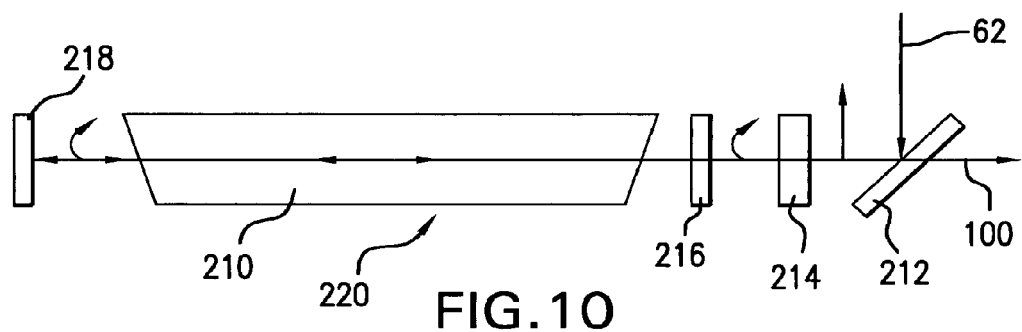
FIG. 10 illustrates schematically input coupling useful according to aspects of an embodiment of the subject matter disclosed.

Illustrated schematically and partly in block diagram form in FIG. 10, a polarization input coupled oscillator 220 forming the ring power amplification stage may include, e.g., a chamber 210, a polarizing beam splitter 212, a quarter wave plate 214, a rear maximally reflective mirror and an output coupler 216. In operation, the maximally reflective mirror 218 and the output coupler 216 for an oscillator cavity like that of FIG. 2, also shown as a regular oscillator, rather than a ring oscillator, for convenience. The polarizing beam splitter and quarter wave plate 214 serve, e.g., to isolate the MO from the amplification stage. The incoming beam 62 is of a polarity that is reflected by the beam splitter 212 into the cavity, with, e.g., the quarter wave plate 214 transmitting the beam 62 into the cavity as circularly polarized and converting the return beam from the output coupler 216 to a polarization transmitted by the polarizing beam splitter 212.

Figure 11:
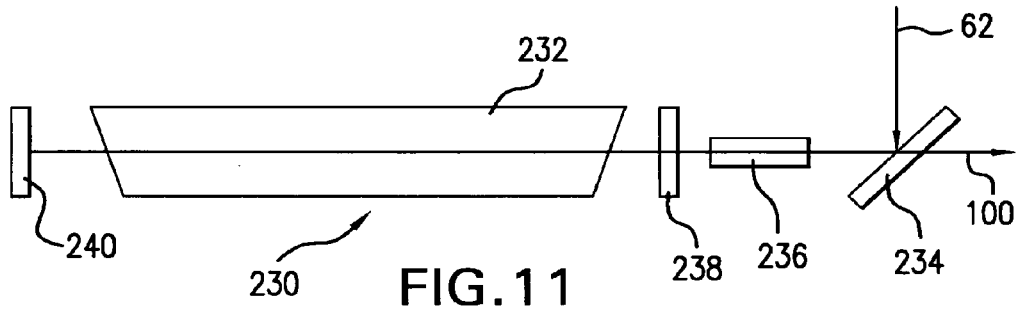
FIG. 11 illustrates schematically input coupling useful according to aspects of an embodiment of the subject matter disclosed.

As illustrated in FIG. 11 a switched input/output coupler coupled oscillator 230 is shown schematically and partly in block diagram format in which, e.g., a chamber 232 may be contained within a cavity formed, e.g., by a maximally reflective mirror 240 and a window 238, with, e.g., an electro-optic switch, e.g., a Q-switch 236, acting as a switch to allow oscillation to build to a selected point and then the Q switch is activated to allow a laser system output laser pulse beam 100 pulse to be emitted.

Illustrated in FIG. 12 schematically and in partial block diagram form is a multi-pass regenerative ring oscillator laser system 250, according to aspects of an embodiment of the subject matter disclosed, which may include, e.g., an amplifier chamber 252 and a seed laser 254 the system 250 may also include an input/output coupler, e.g., an injection seed input/output coupler mechanism 260. The input/output coupler 260 may include, e.g., a partially reflective mirror 262, which may be, e.g., a beam splitter of the type used currently by applicants' assignee's OPuSs sold with its laser equipment. The system 250 may also include, e.g., a maximally reflective optic 264, to steer the MO beam 62 into the electrode region of the cavity as one pass beam 276 which may return to the output coupler 262 as a second pass beam 278 from a beam reverser/returner 270, which may include, e.g., a first maximally reflective mirror 272 and a second maximally reflective mirror 274.

FIG. 13 illustrates schematically and partly in block diagram form, according to aspects of an embodiment of the subject matter disclosed, a multi-pass regenerative ring power amplification stage laser system 280 in the form of a bow-tie configuration, this may comprise, e.g., a chamber 282, a seed laser 284, an injection seeding mechanism 260 and a beam reverser/returner 270, the latter two of which may be configured (angled), e.g., to effect a crossing of an input pass beam 286 and an output pass beam 288, e.g., at or near the intersection of the respective longitudinal and lateral center line axes of electrodes (not shown) generating a gain medium by gas discharge between the electrodes, and thus generally at the longitudinal and lateral axes intersection of the gain medium. In such an embodiment the angle between the two passes may be almost imperceptively small so that, in effect the beams 286, 288 are almost aligned with the longitudinal center-line axis of the discharge formed between the electrodes, one of which, e.g., beam 288, may also form the optical axis of the beam 100 of the laser system. As shown schematically and well out of proportion in the applicable FIGS. in this application neither beam path, e.g., 286, 288 illustrated in FIG. 13 may be shown to extend along the longitudinal centerline axis of the electrodes or may be shown from a side view where the longitudinal centerline axis is not discernible. In practice however, one pass would be very slightly misaligned with the axis and the other essentially aligned with it insofar as such alignment is optically achievable and within the tolerances allowed for the optical trains of such laser systems.

FIG. 15 illustrates schematically and partly in block diagram format a plan view of an embodiment 280 such as illustrated in FIG. 13, e.g., where the MO output laser light pulse beam 62 comes from an MO positioned above (in the direction perpendicular to the plane of the paper) the power amplification stage chamber 282. Further, FIG. 16 illustrates schematically and partly in block diagram format a side view of the apparatus 280 of FIGS. 13 and 15. A turning mirror maximal reflector 430 turns the MO laser output light pulse beam 62 into, e.g., an seed injection mechanism 260 and the crossed (bow-tie) passes 276, 278 in the oscillation resonance cavity 424 formed by the rear mirror beam returner/reflector 270 (not shown in FIG. 16) and the injection seed mechanism 270 input/output coupler partially reflective mirror 262 to form laser system output light pulse beam 100 immerging through the optic 262 acting as a usual oscillator cavity output coupler, as is well known in the art of gas discharge, laser oscillator cavities with output couplers. As can be seen in FIGS. 15 and 16, the MO output beam 62 enters the ring power amplification stage oscillation cavity through the partially reflective mirror 262, which also forms the cavity output coupler from a direction, in relation to the axis of the system output beam 100 that prevents reverse coupling of the system output beam 100 back to the MO.

Figure 17:
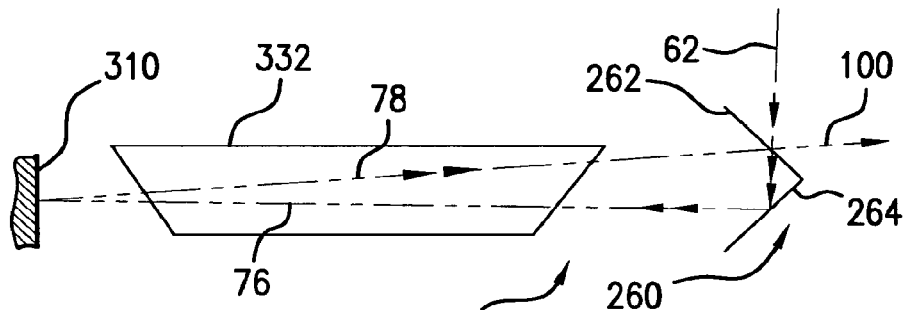
FIG. 17 illustrates schematically input coupling useful according to aspects of an embodiment of the subject matter disclosed.

FIG. 17 illustrates a schematically and partially in block diagram format an input/output coupling scheme for a single rear mirror cavity 300, e.g., with the multi-pass regenerative ring oscillator laser system 300, according to aspects of an embodiment of the subject matter disclosed, in the form of a bow-tie configuration, having, e.g., a single maximally reflective rear cavity mirror 310. In operation the MO laser input/output coupler, e.g., an orthogonal seed injection mechanism 160 may direct the MO laser output light pulse beam 62 into the cavity formed at the rear by, e.g., a single maximally reflective mirror 310 to form, e.g., a "half" bow-tie configuration having a first pass path 76 and a second pass path 78.

Figure 8:
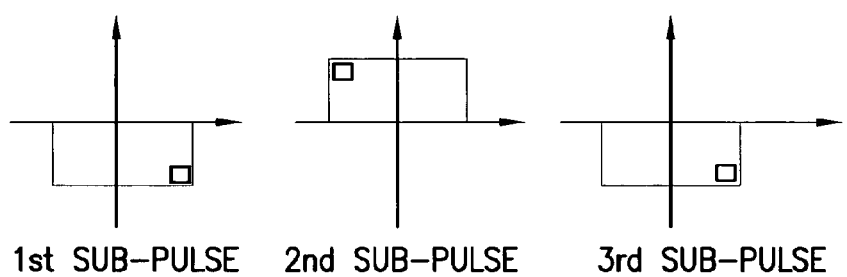
FIG. 8 illustrates schematically multiple reflections similar to those of FIG. 37, or the use of separate beams to fill different spatial portions of an aperture according to aspects of an embodiment of the subject matter disclosed.

Turning now to FIG. 8 there is shown, according to aspects of an embodiment of the subject matter disclosed, what applicants refer to as an OPuS effect cavity 320 in which, e.g., a polarizing beam splitter 322 and a maximally reflective rear cavity mirror 324 may be used along with a quarter wave plate 326 and an output coupler 328. The system 320, according to aspects of an embodiment of the subject matter disclosed, may, e.g., due to slight misalignment of optical elements 322 and 324, have multiple passes generated within the oscillator cavity formed between the rear mirror 324 and output coupler 328, caused, e.g., by the misalignment.

Figure 18:
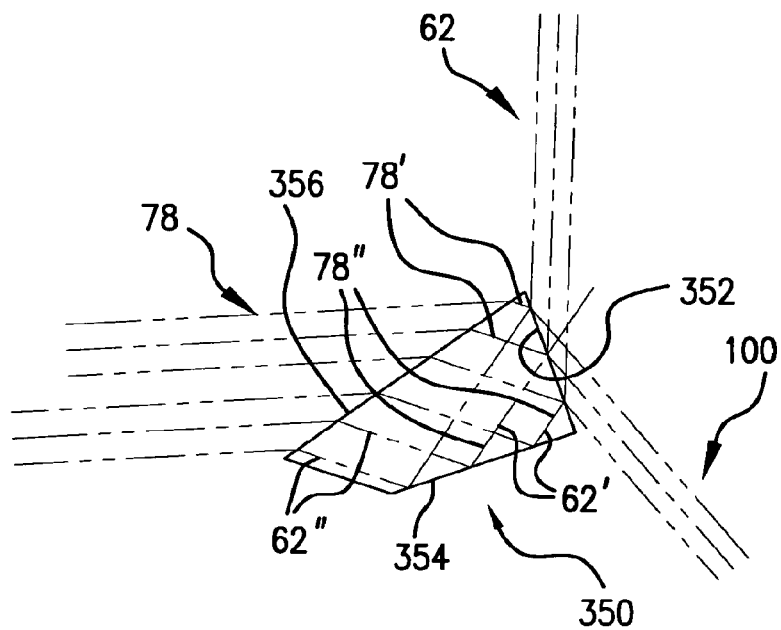
FIG. 18 illustrates schematically illustrates in cross section aspects of an embodiment of an orthogonal injection seeding mechanism according to aspects of an embodiment of the subject matter disclosed.

According to aspects of an embodiment of the subject matter disclosed, the orthogonal seed injection mechanism may comprise an orthogonal injection seeding optic such as, e.g., optical element 350, illustrated in FIG. 18 schematically and in cross-section across the longitudinal extent of the optic 350. Optical element 350 may be made of, e.g., $CaF_2$, e.g., uncoated $CaF_2$, and may comprise, e.g., according to aspects of an embodiment of the subject matter disclosed, an external input/output interface facing 352, a total internal reflection face 354, and an internal input/output interface face 356. In operation, as will be understood by those skilled in the optics art, the MO laser output light pulse beam 62 may be incident upon received by the external input/output interface facing 352, e.g., at an incidence angle of, e.g., about 70° and be refracted within the optic 350 as beam 62' to the total internal reflection face 354, which may be angled so as to totally internally reflect the beam 62' onto the internal input/output interface face 356 as beam 62" where it is refracted again upon entering the lasing gas medium environment inside of the chamber (not shown in FIG. 18), e.g., along a first path 76 and, after again passing through the gain medium, e.g., after reflection from a beam reverser (not shown in FIG. 18) it again is incident on and transmits through the face 356, as beam 78 and is refracted within the optic 350 as beam 78' to exit optic 350 as through this external input/output interface facing 352 the laser system output light pulse beam 100. The beams 76, 78 according to aspects of an embodiment of the subject matter disclosed, along with the beam reverser (not shown in FIG. 18), may cross, e.g., as shown in FIG. 13 or not as shown in FIG. 12. It will be understood that the beam 78' will also partially reflect onto the total internal reflecting surface 354 as beam 78" (62') and the partially reflected portion will become beam 62" and beam 76 again, so that the optic 350 acts as an output coupler until enough oscillations occur such that the stimulated emissions form a substantial laser system output laser light pulse beam 100.

Figure 19:
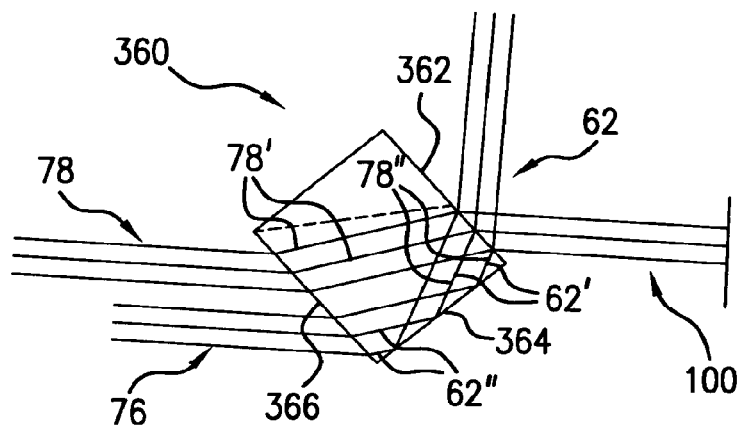
FIG. 19 illustrates schematically illustrates in cross section aspects of an embodiment of an orthogonal injection seeding mechanism according to aspects of an embodiment of the subject matter disclosed.

According to aspects of an embodiment of the subject matter disclosed another version of a seed injection optic 360, illustrated in FIG. 19, schematically and in cross section across a longitudinal axis thereof, may comprise, e.g., an external input/output interface facing 362, a total internal reflection face 364 and an internal input/output interface face 366. In operation the beam 62 from the MO may be incident upon the external input/output interface facing 362 and be refracted within the optic 360 as beam 62' to the total internal reflection face 364, and be reflected as beam 62" to the internal input/output interface face 366 where it will exit and again be refracted in the gas of the lasing medium environment as beam 76. After return from the beam reverser (not shown in FIG. 19) the beam 78 refracts in the optic 360 as beam 78' and transmits through the external input/output face 362 as laser system output light pulse beam 100. It will also be understood by those skilled in the laser art, as was so also with the embodiment of FIG. 18, that the beam 78' will also partially reflect onto the total internal reflecting surface 364 as beam 78" (62') and the partially reflected portion will become beam 62" and beam 76 again, so that the optic 360 acts as an output coupler until enough oscillations occur such that the stimulated emissions form a substantial laser system output laser light pulse beam 100.

According to aspects of an embodiment of the subject matter disclosed a variety of beam returners/reversers 370 may be utilized, e.g., as illustrated schematically in FIGS. 20-22. The optic 370 of FIG. 20 may incorporate, e.g., an input/output face 372, a first total internal reflection face 374, a second total internal reflection face 376 and a third total internal reflection face 378, such that, in operation the beam 76 transiting the gain medium in a first direction may be incident on the face 372, and be reflected by the faces 374, 376 and 378 to exit the optic 370 at the input/output interface face 372 as the beam 78 passing through the gain medium in a second direction. A similar beam reverser 380 is illustrated in cross section and schematically in FIGS. 21 and 22 wherein there are only two totally internal reflecting surfaces 384, 386 and 394, 396 in the optics 380 and 390 respectively.

It will also be understood by those skilled in the optics art that with three internal reflections, or with a three mirror arrangement, e.g., as is currently in use as a beam reverser on applicants' assignee's XLA model laser systems, the input beam 76 and output beam 78 will be effectively aligned and parallel and that relationship does not change, e.g., with rotation of the optic, e.g., optic 370, e.g., about an axis perpendicular to the plane of the page of FIG. 20. For the reversers 380, 390 respectively of FIGS. 21 and 22, the even number of internal reflections, e.g., two internal reflections allows for the beams 76, 78 to have variable angular relationship in the plane of the paper of FIGS. 21 and 22.

It will be understood by those skilled in the optics art that various combinations of the seed injection mechanism referred to in the present application and beam reversers/returners may be utilized to get the beams, e.g., on paths 76, 78 to cross, e.g., as illustrated in FIGS. 2, 3, 4 and 13 or not, e.g., as illustrated in FIG. 12. Also, manipulating these optics will be understood to enable the selection of, e.g., a crossing point for the paths, e.g., 76, 78, e.g., with respect to the extent of the lasing gain medium, e.g., along the longitudinal and/or vertical axis of the lasing gas gain medium during a discharge between the gain medium exciting electrodes. This may be utilized to vary parameters of the ultimate laser system output laser light pulse beam pulses, e.g., energy, energy stability and the like.

Figure 23:
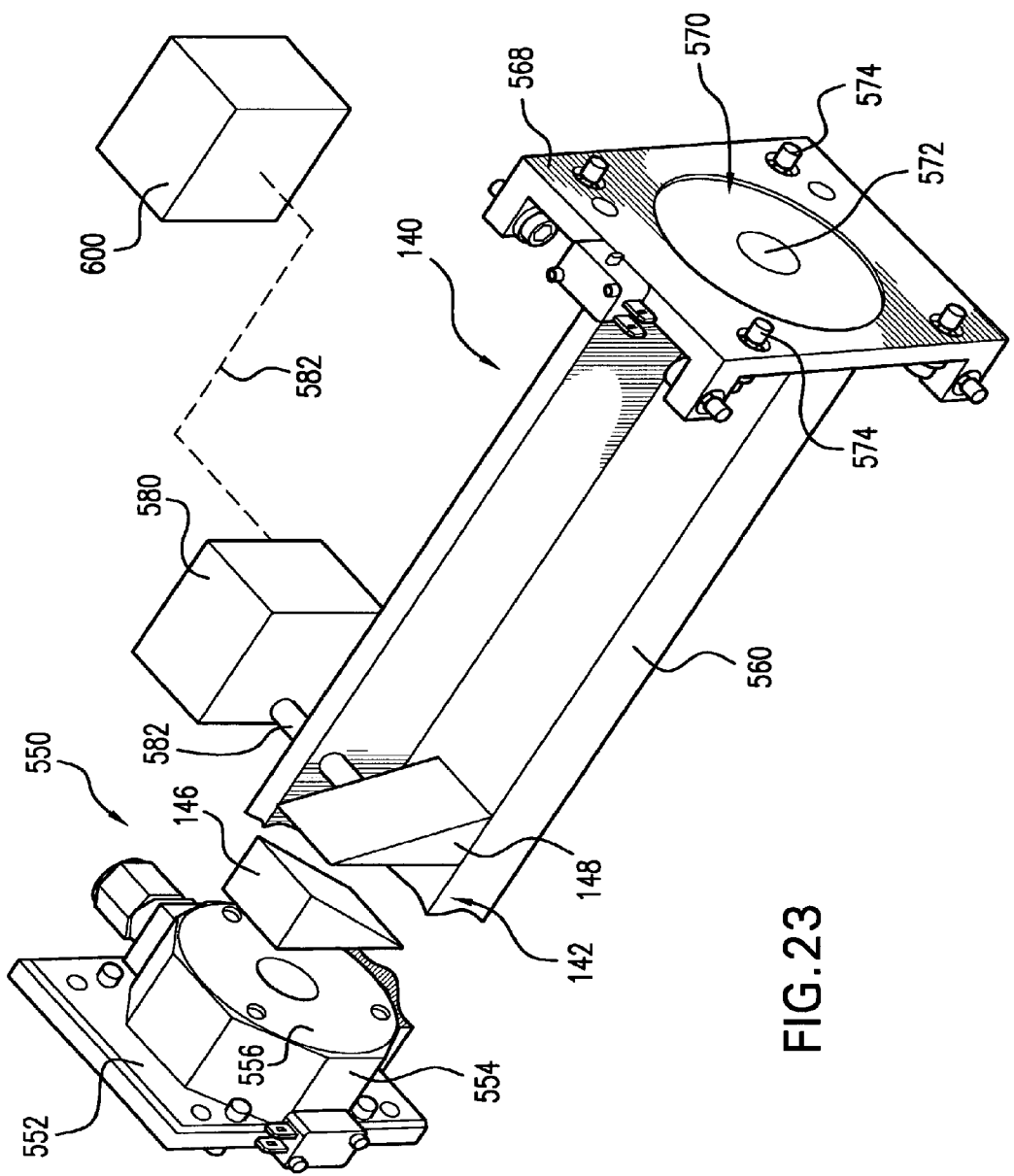
FIG. 23 illustrates partly schematically in a partially cut away perspective view an extension of a lasing chamber containing optical elements in the chamber according to aspects of an embodiment of the subject matter disclosed.

Turning now to FIG. 23 there is illustrated a snout 140, various versions of which are illustrated schematically, e.g., in FIGS. 2, 3 and 4. The snout 140 may comprise, e.g., a window housing 550, which may comprise an external mounting plate 552 and housing walls 554 machined with the housing plate 552 or otherwise affixed to the housing plate 552. Also a window mounting plate 556 is shown. This window housing 550 shown illustratively, according to aspects of an embodiment of the subject matter disclosed, may be similar to such window housings currently being used on applicants' assignee's laser systems and may have a window housing end plate (not shown in this view for clarity purposes), similar to the laser end plate 570, such as is shown in FIG. 23 at the laser side of the snout 140. The not shown window mounting laser end plate may be at the point of the window mounting plate 556. Similarly the snout 140 may have a window end plate (not shown in this FIG. for clarity) similar to the end plate 552 to affix the window housing 550 to the remainder of the snout 140. The laser chamber end mounting plate 568 may be attached to the laser chamber, e.g., 144 in FIG. 2, by mounting bolts 574, and have an aperture 572 through the beam, e.g., 76 enters the chamber 144 and beam 78 returns from the chamber 144.

As shown in FIG. 23 partly schematically and partly in block diagram form the beam expander 142, e.g., comprising beam expanding prism 146 and beam expanding prism 148, may be within the snout 140, as shown schematically in the cutaway of FIG. 23. At least one of the prisms 146, 148 may be mounted on mounts (not shown) for movement one relative to the other. This may be controlled, e.g., by a controller 600, e.g., by an actuator 580, e.g., a stepper motor or other suitable actuators known in the art of laser system optic positioning control as referenced in one or more of the above referenced patents or co-pending applications, connected to the respective at least one prism, e.g., prism 148 by an actuator shaft 582, e.g. for rotation of the prism 148 on the axis of the shaft 582, to change its position relative to the prism 142 and also other optics, e.g., an orthogonal seed injection mechanism (not shown in FIG. 23) and/or the beam returner/reverser (not shown in FIG. 23).

Similarly as illustrated schematically and partly in block diagram form, e.g., in FIGS. 13 and 15, the beam reverser/returner 270 and/or the seed input/output coupling optic 260 may be controlled by a controller 600 controlling the operation of an actuator 590 for the beam returner/reverser and 594 for the input output optic, e.g., an orthogonal seed injection mechanisms 260, with the actuators 590, 594 connected to the controller 600 by control signal lines 592 and 596 respectively.

A ring cavity, e.g., with an output coupler seed laser coupling, e.g., an seed injection mechanism, while perhaps more complex a configuration, makes most efficient use of seed laser energy.

According to aspects of an embodiment of the subject matter disclosed, for the seed laser input/output coupling a range of maximally reflecting mirrors may be utilized, e.g., from about a square 45 degree Rmax to about a square 30 degree Rmax, e.g., as is used on applicants' assignee's ArF 193 nm LNMs. Reflectivity for P-polarization is only about 85% at 45 degrees.

According to aspects of an embodiment of the subject matter disclosed where attenuation of s-polarization may be needed, e.g., because of ASE, it may be achieved via Brewster reflections and insertion of partial reflectors in or into the power amplification stage cavity.

Figure 7:
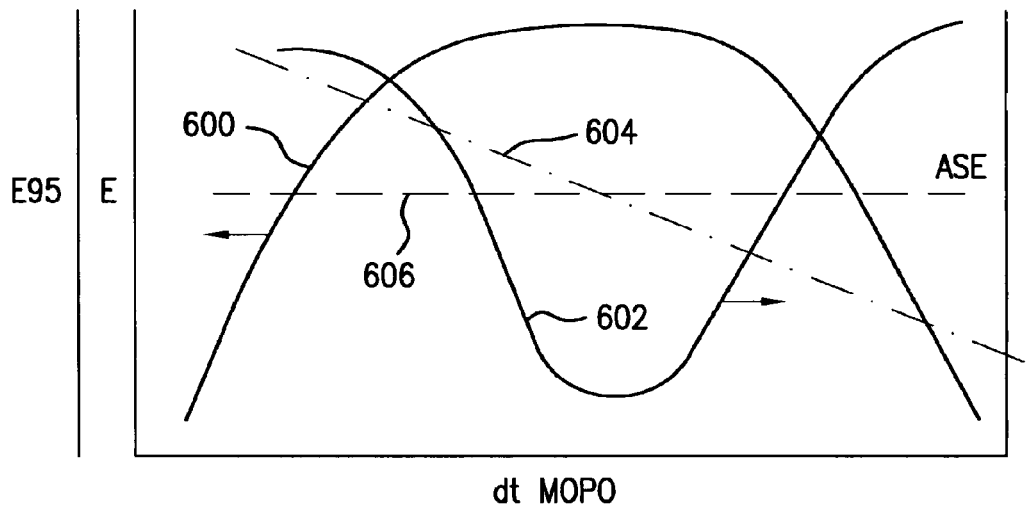
FIG. 7 illustrates a timing and control regime according to aspects of an embodiment of the subject matter disclosed.

MOPO energy vs. amplification stage timing has been examined at different values of seed laser energy, ArF chamber gas mixture, percentage reflectivity of output coupler (cavity Q) and seed laser pulse duration, with the results as explained in relation to FIG. 7. The maximum intensity of the seed pulse has been observed to occur during the initial, very low level, fluorescence of the amplification stage. This very low level fluorescence (and thus gain) is believed to be enhanced by this seed light, as observed in MOPO output. Adjustment of the timing of the seed earlier than or later than, e.g., about 20 or so ns before the amplification stage firing can, e.g., lead to an increase in weak line output, an indication of, e.g., when the "primordial" photons are generated in the amplification stage.

ASE vs. MO-PO timing has been examined for different values of seed laser energy, ArF chamber gas mixture, percentage reflectivity of output coupler (cavity Q) and seed laser pulse duration with the results also explained in relation to FIG. 7.

Figure 24:
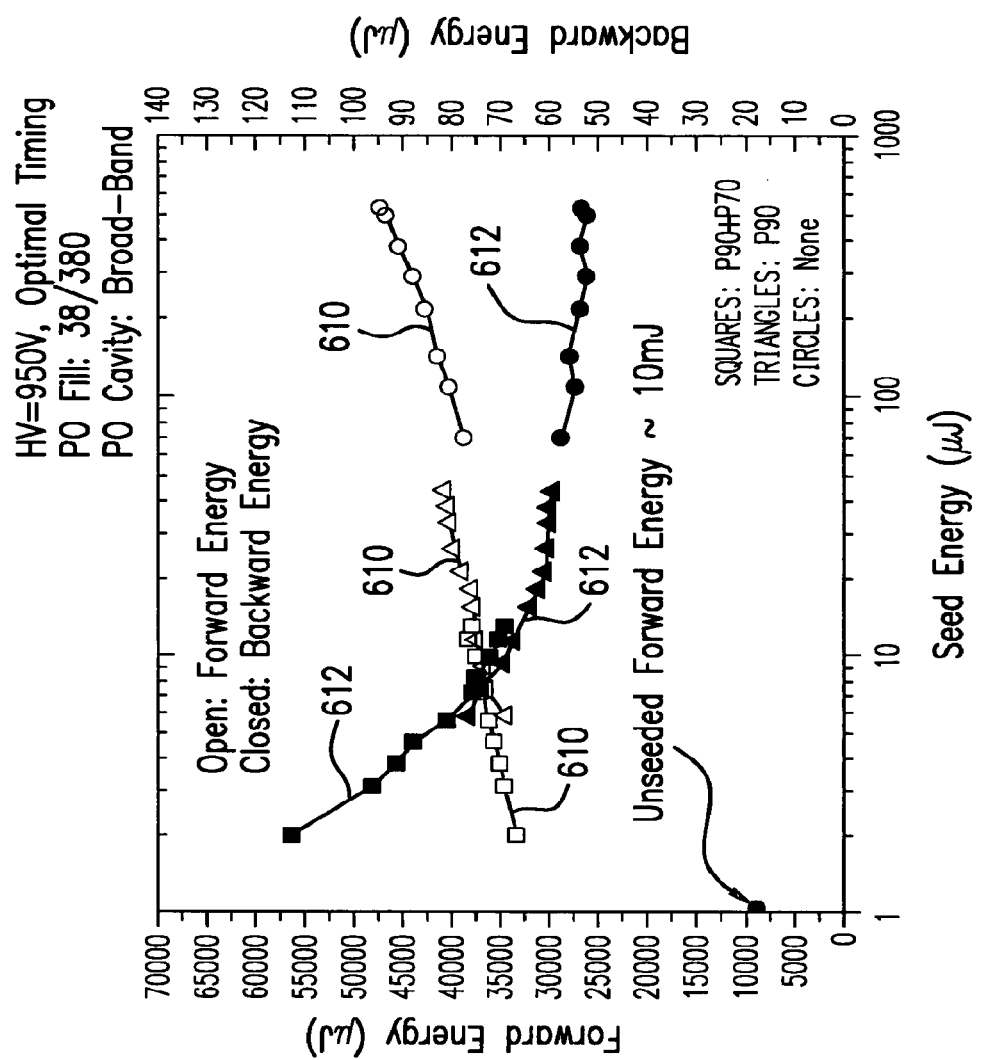
FIG. 24 illustrates measurements of forward and backward energy in a ring power amplifier according to aspects of an embodiment of the subject matter disclosed.
Figure 25:
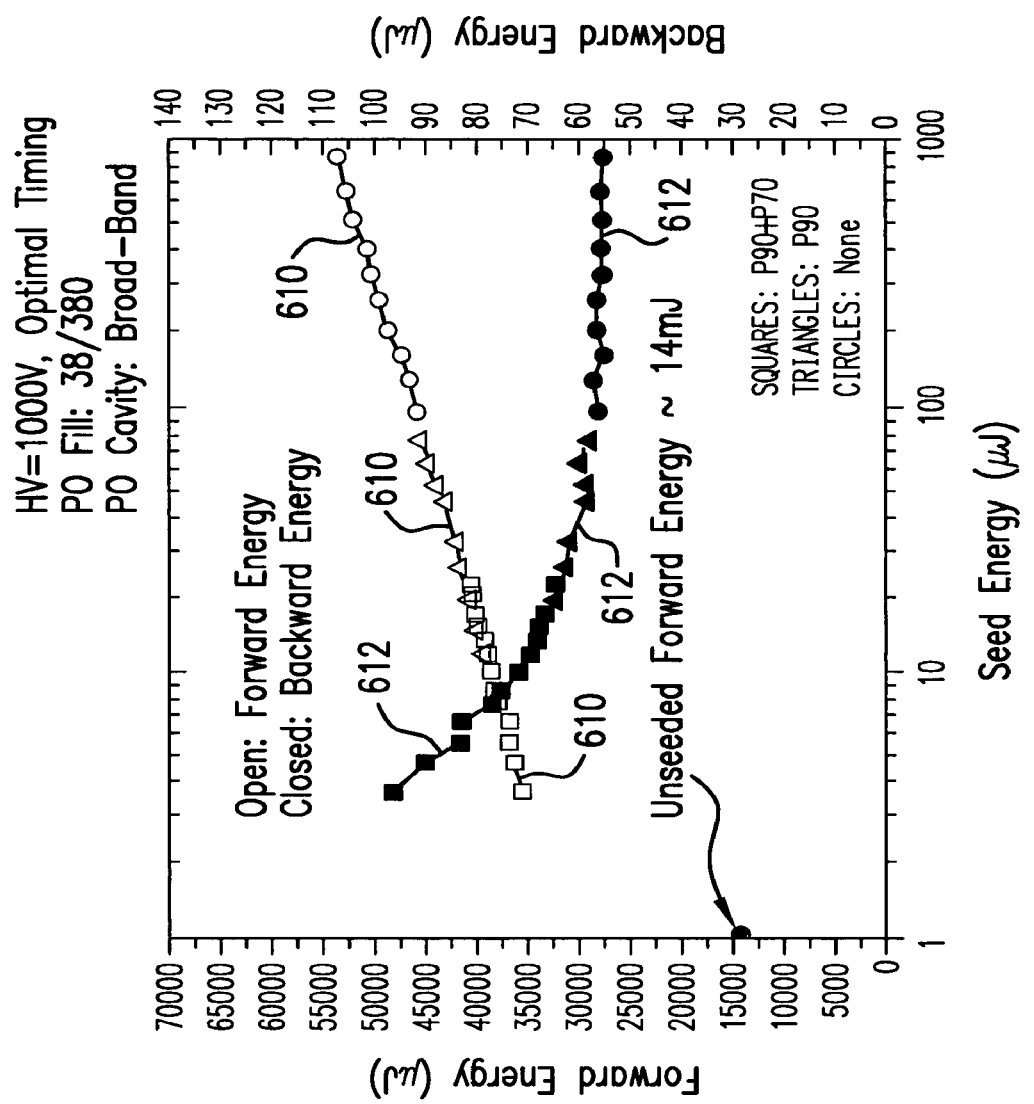
FIG. 25 illustrates measurements of forward and backward energy in a ring power amplifier according to aspects of an embodiment of the subject matter disclosed.

The relationship between forward energy and seed energy has also been examined and the results of which are illustrated, e.g., in FIGS. 24 and 25. The measurements taken at what was considered to be optimum timing of the discharge in the lasing medium in the MO and the discharge in the lasing medium in the ring power amplification stage. In FIG. 24 the curves 610 represent forward energy values and the curves 612 representing backward energy values, with the square data points representing operation with P90+P70 filters and the realignment was performed after insertion of partial reflectors with the results as shown in FIG. 25.

ASE can be of great concern with MOPO designs. Improper timing may lead to increased ASE up to and including generations of only ASE when the MO and power amplification stages are so mis-timed that essentially only broad band(ASE) lasing occurs in the power amplification stage, which being an oscillator will lase when the discharge occurs between the electrodes in the power amplification stage. Unlike a power amplifier, such as in applicants assignee's XLA-XXX laser system where the seed beam passes through the amplification stage a fixed number of times depending on the optical arrangement, in systems according to aspects of an embodiment of the subject matter disclosed amplified spontaneous emission (ASE) lasing occurs whether the seed laser pulse is present for amplification or not. Back scatter from the amplifier cavity optics can form a parasitic laser cavity. Some amplifier cavity optics can form an unintended laser cavity between the amplifier and MO. Therefore, careful control of timing is used, according to aspects of an embodiment of the subject matter disclosed, to keep ASE below limits that reduces or effectively eliminates the unwanted lasing.

ASE measurements have been made with medium and small seed input energy. For example for medium energy, e.g., seed energy of around 50 µJ, with a discharge voltage Vco of around 950V, and with an AMPLIFICATION STAGE gas fill of 38/380, fluorine partial pressure/total pressure, it has been shown that with a relative timing of between about −10 ns and +10 ns of optimum the ASE ratio is below about $3\times10^{-5}$. With low seed energy, e.g., around 5 µJ, with the same voltage and fill the ASE ratio is kept below about $6\times10^{-4}$ between about 10 ns to +10 ns of relative timing.

Maintaining proper ASE performance may require selecting proper amplifier cavity optics that have appropriate selectivity to eliminate unwanted polarization (e.g., utilizing appropriate coatings/angles of incidence, etc.), which can result in better suppression of unwanted polarization, which can result in reduced ASE, e.g., from the S-polarization. Creating dispersion in the amplifier cavity, e.g., with beam expanding and dispersing prisms has also been determined by applicants, according to aspects of an embodiment of the subject matter disclosed, to be an effective method for further reducing the ASE ratio contributing to an effectively large enough margin against whatever ASE specification is selected.

According to aspects of an embodiment of the subject matter disclosed a method is proposed to reduce ASE in ring amplifiers, e.g., to take better advantage of other features of this architecture, e.g., low seed energy, high efficiency, energy stability etc. Applicants propose to introduce some broad band (at least much broader than the line narrowed seed radiation propagating in the opposite direction from that of the main radiation direction to increase ASE in this direction and reduce ASE in the main direction. That is to say broad band gain will be utilized in the opposite path around the ring to reduce the available gain for ASE in the main direction. This could be accomplished, e.g., with some scatter of the seed laser beam from the optics, e.g., by feeding florescence of the seed laser into the ring power amplification stage. The broad band emission can thereby, e.g., deplete gain available to the ASE and will be propagated oppositely to main radiation direction, reducing broad band emission in the main direction.

According to aspects of an embodiment of the subject matter disclosed it will be understood that solid state pulsed power systems such as the magnetically switched systems noted above in one or more of the referenced patents or patent applications and as sold with applicants' assignee's laser systems, having very tightly controlled timing of the firings of electric discharges between electrodes in the respective MO and amplification gain medium chambers, along with the properties of a ring power amplification stage in a MOPRO configuration (e.g., operating the ring power amplification stage at or very near total saturation), enables the delivery to a lithography tool or an LTPS tool, or the like, laser system output light pulse beam pulses having about twice the dose stability as is currently achievable, e.g., in applicants' assignee's XLA MOPA laser systems.

Figure 26:
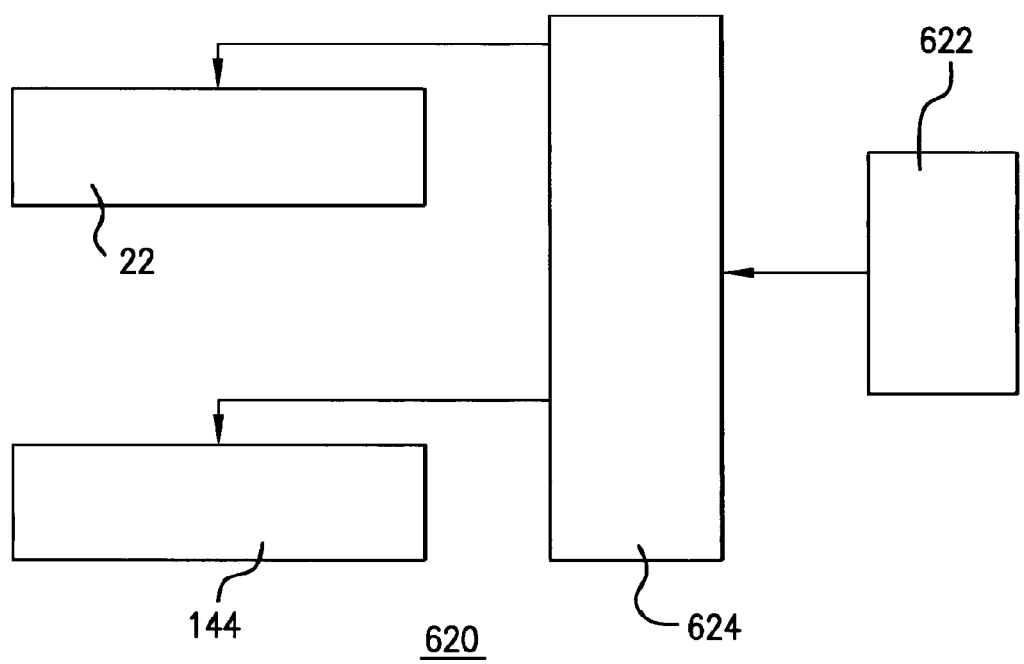
FIG. 26 illustrates schematically and in block diagram form a timing and control system for a MOPO according to aspects of an embodiment of the subject matter disclosed.
Figure 27:
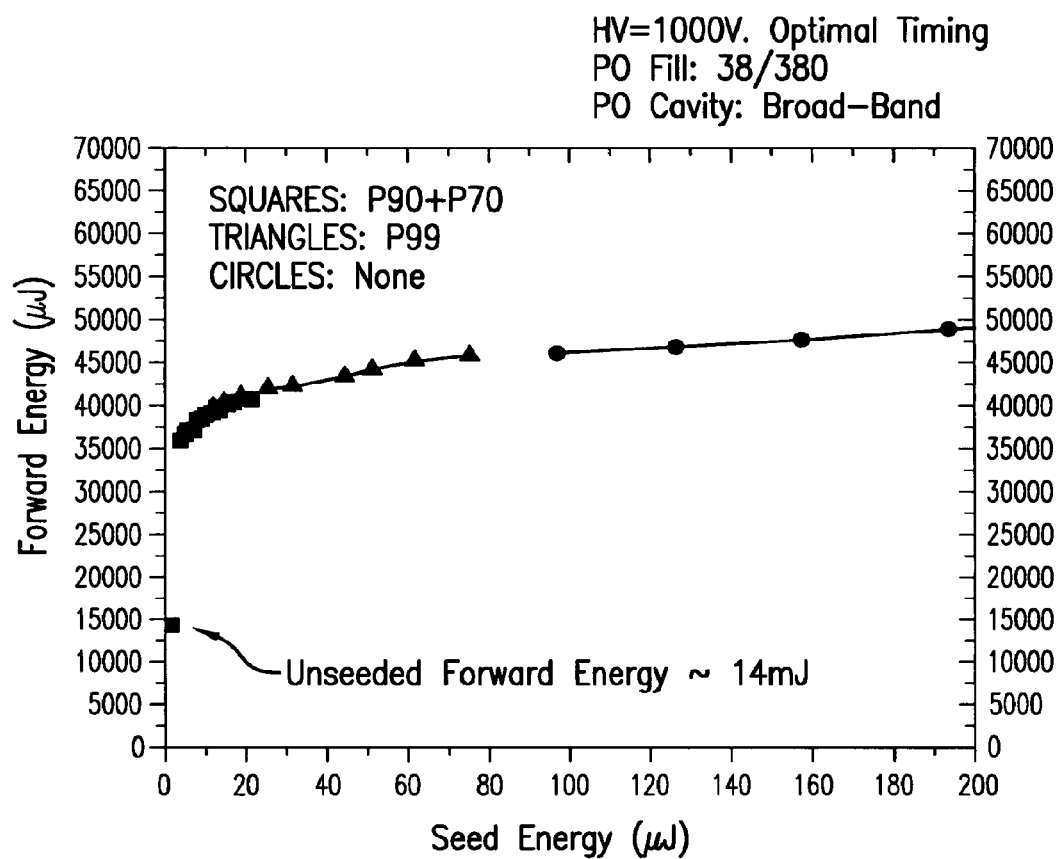
FIG. 27 illustrates the degree of saturation of a ring power oscillator with variation of MO output pulse energy according to aspects of an embodiment of the subject matter disclosed.

FIG. 26 shows schematically and in block diagram an energy/dose control system 620 according to aspects of an embodiment of the subject matter disclosed. As illustrated in block diagram form, the energy/dose controller 620 may include a solid state pulsed power system 624, such as a magnetically switched pulsed power system as noted above, which may be controlled, e.g., by a timing and energy control module 622 of the type sold with applicants' assignee's current laser systems, e.g., XLA MOPA configured laser systems and discussed in one or more of the above referenced patents or co-pending applications. Such timing end energy control modules in combination with the SSPPM 624 are capable of very fine pulse to pulse energy control, e.g., out of the MO and very fine, e.g., within a few nanoseconds, control of the relative timing of the firing of the electric discharge between a first pair of electrodes (not shown) in the MO 24 and a second pair of electrodes, e.g., electrodes 424 in the amplification stage 144 as illustrated, e.g., in FIGS. 15 and 16. This enables, as discussed in one or more of the above referenced patents and co-pending applications, e.g., the selection of a portion of the output laser light pulse beam pulse from the MO to initiate seeding of the amplification gain medium and the like, e.g., to control bandwidth and also impact other overall laser system output light pulse beam pulse parameters. This, in combination with the ring power oscillator operating at or nearly at saturation, e.g., within about 5-10% of saturation, or closer enables the system to delivery about twice the dose stability as is currently available in, e.g., lithography laser light sources, such as applicants' assignee's XLA laser systems or existing laser annealing light sources, e.g., for LTPS.

Figure 31:
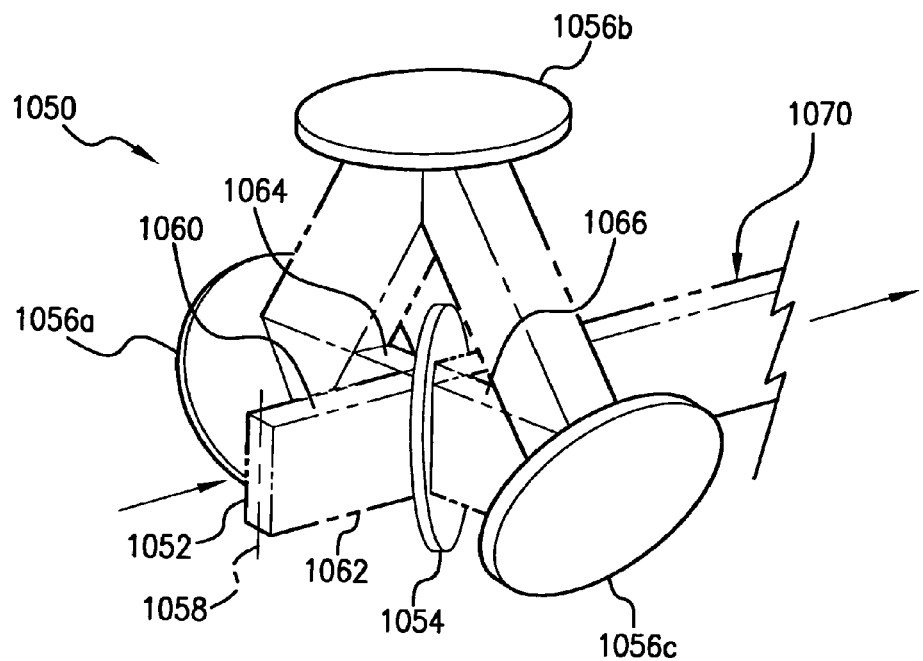
FIG. 31 shows schematically a coherency buster according to aspects of an embodiment of the disclosed subject matter.

Referring to FIG. 31, a beam mixer/flipper 1050 is shown for operation on a beam 1052 (which for illustrative purposes has been shown as having an upper white half and a lower black half). As explained in greater detail below, the beam mixer 1050 can be used to alter the intensity profile of a beam, e.g. improving intensity symmetry along a selected axis of a beam, and can be used to reduce beam coherency, or both. For the embodiment shown, the beam mixer 1050 includes a beam splitter 1054 and mirrors 1056*a-c*.

For the arrangement shown in FIG. 31, the beam 1052 can be initially incident upon the beam splitter 1054 whereupon a portion of the beam may directed, via reflection, toward mirror 1056*a* and the remainder is transmitted, (e.g., with substantially no change in direction) through the beam splitter 1054 and exits the beam mixer 1050 on an output beam path 1070. In one setup, a beam splitter 1054 reflecting about forty to sixty percent of the incident light, e.g., fifty percent, may be used. For this setup, about fifty percent of the initial beam incident upon the beam splitter 1054 is directed toward the mirror 1056*a*. For the beam mixer 1050, mirrors 1056*a-c* may typically be flat, maximum reflectivity mirrors. As shown in FIG. 31, mirror 1056*a* may be positioned and oriented to receive light from the beam splitter 1054 at an angle of incidence of approximately thirty degrees. As further shown, mirror 1056*b* may be positioned and oriented to receive light reflected from mirror 1056*a* at an angle of incidence of approximately thirty degrees, and mirror 1056*c* may be positioned and oriented to receive light reflected from mirror 1056*b* at an angle of incidence of approximately thirty degrees.

Continuing with FIG. 31, light reflected from mirror 1056*c* can be made to be incident upon the beam splitter 1054 at an angle of incidence of about forty-five degrees. For a fifty percent reflectivity beam splitter, about half of the light from mirror 1056*c* is reflected onto the output beam path 1070 and about half of the light from mirror 1056*c* passes through the beam splitter 1054 on a beam path toward mirror 1056*a*, as shown. Thus, the output beam path 1070 includes a combined beam containing the portion of the initial beam 1052 that passed through the beam splitter 1054 and the portion of light from mirror 1056*c* that is reflected from the beam splitter 1054. Similarly, the light on the path from the beam splitter 1054 to mirror 1056*a* includes a combined beam containing the portion of the initial beam 1052 that is reflected by the beam splitter 1054 and the portion of light from mirror 1056*c* that is transmitted through the beam splitter 1054.

The beam entering the beam mixer 1050 in FIG. 31 is shown illustratively as having a rectangular cross-section that defines a long axis 1058. This type of beam is typical of a laser beam produced by an excimer laser with the long axis corresponding to the direction from one discharge electrode to the other. A typical beam may have dimension of about 3 mm by 12 mm. Moreover, for the output of an excimer laser, the intensity profile in one axis, e.g., the long axis 1058 is typically unsymmetrical, whereas the intensity profile in the other axis, e.g., the short axis (i.e. the axis normal to the long axis 1058) is approximately Gaussian. Although the beam mixer 1050 shown is particularly suitable for improving symmetry of a high power excimer discharge laser, it is to be appreciated that it can be used in conjunction with other types of laser systems and for other applications, for example, the beam mixer may be used to reduce coherency in a beam generated by a solid state laser.

Figure 48:
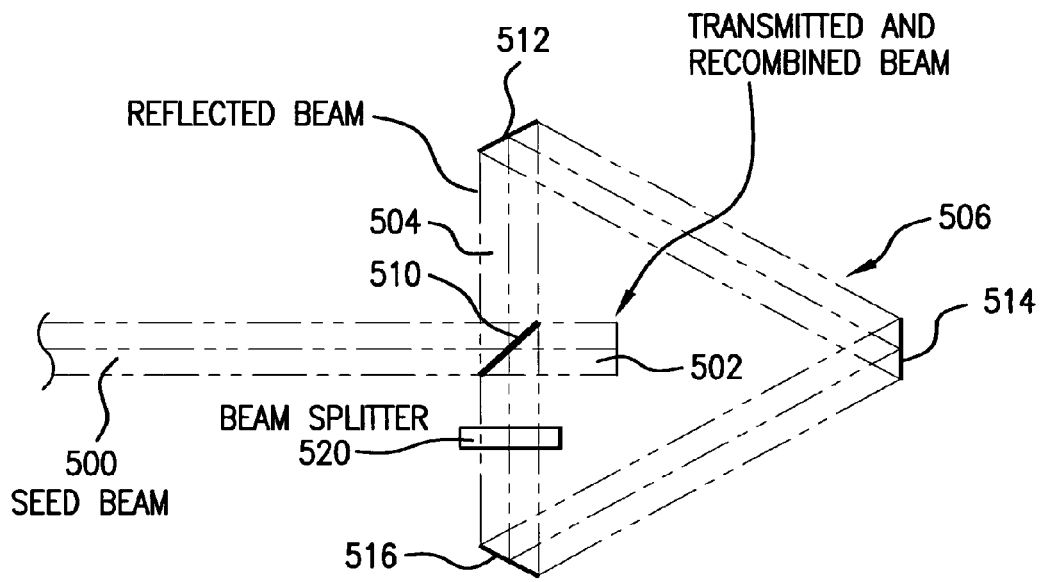
FIG. 48 shows schematically a coherence buster optical delay path according to aspects of an embodiment of the disclosed subject matter.

FIG. 31 shows that the beam extends along the axis 1058 from a first edge 1060 to a second edge 1062. FIG. 31 also shows that the mirrors 1056*a-c* establishing a spatially inverting path which has a beginning 1064 and an end 1066. As FIG. 31 illustrates, the inverting path may be characterized in that a part of the beam near the first beam edge 1060 at the beginning 1064 of the inverting path translates to the second beam edge at the end 1066 of the inverting path. More specifically, for the mixer 1050 shown, a photon at the 'top' of the beam which strikes mirror 1056*a* translates and leaves mirror 1056*c* at the 'bottom' of the beam. Since the inverting path constitutes a delay path, there will be some temporal stretching of the pulse, and this can be beneficial, especially in embodiments with the coherence busting mechanism between the master oscillator/seed laser and the amplification gain medium, e.g., the ring power amplification stage. The pulse stretching between the seed laser and amplification gain medium can stretch somewhat the pulse out of the amplification gain medium. This can also be minimized, e.g., by minimizing the delay path, e.g., to a length of about a ns or so. with a suitable delay path time, etc., as noted elsewhere, the beam mixer 1050 could form a coherence buster mini-OPuS, e.g., as discussed in regard to FIG. 48.

The beam mixer 1050 may be placed in between the seed beam laser portion and the amplifier laser portion of a MOPA or MOPRO (with, e.g., a ring power amplification stage), configured multi-chambered laser system, such as that shown in FIGS. 1-6 and 9-16. Other forms of coherency busting, of the passive type, may be used, e.g., between the MO and PA as discussed in above referenced in U.S. patent application Ser. No. 11/447,380, entitled DEVICE AND METHOD TO STABILIZE BEAM SHAPE AND SYMMETRY FOR HIGH ENERGY PULSED LASER APPLICATIONS, filed on Jun. 5, 2006, and Ser. No. 10/881,533, entitled METHOD AND APPARATUS FOR GAS DISCHARGE LASER OUTPUT LIGHT COHERENCY REDUCTION, filed on Jun. 29, 2004, and published on Dec. 29, 2005, Pub. No. 20050286599, as well as Ser. No. 11/521,904, entitled LASER SYSTEM, filed on the same day as the present application, referenced above.

The darker and lighter entry beam portions as shown in FIG. 31 may be separate beams from separate sources, spatially separated, and the beam mixer 1050 can act as such in addition to or in lieu of being used as a coherency buster for a single beam.

It will be understood that several possible embodiments of delay paths comprising beam mixers, coherence busters or both are illustrated in the present application but are not exhaustive of the optical delay paths that cam be employed, e.g., those having imaging mirrors and not having imaging mirrors, or having a mixture of both, that perform beam delay, flipping and/or mixing functions, provided that, at a minimum the beam pulses (including daughter pulses) are flipped/ mixed (or both) with respect to the main pulse and other daughter pulses.

It will be understood by those skilled in the art that as disclosed in the present application according to aspects of an embodiment of the subject matter disclosed, applicants have enabled the satisfaction of customer demands, both from scanner makers and semiconductor manufacturer end users, that have been placed on light source suppliers, e.g., ArF light sources, beyond even the traditionally expected power and bandwidth improvements. For example, further CoC Improvement is demanded because, e.g., ArF is now used in high volume production, e.g., on cost sensitive products, the industry expectation of equivalent reductions in cost of operation and thus cost of consumables for ArF as was historically demanded in KrF as that technology matured. In addition, energy stability improvements are met by the subject matter disclosed, e.g., critical dimension variation sensitivity to dose, which has become greater with the advent of low K1 lithography techniques. The double exposure concept, e.g., also trades off between overlay and dose control. Optical maskless lithography will require single pulse exposure control, improved by aspects of embodiments of the subject matter disclosed.

With regard to energy stability improvements, the Cymer XLA light source led to a significant improvement in energy stability by exploiting the saturation effects in the PA of a MOPA configuration, e.g., with a two pass PA amplification. The slope of Eout vs. Ein for XLA is about ⅓. MO energy instabilities are reduced by a factor of 3× when passed through such a PA. However, even with the 3× improvement through the PA, the MOPA system energy stability is still greatly impacted by, e.g., the MO energy instability. MO and PA contributions are about equal. Other contributions such as, voltage regulation, timing jitter, and MO pointing jitter are relatively smaller contributors, but not insignificant. The PA energy stability performance falls somewhere between a typical broadband oscillator and a fully saturated amplifier.

According to aspects of an embodiment of the subject matter disclosed, a recirculating ring configuration, e.g., a power ring amplification stage, operates in a much stronger region of saturation. The slope of Eout vs. Ein for a seed laser/amplification gain medium system, e.g., with a ring power amplification stage has been measured by applicants' employer at 0.059. MO energy instabilities can be reduced by a factor of 17×, e.g., when passed through a recirculating ring oscillator, e.g., a power ring amplification stage.

With the recirculating ring configuration the amplification stage energy stability will exhibit the characteristics of a fully saturated amplifier. Applicants expect at a minimum to see about a 1.5-2× improvement in energy stability.

$$\sigma_{System} = \sqrt{\frac{1}{17}\sigma_{MO}^2 + \sigma_{PA}^2 + \sigma_{voltage}^2 + \sigma_{timing}^2 + \sigma_{MO\ Pointing}^2}$$

It will further be understood by those skilled in the art that according to aspects of an embodiment of the subject matter disclosed a power ring amplification stage may be utilized. Optics may be utilized to create two or more overlapping bow ties or race tracks for four passes per oscillation in the cavity.

Characteristic of such amplifier media, e.g., regenerative or recirculating ring power amplification stage can include parallel planarity which could be a stable oscillator, e.g., in half planes or an unstable oscillator. The beam returner/beam reverser could utilize multiple mirrors or prisms or a combination thereof, positioned inside or outside the chamber or a combination thereof, e.g., dependant upon exposure to certain levels of energy density by one or more of the optical elements. Unwanted light, e.g., mostly ASE is discriminated against in a variety of ways, e.g., preferentially being created in a direction opposite from the regeneration path of the oscillations of the seed laser pulse beam, e.g., in the ring power amplification stage.

Expanding the beam within the amplifier stage cavity, e.g., corresponding to the vertical direction of a Brewster angle window, also can serve to protect optical elements in the ring power oscillator cavity as well as disperse the light to lessen ASE. The output coupler portion of the seed inject mechanism may, e.g., have a reflectivity of around 20% for the desired (in-band) frequencies (or polarization or both). Beam expansion may also be able to be performed with multiple prisms, some one or more of which may be inside and/or outside of the chamber enclosure. That is, while one or more of such prisms may be inside the chamber enclosure and exposed to the fluorine containing laser gas mixture, at least one may also be outside the chamber.

Turning now to FIG. 7 there is shown a chart illustrating by way of example a timing and control algorithm according to aspects of an embodiment of the subject matter disclosed. The chart plots laser system output energy as a function of the differential timing of the discharge in the seed laser chamber and the amplification stage, e.g., the ring power amplification stage as curve 600, which is referred to herein as dtMOPO for convenience, recognizing that the amplification stage in some configurations may not strictly speaking be a PO but rather a PA though there is oscillation as opposed to the fixed number of passes through a gain medium in what applicants' assignee has traditionally referred to as a power amplifier, i.e., a PA in applicants' assignee's MOPA XLA-XXX model laser systems, due, e.g., to the ring path length's relation to the integer multiples of the nominal wavelengths. Also illustrated is a representative curve of the ASE generated in the amplification stage of the laser system as a function of dtMOPO, as curve 602. In addition, there is shown an illustrative curve 604 representing the change in the bandwidth of the output of the laser system as a function of dtMOPO. Also illustrated is a selected limit for ASE shown as curve 606.

It will be understood that one can select an operating point on the ASE curve at or around the minimum extremum and operate there, e.g., by dithering the control selection of dtMOPA to, e.g., determine the point on the operating curve 602 at which the system is operating. It can be seen that there is quite a bit of leeway to operate around the minimum extremum of the ASE curve 602 while maintaining output pulse energy on the relatively flat top portion of the energy curve to, e.g., maintain laser system output pulse energy and energy σ, and the related dose and dose σ constant, within acceptable tolerances. In addition as shown, there can be a concurrent use of dtMOPO to select bandwidth from a range of bandwidths while not interfering with the E control just noted.

This can be accomplished regardless of the nature of the seed laser being used, i.e., a solid-state seed or a gas discharge laser seed laser system. Where using a solid-state seed laser, however, one of a variety of techniques may be available to select (control) the bandwidth of the seed laser, e.g., by controlling, e.g., the degree of solid-state seed laser pumping. Such pump power control may, e.g., put the pumping power at above the lasing threshold in order to select a bandwidth. This selection of bandwidth may shift or change the pertinent values of the curve 604, but the laser system will still be amenable to the type of E and BW control noted above using dtMOPO to select both a BW and concurrently an operating point that maintains the output energy of the laser system pulses at a stable and more or less constant value in the flat top region of the illustrated energy curve 600. It is also possible to use a non-CW solid state seed laser and to adjust the output bandwidth. For example, selection of the output coupler reflectivity of the master oscillator cavity (cavity-Q) can adjust the output bandwidth of the seed laser system. Pulse trimming of the seed laser pulse may also be utilized to control the overall output bandwidth of the laser system.

It can be seen from FIG. 7 that either the selected ASE upper limit or the extent of the portion of the energy curve that remains relatively flat with changes in dtMOPO may limit the range of available bandwidth for selection. The slope and position of the BW curve also can be seen to influence the available operating points on the ASE curve to maintain both a constant energy output and a minimum ASE while also selecting bandwidth from within an available range of bandwidths by use of the selection of a dtMOPO operating value.

It is similarly known that the pulse duration of discharge pulses in a gas discharge seed laser, among other things, e.g., wavefront control may be used to select a nominal bandwidth out of the seed laser and thus also influence the slope and/or position of the BW curve 604 as illustrated by way of example in FIG. 7.

Figure 28:
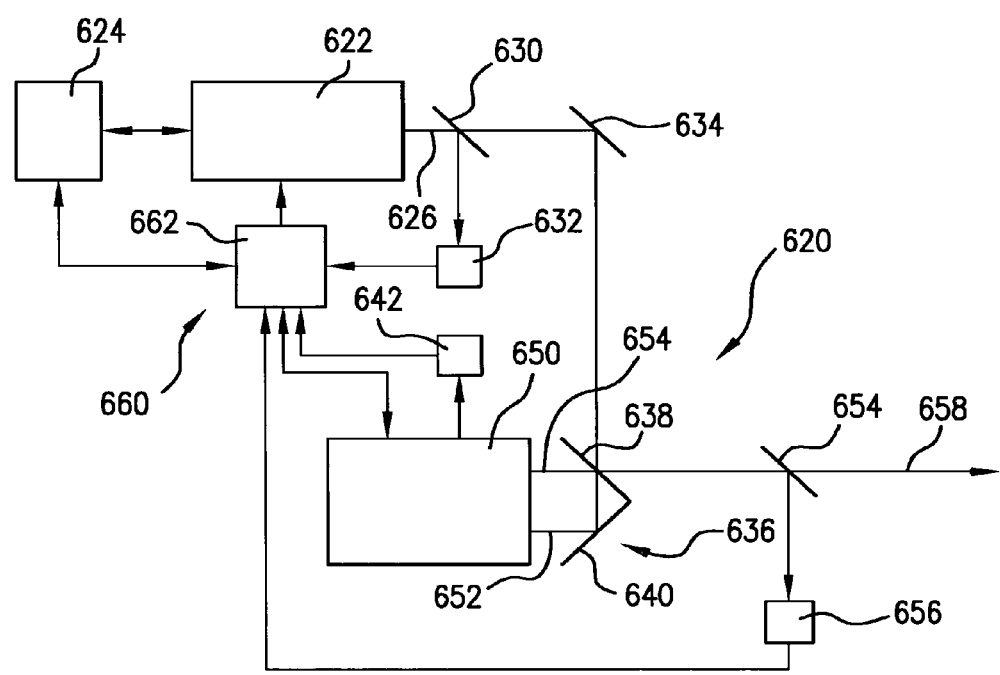
FIG. 28 shows schematically and in block diagram form a laser control system according to aspects of an embodiment of the subject matter disclosed.

Turning now to FIG. 28, there is shown an example in schematic and block diagram form of a laser system controller 620, according to aspects of an embodiment of the subject matter disclosed. The controller 620 may comprise part of a laser system including, e.g., a seed laser 622, such as a gas discharge laser known in the art of the type XeCl, XeF, KrF, ArF or $F_2$ or the like, which may have associated with it a line narrowing module 624, as is known in the art, for selecting a particular nominal center wavelength and at the same time narrowing the bandwidth to the ranges discussed above in the present application. The seed laser 622 may produce a seed laser output beam 626, which may pass through a beam splitter 630 which diverts a small portion of the output beam 626 to a metrology unit metrology module 632, which may include, among other things, an MO energy detector and a wavemeter, measuring, e.g., center wavelength and bandwidth.

The output beam 626 may then be turned by a maximally reflective mirror 634 (for the nominal center wavelength) to a seed injection mechanism 636. The seed injection mechanism may include, e.g., a partially reflective optical element 638 and a maximally reflective optical element 640, and may be two separate elements or a single optic as discussed elsewhere in the present application. As discussed elsewhere, the seed injection mechanism may inject the seed laser output pulse beam 626 into an amplification gain medium, such as a ring power amplification stage 650 along an injection path 652. A beam splitter 654 can divert a small portion of the output beam 658 into a metrology unit 656 which may measure, e.g., output energy and bandwidth. A metrology unit 642 connected directly to the amplification gain medium laser 650 which can measure, e.g., ASE in the laser chamber 650.

A controller 660, which may comprise a processor 662, receives inputs from the various metrology units 632, 642 and 656, and others as appropriate, and utilize them as part of control algorithms referenced in one or more of the above noted patents and co-pending applications and also incorporate the control algorithm noted above regarding operating at or around the ASE curve minimum while maintaining energy constant and also selecting bandwidth within the limits imposed by a selected ASE limit. In addition, as is shown in one or more of the above referenced patents and co-pending applications the controller 660 may also control the timing of the creation of an output pulse in the seed laser and the creation of the output pulse in the amplification gain medium (dtMOPO for short) and also provide control signals to the line narrowing module, e.g., to control bandwidth, e.g., by wavefront manipulation or optical surface manipulation as discussed above and in one or more of the above referenced patents and co-pending patent applications.

Figure 29:
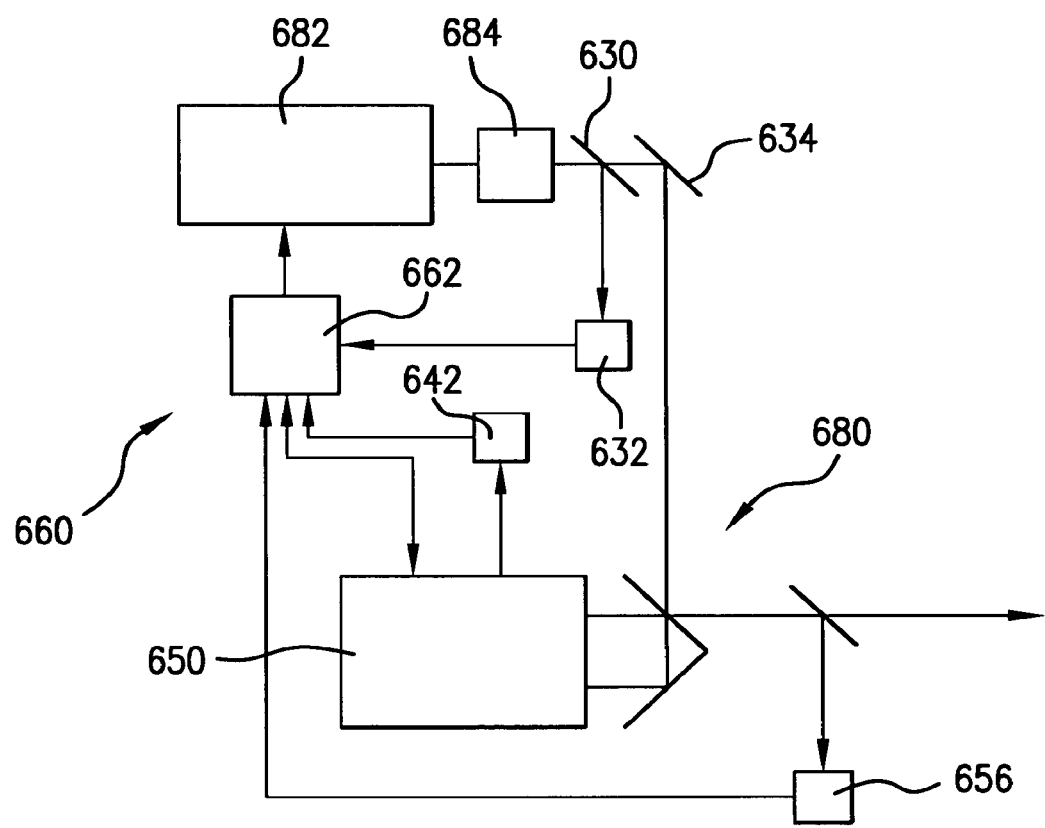
FIG. 29 shows schematically and in block diagram form a laser control system according to aspects of an embodiment of the subject matter disclosed.

Turning now to FIG. 29 there is illustrated schematically and in block diagram form a laser system 680 like that of the laser system 620 of FIG. 28 with the exception that the seed laser 682 is, e.g., a solid state seed laser with an associated frequency converter 684 to, e.g., modify the wavelength of the output of the seed laser 682 to a wavelength suitable for amplification in the amplification gain medium stage 650. In addition, the controller 660 may provide inputs to the seed laser 682 to control both the timing of the creation of the seed laser pulse and the bandwidth, e.g., by modifying the pumping power, as discussed above.

According to aspects of an embodiment of the subject matter disclosed one may need to select an edge optic that is an optic that may have to be used, and thus perhaps coated, all the way to its edge, which can be difficult. Such an optic could be required, e.g., between the output coupler, e.g., 162 shown in FIG. 2 and the maximum reflector, e.g., 164, shown in FIG. 2, together forming a version of a seed injection mechanism 160, shown in FIG. 2, e.g., depending upon the separation between the two, since there may be too little room to avoid using an edge optic. If so, then the edge optic should be selected to be the Rmax, e.g., because of the ray path of the exiting beam as it passes through the OC portion 162. From a coatings standpoint it would be preferable to have the OC be the edge optic because it has fewer layers. However, an alternative design, according to aspects of an embodiment of the subject matter disclosed has been chose by applicants and is illustrated schematically and by way of example in FIG. 30, e.g., wherein the use of an edge optic can be avoided, e.g., if a large enough spacing is provided between out-going and in-coming ring power amplification stage beams, e.g., as created by the beam expander, 142 shown in FIG. 2, e.g., prisms 146, 148. For example, about a 5 mm spacing between the two beams has been determined to be satisfactory enough to, e.g., to avoid the use of any edge optics.

Figure 30:
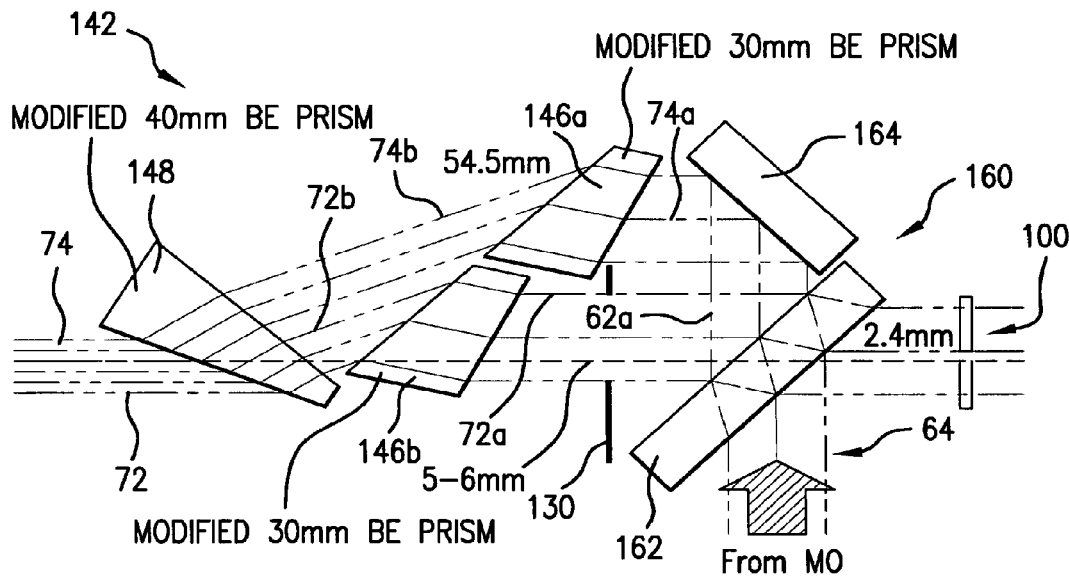
FIG. 30 shows schematically a seed injection mechanism and beam expander according to aspects of an embodiment of the subject matter disclosed.

As illustrated by way of example in FIG. 30 the laser system, e.g., system 110 illustrated by way of example in FIG. 2, may produce a laser system output pulse beam 100. e.g., using a ring power amplification stage 144 to amplify the output beam 62 of a master oscillator 22 in a ring power amplification stage 144. A beam expander/disperser 142, shown in more detail by way of an example of aspects of an embodiment of the subject matter disclosed may be comprised of a first expansion/dispersion prism 146a, and a second expansion/dispersion prism 146b, and a third prism 148.

The seed injection mechanism 160 may comprise a partially reflective input/output coupler 162, and a maximally reflective (Rmax) mirror 164, illustrated by way of example and partly schematically in FIG. 30 in a plan view, i.e., looking down on the seed injection mechanism and m expansion/dispersion 160 and the ring power amplification stage chamber (not shown) into and out of which, respectively the beams 74 and 72 traverse, that is from the perspective of the axis of the output beam 62 traveling from the master oscillator chamber 22, which in such an embodiment as being described may be positioned above the chamber 144 (the beam 62 having been folded into the generally horizontal longitudinal axis as shown (the beam also having been expanded in the MOPuS in its short axis, as described elsewhere, to make it generally a square in cross-sectional shape.

With regard to the configuration of the beam expansion prisms 146a, 146b and 148 inside the ring power amplification stage cavity a similar arrangement may be provided to that of the beam expansion on the output of the power amplifier ("PA") stage in applicants' assignee's XLA-XXX model laser systems, e.g., with a 4× expansion, e.g., provided by a 68.6° incident and 28.1° exit, e.g. on a single prism or on two prisms with the same incident and exit angles. This can serve to, e.g., balance and minimize the total Fresnel losses. Reflectivity coatings, e.g., anti-reflectivity coatings may be avoided on these surfaces since they will experience the highest energy densities in the system. According to aspects of an embodiment of the subject matter disclosed the beam expander/disperser 160 may be implemented with the first prism 146 split into to small prisms 146a, and 146b, which may be, e.g., 33 mm beam expander prisms, e.g., truncated, as shown by way of example in FIG. 30, to fit in the place where one similarly angled prism could fit, with the split prism having a number of advantages, e.g., lower cost and the ability to better align and/or steer the beams 72, 74 (in combination with the beam reverser (not shown in FIG. 30) and the system output beam 100.

The master oscillator seed beam 62 may enter the seed injection mechanism 160 through the beam splitter partially reflective optical element 162, acting as an input/output coupler, to the Rmax 164 as beam 62a, from which it is reflected as beam 74a to the first beam expander prism 146a, which serves to de-magnify the beam in the horizontal axis by about ½× (it remains about 10-11 mm in the vertical axis into the plane of the paper as shown in FIG. 30). The beam 74b is then directed to the second beam expansion prism 148, e.g., a 40 mm beam expansion prism, where it is again de-magnified by about ½× so the total de-magnification is about ¼× to form the beam 74 entering the gain medium of the ring power amplification stage (not shown in FIG. 30. the beam is reversed by the beam reverser, e.g., a beam reverser of the type currently used in applicants' assignee's XLA-XXX model laser system PAs and returns as beam 72 to the prism 148, e.g., having crossed in the gain medium in a bow-tie arrangement or having traveled roughly parallel, perhaps overlapping to some degree in a version of a race-track arrangement. From prism 148 where the beam 72 is expanded by roughly 2× the beam 72b is directed to prism 142b and is expanded a further approximately 2× into beam 72a. Beam 72a is partially reflected back to the Rmax as part of beam 62a and is partially transmitted as output, beam 100, which gradually increases in energy until an output beam pulse of sufficient energy is obtained by lasing oscillation in the ring power amplification stage. The narrowing of the beam entering the amplification gain medium, e.g., the ring power amplification stage has several advantageous results, e.g., confining the horizontal widths of the beam to about the width of the electrical gas discharge between the electrodes in the gain medium (for a bow-tie arrangement the displacement angle between the two beams is so small that they each essentially stay within the discharge width of a few mm even thought they are each about 2-3 mm in horizontal width and for the race track embodiment, the bean 72 or the bean 72 only passes through the gain medium on each round trip, or the beams may be further narrowed, or the discharge widened, so that both beams 72,74 pass through the discharge gain medium in each round trip of the seed beams 72, 74.

The positioning and alignment of the prisms 146a, 146b and 148, especially 146a and 146b can be utilized to insure proper alignment of the output beam 100 from the ring power amplification stage into the laser output light optical train towards the shutter. The beam leaving the input/output coupler 162 may be fixed in size, e.g., in the horizontal direction, e.g., by a horizontal size selection aperture 130, forming a portion of the system aperture (in the horizontal axis) to about 10.5 mm. Another aperture, e.g., in the position roughly of the present PA WEB, e.g., in applicants' assignee's XLA-XXX laser system products, can size the beam in the vertical dimension. According to aspects of an embodiment of the subject matter disclosed applicants propose that a system limiting aperture be positioned just after the main system output OPuS, e.g., a 4×OPus. A ring power amplification stage aperture may be located about 500 mm further inside the laser system. This distance is too great to avoid pointing changes turning into position changes at the specified measurement plane (present system aperture). Instead the limiting system aperture can be located just after the OPuS, and may have a 193 nm reflecting dielectric coating instead of a stainless steel plate commonly used. This design can allow for easier optical alignment, while at the same time reduce heating of this aperture.

According to aspects of an embodiment of the subject matter disclosed, applicants propose to implement a relatively stress-free chamber window arrangement similar to or the same as that discussed in the above referenced co-pending U.S. patent application, because of the use of, e.g., a PCCF coated window.

According to aspects of an embodiment of the subject matter disclosed, applicants propose to, e.g., place ASE detection, e.g., backward propagation ASE detection, in either the LAM or in an MO wavefront engineering box ("WEB"), which can, e.g., include elements of the MOWEB from applicants' assignee's existing XLA-XXX model laser systems along with the mini-OPuSs discussed elsewhere in this application referenced herein, as well as, e.g., beam expansion, e.g., using one or more beam expansion prisms to expand the output beam of the MO in its short axis, e.g., to form generally a square cross-sectional beam. The current MO WEB and its beam turning function is represented schematically as the turning mirror, e.g., 44 shown in FIG. 2. As a preference, however, the backward propagation detector may be placed "in" the MO WEB/MOPuS, that is, e.g., by employing a folding mirror (fold #2), e.g., 44 in FIG. 2, with, e.g., a reflectivity of R=95% instead of R=100% and monitoring the leakage through this mirror 44. Some drift and inaccuracy of this reading may be tolerated, e.g., since it may be utilized as a trip sensor (i.e. measurements in the vicinity of 0.001 mJ when conditions are acceptable—essentially no reverse ASE—as opposed to around 10 mJ when not acceptable—there is reverse ASE), e.g., when the ring power amplifier is not timed to amplify the seed pulse, but still creates broad band laser light. Existing controller, e.g., TEM controller, cabling and ports and the like for new detectors may be employed. The detector may, e.g., be the detector currently used by applicants' assignee on existing XLA-XXX model laser systems to measure beam intensity, e.g., at the laser system output shutter.

According to aspects of an embodiment of the disclosed subject matter one or more mini-OPuS(s), which may be confocal, such that they are highly tolerant to misalignment and thus of potentially low aberration, e.g., for the off-axis rays needed in the proposed short OPuS(s), the so-called mini-OPuS, can have delay times of 4 ns and 5 ns respectively, where more than one is employed. These values were chosen so that both OPuSs exhibit low wavefront distortion with spherical optics in addition to appropriate delay paths for coherence busting. The low wavefront requirement may actually prevent significant speckle reduction from the mini-OPuS(s) unless an angular fan-out from the output of the mini-OPuS(s) is generated, e.g., by replacing a flat/flat compensating plate with a slightly wedged plate, so that the transmitted beam and the delayed beam in the mini-OPuS are slightly angularly offset from each other. The laser beam, e.g., from the master oscillator is partially coherent, which leads to speckle in the beam. Angularly offsetting the reflected beam(s) reentering the mini-OPuS output with the transmitted beam, along with the delay path separation of the main pulse into the main pulse and daughter pulses, can achieve very significant speckle reduction, e.g., at the wafer or at the annealing workpiece, arising from the reduction in the coherence of the laser light source pulse illuminating the workpiece (wafer or crystallization panel). This can be achieved, e.g., by intentionally misaligning the delay path mirrors, probably not possible with a confocal arrangement, but also with the addition of a slight wedge in the delay path prior to the beam splitter reflecting part of the delayed beam into the output with the transmitted beam and its parent pulse and preceding daughter pulses, if any. For example, a 1 milliradian wedge in the plate will produce an angular offset in the reflected daughter pulse beam of 0.86 milliradians.

The optical delay path(s) of the mini-OPuS(s) may have other beneficial results in terms of laser performance and efficiency. According to aspects of an embodiment of the disclosed subject matter, as illustrated schematically in FIG. 48, the laser beam, e.g., seed beam 500 from the seed source laser (not shown in FIG. 48), may be split into two beams 502, 504 using a partially reflective mirror (beam splitter) 510. This mirror 510 transmits a percentage of the beam into the main beam 502 and reflects the rest of the beam 500 as beam 504 into an optical delay path 506. The part 502 that is transmitted continues into the rest of the laser system (not shown in FIG. 48). The part 504 that is reflected is directed along a delay path 506 including, e.g., mirrors 512, 514 and 516, with mirror 514 being displaced perpendicularly to the plane of the paper in the schematic illustration, in order to allow the main beam 502 to reenter the rest of the laser system, e.g., to form a laser output beam or for amplification in a subsequent amplification stage. The beam 504 may then be recombined with the transmitted portion 502 of the original beam 500. The delayed beam 504 may be passed through a wedge (compensator plate) 520 essentially perpendicularly arranged in the path of beam 504. Thus, the daughter pulse beam(s) 504 from the delay path 506 are slightly angularly displaced from the main part of the beam in the transmitted portion 502 in the far field. The displacement may be, e.g., between about 50 and 500 µRad.

The length of the delay path 506 will delay the beam pulses so that there is a slight temporal shift between the part of the beam that is transmitted and the part that is reflected, e.g., more than the coherence length, but much less than the pulse length, e.g., about 1-5 ns. By selecting the appropriate path length, which determines the delay time, the addition of the two beams can be such that the energy in the pulse is spread into a slightly longer $T_{is}$, which in combination with later pulse stretching in the main OPuS(s) can improve laser performance, as well as providing other beneficial laser performance benefits.

Figure 49:
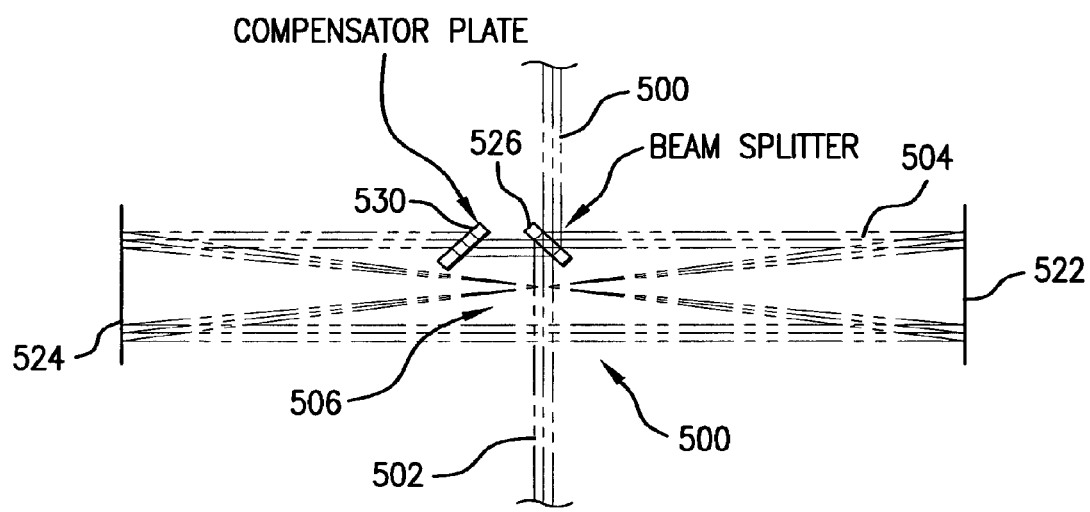
FIG. 49 shows schematically a coherence buster optical delay path according to aspects of an embodiment of the disclosed subject matter.

Two mini-OPuSs may be needed to achieve the desired effect. The offset time between the pulses from the two mini-OPuss may be, e.g., one nanosecond. Based upon optical and mechanical considerations, the delays selected for the stretchers may be, e.g., a 3 ns delay path in the first mini-OPus and a 4 ns delay path in the second. If the delay is shorter, the optical system, e.g., if it uses confocal or spherical mirrors can introduce unacceptable aberrations. If the delay is longer, it may be difficult to fit the system into the available space in the laser cabinet. The distance the beam must travel to achieve the 3 ns delay is 900 mm and to delay by 4 ns is 1200 mm. A confocal optical system 520, minimizing the sensitivity to misalignment, illustrated schematically in FIG. 49 may consist of two mirrors 522, 524, whose focal points are located at the same position in space and whose center of curvatures are located at the opposite mirror, along with a beam splitter 526. A compensator plate 530 (e.g., a wedge) can be added to insure that the reflected beam and the transmitted beam are slightly misaligned as noted above with respect to FIG. 48. In this case, the compensator plate is placed in the path of the delayed beam at an angle for proper functioning.

Figure 50:
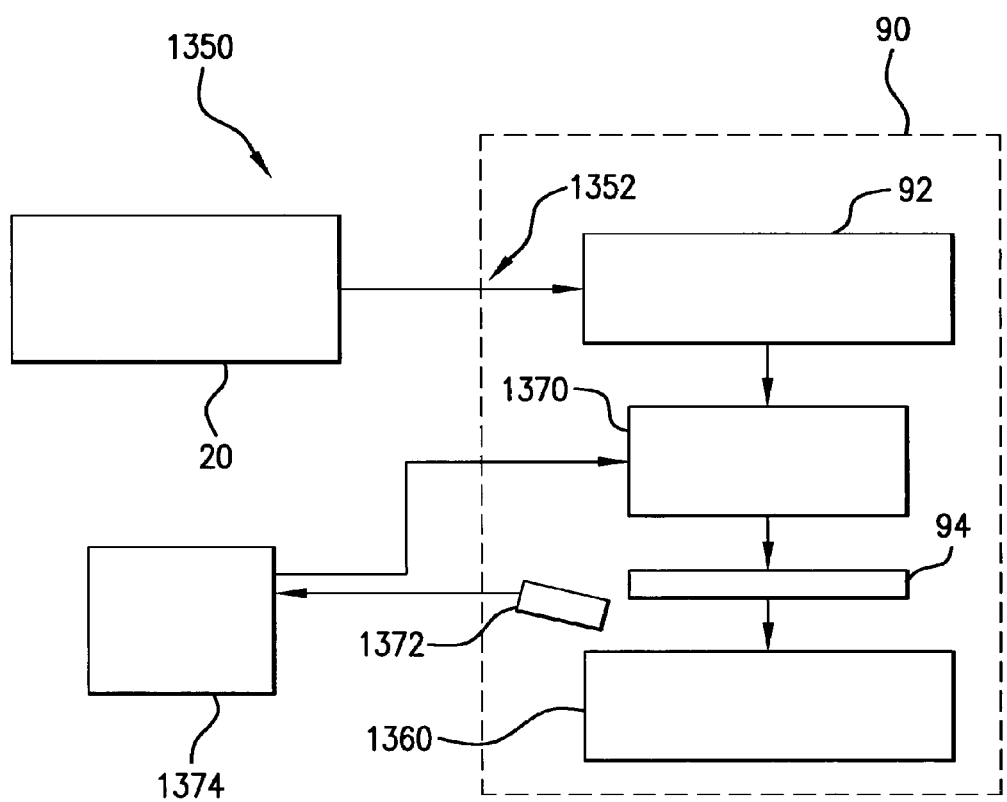
FIG. 50 shows schematically and in block diagram form a photolithography tool according to aspects of an embodiment of the subject matter disclosed.

Turning now to FIG. 50 there is shown schematically and in block diagram form a line edge/line width roughness (feature dimension roughness) control (reduction and/or selection) system 1350 according to aspects of an embodiment of the disclosed subject matter. The system 1350 may include a laser light source 20, such as disclosed in the present application and/or above noted patent applications filed concurrently with the present application, providing exposure illuminating DUV light to an illuminating light entrance opening 1352 in a photolithography tool 90. the tool 90, e.g., a scanner, may include an illuminator 92 as is well known in the art, illuminating a mask/reticle 94 for purposes of exposing an integrated circuit wafer (not shown), e.g., placed on a wafer holding stage 94 within the tool 90. Intermediate the illuminator 92 and the wafer handling stage 94 may be inserted a coherence busting mechanism 1370 such as one or more of the types disclosed in the present application and/or in the above noted patent applications filed concurrently with the present application, e.g., a mini-OPuS. The illuminator may include a projection lens (not shown) having the above noted properties.

The system may also include a sensor, e.g., an image contrast sensor 1372, which can be arranged to detect the impact of speckle on the patterning of an integrated circuit as a whole, or portions thereof, or in selected axes, e.g., one generally parallel to main feature dimension extending in one axis of the integrated circuit and one in another axis, e.g., generally orthogonal to the first axis. the sensor output may be provided to a controller 1374, which may be part of the control system for the laser or the scanner or an overall control system for both the laser and scanner, and may provide a control signal, based on the feedback from the sensor 1372 to the coherence busting mechanism. The control signal may alter the operation of the coherence busting mechanism, e.g., by modifying the actuation signals for, e.g., a beam sweeping mechanism(s) in either or both axes, of modifying the position compensation plates 520, 532 in the mini-OPuS as discussed above, e.g., in regard to FIGS. 47-48, e.g., to change the angular displacement of the main and daughter pulses, e.g., in one or both axes, i.e., by differing amounts and/or directions in each of at least two correction plates, each contained in separate mini-OPuS arranged in series as noted above.

Figure 51:
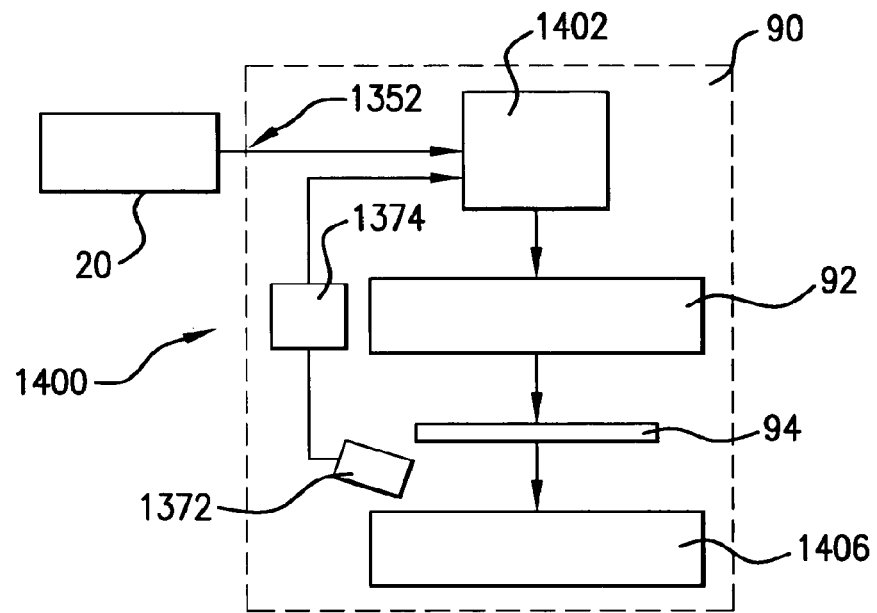
FIG. 51 shows schematically and in block diagram form a photolithography tool according to aspects of an embodiment of the subject matter disclosed.
Figure 52:
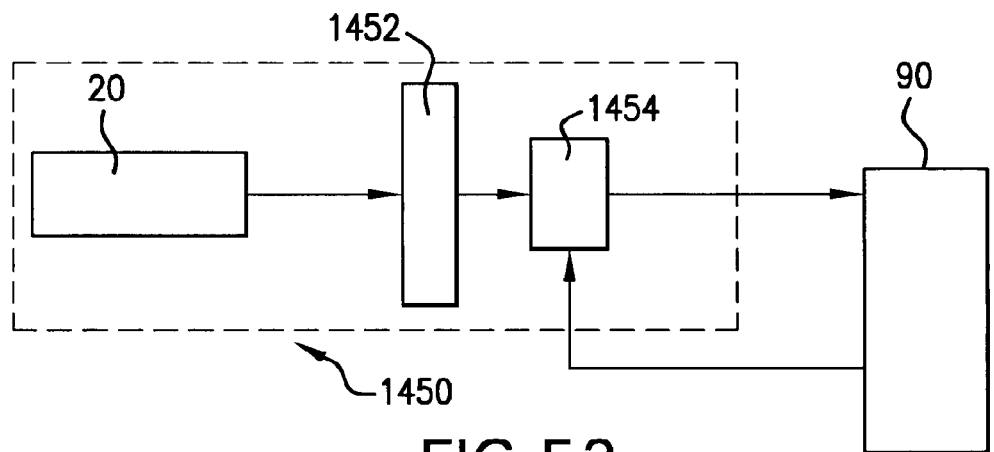
FIG. 52 shows schematically and in block diagram form a laser photolithography tool according to aspects of an embodiment of the subject matter disclosed.
Figure 53:
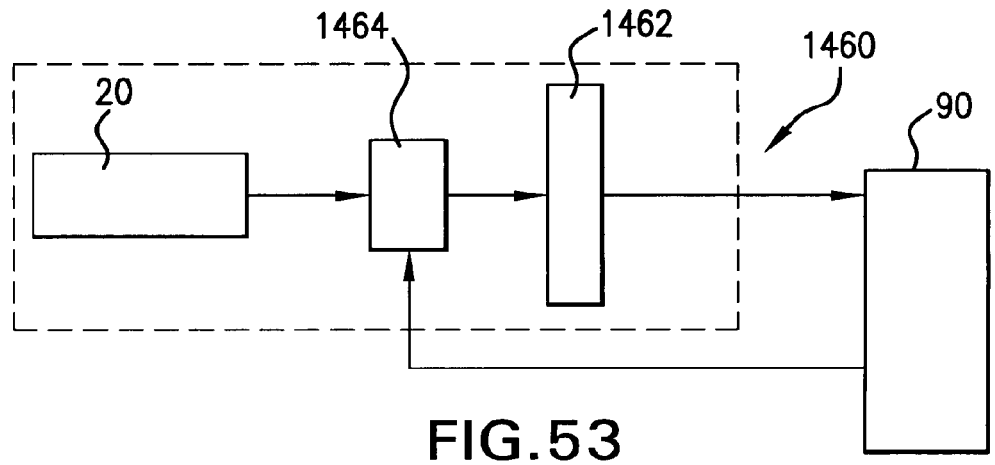
FIG. 53 shows schematically and in block diagram form a laser photolithography tool according to aspects of an embodiment of the subject matter disclosed.

Turning now to FIG. 51 there is illustrated schematically and in block diagram form a line edge/line width roughness (feature dimension roughness) control (reduction and/or selection) system 1400, according to aspects of an embodiment of the disclosed subject matter, similar to that of FIG. 50, however, with the coherence busting mechanism intermediate the light source light entry opening 1352 and the illuminator 92. Similarly, there is shown in FIGS. 52 and 53, schematically and in block diagram form, a line edge/line width roughness (feature dimension roughness) control (reduction and/or selection) system according to aspects of an embodiment of the disclosed subject matter, wherein the controller 1374 (not shown in FIG. 52 or 53, e.g., within the tool 90, provides a control signal to a coherency busting mechanism 1454 in FIG. 52 and 1462 in FIG. 53, within a respective laser system 1450 in FIG. 52 or 1460 in FIG. 53, wherein in each figure the coherence busting mechanism is shown intermediate a pulse stretching OPuS 1452 and the lithography tool 92 in FIG. 52 and intermediate the laser light source 20 and the pulse stretching OPuS 1462 in the laser system 1460 of FIG. 53.

The delay path time(s) in the mini-OPuS(s) for coherence busting and other purposes may be as short as about the temporal coherence length and as long as practical due to the noted optical and space considerations, such as misalignment and aberration tolerance. If there are two or more mini-OPuSs then the delay path in each must be different in length, e.g., by more than the coherence length and selected such that there is no significant coherence reaction (increase) due to the interaction of daughter pulses from the separate OPuS(s). For example the delay path times could be separated by at least a coherence length and by not more than some amount, e.g., four or five coherence lengths, depending on the optical arrangement.

According to aspects of an embodiment of the subject matter disclosed applicants propose to employ a coherence-busting optical structure that, e.g., generates multiple sub-pulses delayed sequentially from a single input pulse, wherein also each sub-pulse is delayed from the following sub-pulse by more than the coherence length of the light, and in addition with the pointing of each sub-pulse intentionally chirped by an amount less than the divergence of the input pulse. In addition applicants propose to utilize a pair of coherence-busting optical delay structures, where the optical delay time difference between the pair of optical delay structures is more than the coherence length of the input light. Each of the two optical delay structures may also generate sub-pulses with controlled chirped pointing as noted in regard to the aspects of the previously described coherence busting optical delay structure.

According to aspects of an embodiment of the disclosed subject matter two imaging mini-OPuSs, which may be confocal, such that they are highly tolerant to misalignment and thus of potentially low aberration, e.g., for the off-axis rays needed in the proposed short OPuSs, the so-called mini-OPuSs, and can have delay times of 4 ns and 5 ns respectively. These values were chosen so that both OPuSs exhibit low wavefront distortion with spherical optics. The low wavefront requirement may prevent significant speckle reduction from the mini-OPuSs unless an angular fan-out from the mini-OPuSs is generated, e.g., by replacing a flat/flat compensating plate with the slightly wedged plate.

It will be understood by those skilled in the art that according to aspects of an embodiment of the disclosed subject matter, adequate coherence busting may be achieved sufficiently to significantly reduce the effects of speckle on the treatment of a workpiece being exposed to illumination from the laser system, such as in integrated circuit photolithography photoresist exposure (including the impact on line edge roughness and line width roughness) or laser heating, e.g., for laser annealing of amorphous silicon on a glass substrate for low temperature recrystallization processes. This may be accomplished by, e.g., passing the laser beam, either from a single chamber laser system or from the output of a multi-chamber laser system or from the seed laser in such a multi-chamber laser system before amplification in another chamber of the multi-chamber laser system, through an optical arrangement that splits the output beam into pulses and daughter pulses and recombines the pulses and daughter pulses into a single beam with the pulses and daughter pulses angularly displaced from each other by a slight amount, e.g., between, e.g., about 50 μRad and 500 μRad and with each of the daughter pulses having been delayed from the main pulse(s), e.g., by at least the temporal coherence length and preferably more than the temporal coherence length.

This may be done in an optical beam delay path having a beam splitter to transmit a main beam and inject a portion of the beam into a delay path and then recombining the main beam with the delayed beam. In the recombination, the two beams, main and delayed, may be very slightly angularly offset from each other (pointed differently) in the far field, referred to herein as imparting a pointing chirp. The delay path may be selected to be longer than the temporal coherence length of the pulses.

The angular displacement may be accomplished using a wedge in the optical delay path prior to the delayed beam returning to the beam splitter which wedge imparts a slightly different pointing to the delayed beam (a pointing chirp). The amount of pointing chirp, as noted above may be, e.g., between about 50 and 500 μRad.

The optical delay paths may comprise two delay paths in series, each with a respective beam splitter. In such an event each delay path can be different in length such that there is not created a coherence effect between the main and daughter pulses from the respective delay paths For example, if the delay in the first delay path is 1 ns the delay in the second delay path could be about 3 ns and if the delay in the first delay path is 3 ns the delay in the second could be about 4 ns.

The wedges in the two separate delay paths may be arranged generally orthogonally to each other with respect to the beam profile, such that the wedge in the first delay path can serve to reduce coherence (speckle) in one axis and the wedge in the other delay path can reduce coherence (speckle) in the other axis, generally orthogonal to the first. Thus, the impact on speckle, e.g., contribution to line edge roughness ("LER") and/or line width roughness ("LWR"), e.g., at the wafer in exposure of photoresist in an integrated circuit manufacturing process can be reduced along feature dimensions in two different axes on the wafer.

According to aspects of an embodiment of the subject matter disclosed, with, e.g., a 6 mRad cross of the bowtie in a bowtie ring power amplification stage, the magnification prisms inside the ring cavity may be slightly different for the in-going and outgoing beams, and could be arranged so that the beam grows slightly as it travels around the ring or shrinks slightly as it travels around the ring. Alternatively, and preferably according to aspects of an embodiment of the subject matter disclosed, a result of breaking the larger beam expansion prism into two separate pieces, e.g., enabled by larger spacing between out-going and in-coming beams, e.g., about 5-6 mm, as illustrated by way of example in FIG. 30, applicants propose to adjust the angles of the two prisms, e.g., 146, 148 shown schematically in FIG. 4, such that they result in the same magnification for both out-going and in-coming beams, e.g., beams 100 and 62, respectively, shown illustratively and schematically in FIG. 30.

According to aspects of an embodiment of the subject matter disclosed applicants propose to place the Rmax, e.g., 164 and the OC, e.g., 162 portions of the version of the seed injection mechanism containing an Rmax 164 and an OC 162, e.g., along with the positioning of the system horizontal axis beam output aperture on that same stage. This enables, e.g., prior alignment of each as an entire unit and removes the need for field alignment of the individual components. This can allow, e.g., for the position of the Rmax/OC assembly, e.g., 160, shown in FIG. 2 (a seed injection mechanism) to be fixed, just like the OC location in a applicants' assignee's single chamber oscillator systems (e.g., XLS 7000 model laser systems) is fixed. Similarly, such an arrangement can allow for the achievement of tolerances such that the Rmax/OC are positioned relative to the system aperture properly without need for significant ongoing adjustment. The beam expansion prism may be moveable for alignment of the injection seed mechanism assembly with the chamber 144 of the amplification gain medium and the output beam 100 path with the laser system optical axis.

According to aspects of an embodiment of the subject matter disclosed applicants propose to position a mechanical shutter to block the MO output from entering the ring, when appropriate, similar to such as are utilized on applicants' assignee's OPuSs, e.g., to block them during alignment and diagnosis. The exact location could be, e.g., just above the last folding mirror prior to the ring power amplification stage, where the mini-OPuSes are protected during unseeded ring power amplification stage alignment and operation.

It will be understood by those skilled in the art that there is disclosed herein an apparatus and a method for use of a line narrowed pulsed excimer or molecular fluorine gas discharge laser system which may comprise a seed laser oscillator producing an output comprising a laser output light beam of pulses comprising: a first gas discharge excimer or molecular fluorine laser chamber; a line narrowing module within a first oscillator cavity; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses, which may comprise a ring power amplification stage. The ring power amplification stage may comprise an injection mechanism which may comprise a partially reflecting optical element, e.g., a beam splitter, which may be a partially reflective optical element and may be polarization sensitive, through which the seed laser oscillator output light beam is injected into the ring power amplification stage. The ring power amplification stage may comprise a bow-tie loop or a race track loop. The ring power amplification stage may amplify the output of the seed laser oscillator cavity to a pulse energy of over 1 mJ, or 2 mJ, or 5 mJ, or 10 mJ or 15 mJ. The laser system may operate at, e.g., an output pulse repetition rate of up to 12 kHz, or ≥2 and ≤8 kHz or ≥4 and ≤6 kHz. The laser system may comprise a seed laser oscillator producing an output comprising a laser output light beam of pulses which may comprise a first gas discharge excimer or molecular fluorine laser chamber; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses, which may comprise a ring power amplification stage. The laser system may operate within a matrix of operating values that can serve to optimize laser lifetime and produce other advantageous results including better pulse energy stability and the like, e.g., the seed laser oscillator containing a lasing gas comprising a mixture of fluorine and other gases and operating at ≤350 kPa of total lasing gas pressure, or ≤300 kPa of total lasing gas pressure, or ≤250 kPa of total lasing gas pressure, or ≤200 kPa of total lasing gas pressure or ≥35 kPa of fluorine partial pressure, or ≥30 kPa of fluorine partial pressure, ≥25 kPa of fluorine partial pressure, or ≥20 kPa of fluorine partial pressure and combinations of the above. The system may further comprise a coherence busting mechanism intermediate the seed laser oscillator and the ring power amplification stage. The coherence busting mechanism may sufficiently destroy the coherence of the output of the seed laser reduce speckle effects in a processing tool using the light from the laser system. The coherence busting mechanism may comprise a first axis coherence busing mechanism and a second axis coherence busing mechanism. The coherence busting mechanism may comprise a beam sweeping mechanism. The beam sweeping mechanism may be driven in one axis by a first time varying actuation signal. The beam sweeping mechanism may be driven in another axis by a second time varying actuation signal. The first actuation signal may comprise a ramp signal and the second actuation signal may comprise a sinusoid. The time varying signal(s) may have a frequency such that at least one full cycle occurs within the time duration of a seed laser output pulse. The coherence busting mechanism may comprise an optical delay path with misaligned optics producing a hall of mirrors effect. The coherence busting mechanism may comprise an optical delay path longer than the coherence length of the seed laser output pulse. The coherence busting mechanism may comprise an active optical coherency busting mechanism and a passive optical coherency busting mechanism. The active coherence busting mechanism may comprise a beam sweeping device and the passive coherence busting mechanism may comprise an optical delay path. The coherence busting mechanism may comprise a first optical delay path with a delay longer than the coherence length of the seed laser output pulse and a second optical delay path in series with the first optical delay path and having a delay longer than the coherence length of the seed laser output pulse. The delay of the second optical delay path may be greater than or equal to about 3 times the coherence length of the seed laser output pulse. The coherence busting mechanism may comprise a pulse stretcher. The pulse stretcher may comprise a negative imaging optical delay path. The pulse stretcher may comprise a six mirror OPuS. The coherence busting mechanism may a beam flipping mechanism. The system and method may comprise the use of a line narrowed pulsed excimer or molecular fluorine gas discharge laser system which may comprise a seed laser oscillator producing an output comprising a laser output light beam of pulses which may comprise a first gas discharge excimer or molecular fluorine laser chamber; a line narrowing module within a first oscillator cavity; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses, which may comprise a ring power amplification stage; a coherence busting mechanism intermediate the seed laser oscillator and the ring power amplification stage. The ring power amplification stage may comprise an injection mechanism comprising a partially reflecting optical element through which the seed laser oscillator output light beam is injected into the ring power amplification stage. The system and method may comprise the use of a broad band pulsed excimer or molecular fluorine gas discharge laser system which may comprise a seed laser oscillator producing an output comprising a laser output light beam of pulses which may comprise a first gas discharge excimer or molecular fluorine laser chamber; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses, which may comprise a ring power amplification stage; a coherence busting mechanism intermediate the seed laser oscillator and the ring power amplification stage. The ring power amplification stage may comprise an injection mechanism comprising a partially reflecting optical element through which the seed laser oscillator output light beam is injected into the ring power amplification stage. The system and method may comprise the use of a pulsed excimer or molecular fluorine gas discharge laser system which may comprise a seed laser oscillator producing an output comprising a laser output light beam of pulses which may comprise a first gas discharge excimer or molecular fluorine laser chamber; a line narrowing module within a first oscillator cavity; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses; e.g., a MOPA or MOPO configured dual chamber seed laser/amplifying laser system, such as applicants' assignee's MOPA XLA-XXX model laser systems, and further comprising a coherence busting mechanism, of the kind(s) discussed herein, intermediate the seed laser oscillator and the amplifying gain medium stage. The amplification stage may comprise a laser oscillation cavity. The amplification stage comprising an optical path defining a fixed number of passes through the amplifying gain medium.

The laser system, e.g., for lithography use may operate within a matrix of MO operating conditions. The ring power amplification stage may amplify the output of the broad band seed laser oscillator cavity to a pulse energy of over 1 mJ, or 2 mJ, or 5 mJ, or 10 mJ or 15 mJ or 20 mJ or greater. The laser system may operating at an output pulse repetition rate of up to 12 kHz, or ≥2 and ≤8 kHz or ≥4 and ≤6 kHz. The system may comprise the seed laser oscillator containing a lasing gas comprising a mixture of fluorine and other gases and operating at ≤500 kPa or ≤400 kPa, or ≤350 kPa of total lasing gas pressure, or ≤300 kPa of total lasing gas pressure, or ≤250 kPa of total lasing gas pressure, or ≤200 kPa of total lasing gas pressure. The system may comprise ≤50 kPa or ≤40 kPa, or ≤35 kPa of fluorine partial pressure, or ≤30 kPa of fluorine partial pressure, ≤25 kPa of fluorine partial pressure, or ≤20 kPa of fluorine partial pressure.

Figure 32:
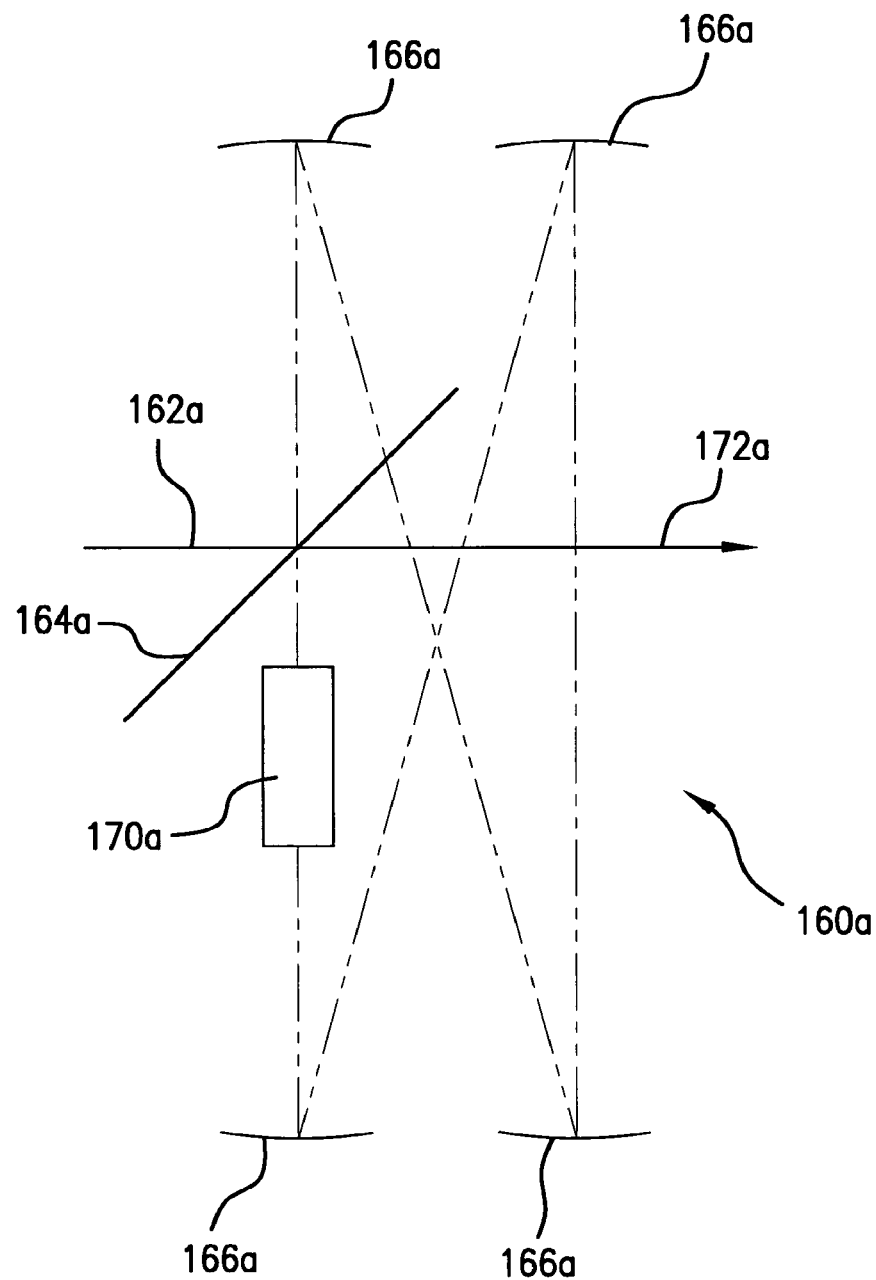
FIG. 32 shows schematically a coherence buster according to aspects of am embodiment of the disclosed subject matter.

Turning now to FIG. 32 there is shown in schematic form a pulse stretcher 160a, which can be, e.g., a version of the optical pulse stretcher ("OPuS") sold with applicants' assignee's laser systems however with, e.g., much shortened delay paths not designed for pulse stretching per se, i.e., enough stretching for significant pulse elongation in the spatial and temporal domains, e.g., increasing the $T_{is}$ by 4× or more as in applicants' assignee's currently sold OPuS pulse stretchers. However, the same folding/inverse imaging effects on the beam for coherency busting purposes, or also as explained in regard to the beam mixer of FIG. 31, can be achieved.

The coherency buster 160a may have an input beam 162a incident on a beam splitter 164a, e.g., a partially reflective mirror 164a for the pertinent wavelength. Part of the beam 162a that is reflected into the delay path comprised of a plurality of mirrors, e.g., confocal mirrors 166a, is imaged back onto the partially reflective mirror 164a, e.g., once or multiple times. It will be understood that such optical coherence busters may have more than four mirrors, e.g., six mirrors, but are illustrated schematically with only four for convenience and clarity. The delay path may be much shorter than the seven to ten meters or so of, e.g., a 4×OPus, such that the second and third passes through the delay path substantially overlap the pulses entering and leaving the coherency buster 160a, but do not even substantially stretch the pulses. As will be understood by those skilled in the art, the delay path may include flat mirrors. Also, the number of curved imaging mirrors may be odd, in which event negative one imaging may occur, or even, in which plus one imaging may occur.

Figure 33:
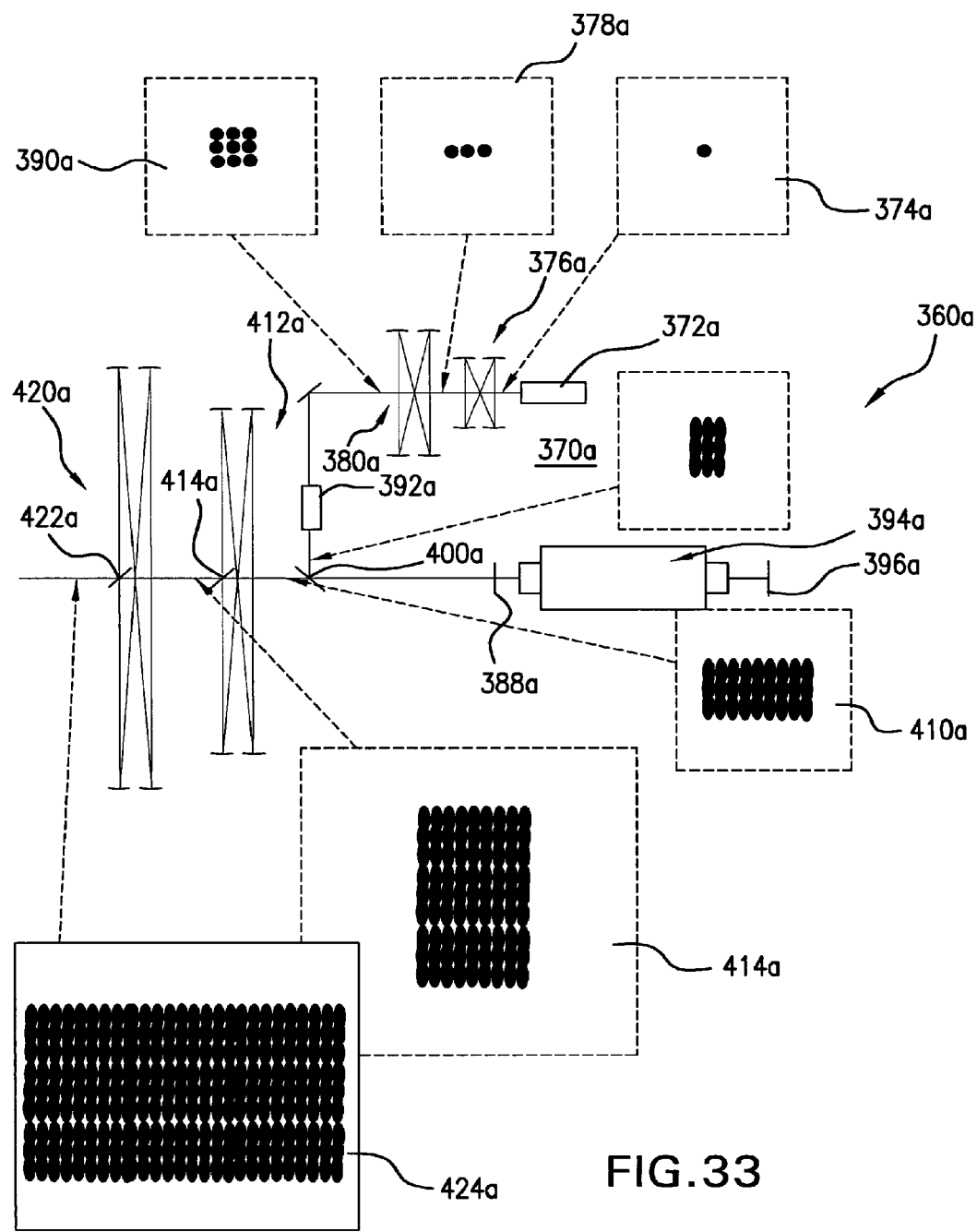
FIG. 33 shows partly schematically and partly in block diagram for an example of elements of a coherence busting scheme and the results of aspects of the scheme according to aspects of an embodiment of the disclosed subject matter.

FIG. 33 shows partly schematically and partly in block diagram form an example of a coherence busting scheme 360a and the results of aspects of the scheme according to aspects of an embodiment of the disclosed subject matter, e.g., in terms of beam divergence and thus coherence busting. The illustrated system may incorporate, e.g., an oscillator/amplifier laser 370a, e.g., including a solid state or excimer seed laser 372a, and an oscillator amplifier laser 394a, or other power amplification stage, e.g., a ring power amplification stage. The amplifier gain medium 394a may be, e.g., an excimer laser arranged in a power oscillator configuration, e.g., with a fully reflective rear cavity mirror 396a and an input/output coupler, e.g., 398a. It will be understood that other seed laser/amplification stage arrangements, some of which are discussed herein, may also be used with the schematically illustrated coherence busting scheme shown by way of example in FIG. 33.

At the output of the seed laser 372a is illustrated a representation of the seed laser output laser light pulse beam divergence 374a containing a single dot indicative of relatively high coherency. The output of the seed laser 372a may be passed through one or more coherency busters, e.g., 376a, 378a, e.g., as shown by example in FIG. 32, or 1050 illustrated in FIG. 31 (discussed in more detail in the co-pending application U.S. patent application Ser. No. 10/881,533, filed on Jun. 29,2004) or other optical elements such as disclosed in US20050286599, referenced above, or one or more mini-OPuS coherence busting mechanisms discussed above, or combinations thereof. A possible embodiment according to aspects of an embodiment of the disclosed subject matter may be the use of a confocal OPuS, e.g., one like that disclosed in the co-pending U.S. patent application Ser. No. 10/847,799, entitled LASER OUTPUT LIGHT PULSE STRETCHER, filed on May 18, 2004, referenced above, with, e.g., two confocal spherical mirrors and four passes of delay path, i.e., from the beam splitter to mirror No. 1 to mirror No. 2 back to mirror No. 1 and back to mirror No. 2 and then returned to the beam splitter, passing through, e.g., an offset correction optic, e.g., as discussed in the co-pending U.S. patent application Ser. No. 11/394,512, entitled CONFOCAL PULSE STRETCHER, filed on Mar. 31, 2006,referenced above. This version of a so-called "mini-OpuS" may comprise two pulse stretchers in series, e.g., with a delay path offset selected to slightly shift the high frequency peaks in the temporal pulse intensity curve of the output of the master oscillator. This may be achieved by, e.g., a delay offset of about 2 ns for a first 1 ns and then three ns delay line mini-OPuS pair or about a 1 ns delay between a 3 ns and 4 ns delay line mini-OPuS pair in series or for a 4 ns and 5 ns delay line mini-OPus in series. It will be understood that the pulse itself will not be stretched significantly, e.g., to come even close to overlap other pulses, but rather will essentially not be stretched at all, since the delay path is so much shorter than the ten or so meters of delay path in the normal pulse stretching OPuSs currently sold by applicants' assignee.

Applicants have noted that producing a 5 ns or greater pulse length from a solid state seed pulse could challenge the present state of the art. However, one can use a mini-OPuS to increase the pulse duration from the seed prior to injection into the amplification stage and this has suggested to applicants also that one could do this anyway even if one could produce a longer pulse from the seed. With a shorter pulse from the seed and the use 1, 2 or more mini-OPuSs to increase the pulse length, the mini-OPuSs being slightly misaligned would create a broadened divergence prior to injection into the amplification stage. With such a multi-seed mini-OPuS scheme, applicants contemplate that there may not be a need for any kind of active beam steering within a single pulse, especially for non-solid state seed laser systems. One may still wish to employ active steering for even more smearing of the divergence, where needed, e.g., in solid state seed laser systems, but it is not contemplated to be necessary in all cases and the seed laser mini-OPuSs need approximately only a 1 foot total path delay, making the building of them right onto the seed laser optical table very straight forward. The stack up of mini-OPuSs and regular OPuSs could look like FIG. 33, which also shows a cartoon of the divergence as it evolves through the optical train. Assuming a 2.7 multiplication from each mini-OPuS 376a, 380a and a 2.7 multiplication from a misaligned amplifier stage cavity 143 separate "pulses" can be produced. Previous measurements with the misaligned amplification stage has indicated to applicants that there are created 6 independent pulses, so the total might be as high as 317. An EO deflector 392a can easily smear through a pointing space big enough to create at least 4 independent pulses, giving a grand potential total of 1271 pulses. Assuming an initial speckle contrast of 100%, one could thereby get a speckle contrast of 2.8% after all of this bouncing around.

The preferred embodiment uses a first delay something more than 1 ns due to increased alignment problems with the shorter delay and increased aberrations in the pulse as stretched in a shorter delay path. Each of the delay paths is, however longer than the coherence length of the pulse and the second delay path is longer than the first, to achieve coherence busting effects such as those discussed herein.

The mini-OPuS pulse stretchers may be selected and arranged to, e.g., fold the beam on itself or fan it out in first one axis, e.g., in a first mini-OPus 376a, resulting in the divergence representation 378a and then in another orthogonally related axis, e.g., in a second mini-OPuS 380a, resulting, e.g., in the divergence representation 390a. A pulse steerer 392a, e.g., and electro-optical ("E-O") element 392a may sweep (paint) the seed beam into the input/output coupler 400a of the amplifier portion 394a resulting in the blurring in one axis as shown in the pulse divergence representation out of the power oscillator 410a (and also the divergence representation 410 into the amplification gain stage 394a). The "regular" or "standard" OPuS, e.g., a 4×$T_{is}$ OPuS (roughly ten meters of delay path), which may contain, e.g., 2 delay paths 412a, 420a initiated by a first beam splitter 414a and a second beam splitter 422a, similarly may be arranged to fold the beam on itself in first one axis and then a second resulting, e.g., in the pulse divergence representations of, respectively, 414a and 424a. The final divergence representation 424a shows schematically that the divergence of the seed beam has been greatly increased, i.e., the beam has been smeared in its passage from the seed laser 372a to the amplifier gain medium 394a and as amplified in the amplifier gain medium 394a and subsequently further having its coherency busted in the 4× regular OPuS 412a, 420a. this increased divergence results in reduced coherence.

It will be understood by those skilled in the art that depending on the initial coherency of the pulse, e.g., out of the seed laser, e.g., almost completely coherent in the case of solid state seed lasers to very little coherency, but still coherency that is desired to be even further reduced, e.g., with an excimer seed laser the type, number and arrangement of coherency busting elements may vary. For example, it may only be necessary to do active coherency busting, e.g., with one form or another of pulse steering/painting, for solid state seed lasers, and this may in some cases for some applications prove to need only a ramp or only AC pulse deflection, i.e., in one axis or the other, or may prove to need both DC and AC pulse painting (Hybrid painting) along with OPuS effect coherency busting both between the MO and amplifier gain medium, e.g., PO or PA or other amplification gain medium stage, e.g., a ring power amplification stage, and also may need to employ the effect of the regular OPuS pulse stretcher(s) on the output of the amplifier gain medium. With an excimer gas discharge laser MO, with relatively much lower coherency than from a solid state seed laser, only passive coherency busting, e.g., between the MO and gain amplifier medium may be needed, e.g., with one or both of the mini-OPuSs 376, 380 or other passive optical elements as noted above between the MO and amplifier gain medium.

One may still need, however, to do beam steering also, e.g., with an active beam steering mechanism, such as discussed above, for even more smearing of the pulse (more divergence), that may be less essential and need a smaller sweeping angle. Such a seed laser mini-OPuS is believed to need approximately only a 1 foot total path delay each and can also be conveniently built onto the seed laser optical table as is currently the practice for relay optics in applicants' assignee's XLA series laser systems.

Figure 34:
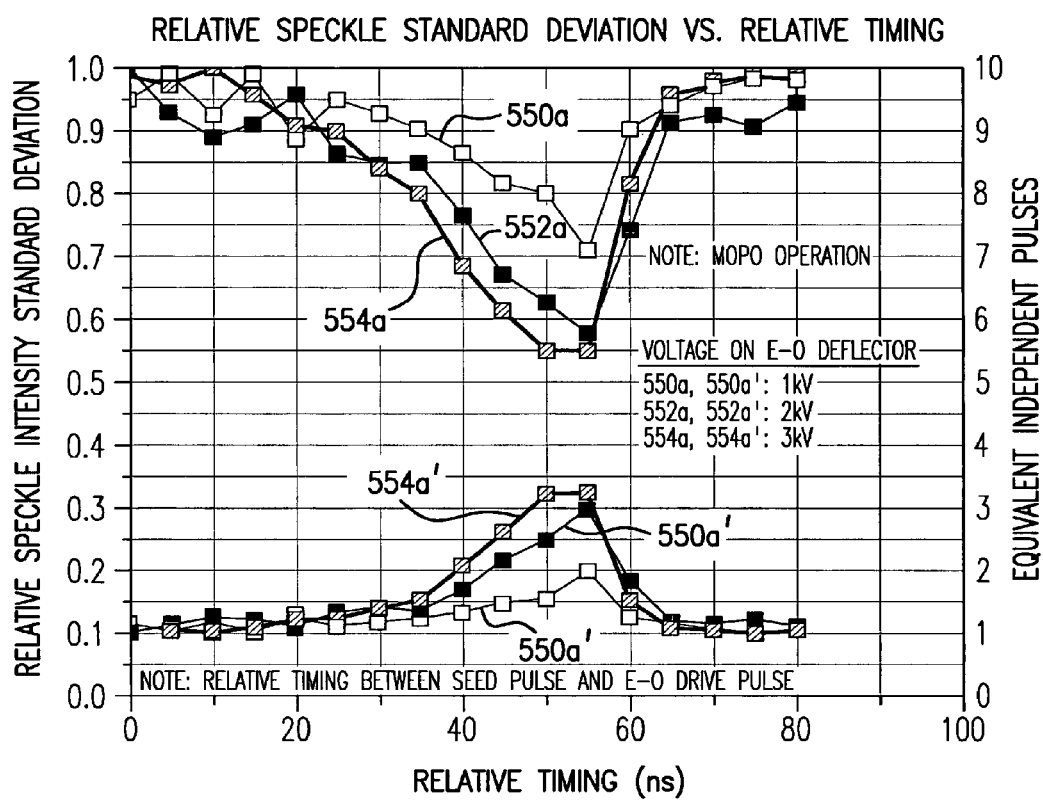
FIG. 34 illustrates relative speckle intensity for a various E-O deflector voltages related to relative timing between the E-O and the pulse generation in the seed laser according to aspects of an embodiment of the disclosed subject matter.
Figure 35:
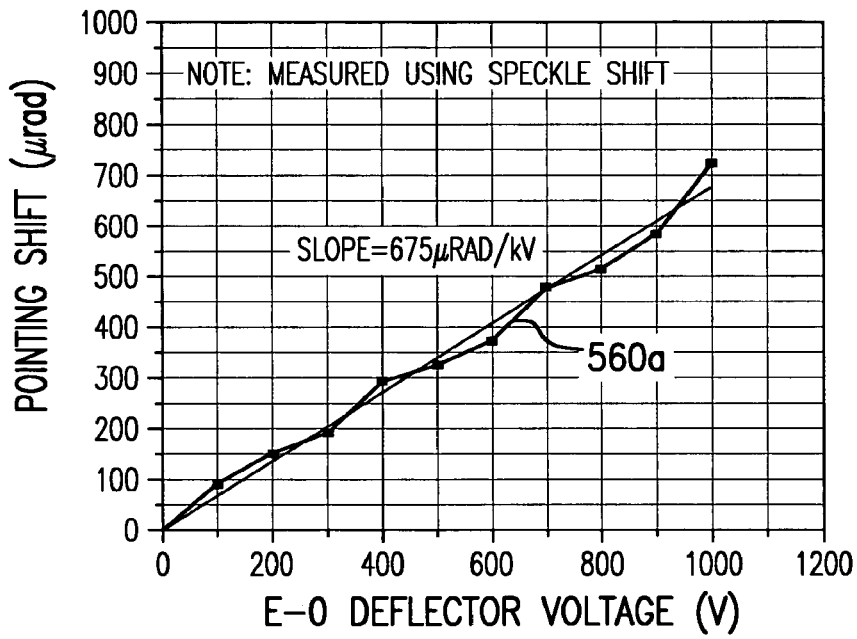
FIG. 35 illustrates pointing shift relative to E-O voltage according to aspects of an embodiment of the disclosed subject matter.

FIG. 34 illustrates an exemplary relative speckle intensity for a 1 kV E-O deflector voltage v. relative timing The relative standard deviation curve 550a is for 1 kV and the equivalent pulse curve is curve 550a'. A 2 kV E-O deflector voltage curve 552a and equivalent pulse curve 552a' are also shown as is a 3 kV E-O deflector voltage curve 554a and equivalent pulse curve 554a'. An example of a point shift vs. E-O voltage curve 560a is shown by way of example in FIG. 35. A plot of pointing shift (inferred by applicants from speckle shift measurements) v. E-O cell applied voltage is shown in FIG. 35. According to aspects of an embodiment of the disclosed subject matter applicants propose to sweep the pointing of the seed laser within a single pulse in order to reduce the speckle contrast within. This may be done, e.g., with electro optical elements, e.g., elements 1912 and 1914 shown illustratively in the schematic and partly block diagram illustration of aspects of an embodiment of the disclosed subject matter found in FIG. 66. Using vertical expansion prior to input of a seed laser pulse into an excimer power oscillator, e.g., a XeF chamber, placed as close to an input coupler, e.g., a beam splitter, and with a clear aperture of the E-O deflector at around 3.2 mm in diameter, the deflector may have to be upstream of the vertical expansion (not shown in FIG. 66). To minimize any translation in the oscillator cavity, e.g., the XeF cavity 1930, e.g., associated with the angular tilt from the E-O deflector, it may be desirable to place the E-O deflector as close to the amplifier cavity as possible.

Figure 36:
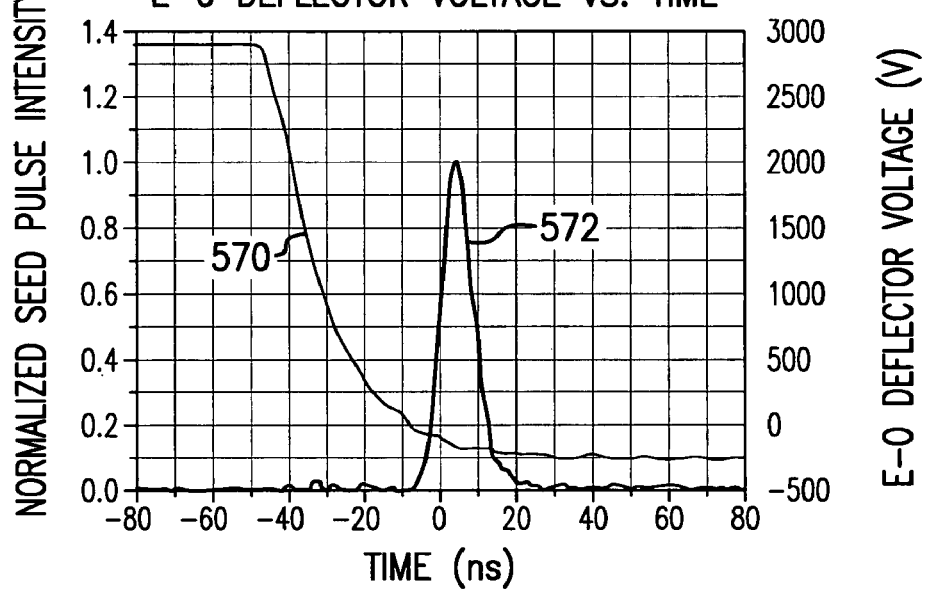
FIG. 36 illustrates an example of the timing of an E-O deflection voltage and a seed laser pulse spectrum according to aspects of an embodiment of the disclosed subject matter.
Figure 45:
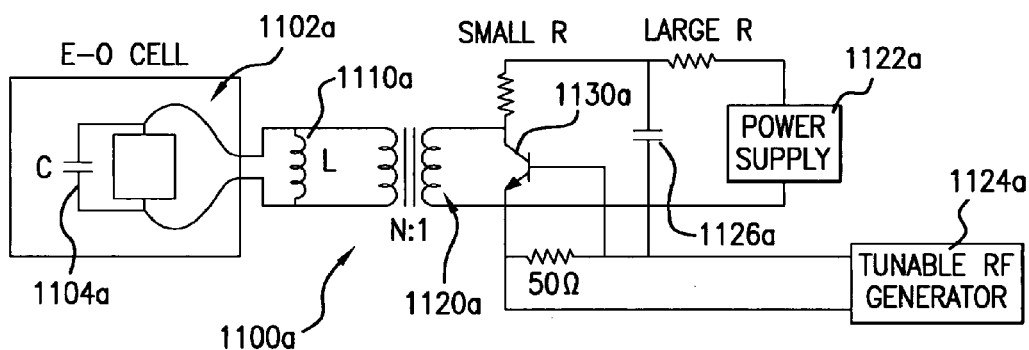
FIG. 45 illustrates a E-O cell drive circuit according to aspects of an embodiment of the disclosed subject matter.

According to aspects of an embodiment of the disclosed subject matter it is contemplated to apply a time changing voltage on a timescale similar to the seed pulse duration, e.g., by applying a DC voltage level until triggered, at which point the high voltage may be shorted to ground, e.g., via a stack of fast MOSFETS, e.g., illustrated schematically in FIG. 45 as a single transistor 1130a. A plot of the applied voltage and the seed laser pulse shape are shown in FIG. 36. Placing a series resister between the E-O cell terminal and voltage supply can be used to control, e.g., the voltage slope applied to the E-O cell. The 50 pF capacitance of the E-O cell in series with, e.g., a 200Ω resister gives an initial slope of about $10^{11}$ λrad's. The voltage across the E-O cell drops, e.g., as seen in FIG. 36 from the DC level to nearly zero in a time similar to the seed pulse duration. By changing the relative timing between the E-O cell pulser and the seed laser one can, e.g., change the amount of pointing sweep that occurs during the seed pulse. In addition, one can change the value of the initial DC voltage to effect a greater or lesser pointing sweep during the seed pulse. Applicants have tested this fast pointing capability, e.g., with the seed laser only and reflecting from an OC only, therefore, with no OPuS effect from the multiple reflections from the OC and Rmax and no effects due to MOPO operation. Without optimizing for relative timing between the E-O cell and the seed pulse, applicants captured speckle patterns for a range of timing between the two. Applicants applied three difference levels of DC voltage to the E-O cell in order to change the maximum available pointing slope. The results showed a minimum speckle intensity normalized standard deviation at about 57 ns relative timing as seen, e.g., in FIG. 34. Without any angular shift during the seed pulse, at both small and large relative timing values, below and above 57 ns the speckle contrast is high. This correlates with values found by applicants during static testing. When, e.g., the relative timing places the E-O Cell voltage slope coincident with the seed pulse, the speckle pattern of a single pulse is smeared in the vertical direction, in a dramatic and satisfactory way.

One can normalize these contrast values to the maximum value in order to evaluate the percentage reduction in contrast, e.g., brought about by the dynamic pointing shift. At the optimum relative timing point the speckle contrast was found to be reduced to about 40% of its peak. Using the $1/\sqrt{N}$ assumption for equivalent number of independent pulses the data can be used to derive the number of pulses required to achieve this level of speckle contrast reduction. At the optimum relative timing, and with 3 kV applied to the E-O cell, the contrast reduction was found to be equivalent to 6 pulses. Even higher voltage levels (and thus even larger pointing shift during a single pulse) could improve this result. Applicants performed similar measurements with the seed laser pulse entering the MOPO amplification stage cavity, but no discharges between the AMPLIFICATION STAGE electrodes and noted that reflections from the OC and the Rmax in the XeF cavity, from the OPuS effect, beam spreading alone, indicated that the maximum speckle contrast was reduced by the amount predicted by the OPuS effect (N=1.56 with a 20% OC, giving $1/\sqrt{n}=0.80$. Thus 70% contrast becomes 56%). The effect of smearing, even though the initial speckle contrast is lower, appears not to change when adding the secondary reflections from the full XeF cavity. The equivalent pulse for speckle reduction is still about 6.

Applicants performed similar measurements with AMPLIFICATION STAGE cavity electrodes discharging and thus implicating the effects of the amplification within the AMPLIFICATION STAGE cavity, which indicated as shown in FIG. 34 the decrease in the impact on speckle reduction through seed beam sweeping. With such a configuration, the effect was found to be just over half of the equivalent number of pulses produced, i.e., about 3, when operating as a MOPO, also found was a rather large reduction in peak speckle contrast, with no smearing. Previous measurements of MOPO operation showed a reduction equivalent to about 6 pulses. These results show a reduction equivalent to about 8 pulses. Applicants suspect that the AMPLIFICATION STAGE cavity may discriminate against off-axis ray angles, e.g., in a flat-flat cavity, and thus the spray of angles sent into the cavity may not all be equally amplified (this could be corrected, e.g., with a true stable cavity, e.g., employing a curved OC and a curved Rmax). Another explanation may be that not all of the seed pulse takes part in controlling the AMPLIFICATION STAGE characteristics. Maybe only, e.g., the first 5 ns of the seed pulse's 10-15 ns pulse duration controls the AMPLIFICATION STAGE and thus the E-O sweep is not fast enough to occur within that smaller window. This may also be corrected, e.g., by using a smaller resister and a shorter sweep.

According to aspects of an embodiment of the disclosed subject matter applicants propose to use a 6 mirror coherency busting mechanism (for convenience herein optical pulse delay paths are indicated schematically as having four mirrors per delay path) which has been developed by applicants' assignee for additional path delay inside either or both of the $1^{st}$ or $2^{nd}$ pulse stretchers in the OPuS used with applicants' assignee's XLA model multi-chamber laser systems. Such a delay path can, e.g., produce −1 imaging for each sub-pulse. This is illustrated schematically and in cartoon fashion, e.g., in FIG. 37 wherein is illustrated the summation of these "flipped" sub-pulses. The flipped sub-pulses shown, e.g., in FIG. 8 can be used, e.g., for improved profile uniformity and symmetry. A 6 mirror design can convert pointing shifts into a divergence increase which may, e.g., be beneficial in a ring arrangement for ASE reduction. The standard 4 mirror design does not. It will be understood that the delay path for this coherency busting purpose need not be as long as the actual OPuS used for pulse stretching to get a much increased pulse $T_{is}$, e.g., for photolithography uses. Rather the coherency busting mechanism, a so-called "mini-OPuS", just needs to fold the pulses a certain number of times. This is illustrated by the pulse 580a, with the corner (pre-flip) designated 582a and the pulses 584a, 586a, 588a. In addition, due to the almost inevitable misalignment of mirrors in the delay path, a "hall of mirrors" or so-called OPuS effect, may also reduce the coherency in the seed laser pulse, and, e.g., so long as the delay path exceeds the spatial coherency length of the beam further coherency busing occurs in the delay path. In this regard, a four mirror mini-OPuS, e.g., with confocal spherical mirrors for ease of alignment, may serve as a satisfactory coherency buster, even without beam flipping in both axis.

According to aspects of an embodiment of the disclosed subject matter it may be necessary to combine two separate laser beams at various points within a system according to aspects of an embodiment of the disclosed subject matter. If only half of the entrance to a 6 mirror pulse stretcher is illuminated, the sub-pulses flip between top and bottom as shown, e.g., in FIG. 8. The summation of these "flipped" sub-pulses can lead to a filled in, full size profile, e.g., as illustrated in the pulse flipping simulation shown in FIG. 41, with the curve 562*a* showing the pulse before entering the delay path and curve 564*a* (black) after one delay path and 566*a* (red) after a second delay path. Laser divergence may then be used to fill in the center portion 568*a*, e.g., after some propagation, e.g., over about 1 m or so.

Use of a solid state laser source for lithography has been proposed in the past and not pursued for two reasons. Solid state lasers are not considered capable of the high average power required for lithography and a solid state laser produces single mode output which is highly (perfectly) coherent. According to aspects of an embodiment of the disclosed subject matter applicants propose to address the low average power problem with, e.g., a hybrid solid state seed/excimer amplifier combination. The high coherence properties of the solid state seed can be addressed in a number of ways according to aspects of embodiments of the disclosed subject matter, e.g., by creating sub-pulses, e.g., that are separated in time longer than the coherence length, or by, e.g., changing the seed laser pointing, e.g., over very short time scales, e.g., within a single laser pulse, or a combination of both. Coherency busting has been found by applicants to be of benefit in dual chamber gas discharge (e.g. excimer) seed/gas discharge (e.g., excimer) amplifier portion lasers as well.

Figure 38:
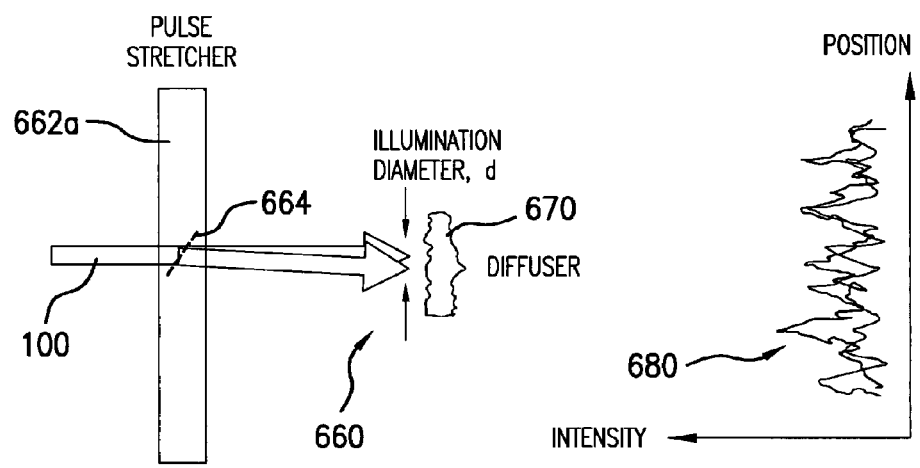
FIG. 38 illustrates the effect of beam sweeping/painting on coherency according to aspects of an embodiment of the disclosed subject matter.

De-phasing of a speckle pattern can be seen from a diffuser 670*a* to occur with a $\lambda/2d$ where d is the illumination width for a slot aperture and diameter for a circular aperture, e.g., as illustrated schematically and in cartoon fashion in FIG. 38. Incoherence of a speckle pattern can also be seen to occur from each sub-pulse produced by a pulse stretcher, provided that the pulse stretcher delays each pulse by greater than the temporal length, which can, e.g., be further exploited by, e.g., intentionally misaligning each pulse stretcher, e.g., a mirror(s) in the pulse stretcher, by a very slight amount. In point of fact, applicants' employer has discovered by testing that it is very hard to precisely align the mirrors in, e.g., an $4 \times T_{is}$ OPuS type of pulse stretcher, and they are slightly out of alignment almost all the time, without having to intentionally misalign them. This amount of "ordinary" misalignment has been found by applicants employer to be an amount sufficient to achieve a desired level of speckle reduction and is illustrated schematically in FIG. 40, as discussed elsewhere.

The effective number of equivalent independent laser pulses can be seen to be equal to the time integral squared ("$T_{is}$") magnification of the each pulse stretcher. Each OPUS pulse stretcher of the kind noted above may have a multiplication of around ~2.4×. With, e.g., three stages of pulse stretching, the number of independent sub-pulses will be $(2.4)^3 = 13.8$. Since speckle contrast scales with the number of independent sub-pulses, N, as $1/\sqrt{N}$, pulse stretchers can provide an output speckle contrast of $1/\sqrt{13.8} = 26.9\%$ with an input speckle contrast of 100%. Since this may still be too high a speckle contrast, according to aspects of an embodiment of the disclosed subject matter a mechanism(s) may be provided to reduce the speckle contrast into or out of the pulse stretcher(s). The same can be said for the so-called mini-OPuSs discussed elsewhere.

Electro-optics or acousto-optics can be used for beam steering, e.g., steering a seed laser light pulse beam within a single pulse in the beam. Utilization of such, e.g., at the output of the seed laser, can result in, e.g., according to aspects of an embodiment of the disclosed subject matter, the electro-optic material(s) only needing to be subject to a low average power seed laser beam. By, e.g., randomly and/or continuously changing the beam steering, e.g., within a single laser pulse, the angular acceptance of the power amplification stage can be "painted" or filled in for each laser pulse. As a result, a main pulse can have a divergence set, e.g., by the MO/power amplification stage optical configuration and not, e.g., by the seed laser characteristics. A greatly reduced coherence for the laser system output laser light pulse can be the result.

According to aspects of an embodiment of the disclosed subject matter an injection controlled amplifier laser system, e.g., with a plane cavity and flat rear mirror, may have suitable energy stability, e.g., for seed pulse inject energies in the range of 0.0085 to 0.99 mJ. This energy of the beam may be, e.g., incident on the rear mirror of, e.g., a power amplification stage, which may form the input coupler from the seed laser. This reflector may have, e.g., about a 90% reflection and about 8% transmission. Therefore, the seeding energy entering the amplification stage cavity itself may be, e.g., about an order of magnitude smaller than what is incident onto the back reflector. With a ring cavity, especially with a partially reflecting seed injection mechanism according to aspects of an embodiment of the disclosed subject matter, discussed elsewhere herein, e.g., the input seed energy may be much less wasted, e.g., admitting around 80% of the seed laser light. An Rmax and OC can be in an $F_2$ containing environment, and thus more robust, though, e.g., if polarization coupling is used, coupling efficiency may still be less than optimum for certain applications. A suitable architecture, e.g., in a MOPA configuration may be a 2-channel ("tic-toc") solid state seed laser, e.g., a $3^{rd}$ harmonic Nd:YLF MO or Nd:YAG system (tuned, e.g., to 351 nm) along with a pair of two 3-pass XeF PA modules. Such a system in a MOPO, e.g., a master oscillator/power amplification stage (such as a ring power oscillator amplification stage) configuration is also considered as an effective alternative. Such a two channel MOPO approach may be similar to the MOPA configuration, i.e., with two seeded power oscillators. Various coupling techniques could be used, e.g., MO coupling using a polarization technique or a seed inject mechanism. Efficiency v. $E_{mo}$ for differing PO/PA configurations has been found to be better for a MOPO or a three pass MOPA, though four pass MOPAs were not tested. Exemplary pulse width (FWHM) has been found to be for an MOPO about 17.3 ns, for a MOPA, single pass, about 13.9 ns and for a MOPA triple pass about 12.7 ns.

Applicants have examined speckle patters for decorrelation with angular shift, e.g., in a MOPO output beam, e.g., with a Nd-YLF seed laser and a XeF power oscillator (e.g., a flat-flat polarization coupled arrangement). With the relative timing between the XeF discharge and the seed laser pulse adjusted and angular and spatial adjustment also made for maximum suppression of the weak line (353) produced by the XeF gain.

Figure 39:
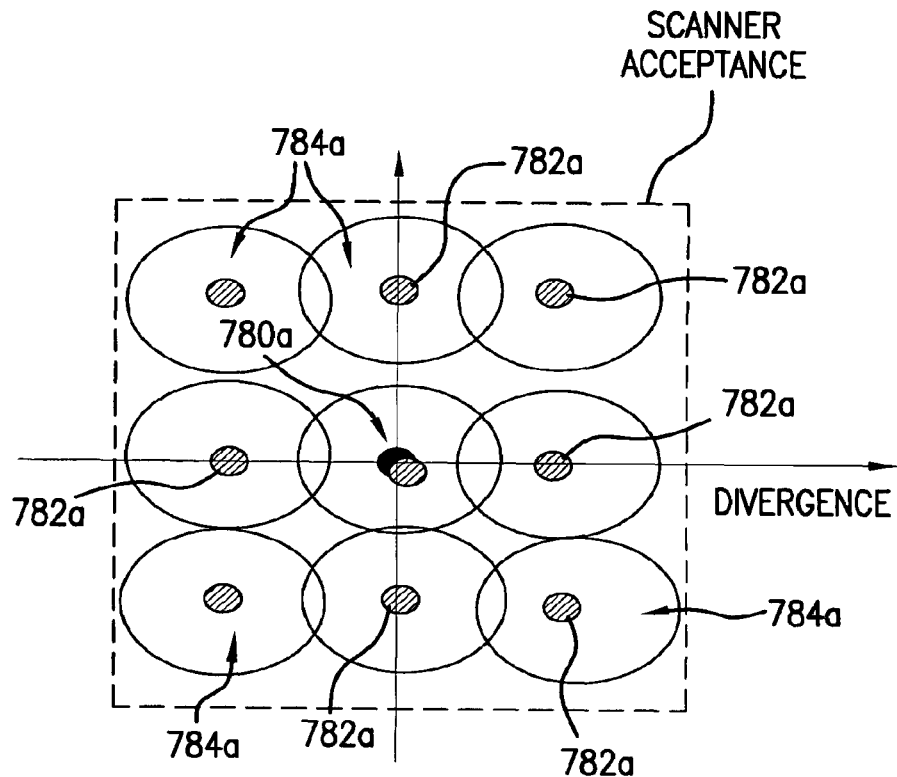
FIG. 39 shows schematically and in cartoon fashion the effects of multiple coherence busting schemes.

FIG. 39 illustrates schematically the results of a coherency busting scheme on an output laser pulse, e.g., in relation to a scanner angular acceptance window, e.g., introducing horizontal and vertical (as illustrated in the plane of the page drawing of FIG. 39) directions. The dot 780a illustrated schematically and by way of example an initial seed laser output pulse divergence profile 780a. The pattern of pulses 782a illustrate a pattern of sub-pulse divergence profiles 782a after beam folding in a perfectly aligned beam delay path, or through a misaligned beam delay path or both, or a combination thereof, and the circles 784a around each represent the effect on the divergence profile of electro-optical smearing.

Figure 40:
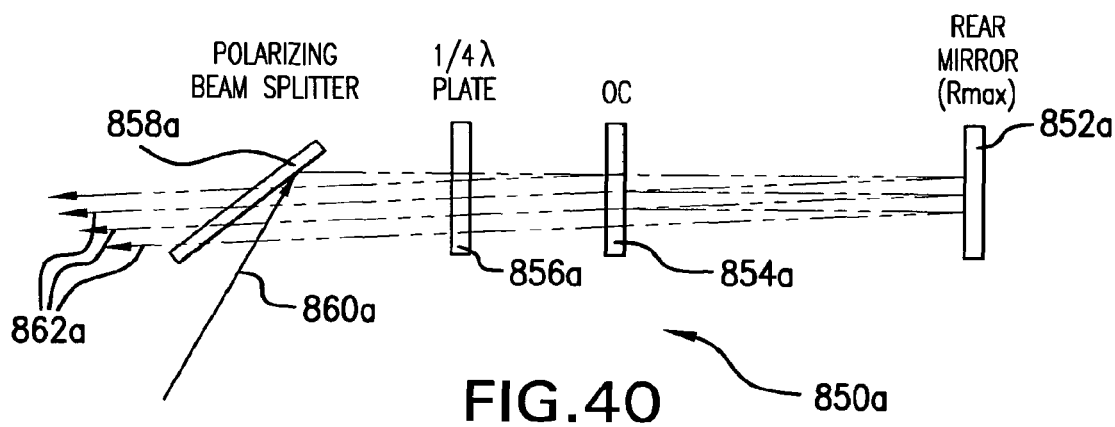
FIG. 40 illustrates schematically a coherency reduction scheme according to aspects of an embodiment of the disclosed subject matter.

Turning now to FIG. 40 there is shown a schematic representation of the effects of coherence busting according to aspects of an embodiment of the disclosed subject matter. Utilizing an imaging delay path, e.g., a pulse stretcher, e.g., a so-called optical pulse stretcher ("OPuS"), e.g., a 4×$T_{is}$ six mirror OPuS sold with the above noted applicants' assignee's laser systems, and illustrated in United States Patents and co-pending applications noted above, or a modified version thereof with a shorter delay path used, e.g., for folding the beam on itself and/or for delay exceeding the coherence length as discussed above, the so-called mini-OPuS, one can achieve a degree of coherence busting, e.g., between the MO and amplifier gain medium, e.g., a PA or a PO or a ring power amplification stage. Other forms of coherence busting e.g., as illustrated in FIG. 31 could be used alone or in combination with such a "mini-OPuS," e.g., as illustrated in FIG. 33 and elsewhere herein.

Figure 42:
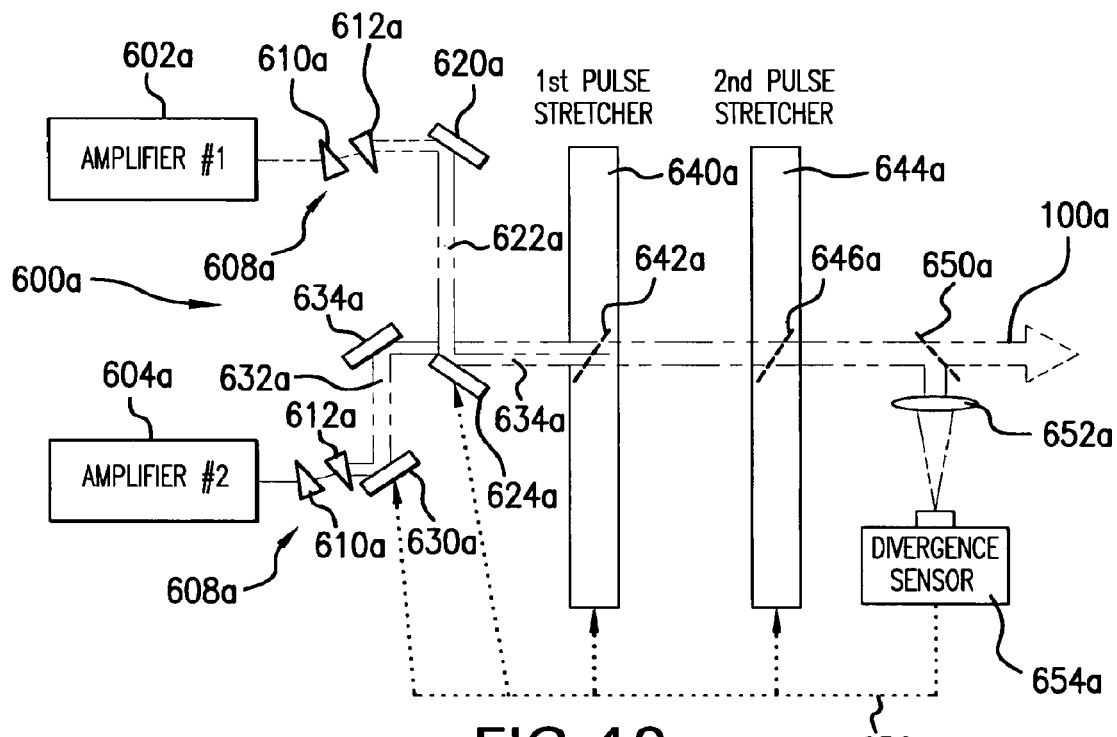
FIG. 42 illustrates schematically and in partly block diagram form a beam combiner with divergence control according to aspects of an embodiment of the disclosed subject matter.

According to aspects of an embodiment of the disclosed subject matter, the pointing/divergence sensitivity of a pulse stretcher, e.g., a 4 mirror 6 mirror pulse stretcher, e.g., a regular OPuS such as a 4×$T_{is}$ OPuS, or a so-called mini-OPuS, or the delay path discussed in more detail in regard to FIG. 31, can be put to advantage, e.g., by adding active mirror control with feedback from, e.g., a pointing/divergence sensor, illustrated, e.g., in FIGS. 13, 14 and 42. Such advantages include creating, e.g., a hall of mirrors effect whereby, e.g., the laser output light pulse beam being smoothed in the delay path and, further, actually becomes something like a plurality of beams of very slightly different pointing and thus angles of incidence on the various mirrors of the pulse stretcher. Applicants assignee has observed this in pulse stretchers where it is very difficult to perfectly align the mirrors, e.g., of the currently used 4×$T_{is}$ OPuS pulse stretcher, thus creating the hall of mirrors effect that reduces the coherence of the laser output light pulse beam exiting the pulse stretcher. Thus the beam 860a forms a plurality of separate beams 82a. In FIG. 40 this is also illustrated schematically and as a result of a flat-flat cavity 850a with slightly misaligned mirrors forming the rear of the cavity 852a and an output coupler 854a, but the same effect has been observed in an OPuS by applicants employer with the coherence busting effect noted above. The cavity illustrated in FIG. 40 may also have a polarizing input coupler 858a and a quarter wave plate 856a.

FIG. 40 illustrates a reduction in coherency, e.g., when using both the reflectivity of an OC and an Rmax, e.g., in a flat-flat cavity with, e.g., a polarizing input coupling from a seed laser source of seed laser pulses. The angles have been exaggerated for clarity of illustration. There are, e.g., multiple rays produced by a static fan out, i.e., "hall of mirrors" effect, e.g., created between the OC and the Rmax. The theoretical energy weighting of these rays, assuming no transmission losses through the cavity and perfect reflectivity is shown below.

| Ray Number | Fractional Energy | | Normalized Energy |
|---|---|---|---|
| 1 | 0.2 = | 0.200 | 0.3125 |
| 2 | 0.8 * 0.8 = | 0.640 | 1.000 |
| 3 | 0.8 * 0.2 * 0.8 = | 0.128 | 0.2000 |
| 4 | 0.8 * 0.2 * 0.2 * 0.8 = | 0.0256 | 0.0400 |
| 5 | 0.8 * 0.2 * 0.2 * 0.2 * 0.8 = | 0.00512 | 0.0080 |
| 6 | 0.8 * 0.2 * 0.2 * 0.2 * 0.2 * 0.8 = | 0.00102 | 0.0016 |

One may assume that each ray is incoherent from all others, e.g., where the path length between the OC and the Rmax is maintained to be longer than the temporal coherence length. Each ray may also be assumed, e.g., to be angled slightly different from all others since, e.g., perfect alignment is believed to be extremely difficult, especially in the vertical direction. Applicants believe that about 37 μrad of angle difference in the vertical direction is needed to create uncorrelated speckle. Summing the normalized energy weighting to give the equivalent number of independent pulses and taking the square root to give the reduction in standard deviation, the sum from the above is 1.56. The square root is 1.25 and thus the standard deviation when using both OC and Rmax reflections is predicted to be 0.551/1.25=0.440, which compares well with a value that applicants have measured, i.e., 0.427.

Static fan out, otherwise referred to herein as a hall of mirrors effect, believed to be essentially unavoidable with manual alignment, produces a single pulse speckle contrast with amplification in an amplification gain medium that is 2.50× smaller than the seed laser alone. This reduction is the equivalent of 6.3 uncorrelated sub-pulses. Some of this contrast reduction is due to the weak line content from the XeF power oscillator used for testing the effects of the oscillation amplification stage, but most is believed to be due to the static fan out effect. Likely, many of the sub-pulses created by the OPuS-like static fan out characteristics of the OC-Rmax (OC-rear cavity mirror) reflections are all amplified to nearly equal intensities and thus create more equivalent independent pulses than shown in the above table.

Tilt angle required to produce uncorrelated speckle patterns may be significant. The first big jump in equivalent pulses, from 1.0 to 1.55, is believed by applicants to be mostly due to the poor pulse-to-pulse repeatability of the speckle patterns when running as a MOPO. Even without changing the mirror tilt at all, two pulses are correlated no better than 30-35%. With seed only, this pulse-to-pulse correlation has been found to be about 85-90%. The long slow rise in equivalent pulse number does not even reach a value of 2.0 until about 400 μrad of mirror tilt as illustrated, e.g., in FIG. 46. This result could mean, e.g., there may be a need for a large angular sweep, of about ±500-1000 μrad, e.g., to create several uncorrelated speckle patterns in a single pulse.

Through experimentation relating to coherence applicants' employer has learned that, e.g., sub-pulses produced by a pulse stretcher are incoherent and lead to a different fringe pattern if their angles are slightly shifted. The pin hole fringe pattern shifts maximum to minimum when input angle is λ/2d.

A plot of pointing shift (inferred by applicants from speckle shift measurements) v. E-O cell applied voltage is shown in FIG. 35. According to aspects of an embodiment of the disclosed subject matter applicants propose to sweep the pointing of the seed laser within a single pulse in order to reduce the speckle contrast within. This may be done, e.g., with electro optical elements, e.g., element 392a illustrated schematically in FIG. 33. Using vertical expansion prior to input of a seed laser pulse into an excimer power oscillator, e.g., a XeF chamber, placed as close to an input coupler, e.g., a beam splitter, and with a clear aperture of the E-O deflector at around 3.2 mm in diameter, the deflector may have to be upstream of the vertical expansion (not shown in FIG. 33). To minimize any translation in the oscillator cavity, e.g., associated with the angular tilt from the E-O deflector, it may be desirable to place the E-O deflector as close to the amplifier cavity as possible.

Turning now to FIG. 42 there is shown schematically and partly in block diagram form a beam combiner system 600a, according to aspects of an embodiment of the disclosed subject matter. The beam combiner system 600a may include, e.g., a first amplifier gain medium portion 602a and a second amplifier gain medium portion 604a, each of which may be, e.g., a PA or PO or ring power amplification stage, as described elsewhere in the present application. The output of each of the amplifier portions 602a, 604a may pass through a beam expander 608a, which may include a prism 610a and a prism 612a, e.g., magnifying the beam by 4×. A turning mirror 620a may steer a first laser system output light pulse beam 622a from the amplifier 602a to a second turning mirror 624a which may steer the pulse beam 622a to form a pulse beam 632a onto a beam splitter for a first pulse stretcher 640a and thence to a beam splitter 646a for a second pulse stretcher 644a. A turning mirror 630a may steer a second laser system output light pulse beam 632a from the second amplifier 604a to a second turning mirror 634a, which may steer the beam 632a to form a beam 634a to be incident on the beam splitter 642a and thence the beam splitter 646a. The output of the first OPuS and second OPuS, which may be "mini-OPuSs" as discussed elsewhere in the present application, may pass through another beam splitter 650a, where, e.g., a small portion of the laser system output laser light pulse beam may be diverted, e.g., for metrology purposes, e.g., focused by a focusing lens 652a into a divergence detector 654a, which may be part of a control system (not shown) providing feedback control signals 656a, e.g., to the beam splitters 642a, 646a of the first and/or second OPuSs 640a, 644a or the turning mirrors for each of the beams 632a, 634a to increase or decrease divergence. Such coherency busting may be at the input to the amplifiers 602a, 604a, e.g., shown in FIG. 42 as opposed to the outputs.

The effective number of equivalent independent laser pulses can be seen to be equal to the $T_{is}$ magnification of the each pulse stretcher. Each OPUS pulse stretcher of the kind noted above may have a multiplication of around ~2.4×. With, e.g., three stages of pulse stretching, the number of independent sub-pulses will be $(2.4)^3=13.8$. Since speckle contrast scales with the number of independent sub-pulses, N, as $1/\sqrt{N}$, pulse stretchers can provide an output speckle contrast of $1/\sqrt{13.8}=26.9\%$ with an input speckle contrast of 100%. Since this may still be too high a speckle contrast, according to aspects of an embodiment of the disclosed subject matter a mechanism(s) may be provided to reduce the speckle contrast into or out of the pulse stretcher(s). The same can be said for the so-called mini-OPuSs discussed elsewhere.

Pulse trimming has been demonstrated, e.g., with the utilization of electro-optics, e.g., at 193 nm. Rather than polarization rotation, used in some other forms of pulse trimming, electro-optics can be used for beam steering, e.g., steering a seed laser light pulse beam within a single pulse in the beam. Utilization of such, e.g., at the output of the seed laser, can result in, e.g., according to aspects of an embodiment of the disclosed subject matter, the electro-optic material(s) only needing to be subject to a low average power seed laser beam. By, e.g., randomly and/or continuously changing the beam steering, e.g., within a single laser pulse, the angular acceptance of the power amplification stage can be "painted" or filled in for each laser pulse. As a result, a main pulse can have a divergence set, e.g., by the PO/power amplification stage optical configuration and not, e.g., by the seed laser characteristics. A greatly reduced coherence for the laser system output laser light pulse can be the result.

According to aspects of an embodiment of the disclosed subject matter an injection controlled amplifier laser system, e.g., with a plane cavity and flat rear mirror, may have suitable energy stability, e.g., for seed pulse inject energies in the range of 0.0085 to 0.99 mJ. This energy of the beam may be, e.g., incident on the rear mirror of, e.g., a power amplification stage, which may form the input coupler from the seed laser. This reflector may have, e.g., about a 90% reflection and about 10% transmission. Therefore, the seeding energy entering the amplification stage cavity itself may be, e.g., about an order of magnitude smaller than what is incident onto the back reflector. With a ring cavity, especially with a partially reflecting seed injection mechanism according to aspects of an embodiment of the disclosed subject matter, discussed elsewhere herein, e.g., the input seed energy may be much less wasted, e.g., about 80% is injected to the amplification stage. An Rmax and OC can be in an $F_2$ containing environment, and thus more robust, though, e.g., if polarization coupling is used, coupling efficiency may still be less than optimum for certain applications. A suitable architecture, e.g., in a MOPA configuration may be a 2-channel ("tic-toc") solid state seed laser, e.g., a $3^{rd}$ harmonic Nd:YLF MO or Nd:YAG system (tuned, e.g., to 351 nm) along with a pair of two 3-pass XeF PA modules. Such a system in a MOPO, e.g., a master oscillator/power amplification stage (such as a ring power oscillator amplification stage) configuration is also considered as an effective alternative. Such a two channel MOPO approach may be similar to the MOPA configuration, i.e., with two seeded power oscillators. Various coupling techniques could be used, e.g., MO coupling using a polarization technique or a seed inject mechanism. Efficiency v. $E_{mo}$ for differing PO/PA configurations has been found to be better for a MOPO or a three pass MOPA, though four pass MOPAs were not tested. Exemplary pulse width (FWHM) has been found to be for an MOPO about 17.3 ns, for a MOPA, single pass, about 13.9 ns and for a MOPA triple pass about 12.7 ns.

Applicants have examined speckle patterns for decorrelation with angular shift, e.g., in a MOPO output beam, e.g., with a Nd-YLF seed laser and a XeF power oscillator (e.g., a flat-flat polarization coupled arrangement). With the relative timing between the XeF discharge and the seed laser pulse adjusted and angular and spatial adjustment also made for maximum suppression of the weak line (353) produced by the XeF gain.

The maximum intensity of the seed pulse has been observed to occur during the initial, very low level, fluorescence of the amplification stage. This very low level fluorescence (and thus gain) is believed to be enhanced by this seed light, as observed in MOPO output. Adjustment of the timing of the seed earlier than or later than, e.g., about 20 or so ns before the amplification stage firing can, e.g., lead to an increase in weak line output.

According to aspects of an embodiment of the disclosed subject matter coherence busting may be accomplished by beam steering, e.g., with electro-optical elements, e.g., pointing of the seed beam during a single pulse using, e.g., a ConOptics E-O deflector assembly matched for the desired nominal center wavelength. Such E-O devices may be like those used in CD and DVD writers that use a doubled Ar-ion line near 351 nm having E-O deflectors used to modulate the beam. With a pointing coefficient of, e.g., about 0.6 μrad/volt and with a capacitance of 50 pF, even a full mrad of deflection requires only 1,700V. A drive circuit useful for pulse trimming, e.g., as illustrated schematically in FIG. 40 (discussed in more detail elsewhere in the present application) can be used, e.g., with a resister in series to produce a controlled sweep rate, e.g., during a single pulse. The seed pulse duration can be around 15 ns, so the rate of rise is well within the capabilities of such a driver, for reasonable pointing changes, such as up to a mRad. With a pumping diode current of around 30 A and 4 A to the oscillator pump diode, the seed laser output laser light pulse beam pulse energy was determined to be 1.2 mJ, sufficient for seeding a gas discharge laser, e.g., a XeF gas discharge laser.

Figure 74:
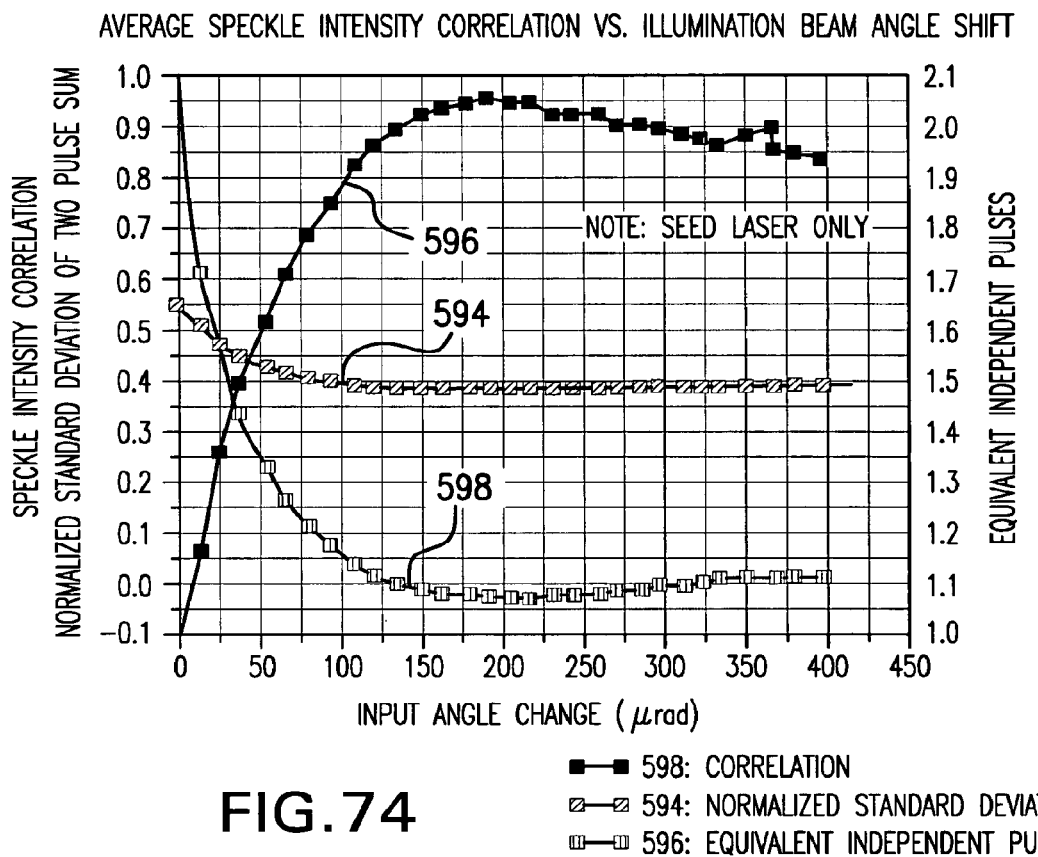
FIG. 74 illustrates exemplary coherency busting test results according to aspects of an embodiment of the disclosed subject matter.

A plot of speckle contrast (average speckle cross-correlation versus mirror tilt—input angle change) for a MOPO configuration is shown by way of example in FIG. 75. A similar plot for only a seed laser pulse passing through an amplifier gain medium in an oscillator configuration, but without excitation of the amplifier gain medium is illustrated by way of example as plot 590 in FIG. 46, which also shows by way of example a plot 592 of equivalent independent pulses. A similar plot is shown in FIG. 74, for the seed laser pulse only in the PO, with curve 596 being the equivalent independent pulses, curve 594 being the normalized standard deviation and curve 598 being the cross correlation. Similar to the MOPO case, it takes about 150-250 μrad of tilt to produce completely or essentially completely uncorrelated speckle patterns and about two equivalent independent pulses. But, as described above, the starting speckle contrast for no shift may be smaller than with the OC reflection only by a factor of about 1.25. Thus according to aspects of an embodiment of the disclosed subject matter applicants have discovered that, e.g., a MOPO single pulse speckle contrast may be significantly lower than a seed-only case, because, e.g., static fan out of the rays produced by the multiple OC-Rmax-OC-Rmax reflections, e.g., because each of these reflections exit at the illustrated separate slightly different angle, producing uncorrelated speckle patterns as shown by way of example in FIG. 75.

According to aspects of an embodiment of the present application applicants believe that this discovery may be utilized to greatly simplify the necessary coherence busting scheme, where a lesser degree of coherency busting may be found to be necessary. Instead of creating the electro-optic capability of, e.g., steering and/or more rapidly modulating ("hybrid painting," in the case of using both), e.g., the entire divergence space, e.g., in one or both axes (e.g., requiring high frequency devices), one can slightly misalign the seed to the PO, e.g., in one axis or the other or both, to exploit this spreading static ray out effect, the so-called hall of mirrors effect. It may then also be possible to use, e.g., only a linear sweep of pointing along one axis or the other or both, e.g., where the one axis is the other axis in the case of spreading only in one axis, with, e.g., a greatly reduced requirements on the E-O drive electronics. In the simplest case, misalignment spreading (beam fan-out so-called hall of mirrors effect, may be employed in only one axis and "singly painting" in the other, e.g., with a saw tooth signed to a tilt mirror and without AC creating hybrid painting. More complex permutations and combinations of these coherency busting techniques may also be applicable.

Figure 43:
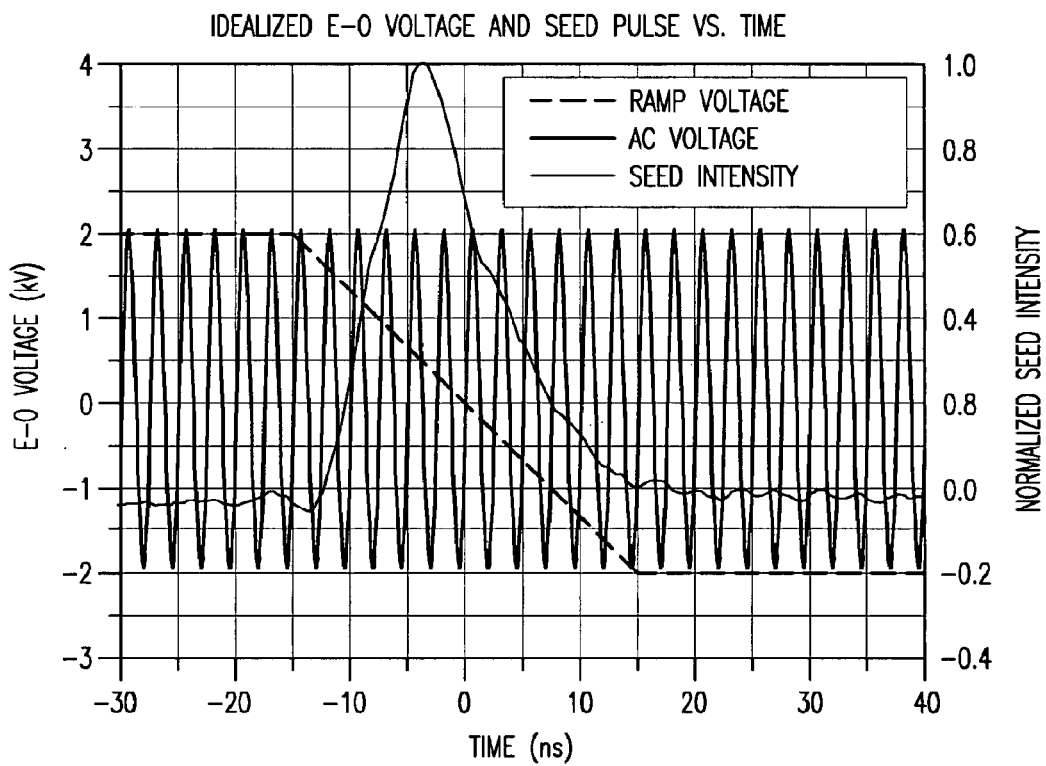
FIG. 43 illustrates a simulated E-O supply voltage with respect to a seed pulse intensity spectrum over time, according to aspects of an embodiment of the disclosed subject matter.
Figure 44:
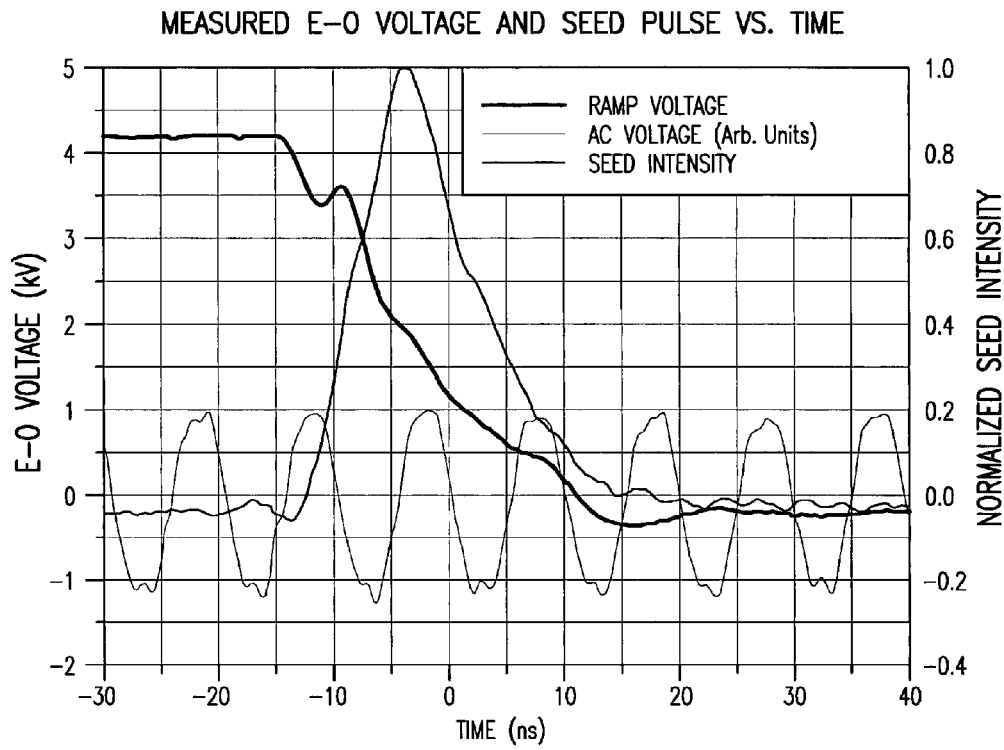
FIG. 44 illustrates a test E-O supply voltage with respect to a seed pulse intensity spectrum over time, according to aspects of an embodiment of the disclosed subject matter.

FIG. 43 gives an example of an idealized high frequency painting E-O voltage signal superimposed on a ramped (time varying) E-O DC voltage signal in relation to the intensity of the seed pulse being "painted", e.g., into a delay path or into the amplifying gain medium, e.g., a PA or PO or other power amplification stage. The ramp voltage may be created, e.g., by a fast R-C decay of an E-O cell capacitance as illustrated schematically in the circuit of FIG. 45. Due to certain constraints on a test circuit that applicants have so far built and tested, e.g., limited RF frequency, impedance mismatch, E-O load cell capacitance mismatch and the like, the actual voltages delivered by the "painting" circuit are shown in FIG. 44, as best as could be measured considering difficulties with probe loading, etc. These are approximately 25% of the needed RF frequency (e.g., about 100 MHz as opposed to 400 MHz) and 10% of the needed peak to peak voltage (e.g., around ±200 kV as opposed to ±2000 kV). The painting voltages could, of course, be better optimized, however, the test circuit was used to demonstrate the effectiveness of "painting" the seed beam into the amplifier gain medium for coherency/speckle reduction, e.g., with hybrid painting using both time varying DC steering and AC modulation, e.g., one in one axis and the other in a second axis, e.g., orthogonally related to each other.

Applicants' experimental measurements have determined that with no ramp and no AC voltage the 2D speckle contrast overall is 76.8% and varies from the horizontal to the vertical axis. With painting using the ramp alone the speckle contrast overall was 29.4%, again varying in the two axes. Painting with the AC alone gave a speckle contrast overall of 59.9%, again varying in the two axes. With the ramp and AC voltages applied the spectral contrast was 28.1% overall and varying in both axes. This was using a less optimized circuit than the one of FIG. 40, which was not available for the testing and the actual tested circuit test results are shown in FIG. 44.

Applicants believe that a more optimized circuit, shown by way of example in FIG. 45, will even improve further the reduction in speckle contrast. The circuit 1100a of FIG. 40 may include, e.g., an E-O cell, such as noted above, with an E-O cell capacitance 1104a and an impedance matching inductor 1110a, and an N:1 step-up transformer 1120a. Also included as illustrated may be, e.g., a DC power supply 1122a charging a capacitor 1126a through a large resistor 1130a and an RF frequency generator connected to a fast acting switch, e.g., a transistor 1140a (in reality a bank of such transistors in parallel), through a resistor. Also the capacitor 1126a discharges through a small resistor 1142a when the switch 1140a is closed.

According to aspects of an embodiment of the disclosed subject matter "painting" may also be done upstream of the amplifier gain medium, e.g., by tilting a mirror upstream of the amplification, e.g. a piezo-electrically adjustable mirror, if paining need not be done within a pulse time, or a piezo-drive fast enough for such painting is or becomes available, and otherwise with, e.g. a electro-optical or acousto-optical beam deflector. The results with the seed only, both with OC only and with OC plus Rmax reflections, look very similar to those measured by applicants such as with tilting a mirror, e.g., through a diffuser as illustrated in FIG. 22. As with the previous measurements, the OPuS-like characteristics of the OC-Rmax reflections can be seen to lead to single-pulse speckle contrast values reduced by the equivalent number of sub-pulses produced. The angular tilt required to produce uncorrelated speckle patterns was determined to be about 200-250 μrad, again similar to the results with tilting the mirror, e.g., downstream from the power amplification stage.

Applicants have performed characterizations of a solid state MO./power amplification stage using an excimer seed laser, e.g., greatly attenuated to simulate the expected pulse energy of, e.g., a 193 nm solid state laser. The pulse duration produced, however, did not match that expected from a 193 nm solid state laser. Applicants believe that proper simulation of the seed pulse duration should further reduce the total seed laser energy required for MO/power amplification stage operation. Using a pulse trimmer, e.g., a Pockels cell to which was applied a step voltage, e.g., timed to trim the later portion of the excimer seed pulse shape (¼λ voltage=2.5 kV), and due to the rise time of the excimer seed laser pulse and the fall time of the Pockels cell, the shortest practical pulse shape attained was about 9 ns FWHM and ~15 ns foot-to-foot. Trimming the later portion of the seed pulse was determined to have virtually no impact on the MO/power amplification stage output pulse characteristics, e.g., intensity, even with approximately 25% of the seed pulse energy eliminated. However, as noted elsewhere in the present application pulse trimming may further reduce speckle by eliminating a portion(s) of the output pulse with the greatest coherency (least speckle contrast).

According to aspects of an embodiment of the disclosed subject matter it is contemplated to apply a time changing voltage on a timescale similar to the seed pulse duration, e.g., by applying a DC voltage level until triggered, at which point the high voltage may be shorted to ground, e.g., via a stack of fast MOSFETS, e.g., illustrated schematically in FIG. 40 as a single transistor 1130. A plot of the applied voltage and the seed laser pulse shape are shown in FIG. 19. Placing a series resister between the E-O cell terminal and voltage supply can be used to control, e.g., the voltage slope applied to the E-O cell. The 50 pF capacitance of the E-O cell in series with, e.g., a 200Ω resister gives an initial slope of about $10^{11}$ μrad/s. The voltage across the E-O cell drops, e.g., as seen in FIG. 19 from the DC level to nearly zero in a time similar to the seed pulse duration. By changing the relative timing between the E-O cell pulser and the seed laser one can, e.g., change the amount of pointing sweep that occurs during the seed pulse. In addition, one can change the value of the initial DC voltage to effect a greater or lesser pointing sweep during the seed pulse. Applicants have tested this fast pointing capability, e.g., with the seed laser only and reflecting from an OC only, therefore, with no OPuS effect from the multiple reflections from the OC and Rmax and no effects due to MOPO operation. Without optimizing for relative timing between the E-O cell and the seed pulse, applicants captured speckle patterns for a range of timing between the two. Applicants applied three difference levels of DC voltage to the E-O cell in order to change the maximum available pointing slope. The results showed a minimum speckle intensity normalized standard deviation at about 57 ns relative timing. Without any angular shift during the seed pulse, at both small and large relative timing values, below and above 57 ns the speckle contrast is high. This correlates with values found by applicants during static testing. When, e.g., the relative timing places the E-O Cell voltage slope coincident with the seed pulse, the speckle pattern of a single pulse is smeared in the vertical direction, in a dramatic and satisfactory way.

Required limits on ASE as currently understood are believed to be attainable with around 5 uJ of seed laser energy and below, e.g., with a long seed pulse shape. Saturation test results have shown applicants that output energy can be attained and the same ASE upper limit levels can be achieved with only 3.75 uJ of seed laser energy when using a short duration seed pulse. Further reductions in seed pulse duration might be possible, resulting in even smaller seed energy requirements. However such further reductions in seed energy may be unnecessary since applicants envision using ~10 uJ of solid state 193 nm seed energy. Shorter pulse durations may prove difficult since, e.g., two stages of mini-OPuS may be used, e.g., between seed laser and the power amplification stage, with a requirement that the delay length of each mini-OPuS be greater than the seed laser pulse duration, the resulting stretched pulse then being approximately 10 ns FWHM.

One can normalize contrast values to the maximum value in order to evaluate the percentage reduction in contrast, e.g., brought about by the dynamic pointing shift. At the optimum relative timing point the speckle contrast was found to be reduced to about 40% of its peak. Using the assumption for equivalent number of independent pulses the data can be used to derive the number of pulses required to achieve this level of speckle contrast reduction. At the optimum relative timing, and with 3 kV applied to the E-O cell, the contrast reduction was found to be equivalent to 6 pulses. Even higher voltage levels (and thus even larger pointing shift during a single pulse) could improve this result. Applicants performed similar measurements with the seed laser pulse entering the power amplification stage cavity, but no discharges between the amplification stage electrodes and noted that reflections from the OC and the Rmax in the XeF cavity, from the OPuS effect, beam spreading alone, indicated that the maximum speckle contrast was reduced by the amount predicted by the OPuS effect (N=1.56 with a 20% OC, giving $1/\sqrt{n}$=0.80. Thus 70% contrast becomes 56%). The effect of smearing, even though the initial speckle contrast is lower, appears not to change when adding the secondary reflections from the full XeF cavity. The equivalent pulse for speckle reduction is still about 6.

Applicants performed similar measurements with amplification stage cavity electrodes discharging and thus implicating the effects of the amplification within the amplification stage cavity, which indicated as shown in FIG. 17 the decrease in the impact on speckle reduction through seed beam sweeping. With such a configuration, the effect was found to be just over half of the equivalent number of pulses produced, i.e., about 3, when operating as a MO/amplification stage, also found was a rather large reduction in peak speckle contrast, with no smearing. Previous measurements of MO/amplification stage operation showed a reduction equivalent to about 6 pulses. These results show a reduction equivalent to about 8 pulses. Applicants suspect that the amplification stage cavity may discriminate against off-axis ray angles, e.g., in a flat-flat cavity, and thus the spray of angles sent into the cavity may not all be equally amplified (this could be corrected, e.g., with a true stable cavity, e.g., employing a curved OC and a curved Rmax). Another explanation may be that not all of the seed pulse takes part in controlling the amplification stage characteristics. Maybe only, e.g., the first 5 ns of the seed pulse's 10-15 ns pulse duration controls the amplification stage and thus the E-O sweep is not fast enough to occur within that smaller window. This may also be corrected, e.g., by using a smaller resister and a shorter sweep.

Figure 47:
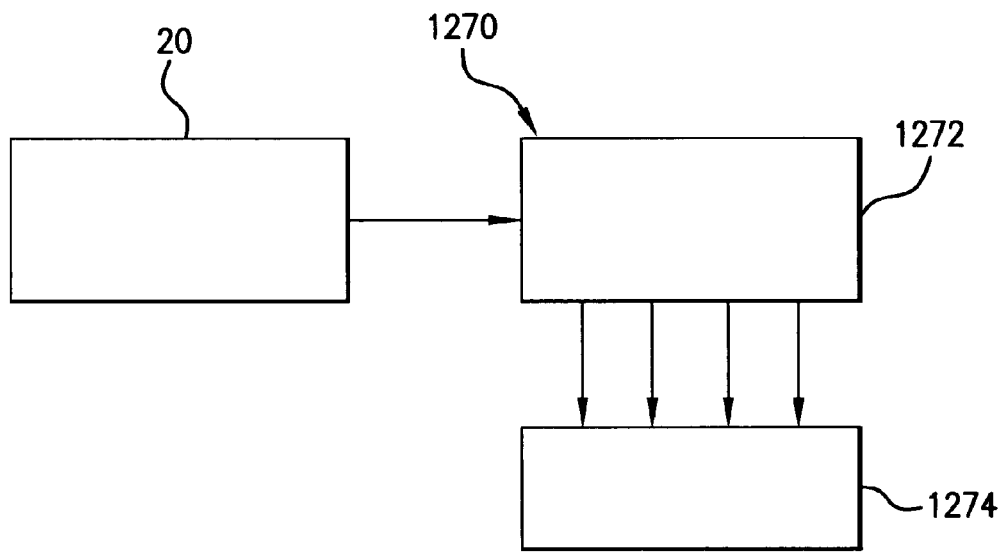
FIG. 47 illustrates schematically and in block diagram form a broad band light source and laser surface treatment system using the DUV laser light according to aspects of an embodiment of the disclosed subject matter.

Turning to FIG. 47 there is illustrated schematically and in block diagram form a laser treatment system, e.g., and LTPS or tbSLS laser annealing system, e.g., for melting and recrystallizing amorphous silicon on sheets of glass substrates at low temperature. The system 1070 may include, e.g., a laser system 20 such as described herein and a optical system 1272 to transform the laser 20 output light pulse beam from about 5×12 mm to 10 or so microns×390 mm or longer thin beams for treating a workpiece, e.g., held on a work piece handling stage 1274.

It will be understood by those skilled in the art that disclosed herein is a method and apparatus which may comprise a line narrowed pulsed excimer or molecular fluorine gas discharge laser system which may comprise a seed laser oscillator producing an output comprising a laser output light beam of pulses which may comprise a first gas discharge excimer or molecular fluorine laser chamber; a line narrowing module within a first oscillator cavity; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses, which may comprise a ring power amplification stage. The ring power amplification stage may comprise an injection mechanism which may comprise a partially reflecting optical element, e.g., a beam splitter through which the seed laser oscillator output light beam is injected into the ring power amplification stage. The ring power amplification stage may comprise a bow-tie loop or a race track loop. The ring power amplification stage may amplify the output of the seed laser oscillator cavity to a pulse energy of ≥1 mJ, or ≥2 mJ, or ≥5 mJ, or 10 mJ, or ≥15 mJ. The laser system may operate at an output pulse repetition rate of up to 12 kHz, or ≥2 and ≤8 kHz, or ≥4 and ≤6 kHz. The apparatus and method may comprise a broad band pulsed excimer or molecular fluorine gas discharge laser system which may comprise a seed laser oscillator producing an output comprising a laser output light beam of pulses which may comprise a first gas discharge excimer or molecular fluorine laser chamber; a laser amplification stage containing an amplifying gain medium in a second gas discharge excimer or molecular fluorine laser chamber receiving the output of the seed laser oscillator and amplifying the output of the seed laser oscillator to form a laser system output which may comprise a laser output light beam of pulses, which may comprise a ring power amplification stage. The ring power amplification stage may comprise an injection mechanism comprising a partially reflecting optical element through which the seed laser oscillator output light beam is injected into the ring power amplification stage. The ring power amplification stage may comprise a bow-tie loop or a race track loop. The apparatus and method may comprise a coherence busting mechanism intermediate the seed laser oscillator and the amplifier gain medium. The coherence busting mechanism may comprise an optical delay path having a delay length longer than the coherence length of a pulse in the seed laser oscillator laser output light beam of pulses. The optical delay path may not substantially increase the length of the pulse in the seed laser oscillator laser output light beam of pulses, but not create overlapping pulses, e.g., as occurs in a 4×OPuS sold by applicants' assignee, with a delay path of many meters, which also significantly increases the $T_{is}$ of the pulse as well as its temporal and spatial length. The coherence busing mechanism may comprise a first optical delay path of a first length and a second optical delay path of a second length, with the optical delay in each of the first and second delay paths exceeding the coherence length of a pulse in the seed laser oscillator laser output light beam of pulses, but not substantially increasing the length of the pulse, and the difference in the length of the first delay path and the second delay path exceeding the coherence length of the pulse. The apparatus and method may comprise a line narrowed pulsed excimer or molecular fluorine gas discharge laser system that may comprise a seed laser oscillator producing an output comprising a laser output light beam of pulses that may comprise a first gas discharge excimer or molecular fluorine laser chamber; a line narrowing module within a first oscillator cavity; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses, which may comprise a ring power amplification stage; a coherence busting mechanism intermediate the seed laser oscillator and the ring power amplification stage. The ring power amplification stage may comprise an injection mechanism comprising a partially reflecting optical element through which the seed laser oscillator output light beam is injected into the ring power amplification stage. The coherence busting mechanism may comprise an optical delay path having a delay length longer than the coherence length of a pulse in the seed laser oscillator laser output light beam of pulses. The optical delay path may not substantially increase the length of the pulse in the seed laser oscillator laser output light beam of pulses. The coherence busting mechanism may comprise a first optical delay path of a first length and a second optical delay path of a second length, with the optical delay in each of the first and second delay paths exceeding the coherence length of a pulse in the seed laser oscillator laser output light beam of pulses, but not substantially increasing the length of the pulse, and the difference in the length of the first delay path and the second delay path exceeding the coherence length of the pulse. The coherence busting mechanism may comprise a coherence busting optical delay structure generating multiple sub-pulses delayed sequentially from a single input pulse, wherein each sub-pulse is delayed from the following sub-pulse by more than the coherence length of the pulse light. The apparatus and method may comprise a broad band pulsed excimer or molecular fluorine gas discharge laser system which may comprise a seed laser oscillator producing an output comprising a laser output light beam of pulses which may comprise a first gas discharge excimer or molecular fluorine laser chamber; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses, which may comprise a ring power amplification stage; a coherence busting mechanism intermediate the seed laser oscillator and the ring power amplification stage. The ring power amplification stage may comprise an injection mechanism comprising a partially reflecting optical element through which the seed laser oscillator output light beam is injected into the ring power amplification stage. The coherence busting mechanism may comprise an optical delay path having a delay length longer than the coherence length of a pulse in the seed laser oscillator laser output light beam of pulses. The optical delay path may not substantially increase the length of the pulse in the seed laser oscillator laser output light beam of pulses. The coherence busing mechanism may comprise a first optical delay path of a first length and a second optical delay path of a second length, with the optical delay in each of the first and second delay paths exceeding the coherence length of a pulse in the seed laser oscillator laser output light beam of pulses, but not substantially increasing the length of the pulse, and the difference in the length of the first delay path and the second delay path exceeding the coherence length of the pulse. The coherence busting mechanism comprising a coherence busting optical delay structure generating multiple sub-pulses delayed sequentially from a single input pulse, wherein each sub-pulse is delayed from the following sub-pulse by more than the coherence length of the pulse light. The apparatus and method may comprise a pulsed excimer or molecular fluorine gas discharge laser system which may comprise a seed laser oscillator producing an output comprising a laser output light beam of pulses which may comprise a first gas discharge excimer or molecular fluorine laser chamber; a line narrowing module within a first oscillator cavity; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses; a coherence busting mechanism intermediate the seed laser oscillator and the laser amplification stage comprising an optical delay path exceeding the coherence length of the seed laser output light beam pulses. The amplification stage may comprise a laser oscillation cavity. The amplification stage may comprise an optical path defining a fixed number of passes through the amplifying gain medium. The coherence busting mechanism may comprise an optical delay path having a delay length longer than the coherence length of a pulse in the seed laser oscillator laser output light beam of pulses. The optical delay path may not substantially increase the length of the pulse in the seed laser oscillator laser output light beam of pulses. The coherence busting mechanism may comprise a first optical delay path of a first length and a second optical delay path of a second length, with the optical delay in each of the first and second delay paths exceeding the coherence length of a pulse in the seed laser oscillator laser output light beam of pulses, but not substantially increasing the length of the pulse, and the difference in the length of the first delay path and the second delay path exceeding the coherence length of the pulse.

Applicants have simulated through calculations speckle reduction as relates to the location of coherence lengths within a single gas discharge (e.g., ArF or KrF excimer) laser system output pulse after such a pulse has passed through the two OPuS pulse stretchers sold on laser systems manufactured by applicants' assignee Cymer, Inc., used for pulse stretching to increase the total integrated spectrum ($T_{is}$) to reduce the impact of peak intensity in the laser output pulse on the optics in the tool using the output light from the laser system, e.g., a lithography tool scanner illuminator. There are two OPuS in series, with the first having a delay path sufficient to stretch the $T_{is}$ of the output pulse from about 18.6 ns to about 47.8 ns and the second to stretch the pulse further to about 83.5 ns.

Starting with the unstretched pulse, applicants divided the pulse into portions equal to the approximate coherence length, assuming a FWHM bandwidth of 0.10 pm and a Gaussian shape for the coherence length function. The impact of the pulse stretching on the coherence length portions of the pulse after passing through the first OPuS was to show that a first intensity hump in the stretched pulse was made up of the coherence length portions of the main pulse, a second intensity hump was made up of coherence length portions of the main pulse overlapped with coherence length portions of a first daughter pulse. A third hump in the intensity of the stretched pulse is the result of overlapping of the first and second daughter pulses. Looking at the individual coherence length portions of the two humps applicants observed that the multiple versions (including daughters) of the coherence length portions remained sufficiently separated to not interfere with each other.

After passage through the second OPuS the simulated intensity of the stretched pulses, again only looking at the content of the first three humps in the stretched pulse, in the simulation (under the second hump were contributions from the original undelayed pulse, as before, the first delayed pulse from the first OPuS, as before, and the first delayed pulse from the second OPuS), applicants observed that in this second pulse the multiple versions of the coherence length portions were very close together. This is caused by the fact that the first OPuS has a delay of ~18 ns and the second has a delay of ~22 ns. Thus only ~4 ns separates the versions of the coherence length portions, which is still not close enough for interference.

Under the third hump applicants observed contributions from the first delayed pulse from the first OPuS, the second delayed pulse from first OPuS, the first delayed pulse from the second OPuS, and the second delayed pulse from second OPuS. Applicants observed that the separation between some related coherence portions is larger than for others in the third hump in the intensity plot of the pulse stretched by two OPuSs. This increase in separation is due to the fact that two round trips through each OPuS equal ~36 ns=18*2 and ~44 ns=22*2. Thus the separation between coherence lengths grows with each round trip.

Applicants concluded that for a mini-OPuS as described in this application a single mini-OPuS with delay equal to one coherence length will create a train of pulses that dies out after about 4 coherence length values. Thus, applicants determined that for a single mini-OPuS to be effective, the two main OPuSs should not bring any daughter coherence lengths to within 4 coherence lengths of each other. But, applicants have observed in the simulation that the main OPuSs do just that, though only marginally so. The separation between coherence lengths for the third and greater humps is sufficient. Applicants believe that the impact of a single mini-OPuS between MO and amplification gain medium will be nearly the full expected coherence busting effect. A second mini-OPuS between MO and PA may not adequately interact with the two main OPuSs. The empty spaces, not filled with related coherence length portions of the pulse humps get more scarce when one combines a single min-OPuS and two regular OPuSs, and the second may be too much. According to aspects of an embodiment of the present invention applicants propose the coordinated change of the regular OPuS delay lengths when the mini-OPuS(s) are installed, including whether they are part of the laser system or installed down stream of the regular main OPuSs, e.g., in the lithography tool itself. Applicants believe that such mini-OPuS(s) can fill in the valleys of the pulse duration somewhat, leading to an increase in $T_{is}$, e.g., allowing a reduction in the delay lengths of one of the two main OPuSs for better overall coherence length separation.

According to aspects of an embodiment of the disclosed subject matter there are certain performance requirements necessary of a very high power amplification stage cavity for, e.g., a 120-180 W or higher laser system, e.g., with two amplifier gain medium chambers in parallel. They should produce linear polarization (>98%). Each amplification stage should produce, and survive, ≥60 W average output energy, e.g., at 193 nm wavelength of ArF, or less stringently at longer wavelengths, e.g., 248 for KrF and 351 for XeF or 318 for XeCl, though even more stringent for $F_2$ at 157 nm. Each amplification stage in one embodiment may operate at about 6 kHz or above. According to aspects of an embodiment of the disclosed subject matter, the amplification stage(s) can exhibit full seeding (at or near saturation) with relatively small seed laser energy. According to aspects of an embodiment of the disclosed subject matter seed laser energy may be no more than around 1 µJ, though the system overall output power in such cases may be less than 200 W. Applicants believe that the amplification stage should also support a moderately large angular distribution, e.g., to maintain the same angular spread of the seed laser, in order to avoid inadvertently improving coherence by, e.g., removing coherence cells, e.g., with a range of angles of within a few m Rad. Protection of the seed laser from reverse traveling radiation is also an important operational requirement. When properly seeded, ASE levels produced by the amplification stage, according to aspects of an embodiment of the disclosed subject matter, should be less than 0.1% or less of the total output.

According to aspects of an embodiment of the disclosed subject matter applicants expect that (1) the gain cross-section will be similar to existing ArF chambers, e.g., applicants' assignee's XLA ArF laser system power amplifier ("PA") chambers, (2) the gain length will also be similar to existing ArF chambers, (3) the gain duration will also be similar to existing ArF chambers.

According to aspects of an embodiment of the disclosed subject matter, applicants propose, e.g., a single MO/gain amplification medium XLA tic-toc with a solid state seed laser operating at 12 kHz with about a 1 mJ seed laser output light pulse energy and the two amplification stages each operating at around a 17 mJ output pulse energy. In addition, according to aspects of an embodiment of the disclosed subject matter, applicants propose the utilization of a regenerative gain media, e.g., a ring power amplification stage, which can enable the generation of several times the output pulse energy in the ring power amplification stage compared, e.g., to a power amplifier ("PA") in a MOPA configuration. For testing purposes applicants have simulated the input from a solid state 193 nm seed laser using a line-narrowed ArF laser.

Applicants have studied ASE vs. MO-PO timing difference for the different values of the above noted parameters with results as indicated in FIG. 7. Similarly a study of MOPO energy vs. MO-PO timing as a function of these same parameters also illustrated in FIG. 7.

In order to meet the requirements noted above, including, e.g., the constraints of known lithography laser light source technology, applicants propose, according to aspects of an embodiment of the disclosed subject matter, a number of overall architectures that are believed to provide workable ways to address the requirements and constraints noted above. The first may be to provide two multi-chamber laser systems along the lines of applicants' assignee's XLA XXX laser system series, e.g., with two dual chamber laser oscillator/amplifier arrangements whereby each is configured to run at around 6 kHz producing output pulses at about 17 mJ with interleaved firing times to produce a single approximately 12 kHz system producing about 17 m per pulse.

Figure 54:
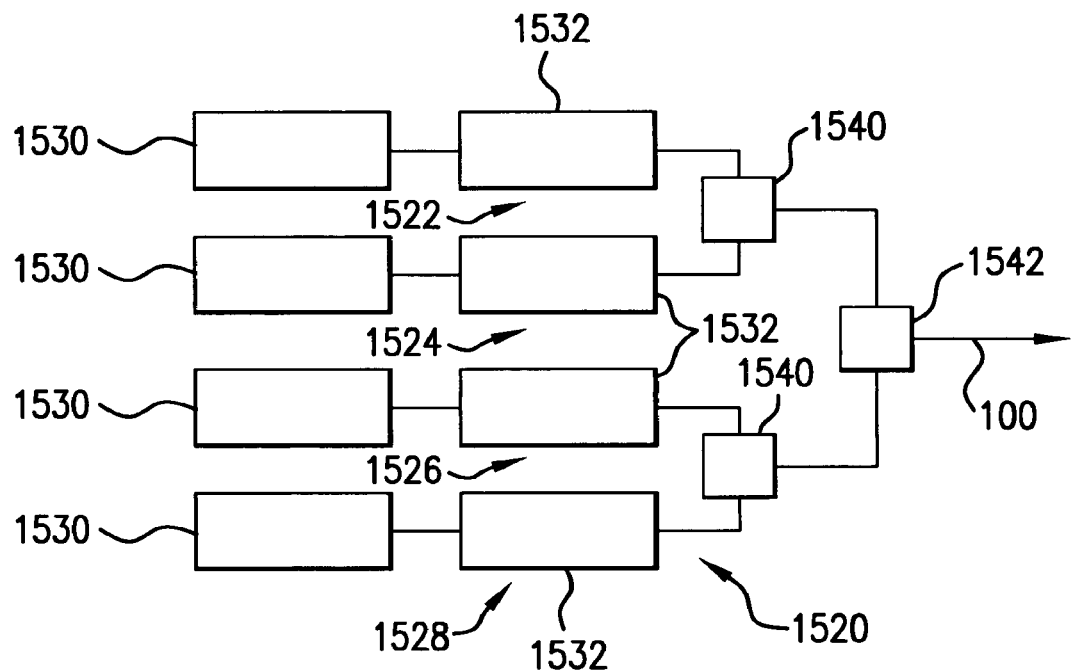
FIG. 54 shows schematically and in block diagram form a very high average power laser light source according to aspects of an embodiment of the disclosed subject matter.

Thus, e.g., according to aspects of an embodiment of the disclosed subject matter, illustrated schematically and in block diagram form in FIG. 54, a very high average power laser system, e.g., an immersion lithography laser light source 1520 may comprise a plurality of oscillator/amplifier laser system output light pulse beam sources, e.g., 1522, 1524, each of which comprising, e.g., a master oscillator portion comprising master oscillator chambers 1530, such as those being sold by applicants' assignee Cymer Inc. as part of an existing XLA XXX model multi-chamber laser system. Also included in each oscillator/amplifier laser system 1522, 1524 may be a power amplifier portion 1532, e.g., comprising an amplifier gain medium. Each of the two oscillator/amplifier laser systems 1522, 1524 provide an output light pulse beam to a beam combiner 1540, e.g., in an overleaving fashion.

Thus, e.g., with each laser system 1522, 1524 operating at 6 kHz and 17 mJ output laser light pulse beam pulse energy the combined output from the beam combiner 1540 could be a 12 kHz 17 mJ output resulting in about a 200 W average power laser system. It will also be understood that the embodiment of FIG. 54 may also be implemented with, e.g., a further plurality of identical oscillator amplifier laser systems 1526, 1528 to produce a 400 W average power laser system. Alternatively, each of the oscillator/amplifier systems 1522, 1524, 1526, 1528 could, e.g., operate at less than 6 kHz, e.g., each at 4 kHz and/or with a higher overall oscillator/amplifier system 1522, 1524, 1526, 1528 output laser light pulse beam pulse energy, e.g., up to around 33 mJ, to the extent that optical damage limits and cost of operation and other factors will allow, for various combinations of ultimate output 100 pulse repetition rate and pulse energy for a similar variety of average output power values from the system 1520.

Figure 55:
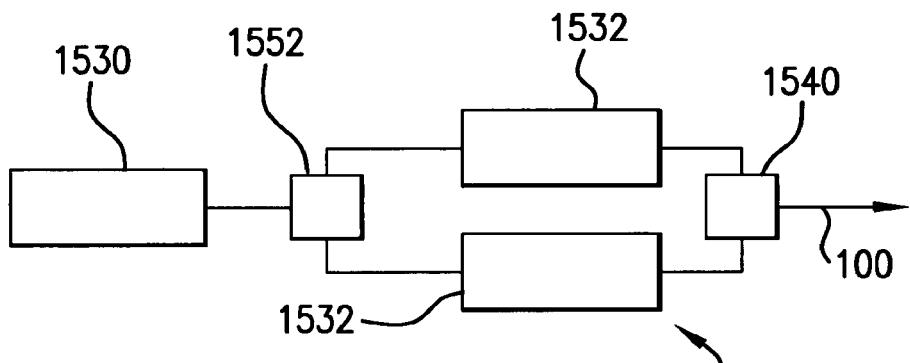
FIG. 55 illustrates schematically and in block diagram form a very high average power laser light source according to aspects of an embodiment of the disclosed subject matter.

Referring now to FIG. 55 there is illustrated schematically and in block diagram form a very high average power tic-toc seed laser/amplifier system 1550 according to aspects of an embodiment of the disclosed subject matter. The seed laser amplifier system 1550 may include, e.g., a seed laser portion 1530, e.g., a solid state seed laser such as a Nd:YAG or a Nd:YLF or a Ti:Sapphire or a fiber laser or other solid state laser, or an excimer or molecular fluorine gas discharge seed laser, e.g., operating at around 12 kHz with a 1-2 mJ output energy pulse and a pair of amplifier portions 1532, each being supplied with, e.g., the alternating output pulses from the seed laser portion 1530, e.g., through a beam splitter 1552, discussed in more detail elsewhere in the present application. The pulse could be supplied in other than an alternating fashion, depending on the repetition rates of the amplification stages. Each of the amplifier portions 1532 can then be run at, e.g., around 6 kHz for a 200 W output with only a 17 mJ output from each of the amplifier portions 1532. Moreover, seed lasers, could be selected to operate at in a range of about 4-12 kHz, giving an output, e.g., for a two amplification stage in parallel embodiment, of 8 kHz to 24 kHz.

Figure 56:
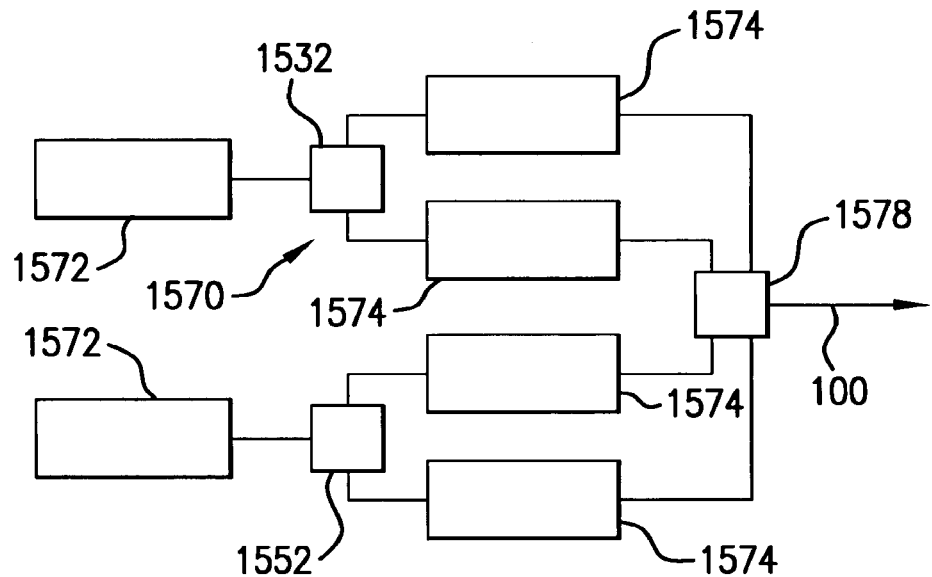
FIG. 56 shows schematically in block diagram form an example of a very high average power laser light source according to aspects of an embodiment of the disclosed subject matter.

Referring to FIG. 56 there is shown schematically in block diagram form an example of a very high average power multiple tic-toc seed laser/amplifier system 1570 according to aspects of an embodiment of the disclosed subject matter. The system 1570 may include, e.g., a first and a second seed laser 1572 each supplying seed laser pulses to a pair of amplifier portions, e.g., amplifier gain media 1574, through a beam splitter 1552 and with the output of each combined in a beam combiner 1578 to provide a laser light source system output laser light pulse beam 100 with an average output power of at or above 200 W. The seed lasers could be, e.g., solid state lasers operating at, e.g., around 12 kHz and the amplifier portions could be, e.g., gas discharge lasers, e.g., excimer or molecular fluorine lasers operating at around 6 kHz. Alternatively, e.g., the seed lasers 1572 could be excimer lasers, e.g, KrF, ArF, XeCl, XeF or molecular fluorine lasers operating at about 6 kHz with the respective pairs of tic-toc amplifier portions each operating at 3 kHz for a total of 12 kHz and 17 mJ per lithography or LTPS laser light source system output laser light pulses and a resultant average power of around 200 W. Frequency conversion, as discussed in more detail elsewhere in the present application may be needed to shift the wavelength of the seed laser(s) 72, e.g., solid state lasers, up to the wavelength of the gas discharge laser amplifier portions 1574. The beam combiner 1578 may be a single beam combiner as shown or cascading combiners as shown in the combiners 1540, 1542 in FIG. 54.

It will also be understood by those skilled in the art that various combinations and permutations of the arrangement illustrated in FIG. 56 may be utilized. For example there may be a plurality of A seed lasers 1572 operating at X kHz with each seeding a plurality of B amplifier portions 1574, each operating at X/B kHz and the combination providing AX system output laser light source output pulses in the output beam 100 of FIG. 56. Then, depending on the necessary average system output power, the pulse energy for the output of each of the plurality of amplifier portions 74 may be determined, e.g., with A=2 and B=2, as illustrated in FIG. 56 and X=6 kHz the overall output beam 100 can have a 12 kHz output and with 17 mJ pulses out of the amplifier portions one gets around 200 w of average output power. The same may be said for the possible arrangements of FIG. 54.

It will be noted that a tic-toc amplifier LTPS or immersion lithography light source, e.g., seeded by a master oscillator running at, e.g., twice the repetition frequency of the, e.g., two amplifier chambers, could be two excimer laser chambers in a MO/amplification gain medium configuration. For example, each amplification medium could have a recirculating/regenerative ring power amplification stage, each of which is alternatively seeded by a master oscillator running at twice the repetition rate of either amplification stage excimer laser chamber. Such systems can be run at any of the desired wavelengths, e.g., DUV wavelengths, e.g., with the MO and PA/PO operating at 157 nm ($F_2$), 193 nm (ArF), 248 nm (KrF), 308 nm (XeCl) or 351 nm (XeF). Further, such systems could include solid state or excimer seed lasers operating at a higher pulse repetition rate seeding a plurality of power amplification stages, e.g., two, in tic-toc configuration, such as ring power amplification stages.

Figure 57:
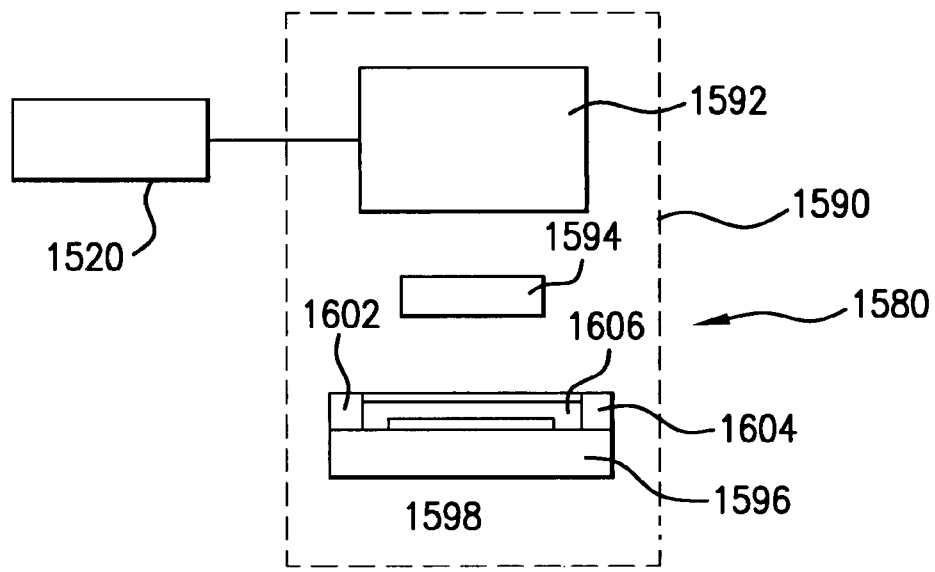
FIG. 57 shows partly schematically and partly in block diagram form, by way of example an immersion laser lithography system according to aspects of an embodiment of the disclosed subject matter.

In FIG. 57 there is shown partly schematically and partly in block diagram form, by way of example an immersion laser lithography system 1580 according to aspects of an embodiment of the disclosed subject matter. The system 1580 may include, e.g., a very high average power output laser light pulse beam source 1520 such as shown in FIG. 54 or 1550 such as shown in FIG. 55 or 1570 such as shown in FIG. 56, supplying line narrowed pulses at 200 W or above average power to a scanner 1590, such as those made by ASML or Canon or Nicon. The scanner 1590 may incorporate an illuminator 1592, a reticle 1594 and a wafer stage 1596 carrying a wafer 1598 for exposure by the radiation from the light source 1520. On the wafer stage 1596 may be a liquid source 1602, e.g., with the liquid being water having a different index of refraction than the ambient around the reticle 1594 and stage 1596, and a liquid drain 1604, supplying the liquid 1606 to cover the wafer 1598 for immersion lithography.

It will also be understood that for purposes of coherence busting, either for excimer or other gas discharge seed lasers supplying excimer or other gas discharge laser amplifier portions or for solid state seed lasers, use of multiple amplifier portions with the beams combined as noted elsewhere in the present application may have beneficial effects in decreasing the optical coherency and therefore, assisting in reducing the effects of the speckle, e.g., in integrated circuit photolithography or LTPS or tbSLS processing. It will also be understood that one or more of the various coherence busting techniques and/or combinations thereof disclosed herein may be utilized inside of the scanner 1590, whether that scanner 1590 is an immersion scanner or not.

Figure 58:
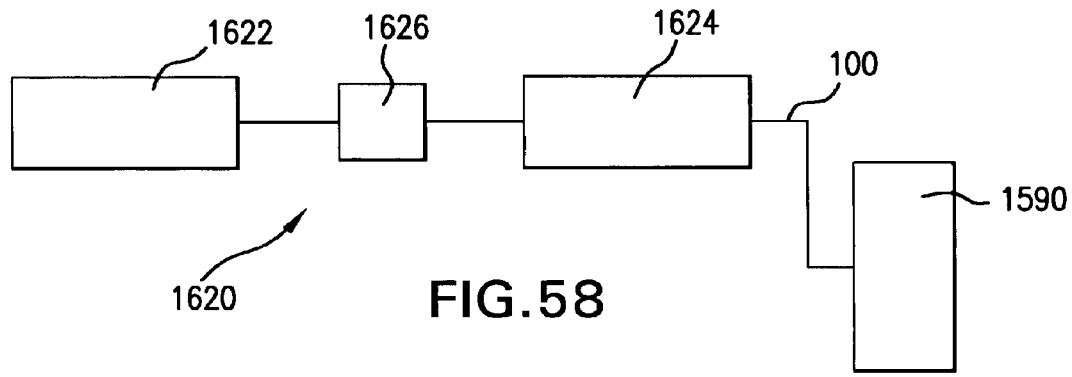
FIG. 58 shows schematically and in block diagram form a solid state seed laser to gas discharge amplifier laser system according to aspects of an embodiment of the disclosed subject matter.

Turning now to FIG. 58 there is shown schematically and in block diagram form a solid state seed laser to gas discharge amplifier laser system 1620 according to aspects of an embodiment of the disclosed subject matter. The system 1620 may include, e.g., a solid state pulsed seed laser 1622, e.g., an Nd:YAG or an ND:YLF pumped tunable solid state laser 1622. The output of the laser 1622 may pass through a coherence buster/frequency multiplier 1626, which may, e.g., be a single optical element, e.g., capable of both frequency shifting the output of the seed laser 1622 and beam steering, as is explained in more detail elsewhere in this application with respect to coherency busting, or could be a frequency shifter along with a coherency buster in series, e.g., as shown in FIG. 59 The system may also have, e.g., an amplifier gain medium such as a PA or PO 1624, or, e.g., a ring power amplification stage 1624, e.g., with the output 100 supplied to a scanner 1590 (Shown in FIG. 57).

It will be understood that with various tuning mechanisms may be used, e.g., operating temperature, as is know in the art, the solid state laser, e.g., a 1064 nm wavelength Nd:YAG (neodymium-doped yttrium aluminum garnet (Nd: $Y_3Al_5O_{12}$)), or 1053 nm Nd:YLF (neodymium doped yttrium lithium fluoride) or Ti:Sapphire laser (tunable from about 650 to 1100 nm), and/or by line selection. The desired frequency/wavelength for amplification in the amplifier portion 1624 may be attained, e.g., with the frequency up-converter 1626 to within an acceptable $\Delta\lambda$ from the nominal center wavelengths of around 351 for XeF, 248 for KrF, 193 for ArF and 157 for molecular fluorine to have acceptable amplifying lasing occur in the amplifier portion 1624, as is well understood in the art. As noted above, coherency busting of the type discussed elsewhere herein may be used inside the scanner 1590 or other application tool, e.g., another micro-lithography tool or a thin beam laser annealing tool.

Figure 59:
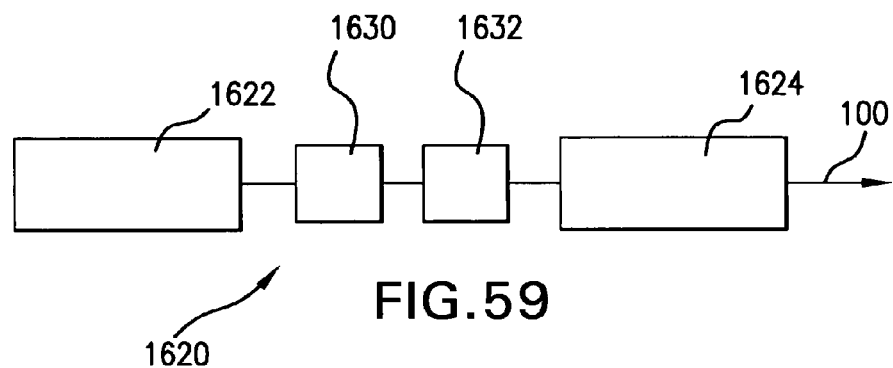
FIG. 59 shows in block diagram form a solid state seed laser/amplifier laser system according to aspects of an embodiment of the disclosed subject matter.
Figure 69:
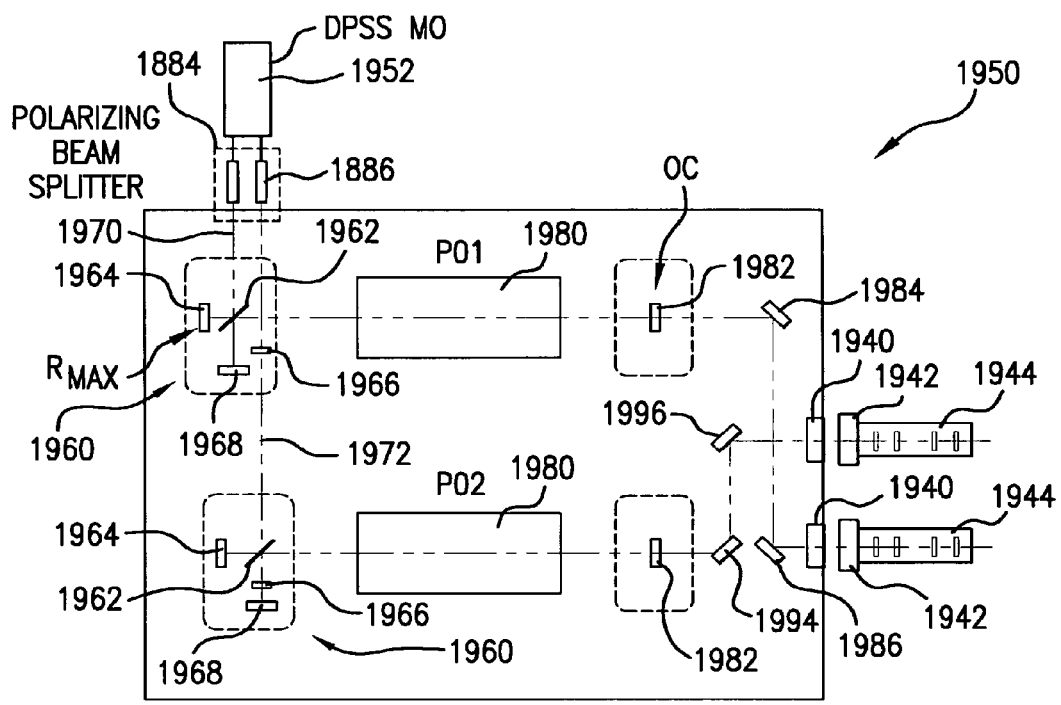
FIG. 69 illustrates schematically and partly in block diagram form a solid state seed laser/gain amplifier laser system according to aspects of an embodiment of the disclosed subject matter.

Turning to FIG. 59 there is shown in block diagram form a solid state seed laser/amplifier laser system 1620 according to aspects of an embodiment of the disclosed subject matter similar to that of FIG. 69 wherein, e.g., a frequency multiplier 1630 and a coherence buster 1632 may be utilized to provide appropriate seed pulses to the amplifier laser portion 1624 to accommodate, e.g., the high coherency of the seed laser output laser light pulse beam pulses and also their frequency shift to the desired frequency/wavelength for amplification, e.g., in the gas discharge amplification gain medium of the amplification stage 1624. The frequency multiplier 1630 and coherence buster 1632, as is the case in other arrangements noted herein, may be combined, e.g., a single non-linear crystal may be used for both, e.g., with appropriate drive signals as will be understood by those skilled in the art, or multiple crystals may be used, e.g., with some crystals optimized for frequency conversion and the others for coherency busting, and positions may be swapped, i.e., coherence busting followed by frequency shifting and vice-versa.

Figure 60:
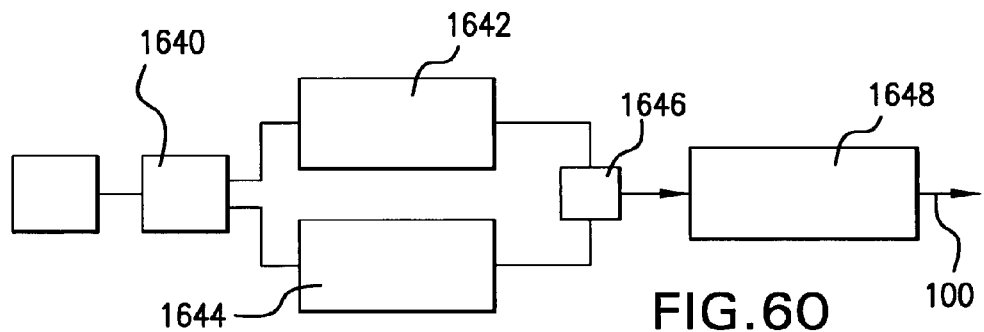
FIG. 60 shows schematically and in block diagram form conversion of the output of a seed laser, e.g., with a frequency converter along with a beam divider, followed by coherency busting according to aspects of an embodiment of the disclosed subject matter.

Turning to FIG. 60 there is shown schematically and in block diagram form conversion of the output of a seed laser, e.g., with a frequency converter 1630 along with a beam divider 1640, followed by coherency busting in one axis, e.g., the long axis of the laser beam or a first axis if the beam is not an ellipse or an elongated rectangle and the short axis or a second orthogonal axis if the beam is not an elongated rectangle, with a respective vertical axis coherency buster 1642 and horizontal axis coherency buster 1644, as explained in more detail herein. The outputs of the coherency busters 1642, 1644 may be combined in a beam combiner 1646, which, as noted elsewhere, may also serve a coherency busting role, e.g., as shown in connection with FIG. 31, and/or FIGS. 37 A and B, and provided as seed laser pulses to the amplifier gain medium portion 1648. Otherwise, if suitable non-linear crystals may not be found for such an embodiment, coherence busing may be don in one axis, e.g., in a coherency buster 1642, followed in series by coherency busing in a second axis in a coherency buster 144, without the need for the subsequent beam combiner 1646.

Figure 61:
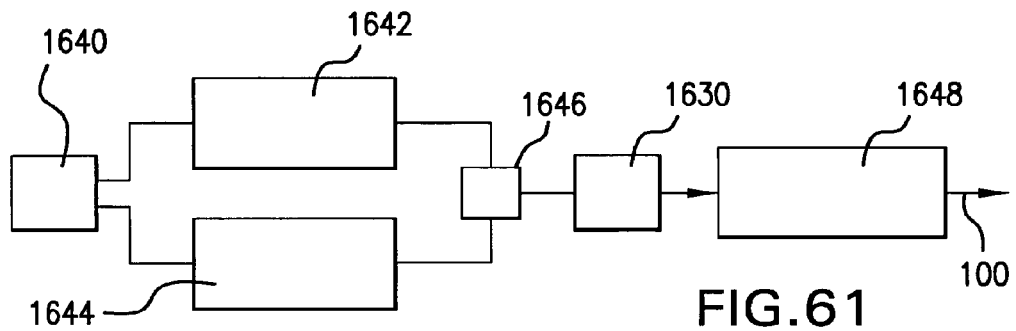
FIG. 61 shows schematically and in block diagram form a version of the embodiment of FIG. 60 according to aspects of an embodiment of the disclosed subject matter.

Turning to FIG. 61 there is shown schematically and in block diagram form a version of the embodiment of FIG. 60 in which, e.g., the frequency conversion in a frequency converter 1630 occurs after the coherency busting, i.e., intermediate the beam combiner 1646 and the amplifier portion 1648.

According to aspects of an embodiment of the disclosed subject matter the generation of 351 nm radiation, e.g., coherent 351 nm radiation, can be done with a solid-state configuration having, e.g., a solid-state drive laser (or lasers) that drive linear or nonlinear frequency conversion stages. Generation of 351 nm laser radiation can be, as illustrated, attained by third harmonic conversion of the output of a Nd:YLF laser operating at 1053 nm. In order to use this approach as a seed laser for an XeF excimer amplifier/oscillator, however, one must ensure that the nominal center wavelength of the, e.g., Nd:YLF seed laser master oscillator matches the gain spectrum of XeF (two lines at 351.12 and 351.26 nm). An alternative approach could be to use an Yb-doped fiber laser as the fundamental drive laser seed pulse source. Yb3+ fiber lasers are inherently tunable, as discussed in J Nilsson et al "High-power wavelength-tunable cladding-pumped rare-earth-doped silica fiber lasers," Opt. Fiber Technol. 10, pp 5-30 (2004), to allow operation between 1050 and 1065 nm. Fiber lasers offer some simplifications in design that may be of particular benefit in applications requiring ultra-reliability, such as LTPS and microlithography. Applicants propose using a pulsed fiber laser system as the source of moderate peak power (5-50 kW) high-repetition-rate (multi-kHz, e.g., up to about 12-15 kHz) 1054 nm narrow-band pulsed radiation. Such a laser could be constructed using standard $Yb^{3+}$ pulsed fiber laser technology—either a q-switched fiber oscillator, a pulsed diode source that is fiber amplified, or a CW source (fiber oscillator or diode) that is modulated (internally or externally) and is fiber amplified.

After the 1054 nm radiation is generated, it can, e.g., be frequency upconverted directly to, e.g., about 351.2 nm, using two stages of nonlinear frequency conversion (second harmonic generation ("SHG") of 1054 to 527 nm then sum frequency generation ("SFG") with the residual fundamental to 351.2 nm (with ~+/−0.1 nm bandwidth).

A CW solid state laser, e.g., a diode laser, with a very narrow bandwidth (very high spectral purity), e.g., matched to the fiber laser, to provide a very narrow band seed to the pulsed solid state fiber laser for amplification and the production of a very narrow band pulsed solid state seed to the power amplification stage(s), e.g., for KrF or ArF lasers. Appropriate LMA (large-mode area) fiber technology may be used to minimize spectral degradation due to nonlinear effects in the fiber comprising the fiber laser amplification oscillator or any subsequent amplification stages. Using such approaches allows spatial beam quality to be maintained (there are techniques for ensuring single-mode operation in large mode area fibers) while reducing the peak power in the core of the fiber.

A fiber-laser-based solid-state 351 nm MO, for XeF, can also be realized according to aspects of an embodiment of the disclosed subject matter. Such a master oscillator architecture may be a simpler more robust solution than a bulk-solid-state laser.

Turning now to FIGS. 62-65 there are shown schematically and partly in block diagram form a plurality of injection seeded 351 nm gas discharge master oscillator/amplifier gain medium laser system solid state master oscillators 1700 according to aspects of an embodiment of the disclosed subject matter. The master oscillator 1700 may include, e.g., a $Yb^{3+}$ doped fiber oscillator or amplifier 1710, e.g., with a diode pump 1712 and a seed laser, e.g., a 1054 nm CW seed diode laser 1714.

Figure 62:
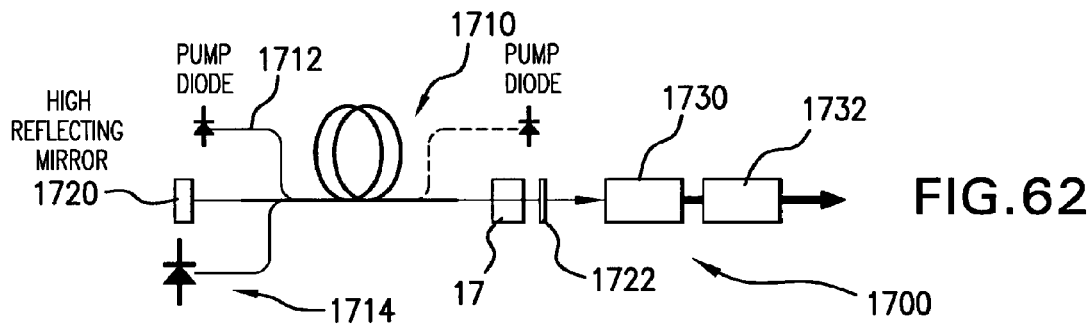
FIG. 62 shows schematically and partly in block diagram form an injection seeded DUV gas discharge master oscillator/amplifier gain medium laser system solid state master oscillator according to aspects of an embodiment of the disclosed subject matter.

Referring to FIG. 62 the master oscillator oscillation cavity may be formed by a rear cavity fully reflective mirror 1720 and a partially reflective output coupler 1722, which may be 90% reflective at the nominal 1054 nm center wavelength of the fiber oscillator 1710. The master oscillator 1700 may employ a Q switch 1724 to allow for the output pulse energy of the master oscillator 210 to accumulate in the oscillation cavity until sufficiently high in energy before the Q-switch 1724 is opened, as is well known in the art. The output of the master oscillator 1700 may thus be pulsed by the frequency of operation of the Q-switch, e.g., at a rate of about 12 kHz. The output of the fiber oscillator laser 1710 may be passed through a second harmonic generator 1730, followed by a frequency adder 1732, to add the original frequency to the second harmonic to generate a third harmonic, i.e., a wavelength of about 351 nm suitable for amplification, in, e.g., a XeF gas discharge laser power amplifier or power oscillator or ring power amplification stage amplifying gain medium (not shown in FIGS. 62-65).

Figure 63:
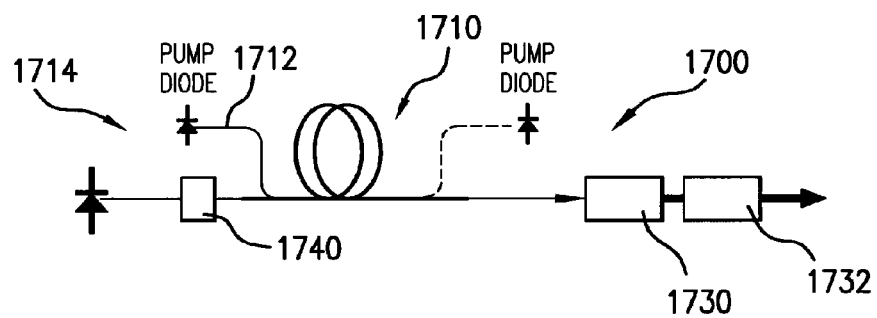
FIG. 63 shows schematically and partly in block diagram form an injection seeded DUV gas discharge master oscillator/amplifier gain medium laser system solid state master oscillator according to aspects of an embodiment of the disclosed subject matter.

Turning to FIG. 63 there is shown schematically and partly in block diagram form a solid state master oscillator 1700 according to aspects of an embodiment of the disclosed subject matter. In this embodiment an external amplitude modulator 1740, e.g., an acousto-optic or electro-optic switch or other suitable mechanism, may be used to pulse the CW seed 1714 into the fiber amplifier 1710 to produce a pulsed output of the master oscillator 1700.

Figure 64:
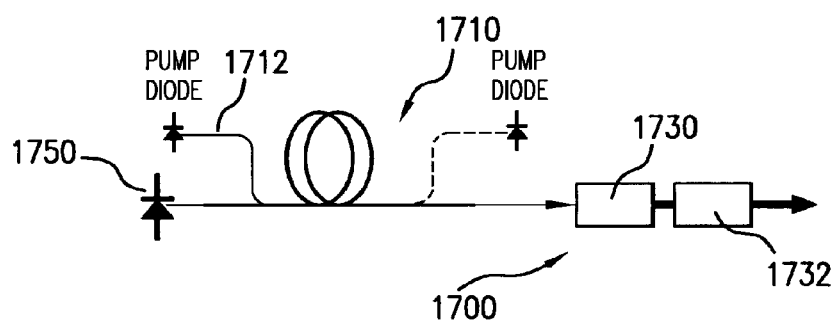
FIG. 64 shows schematically and partly in block diagram form an injection seeded DUV gas discharge master oscillator/amplifier gain medium laser system solid state master oscillator according to aspects of an embodiment of the disclosed subject matter.
Figure 65:
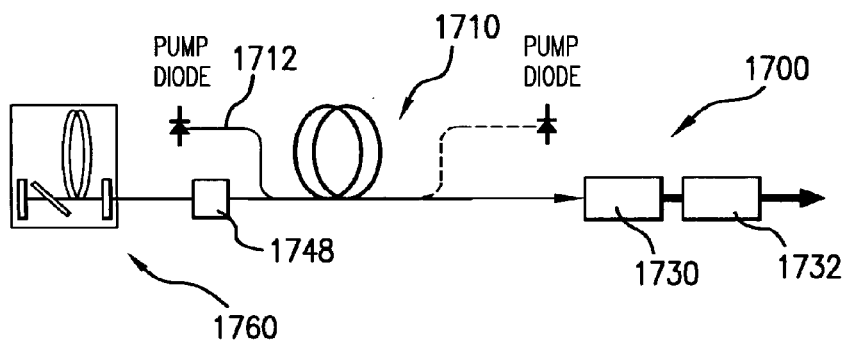
FIG. 65 shows schematically and partly in block diagram form an injection seeded DUV gas discharge master oscillator/amplifier gain medium laser system solid state master oscillator according to aspects of an embodiment of the disclosed subject matter.

In the embodiment of FIG. 64 the 1054 seed may utilize, e.g., a pulsed seed diode 1750 to produce a pulsed output out of the master oscillator 1710, e.g., at around 12 kHz. In the embodiment of FIG. 65 a tunable CW $Yb^{3+}$ master oscillator 1760 may be switched into the fiber amplifier 1710 with an external amplitude modulator, such as is discussed above, to get a pulsed seed laser output from the master oscillator 1700. The fiber amplifier 1710 may utilize pump diodes 1712 to pump the fiber amplifier 1710. The fiber laser may comprise a single fiber or a multiplicity of fibers, e.g., placed serially, with each fiber optimized, as is known in the art, for amplification of its input signal.

According to aspects of an embodiment of the disclosed subject matter applicants have determined certain characteristics desirably evidenced by a seed laser, e.g., a solid state seed laser, for a very high average power laser system, e.g., for photolithography or LTPS applications, including, e.g., pulse energy, pulse duration and timing jitter, which can drive the selection of a seed laser, e.g., a solid state seed laser to the choice(s) of Nd:YAG, Nd:YLF, Ti:Sapphire, and fiber lasers, as discussed elsewhere.

According to aspects of an embodiment of the disclosed subject matter applicants have also studied certain amplification stage resonator cavity properties. On the one hand may be a flat-flat cavity with simple beam splitter input/output coupling, which is simple of construction, though perhaps more wasteful of seed laser energy than is practical in a production system. On the other hand may be a recirculating or regenerative power oscillator, e.g., a ring power amplification stage, e.g., with a beam splitter/mirror input/output coupler. It will be understood by those skilled in the art, as noted above, terms like oscillator, cavity and the like used in reference to, e.g., a MOPO configured laser system mean that the amplification portions of the laser system, seeded by a seed laser portion, lasers due to stimulated emission from the seed beam pulse oscillating in the cavity. This is distinguished from what may be referred to as a power amplifier, such as the PA portions of applicants' assignee's MOPA configured XLA XXX series laser systems. By contrast the amplification occurs in a power amplifier by stimulated emission during a gas discharge in the amplification gain medium of the amplifier portion of the laser system as the seed laser pulse is directed through the amplification gain medium in an excited state a fixed number of times by an optical arrangement, e.g., a two pass optical system as used in applicants' assignee's current XLA XXX series laser systems. In some of the literature, however, an amplifier with a closed cavity around the amplification gain medium, e.g., a bow-tie or racetrack loop path length may be considered to be a "power amplifier" or a regenerative amplifier rather than a "power oscillator." Therefore for purposes of this application and the appended claims the use of the term "ring power amplification stage" is intended to cover any of these structures where a power boosting stage incorporates a gain medium with a closed optical cavity.

The flat-flat configuration may use a traditional polarization input/output coupling e.g., with a polarizing beam splitter and a quarter wave plate and partially reflective output coupler, e.g., as described in more detail below with respect to FIGS. 66 and 69. This may make more efficient use of the seed laser energy but could also be more susceptible to, e.g., thermal effects at high pulse energy and/or high average output power. Other input/output coupling could also be employed as explained elsewhere in this application.

Turning now to FIGS. 14 and 16 there are illustrated in schematic and partly block diagram form examples of very high power, e.g., around 200 W or better average output power, laser systems, 280, and 450, respectively, according to aspects of an embodiment of the disclosed subject matter. These laser systems 280, 450 may be used, e.g., for immersion lithography use or for LTPS use, or the like, which may include, e.g., in the case of FIG. 14 a ring power amplification stage configured laser system 280. The system 280 may include a seed laser 286, which may provide seed laser pulses at, e.g., around 1.0 mJ or less and a pulse repetition rate of, e.g., around 6 kHz, in a seed laser output light pulse beam 288 of laser output light pulses. The beam 288 from the seed laser 286 may pass through a seed injection coupling mechanism 300 into an amplifier gain medium portion 290 of the laser system 280.

The amplifier gain portion 290 may comprise a ring power amplification stage chamber 292 containing a pair of gas discharge electrodes 294 one of which is seen in the view of FIG. 14. The chamber 292 may also comprise an input chamber section 296 and a beam reverser chamber section 298, each of which may be formed with or attached to, e.g., by suitable leak proof means, the chamber 292, such that, e.g., the optics in the input section 296 and in the beam reverser section 298 can be beneficially exposed to fluorine in the lasing gas mixture enclosed in the chamber sections 292, 296, 298.

The seed injection mechanism may include, e.g., a beam splitter/input-output coupler 302 which may be coated with a coating or otherwise selected or made to be partially reflective to the seed laser light, e.g., at a nominal center wavelength of around 193 nm for ArF, 248 nm for KrF, 318 for XeCl or 351 for XeF laser systems, and a maximally reflective mirror 304 that is maximally reflective at the selected nominal center wavelength for the respective ArF, KrF, XeCl or XeF or the like gas discharge laser systems. The beam reverser 310 may be similar to the power amplifier beam reversers, e.g., sold in applicants' assignee's XLA MOPA configured laser systems, XLA XXX systems. Such a beam reverser in an XLA-XXX may constitute a module which may be part of a relay optics subsystem, that, e.g., directs the beam from the output of the MO, through the PA, to the entrance of a pulse stretcher to thereafter exit the laser system through the shutter. The relay optics subsystem may include an MO wavefront engineering/steering box ("WEB"), a PA WEB and the beam reverser module. The Beam Reverser module receive the beam exiting the back end of the PA chamber and send it back through the PA chamber to the PA WEB at a specified angle and position. The module contains the beam reverser prism, which steers the beam back through the PA chamber ensuring that the beam skims past a PA WEB turning prism which steered the beam into the PA chamber in the first instance. The prism is adjustable along the x-axis and rotatable (tiltable) about the x-axis. The beam is returned to the PA chamber on a slightly different path than from the PA WEB to the beam reverser, e.g., as shown in FIG. 20-22, thereby, e.g., passing through the amplifier gain medium in the same path in the vertical axis and different crossing paths in the horizontal axis, horizontal and vertical being in relation to the electrodes and discharge lasing amplification medium and not necessarily oriented to and/or corresponding to true horizontal and vertical. This forms the optically determined tilted double pass of the seed beam from the seed laser through the power amplifier gain medium (not a sealed cavity) of a MOPA power amplifier such as noted above. The beam reverser may, e.g., introduce a slight angle (a few milliradians) and a slight offset (a few millimeters) to the beam that is reflected back through the PA chamber, such that the two beams overlap inside the PA chamber (e.g., intersecting at about the middle of the chamber length—middle of the longitudinal length of the electrodes) and are spatially separated at the PA WEB turning prism. The beam returner according to aspects of an embodiment of the subject matter disclosed may utilize a reverser prism with no optical coatings. The beam may, e.g., enter and exit the beam returner prism at near Brewster's angle, and total internal reflection may occur at the internal reflecting surfaces, thus there are, e.g., virtually no surface losses. The prism must be made out of expensive excimer grade $CaF_2$. Birefringence, bulk absorption and scattering losses must be taken into account, but these phenomena are not expected to be problematic.

In the input section 296 optically accessible through an input window 312 may be placed a beam expander 320, which may be comprised of a prism 322 and a prism 324, which together may narrow the beam 288 on its way into the chamber 292 and conversely expand it on its way out of the chamber 292, the expansion on the way out serving to, e.g., protect the optical elements, e.g., the input/output coupler 300 and the narrowing of the beam 288 on the way into the chamber 292 serving to, e.g., narrow the beam 340 entering the amplification gain medium to approximately the width of the discharge between the electrodes 294 in a direction generally perpendicular to the separation of the electrodes 294.

Baffles 330 may serve to, e.g., protect the optics in the input section 296 and the beam reverser section 298 of the chamber 292 from damage resulting from, e.g., debris circulating with the lasing gas mixture in the chamber 292.

Inside the cavity of the ring power amplification stage 290 the beam 288 may take a first direction recirculating oscillation path 340 and return on a second direction recirculating oscillation path 342 to the seed injection mechanism 300 where the partially reflective input/output coupler acts as a traditional output coupler for an oscillator laser cavity and reflects part of the oscillating laser light photons to the Rmax mirror 304 and back along the path 340. Thus the oscillation in the cavity formed by the seed injection mechanism 300 and the beam reverser 310 is a multi-pass oscillation path. Such oscillation, as noted, is distinct from the photons in a power amplifier making a fixed number of passes through the gain medium, e.g., two in applicants' assignee's XLA XXX laser systems, without oscillating along such power amplifier light path. When the oscillation in the recirculating/regenerative path 340, 342 builds up enough pulse energy a laser system output laser light pulse beam 100 is produced from the seeded power oscillator laser system 280. The seed laser 286 could be either a gas discharge, e.g., excimer or fluorine laser or a solid state laser.

FIG. 16 illustrates schematically and partly in block diagram form a ring power amplification stage laser system 490 configured similarly to applicants' assignee's XLA XXX multi-chambered MOPA laser systems with the PA replaced by a ring power amplification stage 490 according to aspects of an embodiment of the disclosed subject matter. The laser system 450 may be comprised of an excimer gas discharge laser seed laser 452 which may comprise a master oscillator laser chamber 454, with a line narrowing module 456 having a reflective element, e.g., a wavelength and bandwidth selective grating, forming a rear cavity mirror and a partially reflective output coupler 458 forming the other end of the master oscillator 452 oscillation cavity. The master oscillator 452 seed laser output laser light pulse beam of pulses leaving the output coupler 458 may pass through a metrology module (line center analysis module "LAM") 470, which may sample a portion of the output of the MO chamber 454, using a beam splitter 472, and also, in addition to a wavemeter (not shown) for measuring nominal center wavelength of the master oscillator seed laser output laser light pulse beam pulses may comprise an MO laser output light pulse beam pulse energy monitor 474 and an ASE monitor 476, such as a fluorescence detector. The ASE detector, e.g., a broad band photodetector, may serve to detect the presence of a high enough intensity of broadband light to indicate the timing of the discharge in the amplification gain medium is off such that significant lasing in band is not occurring (the seed pulse is not timed to be in the cavity of the amplification stage during the discharge) and essentially only broad band lasing is occurring during the discharge in the amplification stage.

The master oscillator seed laser 452 output laser light pulse beam may then pass to a turning mirror 480 and from there to a seed injection mechanism 300 input to an amplifier gain medium portion 490, which may comprise a ring power amplification stage chamber 492, having a chamber input section 494 and a chamber beam reverser section 496. It will be understood by those skilled in the art that this schematic view of the laser system 450 does not reflect various aspects of the optical path of the beam from the MO 452 to the PO chamber 442, which are drawn schematically to conform to the plane of the paper and not the optical realities of the optical path between the two and into the amplification stage chamber 492.

The seed injection mechanism 300 may include, e.g., a partially reflective input/output coupler 302, e.g., a beam splitter similar to those sold with applicants' assignee's laser systems, e.g., as part of an optical pulse stretcher ("OPuS"), and a maximally reflective mirror Rmax 304 for the given nominal center wavelength, with the partially reflective output coupler 302 serving as an input/output coupler as noted above and specifically as the output coupler for the ring power amplification stage 490 oscillation cavity (defined also by the beam reverser 310). The seed laser output laser light pulse beam from the MO 452 may pass into the ring power amplification stage chamber 492 through an input window 500 and also pass through a beam expander 510 as noted above with respect to FIG. 14. The input section 494 of the ring power amplification stage chamber 492 may also house the beam expander 510, consisting of, e.g., a prism 512 and a prism 514. Other forms of seed injection mechanisms may include those discussed in the above referenced co-pending provisional application filed on the same as the provisional application from which this application claims priority and the other co-pending applications claiming priority to that provisional application or the provisional application from which this present application claims priority.

The output of the ring power amplification stage oscillator 490 may be the overall system output laser light pulse beam of laser pulses, however, as illustrated in FIG. 16, this beam (eventually output beam 100 to the utilization tool, e.g., the scanner) passes also through a metrology unit (bandwidth analysis module "BAM") 340, where output laser light pulse beam bandwidth may be measured, e.g., for each pulse in the beam, and through a pulse stretcher, e.g., a 4×OPuS 520 which may include, e.g., a first delay path 522, which the laser system output beam enters through beam splitter 526 and a second delay path 524 entered through beam splitter 528 (the delay paths formed by mirrors 530). Leaving the OPuS 520 the output beam 100 passes through a shutter 540 which may also have a beam splitter 542, e.g., to take off a portion of the laser system output laser light pulse beam 100 to measure, e.g., pulse energy.

With the beam expander 170 in FIG. 3 and 142 in FIG. 2 placed inside the ring power amplification stage oscillation cavity there is, e.g., a reduction of the energy density on the maximum reflector 164 and partial reflector 162 that make up the input/output coupler 160 of the ring cavity of the amplification stage 180, 144 is achieved. With the beam reverser 70 moved to inside the cavity, the space vacated can house the BAM (or SAM). Need for optical coatings can be eliminated, e.g., due to reduced optical fluence on due to reduction of optical fluence, e.g., on the input/output coupler partially reflecting mirror 162 and maximally reflecting mirror 164, with the beam reverser 70 angled to reduce optical damage, e.g., with an input and output at about Brewster's angle to reduce absorption and also to spread the beam on the input and output faces. There could also be no need protective coatings on the amplification stage chamber window 194, 168. The output window 194, 168 could be at a 47 degree orientation.

And also, since the power amplification stage reaches strong saturation with 100 uJ of MO energy and below, e.g., down to about 5 µJ or so, output energy stability will be dominated by the good ring power amplification stage characteristics and not the less than ideal MO energy stability characteristics. The present Cymer XLA XXX MOPA systems are dominated by the MO energy instabilities. Other output laser beam parameters, e.g., pointing stability, profile stability, and ASE stability may also be beneficially impacted by a configuration according to aspects of an embodiment of the disclosed subject matter utilizing reduced MO energy output.

According to aspects of an embodiment of the disclosed subject matter applicants propose to use a 6 mirror coherency busting mechanism (for convenience herein optical pulse delay paths are indicated schematically as having four mirrors per delay path) which has been developed by applicants' assignee for additional path delay inside either or both of the 1$^{st}$ or 2$^{nd}$ pulse stretchers in the OPuS used with applicants' assignee's XLA model multi-chamber laser systems. Such a delay path can, e.g., produce −1 imaging with an odd number of imaging mirrors. This is illustrated schematically and in cartoon fashion, e.g., in FIGS. 37 and 8 wherein is illustrated the summation of "flipped" sub-pulses. The flipped sub-pulses shown, e.g., in FIG. 8 can be used, e.g., for improved profile uniformity and symmetry and for overlapping into the dame output aperture pulses from different sources, e.g., as a beam combiner.

It will be understood that the delay path for this coherency busting purpose need not be as long as the actual OPuS used for pulse stretching to get a much increased pulse $T_{is}$, and overlapping pulses. Rather the coherency busting mechanism, a so-called "mini-OPuS", among other characteristics can fold the pulses a certain number of times. This is illustrated by the pulse 580, with the corner (pre-flip) designated 582 and the pulses 584, 586, 588. In addition, due to misalignment of mirrors in the delay path, a "hall of mirrors" effect due to subportions of the beam being misaligned, may also reduce the coherency in the seed laser pulse, and, e.g., so long as the delay path exceeds the temporal coherency length of the beam. In this regard, a four mirror mini-OPuS, e.g., with confocally arranged spherical mirrors for ease of alignment, may serve as a satisfactory coherency buster, even without beam flipping in both axis as explained elsewhere in this application. The basic requirement is to mix the beam, e.g., by folding in on itself, in one or more axes, i.e., whether or not negative one imaging occurs. Not only can this occur in OPuS like delay paths, or so-called mini-OPus like delay paths, i.e., with imaging mirrors, but also in delay paths with flat mirrors, such that at least in every round trip of the delay path daughter pulses are flipped in at least one axis with respect to the main pulse and each other.

According to aspects of an embodiment of the disclosed subject matter it may be necessary to combine two separate laser beams at various points within a system according to aspects of an embodiment of the disclosed subject matter. If only half of the entrance to a 6 mirror pulse stretcher is illuminated, the sub-pulses flip between top and bottom as shown, e.g., in FIG. 8. The summation of these "flipped" sub-pulses can lead to a filled in, full size profile, e.g., as illustrated in the pulse stretching simulation shown in FIG. 41, with the curve 562 showing the pulse before entering the delay path and curve 564 (black) after one delay path and 566 (red) after a second delay path. Laser divergence may then be used to fill in the center portion 568, e.g., after some propagation, e.g., over about 1 m or so.

Figure 41:
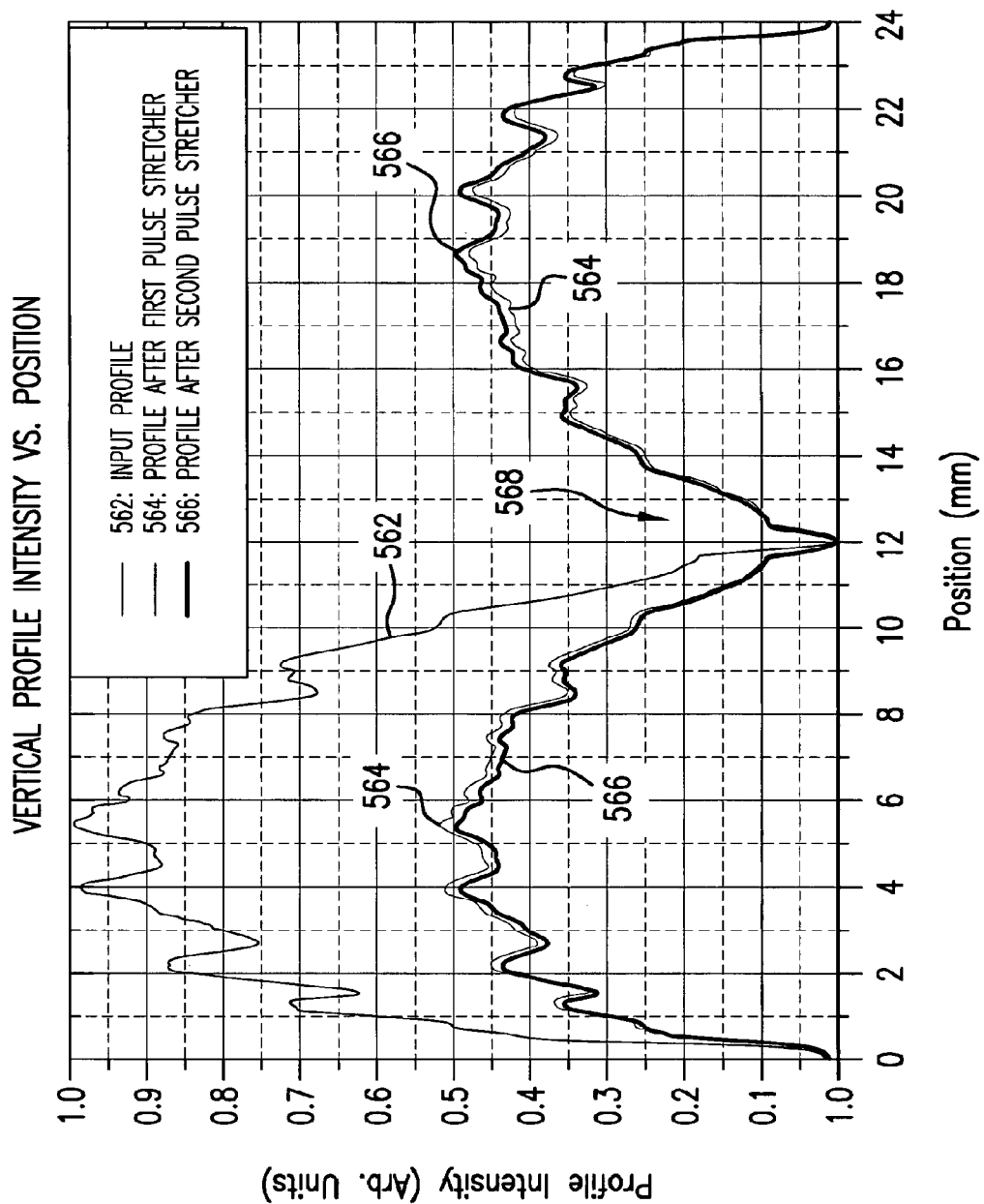
FIG. 41 illustrates results of simulated beam pulse flipping results.

Turning now to FIG. 40 there is shown a schematic representation of the effects of coherence busting according to aspects of an embodiment of the disclosed subject matter. Utilizing an imaging delay path, e.g., a pulse stretcher, e.g., a so-called optical pulse stretcher ("OPuS"), e.g., a 4×$T_{is}$ four mirror OPuS sold with the above noted applicants' assignee's laser systems, and illustrated in U.S. Patents and co-pending applications noted above, or a modified version thereof with a shorter delay, path used, e.g., for folding the beam on itself and/or for delay exceeding the coherence length as discussed herein, the so-called mini-OPuS, one can achieve a degree of coherence busting, e.g., between the MO and amplifier gain medium, e.g., a PA or a PO or a ring power amplification stage. Other forms of coherence busting e.g., as illustrated in FIG. 31 could be used alone or in combination with such a "mini-OPuS," e.g., as illustrated in FIG. 41 and elsewhere herein or as the mini-OPuS itself.

Figure 66:
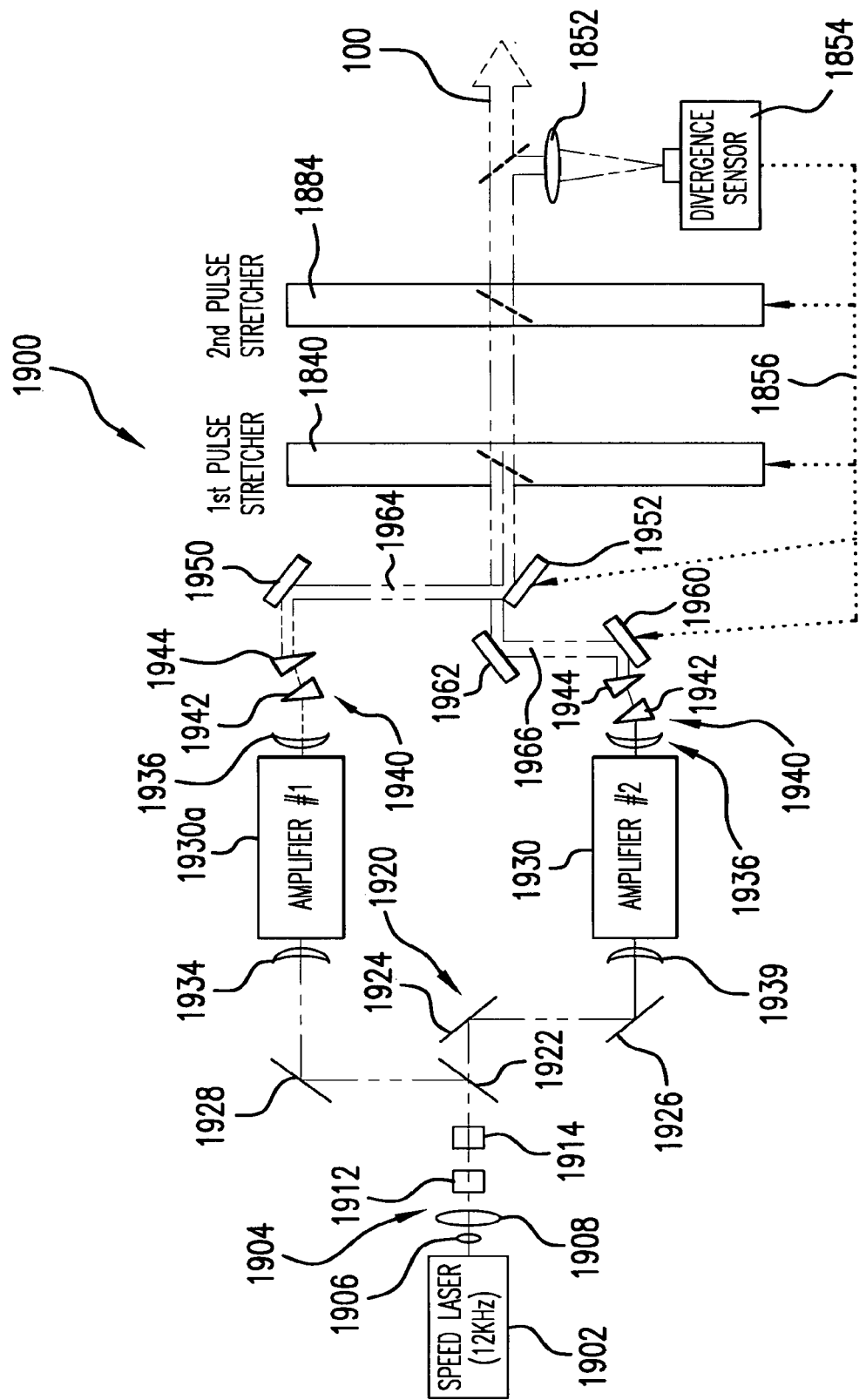
FIG. 66 illustrates schematically and in partly block diagram form a very high power solid state seed laser and gain amplifier laser system according to aspects of an embodiment of the disclosed subject matter.

According to aspects of an embodiment of the disclosed subject matter, the pointing/divergence, sensitivity of a pulse stretcher, e.g., a 4 mirror or 6 mirror pulse stretcher, e.g., a regular OPuS such as a 4×$T_{is}$ OPuS, or a so-called mini-OPuS, or the delay path discussed in more detail in regard to FIG. 31, and also including delay paths with some or all mirrors being flat (non-imaging) can be put to advantage, e.g., by adding active mirror control with feedback from, e.g., a pointing/divergence sensor; illustrated, e.g., in FIGS. 42 and 66. Such advantages include creating or sustaining, e.g., a hall of mirrors effect whereby, e.g., the laser output light pulse beam being smoothed in the delay path actually becomes something like a plurality of beams of very slightly different pointing and thus angle of incidence on the various mirrors of the pulse stretcher and/or down stream of the delay path(s). Applicants assignee has observed this in pulse stretchers where it is very difficult to perfectly align the mirrors, e.g., of the currently used 4×$T_{is}$ OPuS pulse stretcher, thus creating the hall of mirrors effect that reduces the coherence of the laser output light pulse beam exiting the pulse stretcher. Thus the beam 860a forms a plurality of separate beams 862a.

FIG. 40 illustrates a reduction in coherency, e.g., when using both the reflectivity of an OC and an Rmax, e.g., in a flat-flat cavity with, e.g., a polarizing input coupling from a seed laser source of seed laser pulses. The angles have been exaggerated for clarity of illustration. There are, e.g., multiple rays produced by a static fan out, i.e., "hall of mirrors" effect, e.g., created between the OC and the Rmax. The theoretical energy weighting of these rays, assuming no transmission losses through the cavity and perfect reflectivity is shown below.

| Ray Number | Fractional Energy | | Normalized Energy |
|---|---|---|---|
| 1 | 0.2 = | 0.200 | 0.3125 |
| 2 | 0.8 * 0.8 = | 0.640 | 1.000 |
| 3 | 0.8 * 0.2 * 0.8 = | 0.128 | 0.2000 |
| 4 | 0.8 * 0.2 * 0.2 * 0.8 = | 0.0256 | 0.0400 |
| 5 | 0.8 * 0.2 * 0.2 * 0.2 * 0.8 = | 0.00512 | 0.0080 |
| 6 | 0.8 * 0.2 * 0.2 * 0.2 * 0.2 * 0.8 = | 0.00102 | 0.0016 |

One may assume that each ray is incoherent from all others, e.g., where the path length between the OC and the Rmax is maintained to be longer than the temporal coherence length and, e.g., with non-overlapping stretching, i.e., of much less than the pulse length. Each ray may also be assumed, e.g., to be angled slightly different from all others since, e.g., perfect alignment is believed to be extremely difficult, especially in the vertical direction. Applicants believe that about 37 μrad of angle difference in the vertical direction is needed to create uncorrelated speckle. Summing the normalized energy weighting to give the equivalent number of independent pulses and taking the square root to give the reduction in standard deviation, the sum from the above is 1.56. The square root is 1.25 and thus the standard deviation when using both OC and Rmax reflections is predicted to be 0.551/1.25=0.440, which comports well with a value that applicants have measured, i.e., 0.427.

Static fan out, otherwise referred to herein as a hall of mirrors effect, believed to be essentially unavoidable with manual alignment, produces a single pulse speckle contrast with amplification in an amplification gain medium that is 2.50× smaller than the seed laser alone. This reduction is the equivalent of 6.3 uncorrelated sub-pulses. Some of this contrast reduction is due to the weak line content from the XeF power oscillator used for testing the effects of the oscillation amplification stage, but most is believed to be due to the static fan out effect. Likely, many of the sub-pulses created by the OPuS-like static fan out characteristics of the OC-Rmax (OC-rear cavity mirror) reflections are all amplified to nearly equal intensities and thus create more equivalent independent pulses than shown in the above table.

In FIG. 40 this could also illustrate schematically the beam spreading in, e.g., a flat-flat cavity 850a with an input coupler, having slightly misaligned mirrors forming the rear of the cavity 852a and an output coupler 854a, but the same effect has been observed in an OPuS by applicants employer with the coherence busting effect noted above. The cavity illustrated in FIG. 40 may also have a polarizing input coupler 858a and a quarter wave plate 856a.

Tilt angle required to produce uncorrelated speckle patterns may be significant. The first big jump in equivalent pulses, from 1.0 to 1.55, is believed by applicants to be mostly due to the poor pulse-to-pulse repeatability of the speckle patterns when running as a MOPO. Even without changing the mirror tilt at all, two pulses are correlated no better than 30-35%. With seed only, this pulse-to-pulse correlation has been found to be about 85-90%. The long slow rise in equivalent pulse number does not even reach a value of 2.0 until about 400 μrad of mirror tilt as illustrated, e.g., in FIG. 37. This result could mean, e.g., there may be a need for a large angular sweep, of about ±500-1000 μrad, e.g., to create several uncorrelated speckle patterns in a single pulse.

Through experimentation relating to coherence applicants' employer has learned that, e.g., sub-pulses produced by a pulse stretcher are incoherent and lead to a different fringe pattern if their angles are slightly shifted, provided the sub-pulses are delayed by longer than the temporal coherence length. The pin hole fringe pattern shifts maximum to minimum when input angle is λ/2 d.

Use of a solid state laser source for lithography has been proposed in the past and not pursued for two reasons. Solid state lasers are not considered capable of the high average power required for lithography and a solid state laser produces single mode output which is highly (perfectly) coherent. According to aspects of an embodiment of the disclosed subject matter applicants propose to address the low average power problem with, e.g., a hybrid solid state seed/excimer amplifier combination. The high coherence properties of the solid state seed can be addressed in a number of ways according to aspects of embodiments of the disclosed subject matter, e.g., by creating sub-pulses, e.g., that are separated in time longer than the coherence length along with changing the seed laser pointing, e.g., over very short time scales, e.g., within a single laser pulse, or a combination of both. Coherency busting has been found by applicants to be of benefit in dual chamber gas discharge (e.g. excimer) seed/gas discharge (e.g., excimer) amplifier portion lasers as well.

It will be understood by those skilled in the art that an apparatus and method is disclosed for reaching very high average output power, e.g., greater than 100 W or more with an excimer or molecular fluorine gas discharge laser system in the DUV range of wavelengths, e.g., 351 for XeF, 318 for XeCl, 248 for KrF, 193 for ArF and 157 for $F_2$, utilizing, e.g., a power oscillator or other amplification gain stage, e.g., a ring power amplification stage, with little or no significant ASE interfering with the in-band desired radiation output of the laser system, e.g., with a ratio between the ASE and in-band radiation at or below about $5 \times 10^{-4}$, e.g., with, e.g., a 100 uJ pulse energy input into the power amplification stage cavity per pulse. According to aspects of an embodiment of the disclosed subject matter unwanted ring power amplification stage light propagates backwards and can also be sampled for diagnostics and ASE feedback control. Adding a small amount of line-narrowing, e.g., with prism tuning, can also help suppress ASE from the power amplification stage. Also according to aspects of an embodiment of the disclosed subject matter a PA may be used, e.g., along with a solid state MO, e.g., a 4 pass amplifier with no oscillation but with acceptable amplification and perhaps even high enough saturation. With such a design it may be necessary, e.g., for the 4 passes to each traverse the entire gain cross-section in each of the 4 passes. The cavity may have 2 prisms on each side of the cavity, in order to, e.g., reduce the energy density on the coated cavity optics and also provide dispersion for ASE reduction.

In addition, it may not be that the ultimate ASE levels in a MOPO, or other master oscillator/power amplification stage configurations, necessarily increase with decreasing MO energy, such that according to aspects of an embodiment of the disclosed subject matter decreasing MO output energy even below 10 μJ may not result in unacceptable ASE, even without, e.g., a partially reflective off axis seed injection mechanism and/or a regenerative ring power amplification stage configuration. A cavity with beam expansion and crossing beams may be constructed that does not exceed the cavity length of today's XLA, e.g., with the beam expansion prisms far enough away from the chamber to allow lateral translation for beam crossing, e.g., at a distance of a few centimeters of the chamber window, dictated by, e.g., beam width and crossing angle. A separate vessel for the prisms and/or beam reverser optics could also allow the use of a direct $F_2$ supply, e.g., at a different concentration than in the lasing gas mixture, e.g., at around 1% concentration. This could also, e.g., avoid contamination from the optics holders.

Figure 37:
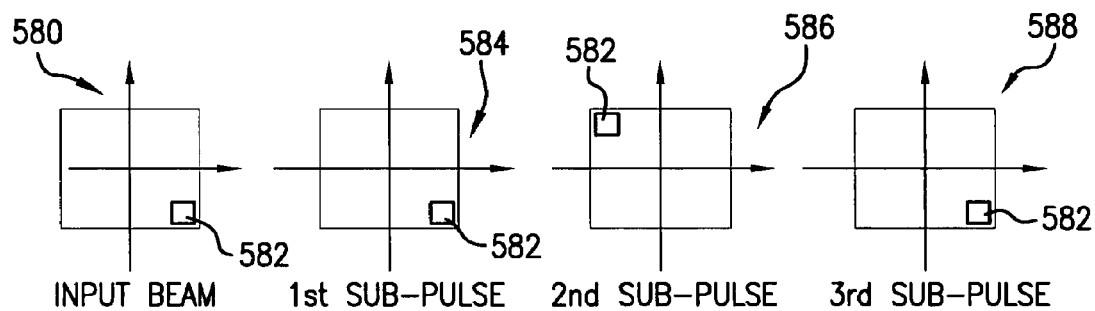
FIG. 37 illustrates schematically the effect on beam coherency from folding a beam upon itself according to aspects of an embodiment of the disclosed subject matter.

The effect of inverse imaging, e.g., in an optical delay path, e.g., in a mini-Opus with a delay path of only about one foot, is illustrated in FIG. 37, e.g. for an input beam 580, in which a beam corner 582 is designated by the square initially in the lower right hand corner of the beam 580a. For a first sub-pulse 584, e.g., between an entrance beam splitter and a first mini-OPuS mirror, the beam corner 582 remains the same. In a second sub-pulse 586, e.g., reflected from the first mirror, the beam has been, e.g., negatively imaged, e.g., to a second mini-OPuS mirror and the beam corner has moved to the upper left hand corner and then for a third sub-pulse 588, reflected to a fourth mini-OPus mirror, where the beam corner has been negatively imaged back to the bottom right hand corner, as illustrated in the figure. Combining all of these sub-pulses into an output pulse, with a relatively short optical pulse delay such that the pulse is not very significantly stretched from a $T_{is}$ standpoint, can still substantially reduce coherency by this effect of folding the beam on itself a plurality of times, depending on the number of mirrors in the delay path.

FIG. 8 illustrates this same effect, e.g., on half of the beam, e.g., is the beam had been split into two halves before entry into the delay path of, e.g., two separate sources, e.g., two solid state seed lasers operating at X kHz in, e.g., a 2× kHz system. As can be seen the two halves are similarly negatively imaged in each sub-pulse resulting in even further reduction in coherency in an overall output pulse formed, e.g., by the combination of the two half pulses into a single output pulse, e.g., of the shape shown by way of example in FIG. 37. as noted, this can also act as an effective beam combiner/mixer for combining separate beams from separate sources.

Turning now to FIG. 42 there is shown schematically and partly in block diagram form a beam combiner system 600a, according to aspects of an embodiment of the disclosed subject matter. The beam combiner system 600a may include, e.g., a first amplifier gain medium portion 602a and a second amplifier gain medium portion 604a, each of which may be, e.g., a PA or PO of ring power amplification stage, as described elsewhere in the present application. The output of each of the amplifier portions 602a, 604a may pass through a beam expander 608a, which may include a prism 610a and a prism 612a, e.g., magnifying the beam by, e.g., about 2×. A turning mirror 620a may steer a first laser system output light pulse beam 622a from the amplifier 602a to a second turning mirror 624a which may steer the pulse beam 622a to form a pulse beam 632a onto a beam splitter for a first pulse stretcher 640a and thence to a beam splitter 646a for a second pulse stretcher 644a. A turning mirror 630a may steer a second laser system output light pulse beam 632a from the second amplifier 604a to a second turning mirror 634a, which may steer the beam 632a to form a beam 634a to be incident on the beam splitter 642a and thence the beam splitter 646a. The output of the first OPuS and second OPuS, which may be "mini-OPuSs" as discussed elsewhere in the present application, may pass through another beam splitter 650a, where, e.g., a small portion of the laser system output laser light pulse beam may be diverted, e.g., for metrology purposes, e.g., focused by a focusing lens 652a into a divergence detector 654a, which may be part of a control system (not shown) providing feedback control signals 656a, e.g., to the beam splitters 642a, 646a of the first and/or second OPuSs 640a, 644a or the turning mirrors for each of the beams 632a, 634a to, e.g., insure the pointing from both amplifiers remain overlapped in the far field so that the beam appears to be as one beam, and also, e.g., so that the two pulse stretchers maintain the pointing chirp introduces=d, e.g., due to the confocal nature of the OPuS(s).

FIG. 38 illustrates schematically the impact of changing the pointing of the beam (sweeping the beam) in terms of coherency/speckle reduction. A pulse stretcher 662 may receive a laser system output laser light pulse beam 100 on a beam splitter 664 and, e.g., through changing the angle of the beam splitter sweep the pointing of the beam 100 onto a diffuser 670. The resultant detected speckle pattern 680 indicates that the sweeping reduces the coherency contrast and thus speckle.

Turning now to FIG. 66 there is illustrated by way of example in schematic and partly block diagram form a very high power solid state seeded immersion lithography laser light source 1900, which may include, e.g., a high pulse repetition rate, e.g. a 12 kHz, solid state seed laser 1902. The output of the seed laser 1902 may pass through formatting optics 1904, which can include, e.g., a lens 1906 and a lens 1908, which may be used to, e.g., to reformat the beam from a round beam to a shape concomitant with the shape of the gain medium in the amplifier portion. The output laser light pulse beam from the seed laser 1902 may then be passed through an x axis electro-optical ("E-O") steering mechanism 1912, and/or a y-axis E-O steering mechanism 1914 or both, e.g., an E-O cell model referenced above, each providing, in a respective axis, e.g., orthogonal to each other, a sweep of the beam in order to paint a reasonable percentage of the utilization tool (e.g., scanner or annealing tool) aperture, e.g., about 1 mrad, along with a high frequency AC painting voltage, as explained elsewhere in the present application. The laser output light pulse beam pulses from the seed laser 1902 may then be split in a beam divider to provide alternating ("tic-toc") input pulses into a respective one of an amplifier gain medium, e.g., a first power oscillator 1930a and a second power oscillator 1930. The power oscillators 1930 and 1930a may comprise ring power oscillators.

The beam divider 1920 may comprise, e.g., a beam splitter 1922 that selectively transmits, e.g., 50% of the output beam from the seed laser 1902 onto a turning mirror 1924 and a turning mirror 1926, leading into the second power oscillator 1930 and reflects 50% to a turning mirror 1928 leading to the second power oscillator 1930, e.g., on each pulse the beam splitter 1920 could also comprise, e.g., an electro-optical or acousto-optical beam deflector alternating actuated to send light to folding mirror 1928 or folding mirror 1924 on alternate pulses.

Each respective power oscillator 1930 or 1930a may include an input coupler/rear cavity mirror 1934, e.g., a concave mirror with an aperture on the axis of revolution of the mirror surface admitting the seed laser beam into the cavity formed by the rear cavity mirror 1934 and a front cavity mirror 1936 as are known in the art of unstable oscillation cavities. It will be understood that the amplifier gain medium may be in other configurations mentioned in the present application, e.g., a stable resonator with, e.g., a seed injection mechanism, discussed in the co-pending and contemporaneously filed application referenced above, and a ring power amplification stage, or a power amplifier, without an oscillator cavity and with only a fixed traversal path for amplification while the gain medium is energized (e.g., a population inversion exists) as is known in the art, without laser oscillation occurring, i.e., without an output coupler as is known in the art of laser oscillation cavities. In oscillation cavity environments, e.g., the convex mirrors could be replaced, e.g., by an input coupler such as the seed injection mechanism, discussed in more detail elsewhere in the present application, and the convex mirror 1936 replaced with an output coupler. Beam expanding, beam combining and coherency busting and divergence measuring (, e.g., where ASE is of concern) of the respective output beams 1966 from the first power oscillator 1930a and 1964 from the power oscillator 1930, and feedback control may occur as discussed in regard to FIG. 21 with respective beam expander 1940, comprising, e.g., prisms 1942 and 1944, beam combiner comprising mirrors 1950, 1952 from the first power oscillator 1930a and mirrors 1960, 1962 from the second power oscillator 1930 and pulse stretchers 1840 and 1844 and metrology unit 1854.

FIG. 39 illustrates schematically the results of a coherency busting scheme on an output laser pulse, e.g., in relation to a scanner acceptance window, e.g., introducing horizontal and vertical (as illustrated in the plane of the page drawing of FIG. 39) directions. The dot 780a illustrated schematically and by way of example an initial seed laser output pulse profile 780a. The pattern of pulses 782a illustrate a pattern of sub-pulse profiles 782a after beam folding in a perfectly aligned beam delay path, or through a misaligned pulse stretcher(s) or both, or a combination thereof, and the circles 784a around each represent the effect on the profile of electro-optical smearing.

Figure 67:
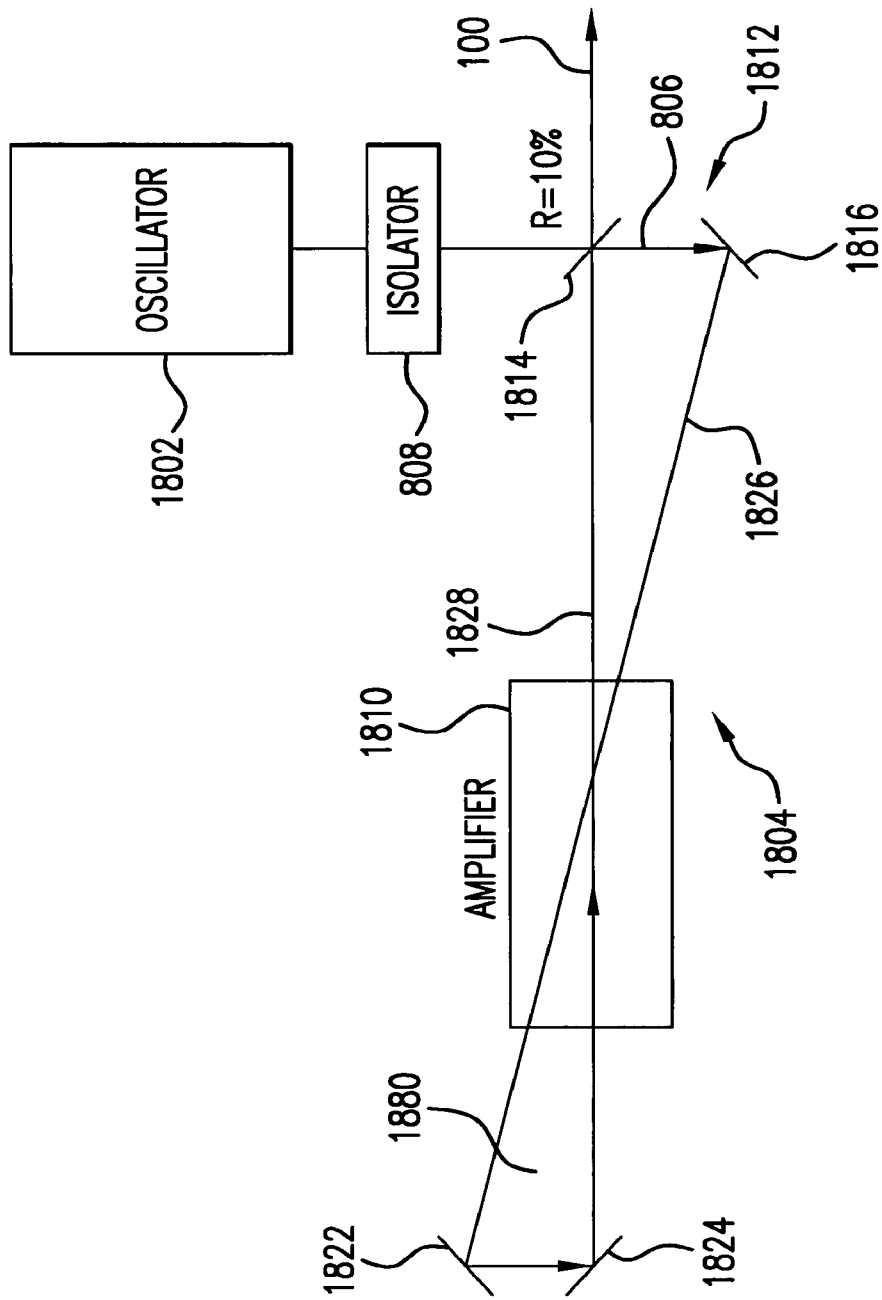
FIG. 67 illustrates schematically and partly in block diagram format a regenerative/recirculating power gain oscillator power amplification stage according to aspects of an embodiment of the disclosed subject matter.

FIG. 67 illustrates schematically and partly in block diagram form by way of example a ring power amplification stage oscillator laser system 1800 and a seed injection mechanism 1812, as discussed in more detail herein. The laser system 1800 may comprise, e.g., a with bow-tie ring power amplification stage 1804 and a seed laser, e.g., a solid state or gas discharge seed oscillator 1802. The seed oscillator 1802 may be isolated from the oscillator cavity of the power amplification stage 1804 by an isolator to prevent unwanted lasing from feedback photons, which may be unnecessary, e.g., with a proper seed injection mechanism 812. The power amplification stage section 1804 may include, e.g., a power amplification stage chamber 1810, a seed injection mechanism 1812, which may include, e.g., an input/output coupler 1814 and a maximally reflective ("Rmax") mirror 1816 beam reverser 1820, reflecting the output beam 1806 from the seed oscillator 1802 into the amplifier portion chamber 1804, and also include a beam reverser/returner 1820, which may include, e.g., a first maximally reflective mirror 1822 and a second mirror 1824, e.g., made of a material, like the Rmax mirror 1816, selected to be maximally reflective for a suitable band around the nominal center wavelength of the laser system, e.g., 351 for XeF, 318 for XeCl, 248 for KrF, 193 for ArF and 157 for $F_2$. The seed injection mechanism and beam returner, as explained in more detail herein, may be arranged so as to form the oscillation cavity of the power amplification stage 1840 (whether technically speaking an oscillator or amplifier oscillator stage, i.e., depending on cavity length). It will be understood that the angle of offset of the beams 826,828 is greatly exaggerated for illustration purposes and could be around 1 μrad.

Figure 68:
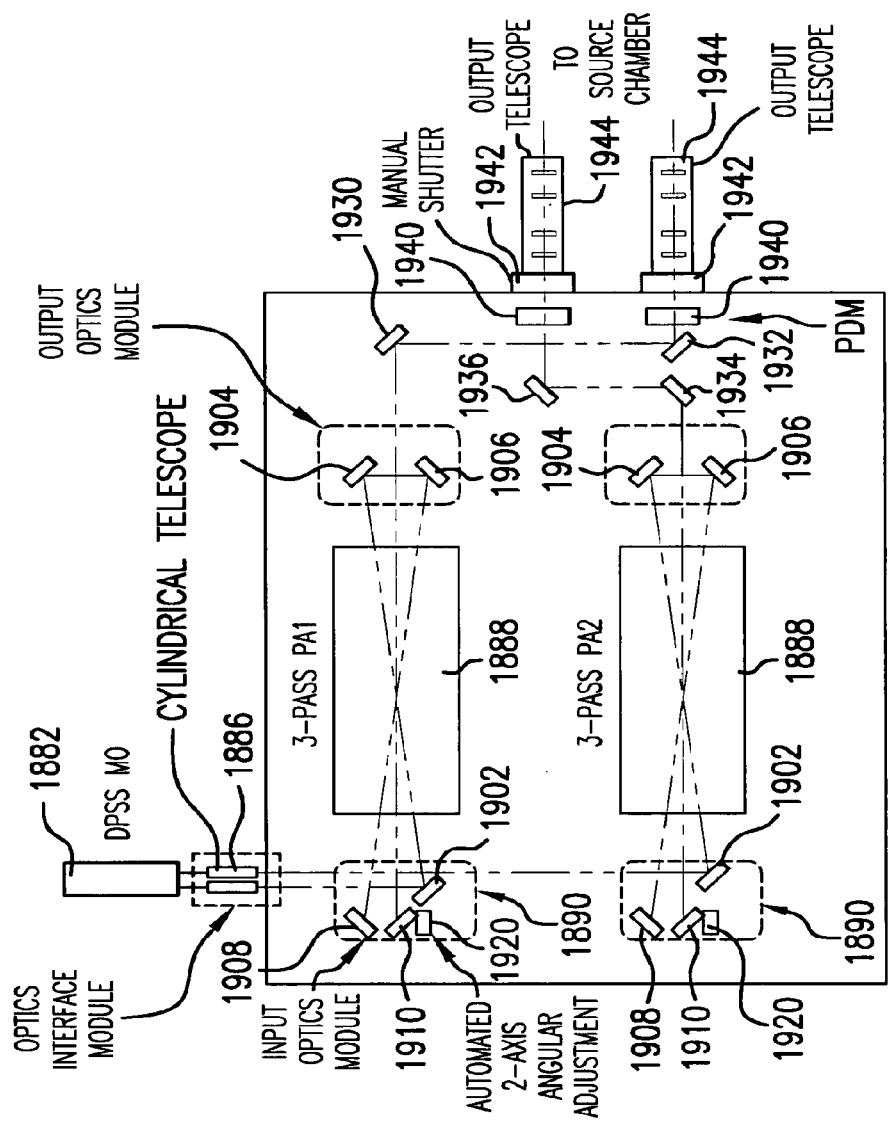
FIG. 68 illustrates schematically and partly in block diagram form a solid state seed laser/gain amplifier laser system according to aspects of an embodiment of the disclosed subject matter.

FIG. 68 illustrates schematically and partly in block diagram form a solid state seed/power amplifier laser system 1880 according to aspects of an embodiment of the disclosed subject matter. The system may incorporate a solid state 12 kHz seed laser 1882 and a pair of amplifier gain media, e.g., a pair of power amplifier chambers 1888. An optical interface module 1884 may receive the output of the seed laser 1882 and direct it in tic-toc fashion into the respective amplifier gain medium 1888, e.g., on alternating pulses. The optical interface module 1884 may comprise, e.g., a pair of cylindrical telescopes 1886, which may serve to format the beam, e.g., because the output may be astigmatic with the telescope serving to remove the astigmatism, and may also include, e.g., an input optics module 1890, each including, e.g., a mirror 1902, a mirror 1908 and a mirror 1910, which together with mirrors 1904 and 1906 may form, e.g., a fixed number of passes, e.g., three passes through the gain medium between electrodes (not shown in FIG. 68) in an amplifier gain medium configured, e.g., as a three pass power amplifier ("PA"). that is, no laser oscillation occurs in the amplifier gain medium. The respective outputs of the respective power amplifier 1888 may be steered by beam turning mirror 1930, 1932 on the one hand and 1934, 1936 on the other through a respective energy sensor. These output beams from the system 1880 may be combined in a beam combiner as discussed elsewhere in the present application.

A coherency buster, e.g., an automated two axis angular adjustment mechanism 1910, e.g., modulating the tilt of the respective mirror 910 in the input optics module 890 may serve a similar purpose to that of the X and Y axis beam steering electro optic elements 1712, 1714 of the embodiment of FIG. 66, e.g., by sweeping the beam entering the amplifier gain medium from side to side and/or up and down for greater divergence and thus coherency busting as discussed elsewhere herein.

Turning now to FIG. 69 there is illustrates schematically and in partly block diagram format a seed laser/amplifier gain medium laser system such as a solid state seed/power amplification stage laser system 1950 according to aspects of an embodiment of the disclosed subject matter. The system 1950 may include, e.g., a seed laser, e.g., a solid state 12 kHz seed laser 1952 the output of which may enter into an optical interface modules 1884, e.g., into a respective one of a pair of cylindrical telescopes 1886, as in the embodiment of FIG. 68. Input coupling modules 1960 may include, e.g., a polarizing beam splitter 1962, an Rmax 1964, a quarter wave plate 1966, and an input coupler Rmax mirror 1968, which together function to couple output of the seed laser 1952, respective seed beam 1970, 1972, into the respective gain amplifier medium, e.g., a power amplification stage oscillator having an output coupler 1982, by e.g., using a polarization coupling. Turning mirrors 1984, 1986, 1994, 1996 serve the same purpose as the respective turning mirrors in the embodiment of FIG. 68.

Figure 70:
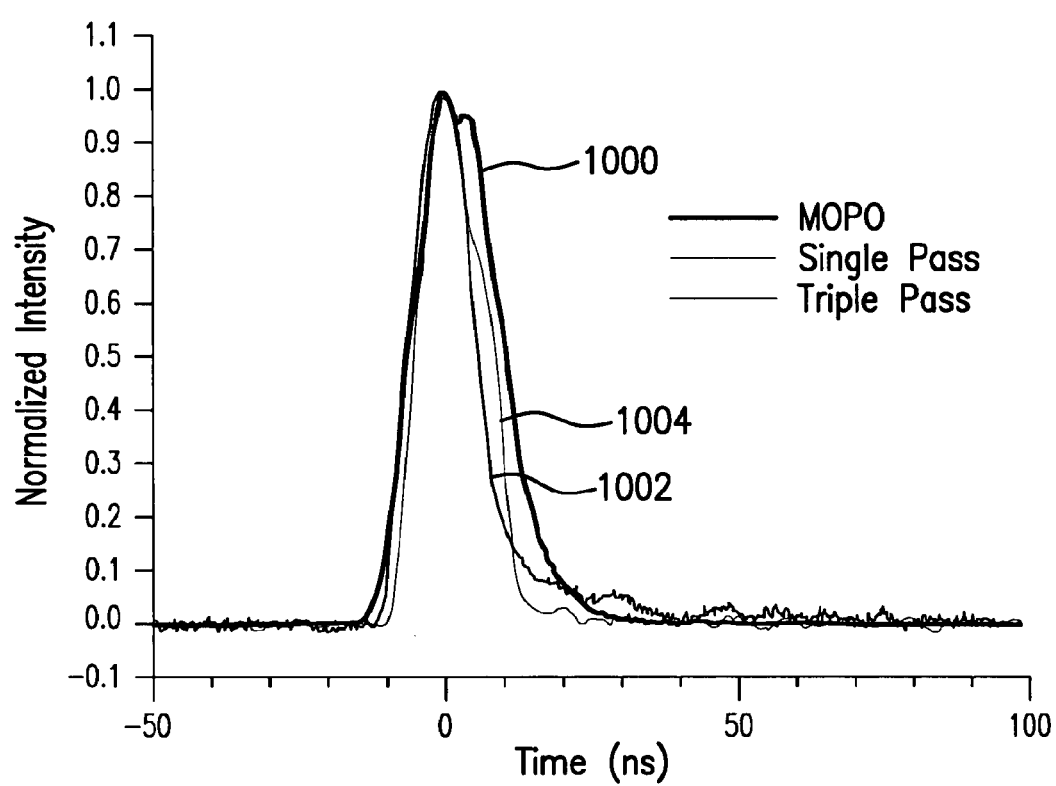
FIG. 70 illustrates normalized output pulse shapes from laser systems according to aspects of an embodiment of the disclosed subject matter.

FIG. 70 represents an illustrative normalized MOPO intensity 1000, a normalized single pass PA intensity 1002 and a normalized two pass PA intensity 1004.

Figure 71:
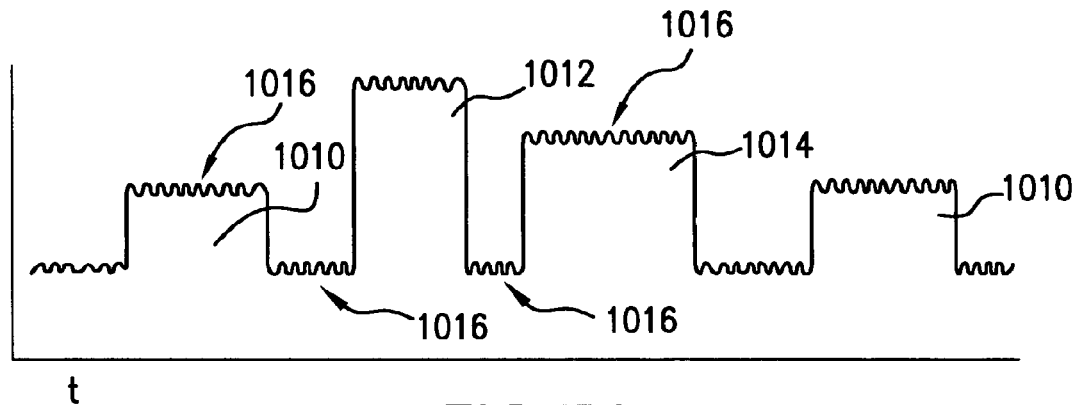
FIG. 71 represents schematically E-O cell laser steering input voltages according to aspects of an embodiment of the disclosed subject matter.
Figure 73:
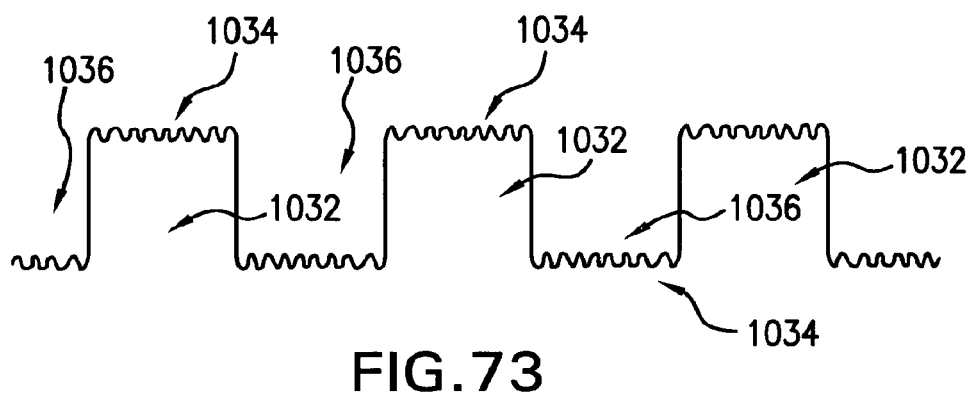
FIG. 73 represents schematically E-O cell laser steering voltages input signals according to aspects of an embodiment of the disclosed subject matter.

FIG. 71 represents an illustrative macroscopic steering pulse 1010, which may comprise a plurality of alternating high and low DC voltages 1010, 0102, and 1014, which may repeat in some pattern, e.g., of three different high voltages, as illustrated and a superimposed alternating current high frequency steering voltage 1016, which may occur, e.g., both at the higher voltage and at the low voltage. As illustrated, e.g., the high voltages may have different pulse durations and different low voltage duration intervals as well. As shown in FIG. 73, these high voltages 1032 may be of the same value and same low voltage duration interval 1036 with superimposed AC 1034.

Figure 72:
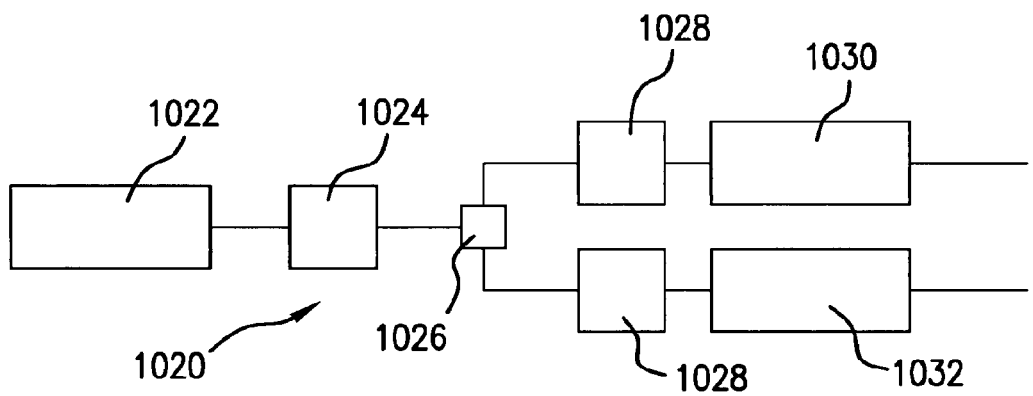
FIG. 72 represents schematically in block diagram form a laser steering system according to aspects of an embodiment of the disclosed subject matter.

FIG. 72 illustrates schematically and in block diagram form an optical switching and painting system 1020, according to aspects of an embodiment of the disclosed subject matter, which may include, e.g., a solid state seed 1022, a frequency converter 1024, and an optical switch and painter 1026, which may include an electro-optical beam director that, e.g., deflects the beam into a first one of an amplifier gain medium 1030 when the pulse, e.g., as shown in FIG. 73 is high (1032 in FIG. 73 and into the other amplifier gain medium 1032, when the pulse is low (1036 in FIG. 73) and also applies the AC beam steering 1034 into each amplifier 1030, 1032. A second frequency shifter 1028 may be intermediate the beam splitter/painter 1026 and the respective amplifier gain medium 1032, and may be in addition to the frequency shifting of the element 1024 or in lieu thereof.

According to aspects of an embodiment of the disclosed subject matter applicants propose to generate 193 nm laser light utilizing a solid-state seed laser, e.g., the generation of coherent 193 nm radiation in a solid-state configuration with a solid-state seed drive laser (or lasers) that drive linear or nonlinear frequency conversion stages. One potential seed drive laser is the pulsed Yb fiber laser, lasing at around 1060 nm, tunable in the 1050-1080 nm region. Such lasers constitute a mature and powerful fiber laser technology, which may, e.g., be configured to produce short temporal duration pulses (1-5 ns) at multi-kilohertz repetition frequencies. To generate 193 nm using 1060 nm as the longest wavelength mixing source, according to aspects of an embodiment of the disclosed subject matter, applicants propose to use, e.g., sum frequency generation ("SFG") with a long wavelength and a moderately short wavelength to generate deep ultraviolet ("DUV"). Second harmonic generation ("SHG") to reach 193 nm is not possible, due to the present lack of a 236.5 nm source as the other mixing wavelength. However, such a source could be derived by fourth harmonic generation, ("FHG") of the 946 nm output of a q-switched diode-pumped Nd:YAG laser (946 nm being a lower efficiency transition in Nd:YAG.

The output of the Nd:YAG is essentially a fixed wavelength, and overall tunability could be provided by tuning the output wavelength of the Yb fiber laser, e.g., a $Yb^{+3}$ fiber laser. Tunability of the Yb fiber laser output could be obtained via a CW diode seed laser, e.g., a New Focus Vortex TLB-6021. Such a diode laser seeders can provide fast wavelength control over limited wavelength ranges, e.g., via internal PZT control of reflectors, as desired for lithography source applications and have a high spectral purity. Nd:YAG lasers are operable at multi-kilohertz repetition frequencies, ensuring the overall system repetition rate can meet the repetition rate requirements for a practical excimer laser injection seeding source.

To achieve narrow bandwidth operation, both laser sources need individually to be narrowband. In Nd:YAG systems, this may be achieved, e.g., by injection seeding with a CW lower power Nd:YAG laser, e.g., in a non-planar ring oscillator architecture that is operating, e.g., with a single longitudinal mode output. In the Yb fiber laser case, the bandwidth could be assured via the CW diode laser seeder, which typically operates at very narrow linewidths, e.g., on the order of 100 MHz FWHM. Further, appropriate large-mode area ("LMA") fiber technology could be used to minimize spectral degradation due, e.g., to nonlinear effects in the fiber comprising the fiber laser oscillator or any subsequent amplification stages.

Figure 76:
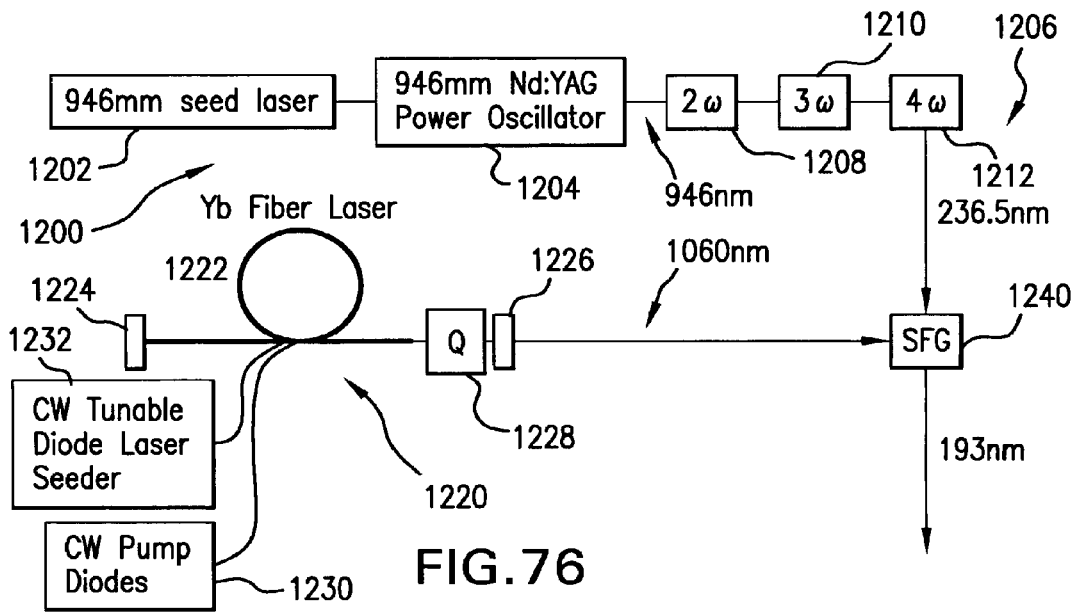
FIG. 76 illustrates schematically and partly in block diagram form a solid state seed laser with about 193 nm output light according to aspects of an embodiment of the disclosed subject matter.

To generate 193.4 nm radiation, e.g., as illustrated schematically and partly in block diagram form in FIG. 76, a system 1200 including, e.g., a pulsed 946 nm Nd:YAG laser 1204 seeded by a 946 nm seed laser, e.g., a 946 nm CW Nd:YAG seed laser 1202, which the output of the Nd:YAG laser 1204 frequency doubled, in a frequency converter 1206, which may include, e.g., a frequency doubler 1208, e.g., a non-linear material such as an LBO or KTP crystal, followed by either another frequency doubler (not shown) or a third harmonic generator 1210 and a fourth harmonic generator 1212 (e.g., each done using sum-frequency generation with residual pump radiation, e.g., using the above noted crystals), either approach generating the fourth harmonic at 236.5 nm. The 236.5 nm radiation can then be mixed, e.g., in a sum frequency generation with the 1060 nm output of the a Yb fiber laser in a final nonlinear crystal mixing stage, sum frequency generator 1240, e.g., a CLBO or a BBO crystal. That is, e.g., 1/1040 (0.000943)+1/236.5 (0.00423)=1/193.3 (0.005173). The fiber laser 1222 may have a rear oscillation cavity mirror 1224 and a front window 1226, with a Q-switch 1228.

CLBO is cesium lithium borate, which is an effective $4^{th}$ or $5^{th}$ harmonic generator for Nd:YAG output light, can be phase matched up for 193 nm operation and has a damage threshold of >26 $GW/cm^2$. BBO is beta barium borate (b-$BaB_2O_4$), which is one of the most versatile nonlinear optical crystal materials available and most commonly used for second- or higher-order harmonic generation of Nd:YAG, Ti:Sapphire, argon ion and alexandrite lasers. CLBO may be used, e.g., because of its higher transparency and high acceptance angle, which may, however, require cryogenic cooling for phase matching, also being problematic because CLBO is a hygroscopic material). An alternative is, e.g., BBO, which can be phase matched but is being operated very close to its absorption band edge at ~190 nm. BBO also has much a narrower acceptance angle than CLBO, but this can be managed through optical design, e.g., with anamorphic focusing. According to aspects of an embodiment of the disclosed subject matter both lasers 1024, 1022 can be made relatively powerful, e.g., with real output power of greater than about 25 KW, helping to compensate for any inefficiencies in the non-linear frequency conversion stages 1206, 1240.

According to aspects of the disclosed subject matter, the generation of 193.3 nm with solid state laser(s) for seeding an excimer amplifier gain medium may also be done, e.g., by the use of mature drive laser technologies, which may be wavelength tunable in a similar fashion to current tuning of excimer lasers. A seed laser system 1200', illustrated schematically and in partly block diagram form in FIG. 77, may comprise, e.g., an Er fiber laser 1260, e.g., lasing at around 1550 nm but tunable in the 1540-1570 nm range. Er fiber lasers are available, and use similar generic technologies to Yb fiber lasers. Such an approach is attractive because of the maturity of fiber and pump diode laser technology for this wavelength range, applied, e.g., in fiber-based telecommunications, e.g., erbium-doped fiber amplifiers or EDFAs used as signal boosters in optical fiber communication.

Figure 77:
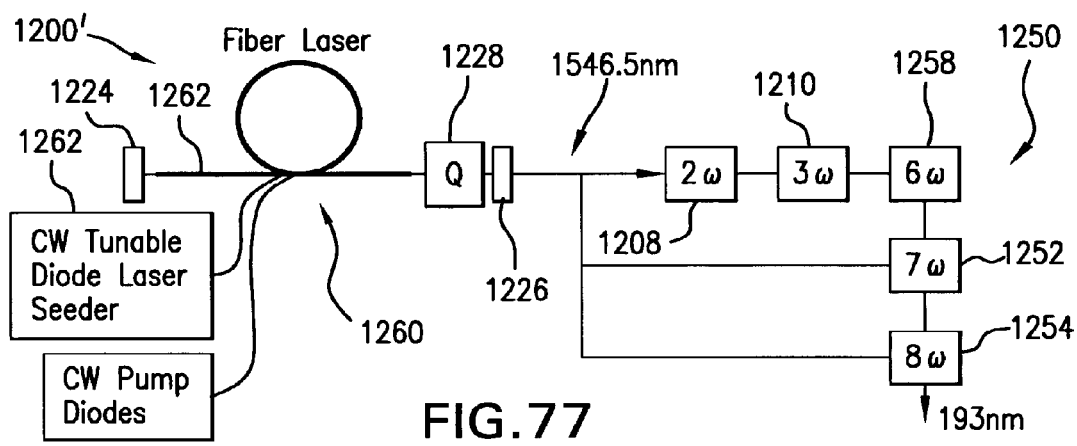
FIG. 77 illustrates schematically and partly in block diagram form a sold state seed laser with about 193 nm output light according to aspects of an embodiment of the disclosed subject matter.
Figure 78:
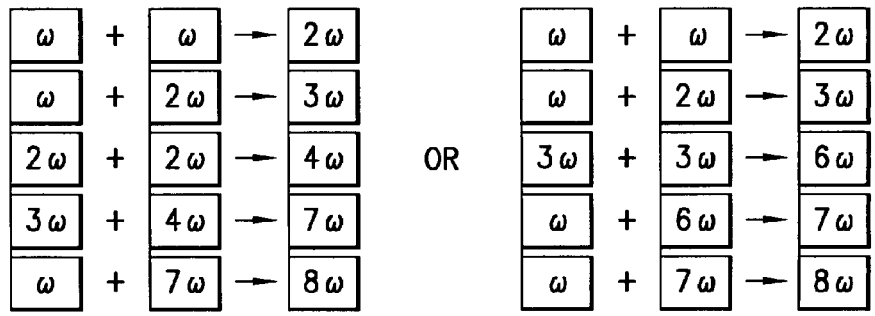
FIG. 78 illustrates various frequency up-conversion schemes.

According to aspects of an embodiment of the disclosed subject matter applicants propose to use a pulsed fiber laser oscillator 1260 as the source of moderate peak power (e.g., 5-50 kW) high-repetition-rate (multi-kHz, e.g., at least 12) 1546.5 nm narrowband pulsed radiation. That laser 1260 could be constructed using standard pulsed fiber laser technology, to use a single-mode CW tunable narrowband diode laser 1262 as an injection seeder for the fiber laser oscillator 1260 to ensure narrowband, single wavelength performance, and also to allow the fast wavelength tunability required for lithography light source applications. An example of the type of diode laser seeder 1262 is, e.g., a New Focus Vortex TLB-1647, which uses an external cavity diode configuration with PZT wavelength actuation for high-speed wavelength drive over a limited wavelength range, in parallel with mechanical drive for extended wavelength range operation. Further, appropriate large-mode area ("LMA") fiber technology could be used to minimize spectral degradation, e.g., due to nonlinear effects in the fiber comprising the fiber laser oscillator or any subsequent amplification stages. Using such approaches can, e.g., allow spatial beam quality to be maintained, employing techniques for ensuring single-mode operation in large mode area fibers, while reducing the peak power in the core of the fiber. After the 1546.5 nm radiation is generated, it may then be frequency upconverted directly to 193.3 nm, e.g., using five stages of nonlinear frequency conversion, either second harmonic generation, or sum frequency generation. This can be achieved through the steps listed in FIG. 78, one of which is illustrated by way of example in FIG. 77, wherein co refers to 1546.5 nm and 8ω becomes 193.3 nm. In FIG. 77 there is shown the generation of the second harmonic 2ω of 1546.5 nm in SHG 1208, and the third harmonic generation, e.g., by adding the base frequency to the second harmonic to in SFG 1258 to get 3ω, and frequency doubling 3 W to get 6ω in frequency double 1258, followed by similar such sum frequency generations as just noted in SFGs 1252 and 1254 to get, respectively, 7ω and 8ω. In addition, according to aspects of an embodiment of the disclosed subject matter relatively low-power pulsed fiber laser oscillator outputs, e.g., seeded by a diode laser for spectrum/wavelength control, could then be boosted in peak power via, e.g., a subsequent stage(s) of fiber amplification (not shown). Applicants propose also, the development of an all-fiber solid state drive laser based on this approach.

Turning to FIG. 47 there is illustrated schematically and in block diagram form a laser treatment system, e.g., and LTPS or tbSLS laser annealing system, e.g., for melting and recrystallizing amorphous silicon on sheets of glass substrates at low temperature. The system 1070 may include, e.g., a laser system 20 such as described herein and a optical system 1272 to transform the laser 20 output light pulse beam from about 5×12 mm to 10 or so microns×390 mm or longer thin beams for treating a workpiece, e.g., held on a work piece handling stage 1274.

MO/amplification stage energy vs. MO/amplification stage timing has been examined at different values of seed laser energy, ArF chamber gas mixture, percentage reflectivity of output coupler (cavity Q) and seed laser pulse duration, with the results as explained in relation to FIG. 7.

ASE vs. MO/amplification stage timing has been examined for different values of seed laser energy, ArF chamber gas mixture, percentage reflectivity of output coupler (cavity Q) and seed laser pulse duration with the results also explained in relation to FIG. 7.

Turning to FIG. 7 there is shown a chart illustrating by way of example a timing and control algorithm according to aspects of an embodiment of the subject matter disclosed. The chart plots laser system output energy as a function of the differential timing of the discharge in the seed laser chamber and the amplification stage, e.g., the ring power amplification stage as curve 600, which is referred to herein as dtMOPO for convenience, recognizing that the amplification stage in some configurations may not strictly speaking be a PO but rather a PA though there is oscillation as opposed to the fixed number of passes through a gain medium in what applicants' assignee has traditionally referred to as a power amplifier, i.e., a PA in applicants' assignee's MOPA XLA-XXX model laser systems, due, e.g., to the ring path length's relation to the integer multiples of the nominal wavelengths. Also illustrated is a representative curve of the ASE generated in the amplification stage of the laser system as a function of dtMOPO, as curve 602. In addition there is shown an illustrative curve 604 representing the change in the bandwidth of the output of the laser system as a function of dtMOPO. Also illustrated is a selected limit for ASE shown as curve 606.

It will be understood that one can select an operating point on the timing curve at or around the minimum extremum of ASE and operate there, e.g., by dithering the control selection of dtMOPO to, e.g., determine the point on the operating curve 602 at which the system is operating. It can be seen that there is quite a bit of leeway to operate around the minimum extremum of the ASE curve 602 while maintaining output pulse energy on the relatively flat top portion of the energy curve to, e.g., maintain laser system output pulse energy and energy σ, and the related dose and dose σ constant, within acceptable tolerances. In addition as shown, there can be a concurrent use of dtMOPO to select bandwidth from a range of bandwidths while not interfering with the E control just noted.

This can be accomplished regardless of the nature of the seed laser being used, i.e., a solid state seed or a gas discharge laser seed laser system. Where using a solid state seed laser, however, one of a variety of techniques may be available to select (control) the bandwidth of the seed laser, e.g., by controlling, e.g., the degree of solid state seed laser pumping or any of a number of means well known in the art. Such pump power control may, e.g., put the pumping power at above the lasing threshold in order to select a bandwidth. This selection of bandwidth may shift or change the pertinent values of the curve 604, but the laser system will still be amenable to the type of E and BW control noted above using dtMOPO to select both a BW and concurrently an operating point that maintains the output energy of the laser system pulses at a stable and more or less constant value in the flat top region of the illustrated energy curve 600. It is also possible to use a non-CW solid state seed laser and to adjust the output bandwidth. For example, selection of the output coupler reflectivity of the master oscillator cavity (cavity-Q) can adjust the output bandwidth of the seed laser system. Pulse trimming of the seed laser pulse may also be utilized to control the overall output bandwidth of the laser system.

It can be seen from FIG. 7 that either the selected ASE upper limit or the extent of the portion of the energy curve that remains relatively flat with changes in dtMOPO may limit the range of available bandwidth for selection. The slope and position of the BW curve also can be seen to influence the available operating points on the timing curve to maintain both a constant energy output and a minimum ASE while also selecting bandwidth from within an available range of bandwidths by use of the selection of a dtMOPO operating value.

It is similarly known that the pulse duration of discharge pulses in a gas discharge seed laser, among other things, e.g., wavefront control may be used to select a nominal bandwidth out of the seed laser and thus also influence the slope and/or position of the BW curve 604 as illustrated by way of example in FIG. 7.

According to aspects of an embodiment of the subject matter disclosed one may need to select an edge optic that is an optic that may have to be used, and thus perhaps coated, all the way to its edge, which can be difficult. Such an optic could be required, e.g., between the output coupler, e.g., 162 shown in FIG. 2 and the maximum reflector, e.g., 164, shown in FIG. 2, together forming a version of a seed injection mechanism 160, shown in FIG. 2, e.g., depending upon the separation between the two, since there may be too little room to avoid using an edge optic. If so, then the edge optic should be selected to be the Rmax, e.g., because of the ray path of the exiting beam as it passes through the OC portion 162. From a coatings standpoint it would be preferable to have the OC be the edge optic because it has fewer layers. However, an alternative design, according to aspects of an embodiment of the subject matter disclosed has been chose by applicants and is illustrated schematically and by way of example in FIG. 30, e.g., wherein the use of an edge optic can be avoided, e.g., if a large enough spacing is provided between out-going and in-coming ring power amplification stage beams, e.g., as created by the beam expander, 142 shown in FIG. 2, e.g., prisms 146, 148. For example, about a 5 mm spacing between the two beams has been determined to be satisfactory enough to, e.g., to avoid the use of any edge optics.

Figure 46:
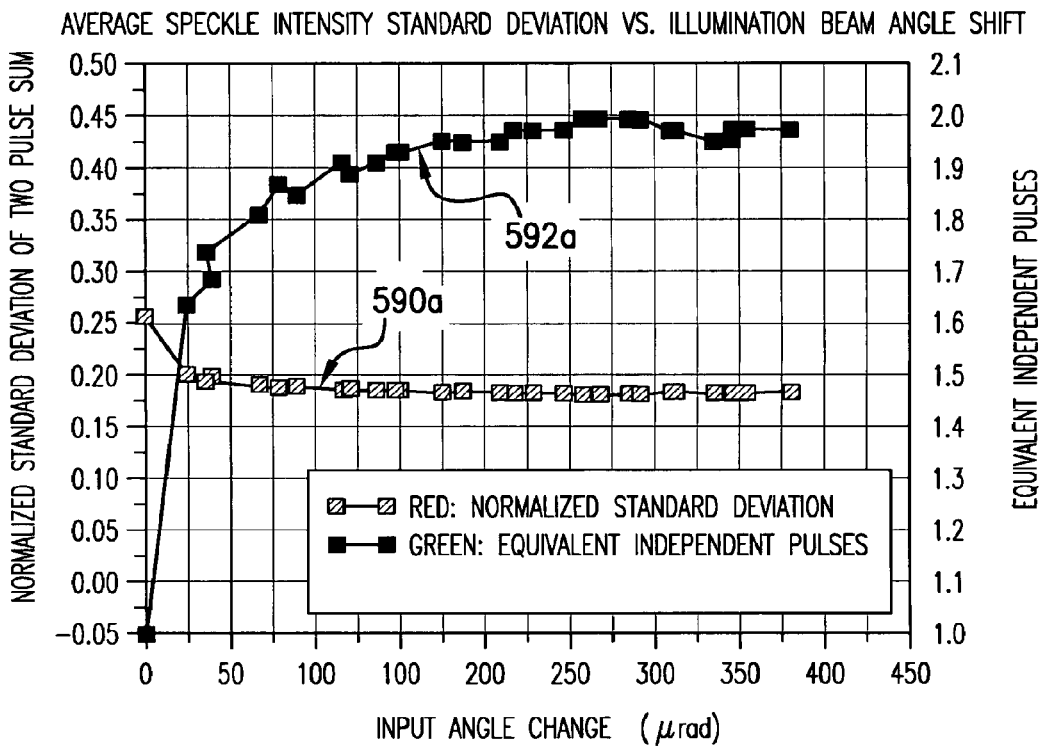
FIG. 46 illustrates exemplary test results according to aspects of an embodiment of the disclosed subject matter.

As illustrated by way of example in FIG. 46 the laser system, e.g., system 110 illustrated by way of example in FIG. 2, may produce a laser system output pulse beam 100, e.g., using a ring power amplification stage 144 to amplify the output beam 62 of a master oscillator 22 in a ring power amplification stage 144. A beam expander/disperser 142, shown in more detail by way of an example of aspects of an embodiment of the subject matter disclosed may be comprised of a first expansion/dispersion prism 146a, and a second expansion/dispersion prism 146b, and a third prism 148.

The seed injection mechanism 160 may comprise a partially reflective input/output coupler 162, and a maximally reflective (Rmax) mirror 164, illustrated by way of example and partly schematically in FIG. 30 in a plan view, i.e., looking down on the seed injection mechanism and m expansion/dispersion 160 and the ring power amplification stage chamber (not shown) into and out of which, respectively the beams 74 and 72 traverse, that is from the perspective of the axis of the output beam 62 traveling from the master oscillator chamber 22, which in such an embodiment as being described may be positioned above the chamber 144 (the beam 62 having been folded into the generally horizontal longitudinal axis as shown (the beam also having been expanded in the MOPuS (also called the MO WEB, having the mini-OPuSs and a beam expander as discussed elsewhere) in its short axis, as described elsewhere, to make it generally a square in cross-sectional shape.

With regard to the configuration of the beam expansion prisms 146a, 146b and 148 inside the ring power amplification stage cavity a similar arrangement may be provided to that of the beam expansion on the output of the power amplifier ("PA") stage in applicants' assignee's XLA-XXX model laser systems, e.g., with a 4× expansion, e.g., provided by a 68.6° incident and 28.1° exit, e.g. on a single prism or on two prisms with the same incident and exit angles. This can serve to, e.g., balance and minimize the total Fresnel losses. Reflectivity coatings, e.g., anti-reflectivity coatings may be avoided on these surfaces since they will experience the highest energy densities in the system. According to aspects of an embodiment of the subject matter disclosed the beam expander/disperser 160 may be implemented with the first prism 146 split into to small prisms 146a, and 146b, which may be, e.g., 33 mm beam expander prisms, e.g., truncated, as shown by way of example in FIG. 30, to fit in the place where one similarly angled prism could fit, with the split prism having a number of advantages, e.g., lower cost and the ability to better align and/or steer the beams 72, 74 (in combination with the beam reverser (not shown in FIG. 30) and the system output beam 100.

The master oscillator seed beam 62 may enter the seed injection mechanism 160 through the beam splitter partially reflective optical element 162, acting as an input/output coupler, to the Rmax 164 as beam 62a, from which it is reflected as beam 74a to the first beam expander prism 146a, which serves to de-magnify the beam in the horizontal axis by about ½× (it remains about 10-11 mm in the vertical axis into the plane of the paper as shown in FIG. 30). The beam 74b is then directed to the second beam expansion prism 148, e.g., a 40 mm beam expansion prism, where it is again de-magnified by about ½× so the total de-magnification is about ¼× to form the beam 74 entering the gain medium of the ring power amplification stage (not shown in FIG. 30. the beam is reversed by the beam reverser, e.g., a beam reverser of the type currently used in applicants' assignee's XLA-XXX model laser system PAs and returns as beam 72 to the prism 148, e.g., having crossed in the gain medium in a bow-tie arrangement or having traveled roughly parallel, perhaps overlapping to some degree in a version of a race-track arrangement. from prism 148 where the beam 72 is expanded by roughly 2× the beam 72*b* is directed to prism 142*b* and is expanded a further approximately 2× into beam 72*a*. Beam 72*a* is partially reflected back to the Rmax as part of beam 62*a* and is partially transmitted as output beam 100, which gradually increases in energy until an output beam pulse of sufficient energy is obtained by lasing oscillation in the ring power amplification stage. The narrowing of the beam entering the amplification gain medium, e.g., the ring power amplification stage has several advantageous results, e.g., confining the horizontal widths of the beam to about the width of the electrical gas discharge between the electrodes in the gain medium (for a bow-tie arrangement the displacement angle between the two beams is so small that they each essentially stay within the discharge width of a few mm even thought they are each about 2-3 mm in horizontal width and for the race track embodiment, the beam 72 or the beam 72 only passes through the gain medium on each round trip, or the beams may be further narrowed, or the discharge widened.

The positioning and alignment of the prisms 146*a*, 146*b* and 148, especially 146*a* and 146*b* can be utilized to insure proper alignment of the output beam 100 from the ring power amplification stage into the laser output light optical train towards the shutter. The beam leaving the input/output coupler 162 may be fixed in size, e.g., in the horizontal direction, e.g., by a horizontal size selection aperture 130, forming a portion of the system aperture (in the horizontal axis) to about 10.5 mm. Another aperture, e.g., in the position roughly of the present PA WEB, e.g., in applicants' assignee's XLA-XXX laser system products, can size the beam in the vertical dimension. since the beam has about a 1 mRad divergence, the sizing may be slightly smaller in each dimension than the actual beam dimensions wanted at the shutter, e.g., by about 1 mm. According to aspects of an embodiment of the subject matter disclosed applicants propose that a system limiting aperture be positioned just after the main system output OPuS, e.g., a 4×OPus. A ring power amplification stage aperture may be located about 500 mm further inside the laser system. This distance is too great to avoid pointing changes turning into position changes at the specified measurement plane (present system aperture). Instead the limiting system aperture can be located just after the OPuS, and may have a 193 nm reflecting dielectric coating instead of a stainless steel plate commonly used. This design can allow for easier optical alignment, while at the same time reduce heating of this aperture.

According to aspects of an embodiment of the subject matter disclosed, applicants propose to implement a relatively stress-free chamber window arrangement similar to or the same as that discussed in an above referenced co-pending U.S. patent application, e.g., at least on the bean reverser side of the chamber, because of the use of, e.g., a PCCF coated window a this location.

According to aspects of an embodiment of the subject matter disclosed, applicants propose to, e.g., place ASE detection, e.g., backward propagation ASE detection, in either the LAM or in an MO wavefront engineering box ("WEB"), or the so-called MOPuS, which can, e.g., include elements of the MOWEB from applicants' assignee's existing XLA-XXX model laser systems along with the mini-OPuSs discussed elsewhere in this application, as well as, e.g., beam expansion, e.g., using one or more beam expansion prisms to expand the output beam of the MO in its short axis, e.g., to form generally a square cross-sectional beam. The current MO WEB and its beam turning function is represented schematically as the turning mirror, e.g., 44 shown in FIG. 2. As a preference, however, the backward propagation detector may be placed "in" the MO WEB/MOPuS, that is, e.g., by employing a folding mirror (fold #2), e.g., 44 in FIG. 2, with, e.g., a reflectivity of R=95% instead of R=100% and monitoring the leakage through this mirror 44. Some drift and inaccuracy of this reading may be tolerated, e.g., since it may be utilized as a trip sensor (i.e. measurements in the vicinity of 0.001 mJ when conditions are acceptable—essentially no reverse ASE—as opposed to around 10 mJ when not acceptable—there is reverse ASE), e.g., when the ring power amplifier is not timed to amplify the seed pulse, but still creates broad band laser light. Existing controller, e.g., TEM controller, cabling and ports and the like for new detectors may be employed. The detector may, e.g., be the detector currently used by applicants' assignee on existing XLA-XXX model laser systems to measure beam intensity, e.g., at the laser system output shutter.

According to aspects of an embodiment of the disclosed subject matter one or more mini-OPuS(s), which may be confocal, such that they are highly tolerant to misalignment and thus of potentially low aberration, e.g., for the off-axis rays needed in the proposed short OPuS(s), the so-called mini-OPuS, can have delay times of 4 ns and 5 ns respectively, where more than one is employed. These values were chosen so that both OPuSs exhibit low wavefront distortion with spherical optics in addition to appropriate delay paths for coherence busting. The low wavefront requirement may actually prevent significant speckle reduction from the mini-OPuS(s) unless special means are utilized, e.g., an angular fan-out from the output of the mini-OPuS(s) generated, e.g., by replacing a flat/flat compensating plate with a slightly wedged plate, so that the transmitted beam and the delayed beam in the mini-OPuS are slightly angularly offset from each other. Other means may be employed, e.g., beam flipping in either or both axes, e.g., top to bottom or left to right, negative one imaging, the combination of top to bottom and left to right flipping, and beam translation (shear), which may be accomplished, e.g., by removing the compensator plate such as is shown in the co-pending patent application noted above entitled CONFOCAL PULSE STRETCHER, Ser. No. 11/394,512, filed on Mar. 31, 2006, or the addition of a second compensator plate in a second axis, e.g., orthogonal to that of the first.

The laser beam, e.g., from the master oscillator is partially coherent, which leads to speckle in the beam. Angularly offsetting the reflected beam(s) reentering the mini-OPuS output with the transmitted beam, along with the delay path separation of the main pulse into the main pulse and daughter pulses, can achieve very significant speckle reduction, e.g., at the wafer or at the annealing workpiece, arising from the reduction in the coherence of the laser light source pulse illuminating the workpiece (wafer or crystallization panel). This can be achieved, e.g., by intentionally misaligning the delay path mirrors, probably not possible with a confocal arrangement, but also with the addition of a slight wedge in the delay path prior to the beam splitter reflecting part of the delayed beam into the output with the transmitted beam and its parent pulse and preceding daughter pulses, if any. For example, a 1 milliradian wedge in the plate will produce an angular offset in the reflected daughter pulse beam of 0.86 milliradians.

The optical delay path(s) of the mini-OPuS(s) may have other beneficial results in terms of laser performance and efficiency. According to aspects of an embodiment of the disclosed subject matter, as illustrated schematically in FIG. 48, the laser beam, e.g., seed beam 500 from the seed source laser (not shown in FIG. 48, may be split into two beams 502, 504 using a partially reflective mirror (beam splitter) 510. This mirror 510 transmits a percentage of the beam into the main beam 502 and reflects the rest of the beam 500 as beam 504 into an optical delay path 506. The part 502 that is transmitted continues into the rest of the laser system (not shown in FIG. 48). The part 504 that is reflected is directed along a delay path 506 including, e.g., mirrors 512, 514 and 516, with mirror 514 being displaced perpendicularly to the plane of the paper in the schematic illustration, in order to allow the main beam 502 to reenter the rest of the laser system, e.g., to form a laser output beam or for amplification in a subsequent amplification stage. The beam 504 may then be recombined with the transmitted portion 502 of the original beam 500. The delayed beam 504 may be passed through a wedge (compensator plate) 520 essentially perpendicularly arranged in the path of beam 504. Thus, the daughter pulse beam(s) 504 from the delay path 506 are slightly angularly displaced from the main part of the beam in the transmitted portion 502 in the far field. The displacement may be, e.g., between about 50 and 500 µRad.

The length of the delay path 506 will delay the beam pulses so that there is a slight temporal shift between the part of the beam that is transmitted and the part that is reflected, e.g., more than the coherence length, but much less than the pulse length, e.g., about 1-5 ns. By selecting the appropriate path length, which determines the delay time, the addition of the two beams can be such that the energy in the pulse is spread into a slightly longer $T_{is}$ which in combination with later pulse stretching in the main OPuS(s) can improve laser performance, as well as providing other beneficial laser performance benefits.

Two mini-OPuSs may be needed to achieve the desired effect. The offset time between the pulses from the two mini-OPuSs may be, e.g., 1-2 nanosecond. Based upon optical and mechanical considerations, the delays selected for the stretchers may be, e.g., a 3 ns delay path in the first mini-OPuS and a 4 ns delay path in the second. If the delay is shorter, the optical system, e.g., if it uses confocal or spherical mirrors, can introduce unacceptable aberrations. If the delay is longer, it may be difficult to fit the system into the available space in the laser cabinet. The distance the beam must travel to achieve the 3 ns delay is 900 mm and to delay by 4 ns is 1200 mm. A confocal optical system 500, minimizing the sensitivity to misalignment, illustrated schematically in FIG. 49 may consist of two mirrors 522, 524, whose focal points are located at the same position in space and whose center of curvatures are located at the opposite mirror, along with a beam splitter 526. A compensator plate 530 (e.g., a wedge) can be added to insure that the reflected beam and the transmitted beam are slightly misaligned as noted above with respect to FIG. 49. In this case, the compensator plate is placed in the path of the delayed beam at an angle for proper functioning.

The delay path time(s) in the mini-OPuS(s) for coherence busting and other purposes may be as short as about the temporal coherence length and as long as practical due to the noted optical and space considerations, such as misalignment and aberration tolerance. If there are two or more mini-OPuSs then the delay path in each must be different in length, e.g., by more than the coherence length and selected such that there is no significant coherence reaction (increase) due to the interaction of daughter pulses from the separate OPuS(s). For example the delay path times could be separated by at least a coherence length and by not more than some amount, e.g., four or five coherence lengths, depending on the optical arrangement.

According to aspects of an embodiment of the subject matter disclosed applicants propose to employ a coherence-busting optical structure that, e.g., generates multiple sub-pulses delayed sequentially from a single input pulse, wherein also each sub-pulse is delayed from the following sub-pulse by more than the coherence length of the light, and in addition with the pointing of each sub-pulse intentionally chirped by an amount less than the divergence of the input pulse. In addition applicants propose to utilize a pair of coherence-busting optical delay structures, where the optical delay time difference between the pair of optical delay structures is more than the coherence length of the input light. Each of the two optical delay structures may also generate sub-pulses with controlled chirped pointing as noted in regard to the aspects of the previously described coherence busting optical delay structure.

According to aspects of an embodiment of the disclosed subject matter two imaging mini-OPuSs, which may be confocal, such that they are highly tolerant to misalignment and thus of potentially low aberration, e.g., for the off-axis rays needed in the proposed short OPuSs, the so-called mini-OPuSs, and can have delay times of 4 ns and 5 ns respectively. These values were chosen so that both OPuSs exhibit low wavefront distortion with spherical optics. The low wavefront requirement may prevent significant speckle reduction from the mini-OPuSs unless special means are utilized, e.g., an angular fan-out, or a position translation/shear ("position chirp") or beam flipping/inversion as noted above, from the mini-OPuSs is generated, e.g., by replacing a flat/flat compensating plate with a slightly wedged plate or adding another compensation plate in a different axis.

It will be understood by those skilled in the art that according to aspects of an embodiment of the disclosed subject matter, adequate coherence busting may be achieved sufficiently to significantly reduce the effects of speckle on the treatment of a workpiece being exposed to illumination from the laser system, such as in integrated circuit photolithography photoresist exposure (including the impact on line edge roughness and line width roughness) or laser heating, e.g., for laser annealing of amorphous silicon on a glass substrate for low temperature recrystallization processes. This may be accomplished by, e.g., passing the laser beam, either from a single chamber laser system or from the output of a multi-chamber laser system or from the seed laser in such a multi-chamber laser system before amplification in another chamber of the multi-chamber laser system, through an optical arrangement that splits the output beam into pulses and daughter pulses and recombines the pulses and daughter pulses into a single beam with the pulses and daughter pulses angularly displaced from each other by a slight amount, e.g., between, e.g., about 50 µRad and 500 µRad and with each of the daughter pulses having been delayed from the main pulse(s), e.g., by at least the temporal coherence length and preferably more than the temporal coherence length.

This may be done in an optical beam delay path having a beam splitter to transmit a main beam and inject a portion of the beam into a delay path and then recombining the main beam with the delayed beam. In the recombination, the two beams, main and delayed, may be very slightly angularly offset from each other (pointed differently) in the far field, referred to herein as imparting a pointing chirp. The delay path may be selected to be longer than the temporal coherence length of the pulses.

The angular displacement may be accomplished using a wedge in the optical delay path prior to the delayed beam returning to the beam splitter which wedge imparts a slightly different pointing to the delayed beam (a pointing chirp). The amount of pointing chirp, as noted above may be, e.g., between about 50 and 500 µRad.

The optical delay paths may comprise two delay paths in series, each with a respective beam splitter. In such an event each delay path can be different in length such that there is not created a coherence effect between the main and daughter pulses from the respective delay paths For example, if the delay in the first delay path is 1 ns the delay in the second delay path could be about 3 ns and if the delay in the first delay path is 3 ns the delay in the second could be about 4 ns.

The wedges in the two separate delay paths may be arranged generally orthogonally to each other with respect to the beam profile, such that the wedge in the first delay path can serve to reduce coherence (speckle) in one axis and the wedge in the other delay path can reduce coherence (speckle) in the other axis, generally orthogonal to the first. thus, the impact on speckle, e.g., contribution to line edge roughness ("LER") and/or line width roughness ("LWR"), e.g., at the wafer in exposure of photoresist in an integrated circuit manufacturing process can be reduced along feature dimensions in two different axes on the wafer.

Other special means as noted above, e.g., beam translation, beam imaging, fan-out flipping and the like may be employed.

According to aspects of an embodiment of the subject matter disclosed, with, e.g., a 6 mrad cross of the bowtie in a bowtie ring power amplification stage, the magnification prisms inside the ring cavity may be slightly different for the in-going and outgoing beams, and could be arranged so that the beam grows slightly as it travels around the ring or shrinks slightly as it travels around the ring. Alternatively, and preferably according to aspects of an embodiment of the subject matter disclosed, a result of breaking the larger beam expansion prism into two separate pieces, e.g., enabled by larger spacing between out-going and in-coming beams, e.g., about 5-6 mm, as illustrated by way of example in FIG. 30, applicants propose to adjust the angles of the two prisms, e.g., 146, 148 shown schematically in FIG. 4, such that they result in the same magnification for both out-going and in-coming beams, e.g., beams 100 and 62, respectively, shown illustratively and schematically in FIG. 30.

According to aspects of an embodiment of the subject matter disclosed applicants propose to place the Rmax, e.g., 164 and the OC, e.g., 162 portions of the version of the seed injection mechanism containing an Rmax 164 and an OC 162, e.g., along with the positioning of the system horizontal axis beam output aperture on that same stage. This enables, e.g., prior alignment of each as an entire unit and removes the need for field alignment of the individual components. This can allow, e.g., for the position of the Rmax/OC assembly, e.g., 160, shown in FIG. 2 (a seed injection mechanism) to be fixed, just like the OC location in a applicants' assignee's single chamber oscillator systems (e.g., XLS 7000 model laser systems) is fixed. Similarly, such an arrangement can allow for the achievement of tolerances such that the Rmax/OC are positioned relative to the system aperture properly without need for significant ongoing adjustment. The beam expansion prism may be moveable for alignment of the injection seed mechanism assembly with the chamber 144 of the amplification gain medium and the output beam 100 path with the laser system optical axis.

According to aspects of an embodiment of the subject matter disclosed applicants propose to employ a coherence-busting optical structure that generates multiple sub-pulses delayed sequentially from a single input pulse, wherein also each sub-pulse is delayed from the following sub-pulse by more than the coherence length of the light, and in addition with the pointing of each sub-pulse intentionally chirped by an amount less than the divergence of the input pulse, or any of the other special means noted above. In addition applicants propose to utilize a pair of coherence-busting optical delay structures, where the optical delay time difference between the pair of optical delay structures is more than the coherence length of the input light. Each of the two optical delay structures may also generate sub-pulses with controlled chirped pointing as noted in regard to the aspects of the previously described coherence busting optical delay structure, or any of the other special means noted above.

According to aspects of an embodiment of the subject matter disclosed applicants propose to position a mechanical shutter to block the MO output from entering the ring, when appropriate, similar to such as are utilized on applicants' assignee's OPuSs, e.g., to block them during alignment and diagnosis. The exact location could be, e.g., just above the last folding mirror prior to the ring power amplification stage, where the mini-OPuSes are protected during unseeded ring power amplification stage alignment and operation.

Figure 79:
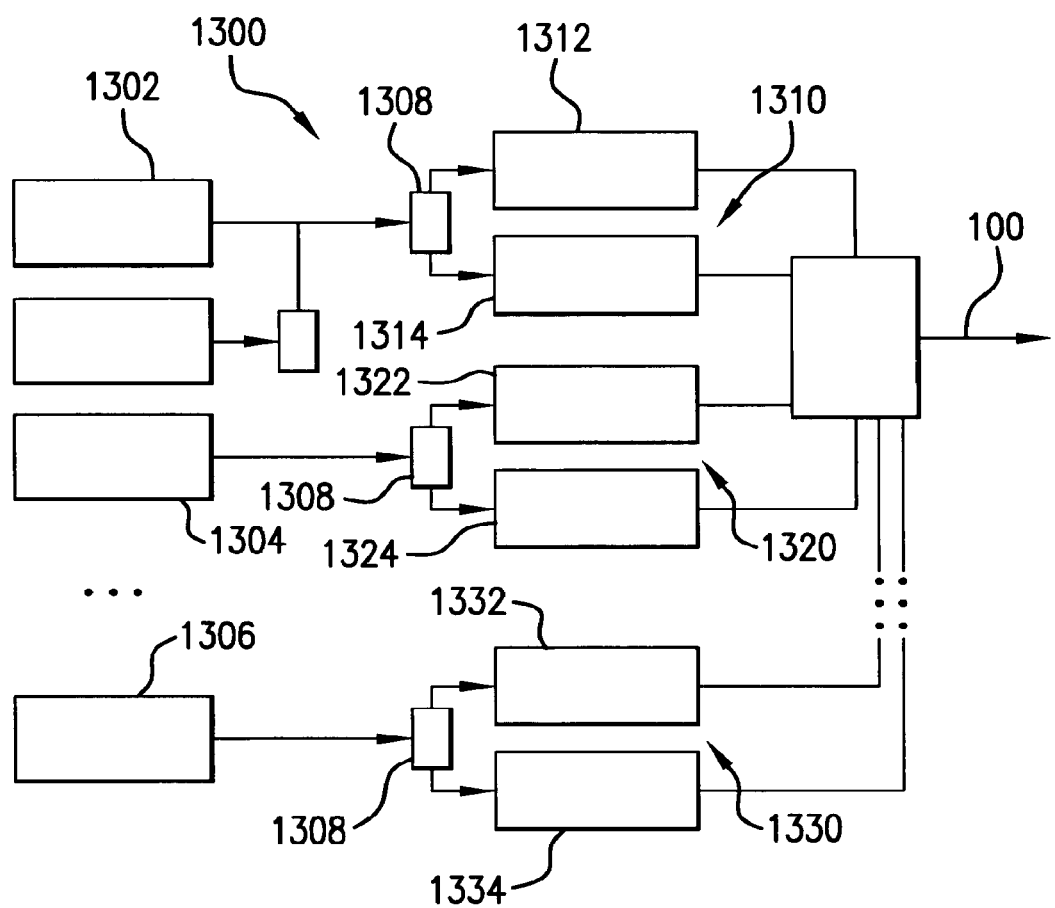
FIG. 79 shows schematically and in block diagram form a laser system according to aspects of an embodiment of the disclosed subject matter.

Turning now to FIG. 79 there is shown schematically and in block diagram a laser DUV light source according to aspects of an embodiment of the disclosed subject matter. The system 1300 may include, e.g., a plurality of seed laser systems, which may be solid state lasers, 1302, 1304, 1306, for example as described elsewhere in the present application, with the seed laser 1306 being an nth seed laser in the system. for each seed laser there may be a corresponding amplification laser system, e.g., 1310, 1320 and 1330, with the amplification laser system 1306 being an nth amplification laser system. each amplification laser system 1310, 1320, 1330 may have a plurality of A, in the illustrative case A=2, amplification gain mediums 1312, 1314, and 1322, 1324 and 1332, 1334, with the amplification gain mediums 1332, 1334 comprising an exemplary nth amplification gain medium system 1330. Each gain medium 1312, 1314, 1322, 1324, 1332, 1334 may comprise a gas discharge laser, such as an excimer or molecular fluorine laser, and more specifically may comprise a ring power amplification stage as described elsewhere in the present application and in above identified co-pending applications filed on the same day as the present application. Each of the respective A amplification gain mediums 1312, 1314 and 1322, 1324 and 1332, 1334 may be supplied with output pulses from the respective seed laser 1302, 1304 and 1306 by a beam divider 1308. The respective amplifier gain mediums 1312, 1314, 1322, 1324 and 1332, 1334 may operate at a fraction of the pulse repetition rate X of the respective seed lasers, e.g., A/X. A beam combiner 1340 may combine the outputs of the amplifier gain mediums 1312, 1314, 1322, 1324, 1332, 1334 to form a laser system 1300 output laser light source beam 100 of pulses at a pulse repetition rate of nX.

Figure 80:
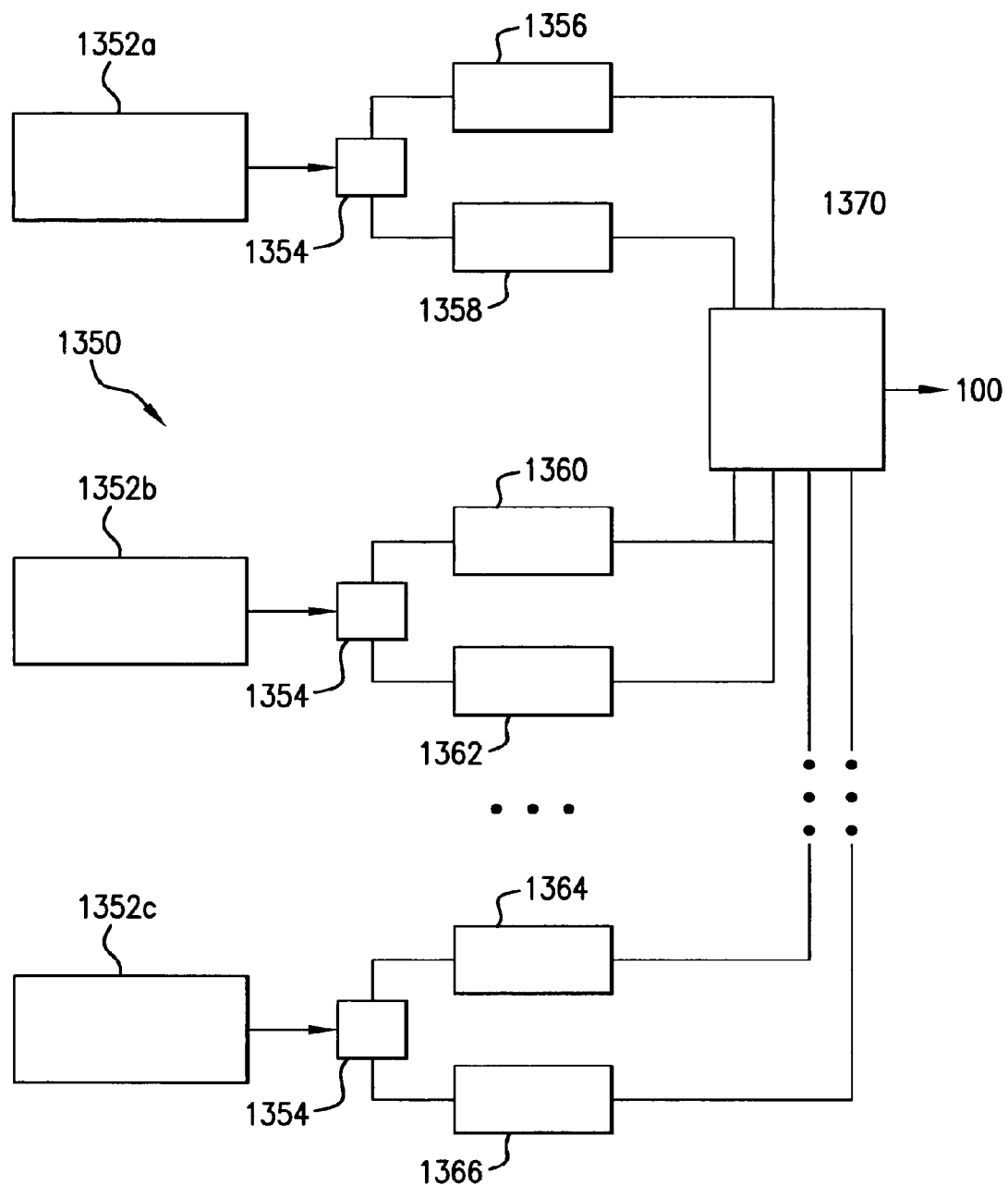
FIG. 80 shows schematically and in block diagram form a laser system according to aspects of an embodiment of the disclosed subject matter.

Turning to FIG. 80 there is illustrated schematically and in block diagram form a laser system 1350 according to aspects of an embodiment of the disclosed subject matter. which may comprise a plurality of seed lasers 1352a, 1352b and 1352c which may be solid state lasers, 1352a, 1352b, 1352c, for example as described elsewhere in the present application, with the seed laser 1352c being an nth seed laser in the system 1450. Each of the seed lasers may feed a pair of respective amplifier gain mediums 1356, 1358, 1360, 1362 and 1364, 1366, with the amplifier gain mediums 1364, 1366 being the nth pair in the system 1350, corresponding to the nth seed laser 1352c, with a respective beam divider 1354. Each amplification gain medium may be a gas discharge laser, such as an excimer or molecular fluorine laser, and more specifically may comprise a ring power amplification stage as described elsewhere in the present application and in above identified co-pending applications filed on the same day as the present application. Each of the pairs of amplification gain mediums 1356, 1358, 1360, 1362, and 1364, 1366 may operate at ½ the pulse repetition rate X of the respective seed laser 1252a, 1352b and 1352c, with the seed lasers 1352a, 1352b and 1352c all operating at the same pulse repetition rate X, to produce a laser light source output light beam of pulses 100 at nX, or each may operate at a respective pulse repetition rate X, X', X" ... X$^{n'}$ some but not all of which may be equal to others, such that the output pulse rate in the output pulse beam 100 is ΣX'+X" ... X", through a beam combiner 1370.

It will be understood by those skilled in the art that disclosed in the present application is a method and apparatus which may comprise a laser light source system which may comprise a solid state laser seed beam source providing a seed laser output; a frequency conversion stage converting the seed laser output to a wavelength suitable for seeding an excimer or molecular fluorine gas discharge laser, e.g., within a band of wavelengths around the nominal center wavelength of the output of the respective type of gas discharge laser, which those skilled in the art will understand to be able to be amplified in the selected gas discharge lasing medium; an excimer or molecular fluorine gas discharge laser gain medium amplifying the converted seed laser output to produce a gas discharge laser output at approximately the converted wavelength, which those skilled in the art will understand to be within the band of wavelengths around a nominal center wavelength for the type of gas discharge laser lasing medium, wherein seed laser pulses of the appropriate wavelength(s) will be amplified by stimulated emission in the excited lasing medium. The excimer or molecular fluorine laser may be selected from a group comprising XeCl, XeF, KrF, ArF and F$_2$ laser systems. The laser gain medium may comprise a power amplifier. The power amplifier may comprise a single pass amplifier stage, a multiple-pass amplifier stage. The gain medium may comprise a ring power amplification stage or a power oscillator. The ring power amplification stage may comprise a bow-tie configuration or a race track configuration. The method and apparatus may further comprise an input/output coupler seed inject mechanism. The method and apparatus may further comprise a coherence busting mechanism. The solid state seed laser beam source may comprise an Nd-based solid state laser, e.g., with an frequency doubled pump, pumping the Nd-based solid state laser. The Nd-based solid state laser may comprise a fiber amplifier laser. The Nd-based solid state laser may be selected from a group comprising: Nd:YAG, Nd:YLF and Nd:YVO$_4$ solid state lasers. The solid state seed laser beam source may comprise an Er-based solid state laser, e.g., comprising a fiber laser. The Er-based solid state laser may comprise an Er:YAG laser or, e.g., an Er:Glass laser. The frequency conversion stage may comprise a linear frequency converter, e.g., may comprise a Ti:Sapphire crystal or may comprise a crystal which may comprise Alexandrite. The frequency conversion stage may comprise a non-linear frequency converter, e.g., comprising a second harmonic generator or a sum-frequency mixer.

Applicants have simulated through calculations speckle reduction as relates to the location of coherence lengths within a single gas discharge (e.g., ArF or KrF excimer) laser system output pulse after such a pulse has passed through the two OPuS pulse stretchers sold on laser systems manufactured by applicants' assignee Cymer, Inc., used for pulse stretching to increase the total integrated spectrum ($T_{is}$) to reduce the impact of peak intensity in the laser output pulse on the optics in the tool using the output light from the laser system, e.g., a lithography tool scanner illuminator. There are two OPuS in series, with the first having a delay path sufficient to stretch the $T_{is}$ of the output pulse from about 18.6 ns to about 47.8 ns and the second to stretch the pulse further to about 83.5 ns, e.g., measured at E95% (the width of the spectrum within which is contained 95% of the energy of the pulse.

Starting with the unstretched pulse, applicants divided the pulse into portions equal to the approximate coherence length, assuming a FWHM bandwidth of 0.10 pm and a Gaussian shape for the coherence length function. The impact of the pulse stretching on the coherence length portions of the pulse after passing through the first OPuS was to show that a first intensity hump in the spectrum of the stretched pulse was made up of the coherence length portions of the main pulse, a second intensity hump was mad up of coherence length portions of the main pulse overlapped with coherence length portions of a first daughter pulse. A third hump in the intensity spectrum is the result of overlapping of the first and second daughter pulses. Looking at the individual coherence length portions of the two humps applicants observed that the multiple versions (including daughters) of the coherence length portions remained sufficiently separated to not interfere with each other.

After passage through the second OPuS the simulated spectra, again only looking at the content of the first three humps in the stretched pulse, in the simulation (under the second hump were contributions from the original undelayed pulse, as before, the first delayed pulse from the first OPuS, as before and the first delayed pulse from the second OPuS), applicants observed that in this second pulse the multiple versions of the coherence length portions were very close together. This is caused by the fact that the first OPuS has a delay of ~18 ns and the second has a delay of ~22 ns. Thus only ~4 ns separates the versions of the coherence length portions, which is still not close enough for interference.

Under the third hump applicants observed contributions from the first delayed pulse from the first OPuS, the second delayed pulse from first OPuS, the first delayed pulse from the second OPuS, and the second delayed pulse from second OPuS. applicants observed that the separation between some related coherence portions is larger than for others in the third hump in the intensity spectrum of the pulse stretched by two OPuSs. This increase in separation is due to the fact that two round trips through each OPuS equal ~36 ns=18*2 and ~44 ns=22*2. Thus the separation between coherence lengths grows with each round trip.

Applicants have determined that for each single mini-OPuS to be effective, the two main OPuSs should not bring any daughter coherence lengths to within about 4 coherence lengths of each other. That is, to insure that correlated temporal coherence elements do not overlap, there must be taken into account the specification of the separate delay paths such that temporal coherence elements from the main beam are not later recombined with themselves through coincidence of the delayed version of the element due to the different delay paths. Such overlapping in time by the effect of the various combinations of delay paths is undesirable from a speckle reduction standpoint.

Care must be taken with selection of the delay lengths of the mini-OPuSs and main OPuSs to avoid temporal collision of the temporal coherence elements. According to aspects of an embodiment of the present invention applicants propose the coordinated change of the regular OPuS delay lengths when the mini-OPuS(s) are installed, including whether they are part of the laser system or installed down stream of the regular main OPuSs, e.g., in the lithography tool itself Applicants believe that such mini-OPuS(s) can fill in the valleys of the pulse duration somewhat, leading to an increase in $T_{is}$, e.g., allowing a reduction in the delay lengths of one of the two main OPuSes for better overall coherence length separation.

According to aspects of an embodiment of the disclosed subject matter, the coherence busting may be through a combination of delay paths and the special means noted above, e.g., beam flipping, negative one imaging, beam translation/shear, beam chirp or beam fan out, implemented as discussed above.

Figure 81A:
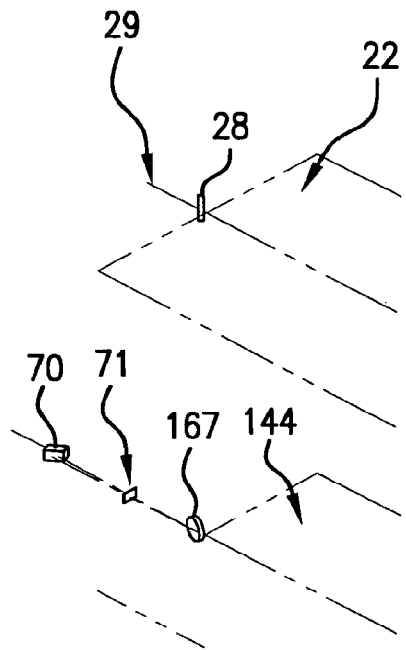
FIGS. 81 A-C illustrate in exploded form a perspective and partly schematic view of a ray path for a seed laser amplification gain medium according to aspects of an embodiment of the disclosed subject matter.
Figure 81B:
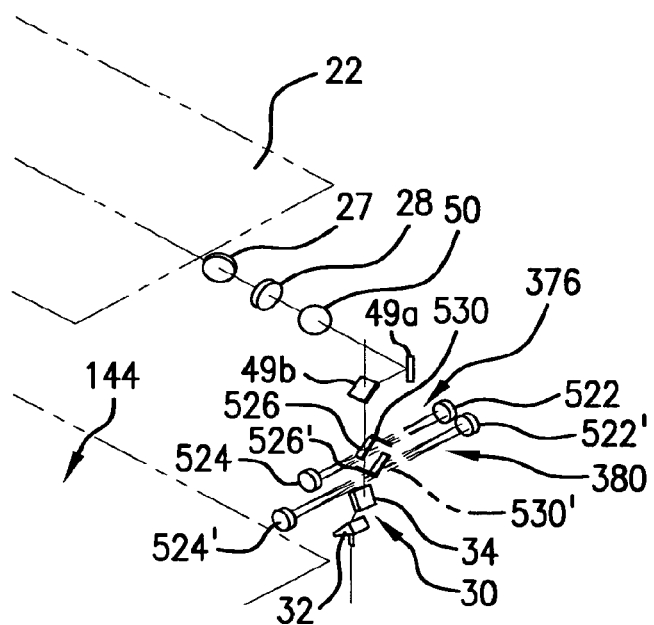
Figure 81C:
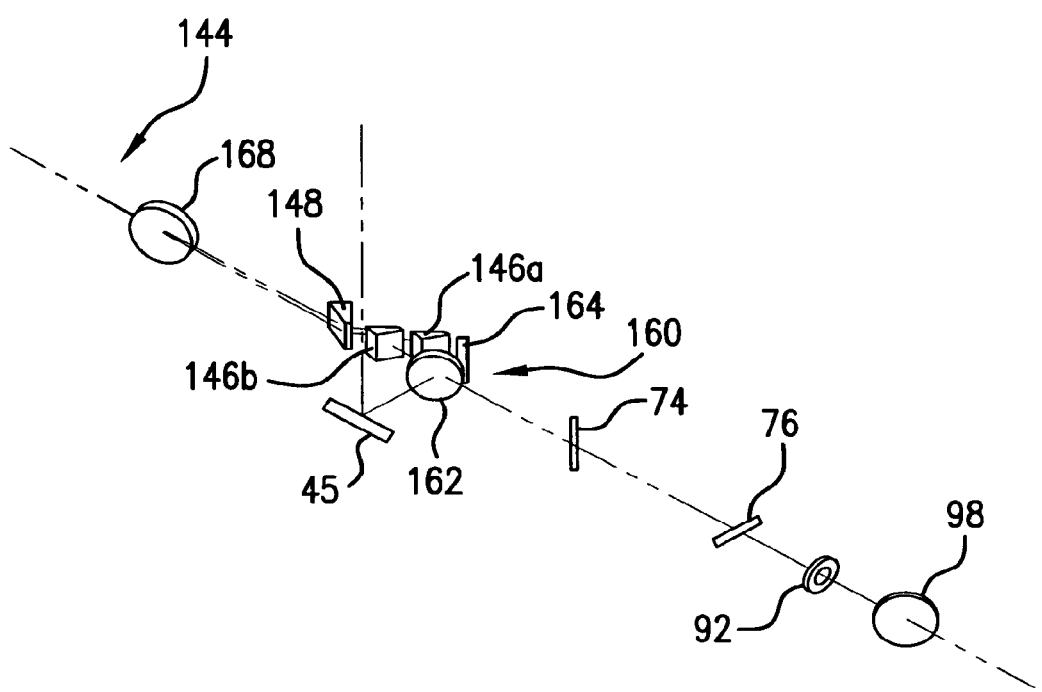

Turning now to FIGS. 81A-c there is shown perspectively and partly schematically a ray trace for an embodiment of the disclosed subject matter comprising, e.g., a MO chamber 22 and an amplifier gain medium chamber 144, with FIG. 81A showing the left hand portions of the traced rays in the seed laser chamber 22 above and the amplifier gain medium chamber 144 below. The beam leaves the line narrowing module LNM (not shown in FIG. 81A) through the LNM aperture 29 and enters the seed laser chamber 22 through the MO chamber rear window 28. At the left hand side of the bow tie beam exits the amplification gain medium chamber 144 through the rear window thereof 167, passes through a beam reverser aperture 71 and is reversed in the beam reverser 70 as explained above and returns to the amplification gain medium chamber 144 through the aperture 71 and window 167 on a slightly different path than the path to the beam reverser/returner 70, in the exemplary case in a crossing arrangement forming the bow-tie.

Turning to FIG. 81B there is shown perspectively and partly schematically a part of the relay optics and coherence busting delay paths intermediate the seed laser chamber 22 and the amplification gain medium chamber 144. the seed pulses output from the seed laser chamber 22 in a seed laser output light pulse beam of pulses passes through the seed laser right hand window 27, an output coupler 28 and a LAM beam splitter where, e.g., a portion of the beam is diverted for metrology purposes. The beam is then turned horizontally and vertically in a pair of turning mirrors 44a and 44b and is directed to a beam splitter 526 in a first mini-OPus delay path 376, e.g., a 3 ns delay path, with part of the beam, e.g., 40% reflected into the delay path and the remainder passing into a second delay path 380. A compensator wedge 530, may be aligned to overlap the daughter pulses exiting the delay path 376 or slightly misaligned to give the respective daughter pulses a slightly different spatial path on exit from the delay path 376 (beam shear). The delay path 376 may be formed by a pair of confocal mirrors 522, 524 or other mirror arrangements, including, e.g., two or more confocal or non-confocal mirrors at each end of the delay path 376 delivering the delayed beam back to the beam splitter 526. The beam can then pass into a second delay path 380, e.g., a 4 ns delay path with a beam splitter 526' where a portion of the beam, e.g., 405 is reflected into the delay path and the remainder passed out of the delay path 380 and into, e.g., a beam expander 30. The delay path, except for having the different delay, e.g., 4 ns, may be constructed identically to that of the delay path 376, or may be of a different variety, e.g., with a different mirror configuration, e.g., arranged for beam flipping and/or negative one imaging or the like. In lieu of the compensator plate that is misaligned, the first or second delay paths 376, 380 may have one or the other aligned for output beam overlap, or may have one or the other substituted with a beam flipping optical element as discussed in more detail elsewhere.

The beam exiting the second delay path may pass through a beam expander, e.g., a dual prism beam expander 30, e.g., including a first expanding prism 32 and a second expanding prism 30.

Turning now to FIG. 81 C there is illustrated the input/output coupling optics and the laser system output beam optical path associated with input of the seed laser beam leaving the beam expander 30 and entering and leaving the amplification gain medium stage 144, e.g., in a bow-tie ring power amplification stage arrangement. The beam leaving the beam expander 30 is turned by a turning mirror 45 into a partially reflective mirror 162 acting as a beam splitter/input/output coupler optic for the amplification gain medium stage 144. The partially reflective mirror 162 may have an anti-reflective coating on the input incidence side and be, e.g./20-30% reflective on the opposite amplification gain medium chamber cavity side, to perform the output coupler function. The partially reflective mirror passes the beam to a maximally reflective mirror (for the given wavelength) which can reflect the beam into the amplification gain medium chamber 144 through a beam expander optical assembly and a chamber right side window 168. The beam expander optical arrangement may include a first (input) beam expander prism portion 146a and on to a second beam expander prism 148 and into the amplification gain medium chamber along a first path, while the returning beam in the, e.g., bow-tie loop may pass through the second beam expander prism 148 and through a first beam expander prism second portion 146b, which expands the amplified beam exiting through the input/output coupler 162 or returning to the chamber through reflection off of the output coupler 162 and maximally reflective mirror 164 in the bow-tie oscillation loop.

The beam exiting the amplification gain medium chamber 144 through the output coupler 162 may pass through a BAM beam splitter where a portion of the beam is redirected for metrology purposes, an OPUS beam splitter where the beam is separated into a main portion and a delayed portion through one of more main OPuSs for beam stretching to lengthen the $T_{is}$ of the laser system output pulse, a system aperture 92 and a shutter beam splitter where a portion of the beam is separated out for metrology purposes.

Figure 82A:
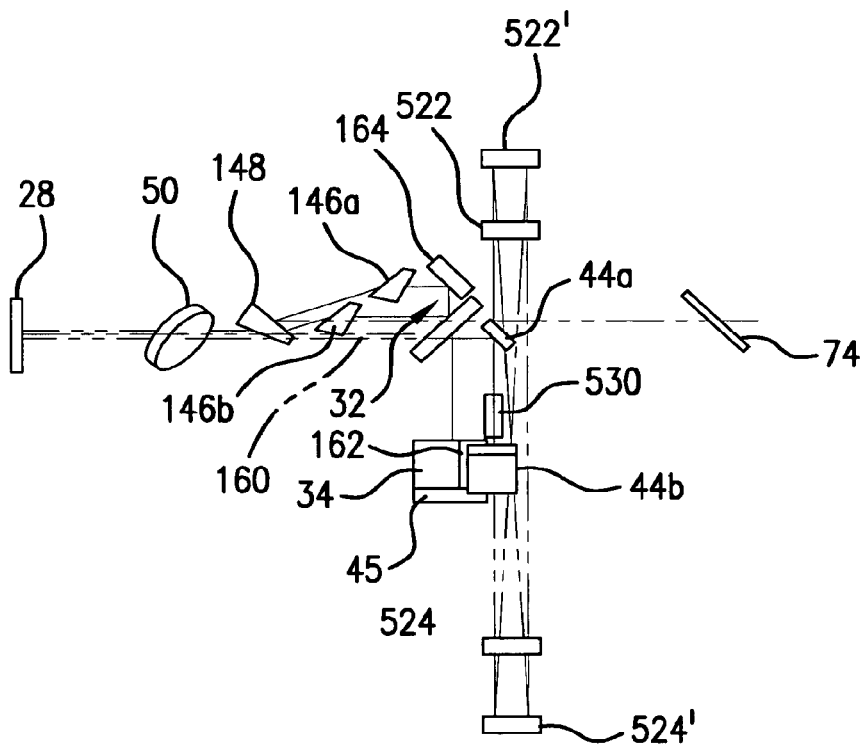
FIGS. 82 A and B illustrate a perspective view partly schematic of a top and side view of a portion of the ray path of FIGS. 81 A-C.
Figure 82B:
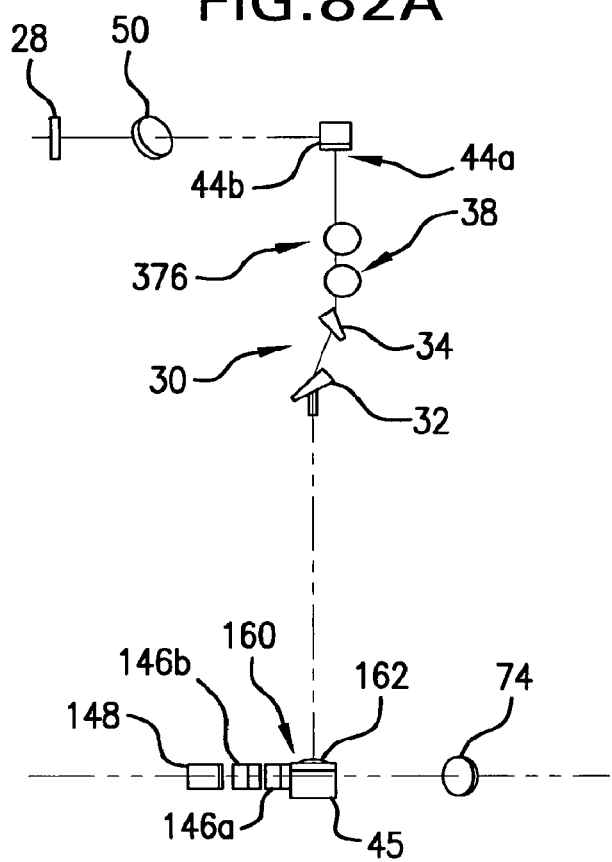
Figure 83B:
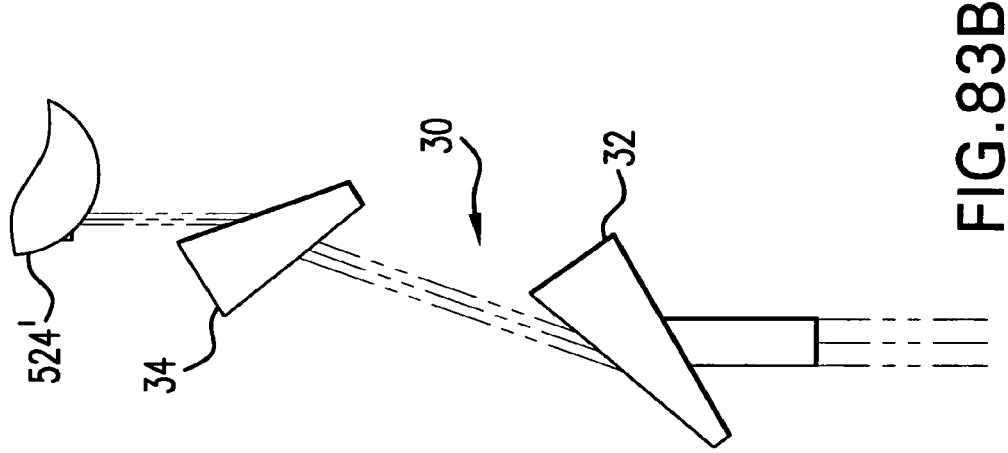
FIG. 83A illustrates a perspective partly schematic view of a portion of the relay optics of FIGS. 81 A-C and 82 A-B.
FIG. 83 B illustrates a side view in more detail of the beam expander of FIGS. 81 A-C, 82 A-B, and 83 A.
Figure 83A:
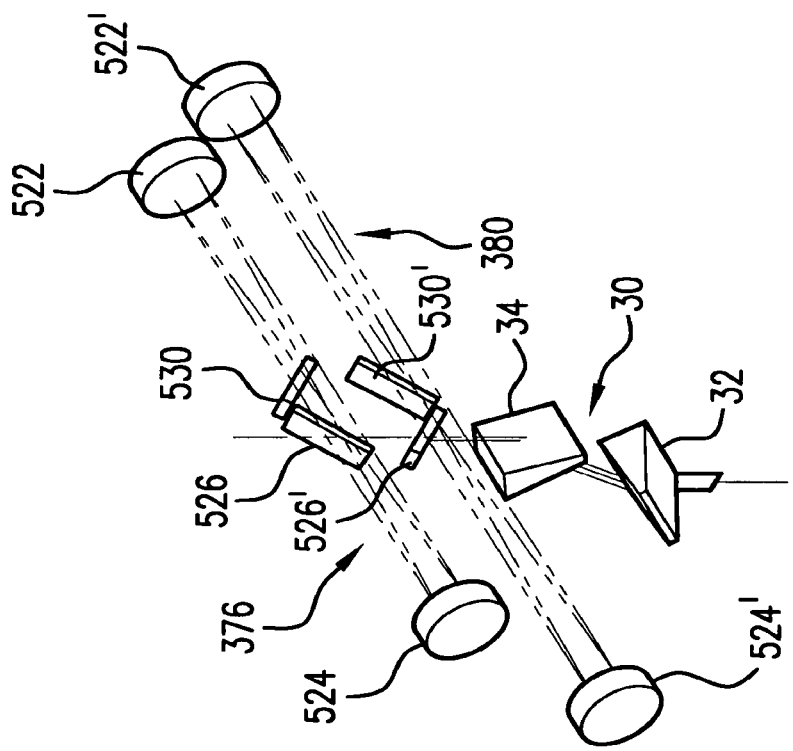
Figure 84A:
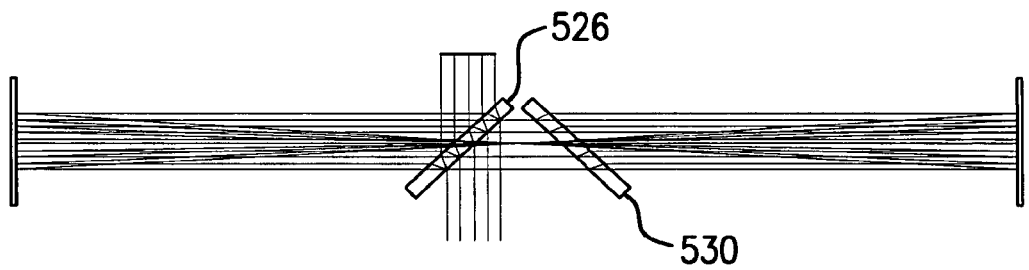
FIGS. 84A and B illustrate schematically a top view and side view of a beam spatial translation/fan out/chirp mechanism according to aspects of an embodiment of the disclosed subject matter.
Figure 84B:
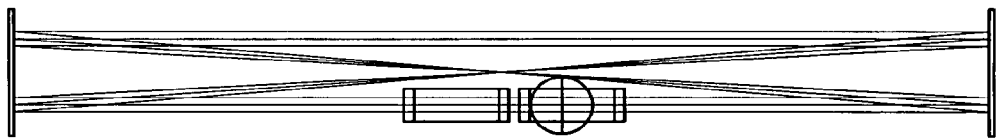

Turning now to FIGS. 82A and 82B there is illustrated perspectively and partly schematically a top view of a portion of the optical train of FIGS. 81A-C, including the relay optics between the seed laser chamber and the amplification gain medium laser chamber. FIG. 83A shows a perspective and partly schematically a more detailed view of the delay paths 376 and 380 and the beam expander 30. FIG. 83 B shows a side view of more detail of the beam expander 30.

Figure 85:
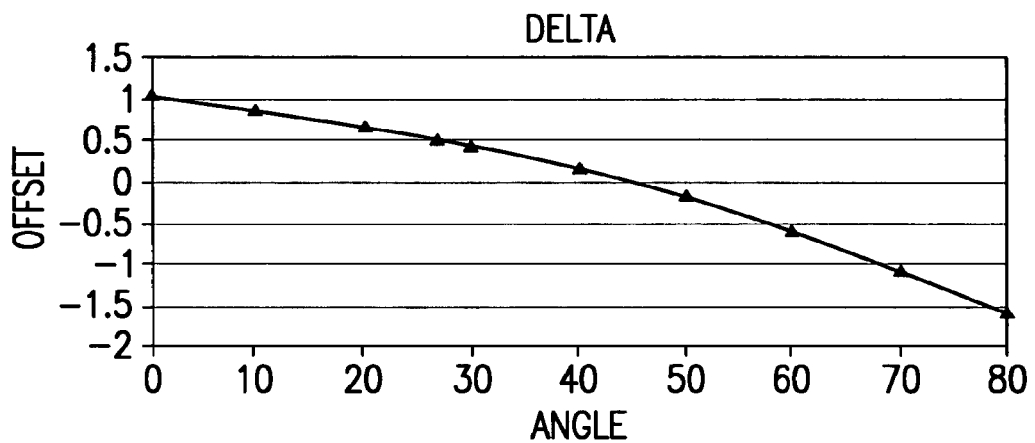
FIG. 85 is a chart of beam displacement to offset angle.

The design of the delay path, e.g., the 3 ns delay path may include a 3.18 mm thick beam splitter 526, two concave mirrors 522, 524, e.g., with a radius of curvature of 225 mm, and a compensator plate 530 so that the reflected beams will overlap the transmitted beam. If the reflected/delayed beam is desired to not overlap the transmitted beam, a number of embodiments may be employed, including, e.g., the tilting of the compensator plate 530. Thus, for example, with the an offset of the beam going through the beam splitter 526 at 1.048 mm, the compensator plate 530 may be placed at an opposite angle from that of the beam splitter 526. The reflected beam will then overlap the transmitted beam. By changing the angle of rotation of the compensator plate 530, the offset between the transmitted beam and the first reflected beam can be controlled. If the beam splitter 526 is normal to the beam, the offset between the two beams is 1.048 mm. The delta offset between the two beams as a function of angle is shown in FIG. 85. To produce an offset of 0.5 mm, an incidence angle of 27 degrees is needed. Another way to produce the offset could be, e.g., to make the compensator plate 530 thinner or thicker. A plate thickness of 1.66 or 4.70 mm will produce a 0.5 mm offset. The advantage of using a thicker plate at 45 degrees is that the anti-reflection coating stays the same. However, using a plate at 27 degrees uses the same thickness for the substrate as the beam splitter 526. The beam incident on the compensator plate 530 is s-polarized, so it is better for the anti-reflection coating for the part to be at 27 degrees rather than 45 degrees.

Figure 86:
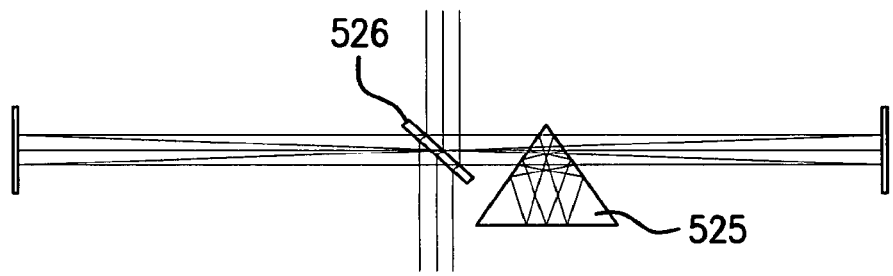
FIG. 86 illustrates schematically a bean flipping mechanism within a beam delay path according to aspects of an embodiment of the disclosed subject matter.

Additionally either delay path may be set up for one or more of the special means discussed elsewhere, of which the bean shearing technique just described may be one, with the other delay path, e.g., the 4 ns delay path having the same or essentially the same beam manipulation (along with delay of a specified length) or may have a different coherence busting scheme. for Example as illustrated in FIG. 83 schematically, the second, longer delay path, e.g., the 4 ns delay path 380 may also incorporate a beam flipping mechanism, e.g., a prism such as an isosceles prism 525, which, like the coherence busting optics disclosed in the co-pending patent application noted above entitled METHOD AND APPARATUS FOR GAS DISCHARGE LASER OUTPUT LIGHT COHERENCY REDUCTION, filed on Dec. 29, 2005, Ser. No. 10/881,533, referenced above, can, e.g., flip the beam upon itself in one or more axes. the exemplary beam flipping optic 525 may flip each daughter pulse on itself, e.g., in the long axis, as it passes through the prism and internal reflections within the prism, as illustrated schematically in FIG. 86. As noted elsewhere, such coherence busting with delay a path or paths and similar or assorted other special means for such as beam flipping, translation, imaging and the like as discussed elsewhere may be done at the output of the amplification gain medium, intermediate the seed laser and amplification gain medium, after the laser system shutter, in a beam delivery unit, e.g., an enclosed and absorption species free beam path intermediate the laser shutter and the input to the tool using the laser light or inside the tool itself, e.g., a scanner or a tbSLS machine.

It will be understood by those skilled in the art that an apparatus and method is disclosed that may comprise a line narrowed pulsed excimer or molecular fluorine gas discharge laser system which may comprise a seed laser oscillator producing an output comprising a laser output light beam of pulses which may comprise a first gas discharge excimer or molecular fluorine laser chamber; a line narrowing module within a first oscillator cavity; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses, which may comprise a ring power amplification stage. The ring power amplification stage may comprise an injection mechanism comprising a partially reflecting optical element through which the seed laser oscillator output light beam is injected into the ring power amplification stage. The ring power amplification stage may comprise a bow-tie loop or a race track loop. The ring power amplification stage may amplify the output of the seed laser oscillator cavity to a pulse energy of $\geq 1$ mJ or $\geq 2$ mJ or $\geq 5$ mJ or $\geq 10$ mJ or $\geq 15$ mJ. The laser system may operate at an output pulse repetition rate of up to 12 kHz, $\geq 2$ and $\leq 8$ kHz or $\geq 4$ and $\leq 6$ kHz. The apparatus and method may comprise a broad band pulsed excimer or molecular fluorine gas discharge laser system which may comprise a seed laser oscillator producing an output comprising a laser output light beam of pulses which may comprise a first gas discharge excimer or molecular fluorine laser chamber; a laser amplification stage which may contain an amplifying gain medium in a second gas discharge excimer or molecular fluorine laser chamber receiving the output of the seed laser oscillator and amplifying the output of the seed laser oscillator to form a laser system output comprising a laser output light beam of pulses, which may comprise a ring power amplification stage. According to aspects of an embodiment of the disclosed subject matter a coherence busting mechanism may be located intermediate the seed laser oscillator and the amplifier gain medium. The coherence busting mechanism may comprise an optical delay path having a delay length longer than the coherence length of a pulse in the seed laser oscillator laser output light beam of pulses. The optical delay path may not substantially increase the length of the pulse in the seed laser oscillator laser output light beam of pulses. The coherence busting mechanism may comprise a first optical delay path of a first length and a second optical delay path of a second length, with the optical delay in each of the first and second delay paths exceeding the coherence length of a pulse in the seed laser oscillator laser output light beam of pulses, but not substantially increasing the length of the pulse, and the difference in the length of the first delay path and the second delay path exceeding the coherence length of the pulse and also not substantially increasing the length of the pulse. The apparatus and method according to aspects of an embodiment may comprise a line narrowed pulsed excimer or molecular fluorine gas discharge laser system which may comprise a seed laser oscillator producing an output comprising a laser output light beam of pulses which may comprise a first gas discharge excimer or molecular fluorine laser chamber; a line narrowing module within a first oscillator cavity; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses, which may comprise a ring power amplification stage; a coherence busting mechanism intermediate the seed laser oscillator and the ring power amplification stage. According to aspects of an embodiment the apparatus and method may comprise a broad band pulsed excimer or molecular fluorine gas discharge laser system which may comprise a seed laser oscillator producing an output comprising a laser output light beam of pulses which may comprise a first gas discharge excimer or molecular fluorine laser chamber; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses, which may comprise a ring power amplification stage; a coherence busting mechanism intermediate the seed laser oscillator and the ring power amplification stage. The apparatus and method according to aspects of an embodiment may comprise a pulsed excimer or molecular fluorine gas discharge laser system which may comprise a seed laser oscillator producing an output comprising a laser output light beam of pulses which may comprise a first gas discharge excimer or molecular fluorine laser chamber; a line narrowing module within a first oscillator cavity; a laser amplification stage containing an amplifying gain medium in a second gas discharge excimer or molecular fluorine laser chamber receiving the output of the seed laser oscillator and amplifying the output of the seed laser oscillator to form a laser system output comprising a laser output light beam of pulses; a coherence busting mechanism intermediate the seed laser oscillator and the laser amplification stage comprising an optical delay path exceeding the coherence length of the seed laser output light beam pulses. The amplification stage may comprise a laser oscillation cavity or an optical path defining a fixed number of passes through the amplifying gain medium. The coherence busting mechanism may comprise comprising a coherence busting optical delay structure generating multiple sub-pulses delayed sequentially from a single input pulse, wherein each sub-pulse is delayed from the following sub-pulse by more than the coherence length of the pulse light. It will also be understood by those skilled in the art that an apparatus and method is disclosed which may comprise according to aspects of an embodiment a laser light source system which may comprise a solid state laser seed beam source providing a seed laser output; a frequency conversion stage converting the seed laser output to a wavelength suitable for seeding an excimer or molecular fluorine gas discharge laser; an excimer or molecular fluorine gas discharge laser gain medium amplifying the converted seed laser output to produce a gas discharge laser output beam of pulses at approximately the converted wavelength; a coherence busting mechanism comprising an optical delay element having a delay path longer than the coherence length of the output pulse. The excimer or molecular fluorine laser may be selected from a group comprising XeCl, XeF, KrF, ArF and $F_2$ laser systems. The laser gain medium may comprise a power amplifier, which may comprise a single pass amplifier stage or a multiple-pass amplifier stage. The gain medium may comprise a ring power amplification stage, which may comprise a bow-tie configuration or race track configuration and may also comprise an input/output coupler seed inject mechanism. The coherence busting mechanism may be intermediate the laser seed beam source and the gas discharge laser gain medium. The solid state seed laser beam source may comprise an Nd-based solid state laser and may comprise a frequency doubled pump pumping the Nd-based solid state laser. The Nd-based solid state laser may comprise a fiber amplifier laser and may comprise an Nd-based solid state laser selected from a group which may comprise Nd:YAG, Nd:YLF and Nd:YVO$_4$ solid state lasers. The solid state seed laser beam source may comprise an Er-based solid state laser, which may comprise a fiber laser. The Er-based solid state laser may comprise an Er:YAG laser. The frequency conversion stage may comprise a linear frequency converter, which may comprise a Ti:Sapphire crystal or a crystal comprising Alexandrite. The frequency conversion stage may comprise a non-linear frequency converter, e.g., a second harmonic generator or a sum-frequency mixer. The apparatus and method according to aspects of an embodiment may comprise a laser light source system which may comprise a solid state laser seed beam source providing a seed laser output; frequency conversion stage converting the seed laser output to a wavelength suitable for seeding an excimer or molecular fluorine gas discharge laser; an excimer or molecular fluorine gas discharge laser gain medium amplifying the converted seed laser output to produce a gas discharge laser output at approximately the converted wavelength, which may comprise a ring power amplification stage. The method may comprise utilizing a solid state laser seed beam source to provide a seed laser output; frequency converting in a frequency conversion stage the seed laser output to a wavelength suitable for seeding an excimer or molecular fluorine gas discharge laser; utilizing an excimer or molecular fluorine gas discharge laser gain medium, amplifying the converted seed laser output to produce a gas discharge laser output at approximately the converted wavelength.

It will also be understood by those skilled in the art that an apparatus and method is disclosed that may comprise a processing machine which may comprise an irradiation mechanism irradiating a workpiece, such as a semiconductor manufacturing wafer or a thin film transistor panel being irradiated, e.g., as part of a photolithography process in the former case and laser annealing for amorphous silicon crystallization in the latter, with pulsed UV light, e.g., DUV light, e.g., at 248 nm or 193 nm, or EUV light, e.g., at around 13 nm; a UV light input opening; a workpiece holding platform, e.g., a wafer transfer stage or a thin film panel transfer stage; a coherence busting mechanism comprising an optical delay path exceeding the coherence length of the UV light pulses. The optical delay path may not substantially increase the length of the UV light pulse. The coherence busting mechanism may comprise a first optical delay path of a first length and a second optical delay path of a second length, with the optical delay in each of the first and second delay paths exceeding the coherence length of the UV light pulse, but not substantially increasing the length of the pulse, and the difference in the length of the first delay path and the second delay path exceeding the coherence length of the pulse. At least one of the first and second optical delay paths may comprise a beam flipping or beam translating mechanism, e.g., the misaligned compensator plate, flipping optical elements, negative on e imaging optical elements and the like.

It will be understood by those skilled in the art that the aspects of embodiments of the disclosed subject matter disclosed above are intended to be preferred embodiments only and not to limit the disclosure of the disclosed subject matter(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the disclosed subject matter(s) but also such equivalents and other modifications and changes that would be apparent to those skilled in the art. In additions to changes and modifications to the disclosed and claimed aspects of embodiments of the disclosed subject matter(s) noted above others could be implemented.

While the particular aspects of embodiment(s) of the LASER SYSTEM described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the subject matter disclosed are merely exemplary, illustrative and representative of the subject matter which is broadly contemplated by the subject matter disclosed. The scope of the presently described and claimed aspects of embodiments fully encompasses other embodiments which may now be or may become obvious to those skilled in the art based on the teachings of the Specification. The scope of the present LASER SYSTEM is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

It will be understood also be those skilled in the art that, in fulfillment of the patent statutes of the United States, applicant(s) has disclosed at least one enabling and working embodiment of each invention recited in any respective claim appended to the Specification in the present application and perhaps in some cases only one. For purposes of cutting down on patent application length and drafting time and making the present patent application more readable to the inventor(s) and others, applicant(s) has used from time to time or throughout the present application definitive verbs (e.g., "is", "are", "does", "has", "includes" or the like) and/or other definitive verbs (e.g., "produces," "causes" "samples," "reads," "signals" or the like) and/or gerunds (e.g., "producing," "using," "taking," "keeping," "making," "determining," "measuring," "calculating" or the like), in defining an aspect/feature/element of, an action of or functionality of, and/or describing any other definition of an aspect/feature/element of an embodiment of the subject matter being disclosed. Wherever any such definitive word or phrase or the like is used to describe an aspect/feature/element of any of the one or more embodiments disclosed herein, i.e., any feature, element, system, sub-system, component, sub-component, process or algorithm step, particular material, or the like, it should be read, for purposes of interpreting the scope of the subject matter of what applicant(s) has invented, and claimed, to be preceded by one or more, or all, of the following limiting phrases, "by way of example," "for example," "as an example," "illustratively only," "by way of illustration only," etc., and/or to include any one or more, or all, of the phrases "may be," "can be", "might be," "could be" and the like. All such features, elements, steps, materials and the like should be considered to be described only as a possible aspect of the one or more disclosed embodiments and not as the sole possible implementation of any one or more aspects/features/elements of any embodiments and/or the sole possible embodiment of the subject matter of what is claimed, even if, in fulfillment of the requirements of the patent statutes, applicant(s) has disclosed only a single enabling example of any such aspect/feature/element of an embodiment or of any embodiment of the subject matter of what is claimed. Unless expressly and specifically so stated in the present application or the prosecution of this application, that applicant(s) believes that a particular aspect/feature/element of any disclosed embodiment or any particular disclosed embodiment of the subject matter of what is claimed, amounts to the one an only way to implement the subject matter of what is claimed or any aspect/feature/element recited in any such claim, applicant(s) does not intend that any description of any disclosed aspect/feature/element of any disclosed embodiment of the subject matter of what is claimed in the present patent application or the entire embodiment shall be interpreted to be such one and only way to implement the subject matter of what is claimed or any aspect/feature/element thereof, and to thus limit any claim which is broad enough to cover any such disclosed implementation along with other possible implementations of the subject matter of what is claimed, to such disclosed aspect/feature/element of such disclosed embodiment or such disclosed embodiment. Applicant(s) specifically, expressly and unequivocally intends that any claim that has depending from it a dependent claim with any further detail of any aspect/feature/element, step, or the like of the subject matter of what is claimed recited in the parent claim or claims from which it directly or indirectly depends, shall be interpreted to mean that the recitation in the parent claim(s) was broad enough to cover the further detail in the dependent claim along with other implementations and that the further detail was not the only way to implement the aspect/feature/element claimed in any such parent claim(s), and thus be limited to the further detail of any such aspect/feature/element recited in any such dependent claim to in any way limit the scope of the broader aspect/feature/element of any such parent claim, including by incorporating the further detail of the dependent claim into the parent claim.

It will be understood by those skilled in the art that the aspects of embodiments of the subject matter disclosed above are intended to be preferred embodiments only and not to limit the disclosure of the subject matter disclosed(s) in any way and particularly not to a specific preferred embodiment alone. Many changes and modification can be made to the disclosed aspects of embodiments of the disclosed subject matter disclosed(s) that will be understood and appreciated by those skilled in the art. The appended claims are intended in scope and meaning to cover not only the disclosed aspects of embodiments of the subject matter disclosed(s) but also such equivalents and other modifications and changes that would be apparent to those skilled in the art. In additions to changes and modifications to the disclosed and claimed aspects of embodiments of the subject matter disclosed(s) noted above others could be implemented.

We claim:

1. A method of operating a pulsed gas discharge laser system, the method comprising:
   producing, at a seed laser oscillator including a first gas discharge laser chamber, an output comprising a laser output light beam of pulses;
   directing the output produced at the seed laser oscillator through a regenerative ring power amplification stage containing an amplifying gain medium in a second gas discharge laser chamber;
   amplifying the produced output within the regenerative ring power amplification stage to thereby form a laser system output comprising a laser output light beam of pulses, the regenerative ring power amplification stage comprising a closed optical cavity defined in part by a partially reflecting optical element through which the seed laser oscillator output light beam is injected and through which the laser system output is transmitted, the partially reflecting optical element being a single piece and comprising portions that are angled relative to each other;

selecting a differential timing between an electrical discharge between a pair of electrodes in the first laser chamber and a pair of electrodes in the second laser chamber to thereby maintain amplified spontaneous emission below a selected limit and the pulse energy of the laser system output light beam of pulses essentially constant; and actively tuning the bandwidth of the pulses of the seed laser output light beam of pulses, wherein tuning the bandwidth comprises adjusting an interaction of a pulse wavefront with a bandwidth selection optic in a line narrowing module of the seed laser oscillator.

2. The method of claim 1, wherein:
selecting the differential timing enables control of the bandwidth of the pulses in the laser output light beam of pulses.

3. The method of claim 1, wherein:
the bandwidth selection optic comprises a grating; and
adjusting the interaction comprises changing the shape of a face of the grating upon which is incident the pulse.

4. The method of claim 1, wherein:
the bandwidth selection optic comprises a grating; and
adjusting the interaction comprises changing the shape of the wavefront of the pulse incident on the grating.

5. The method of claim 1, wherein:
the bandwidth selection optic comprises a grating; and
adjusting the interaction comprises changing the shape of a face of the grating upon which is incident the pulse and changing the shape of the wavefront of the pulse incident on the grating.

6. The method of claim 1, wherein the partially reflecting optical element further comprises a portion that is maximally reflective to a nominal center wavelength that propagates in the ring power amplification stage.

7. A method of operating a pulsed gas discharge laser system, the method comprising:
producing, at a seed laser oscillator including a first gas discharge laser chamber, an output comprising a laser output light beam of pulses;
directing the output produced at the seed laser oscillator through a regenerative ring power amplifier stage containing an amplifying gain medium in a second gas discharge laser chamber;
amplifying the produced output within the regenerative ring power amplification stage to thereby form a laser system output comprising a laser output light beam of pulses, the regenerative ring power amplification stage comprising a closed optical cavity defined in part by a partially reflecting optical element through which the seed laser oscillator output light beam is injected and through which the laser system output is transmitted, the partially reflecting optical element being a single piece and comprising portions that are angled relative to each other;
selecting a differential timing between an electrical discharge between a pair of electrodes in the first laser chamber and a pair of electrodes in the second laser chamber to thereby enable control of the bandwidth of the pulses in the laser output light beam of pulses; and
tuning the bandwidth of the pulses of the seed laser output light beam of pulses, wherein tuning the bandwidth comprises adjusting an interaction of a pulse wavefront with a bandwidth selection optic in a line narrowing module of the seed laser oscillator.

8. The method of claim 7, wherein:
the bandwidth selection optic comprises a grating; and
adjusting the interaction comprises changing the shape of a face of the grating upon which is incident the pulse.

9. The method of claim 7, wherein:
the bandwidth selection optic comprises a grating; and
adjusting the interaction comprises changing the shape of the wavefront of the pulse incident on the grating.

10. The method of claim 7, wherein:
the bandwidth selection optic comprises a grating; and
adjusting the interaction comprises changing the shape of a face of the grating upon which is incident the pulse and changing the shape of the wavefront of the pulse incident on the grating.

11. A method of operating a pulsed gas discharge laser system, the method comprising:
producing, at a seed laser oscillator including a first gas discharge laser chamber, an output comprising a laser output light beam of pulses;
directing the output produced at the seed laser oscillator through a regenerative ring power amplification stage containing an amplifying gain medium in a second gas discharge laser chamber;
amplifying the produced output within the regenerative ring power amplification stage to thereby form a laser system output comprising a laser output light beam of pulses, the regenerative ring power amplification stage comprising a closed optical cavity defined in part by a partially reflecting optical element through which the seed laser oscillator output light beam is injected and through which the laser system output is transmitted, the partially reflecting optical element being a single piece and comprising portions that are angled relative to each other;
selecting a differential timing between an electrical discharge between a pair of electrodes in the first laser chamber and a pair of electrodes in the second laser chamber; and
actively tuning the bandwidth of the pulses of the seed laser output light beam of pulses, wherein tuning the bandwidth comprises adjusting an interaction of a pulse wavefront with a bandwidth selection mechanism in a line narrowing module of the seed laser oscillator.

12. The method of claim 11, wherein:
the bandwidth selection mechanism comprises a grating; and
adjusting the interaction comprises changing the shape of a face of the grating upon which is incident the pulse.

13. The method of claim 11, wherein:
the bandwidth selection mechanism comprises a grating; and
adjusting the interaction comprises changing the shape of the wavefront of the pulse incident on the grating.

14. An apparatus comprising:
a pulsed gas discharge laser system comprising a seed laser oscillator producing an output comprising a laser output light beam of pulses comprising a first gas discharge laser chamber;
a regenerative ring laser amplification stage containing an amplifying gain medium in a second gas discharge laser chamber receiving the output of the seed laser oscillator and amplifying the output of the seed laser oscillator to form a laser system output comprising a laser output light beam of pulses, the regenerative ring laser amplification stage comprising a closed optical cavity defined in part by a partially reflecting optical element through which the seed laser oscillator output light beam is injected and through which the laser system output is transmitted, the partially reflecting optical element being a single piece and comprising portions that are angled relative to each other; and a timing and energy controller selecting a differential timing between an electrical discharge between a pair of electrodes in the first laser chamber and a pair of electrodes in the second laser chamber to thereby keep amplified spontaneous emission below a selected limit and the pulse energy of the laser system output light beam of pulses essentially constant, wherein a line narrowing module includes a bandwidth selection optic that is connected to the timing and energy controller to enable the controller to adjust the bandwidth of the seed laser oscillator output beam.

15. The apparatus of claim 14, wherein the seed laser oscillator includes a line narrowing module that includes a bandwidth selection mechanism.

16. The apparatus of claim 14, wherein the ring laser amplification stage comprises a bow-tie loop.

17. The apparatus of claim 14, wherein the ring laser amplification stage comprises a race track loop.

* * * * *